US012655667B2

(12) United States Patent
McMillian et al.

(10) Patent No.: US 12,655,667 B2
(45) Date of Patent: Jun. 16, 2026

(54) CONTINUOUS LOCKING HINGE ASSEMBLIES AND FOLDING DOOR ASSEMBLIES INCLUDING THE SAME

(71) Applicant: Endura Products, LLC, Colfax, NC (US)

(72) Inventors: Cody McMillian, Colfax, NC (US); Austin Mundy, Colfax, NC (US); Chris Keziah, Colfax, NC (US); Luke Baker, Colfax, NC (US); Michael K. Mitchell, Colfax, NC (US)

(73) Assignee: Endura Products, LLC, Colfax, NC (US)

( * ) Notice: Subject to any disclaimer, the term of this patent is extended or adjusted under 35 U.S.C. 154(b) by 34 days.

(21) Appl. No.: 18/423,628

(22) Filed: Jan. 26, 2024

(65) Prior Publication Data

US 2024/0183205 A1 Jun. 6, 2024

Related U.S. Application Data

(63) Continuation-in-part of application No. 17/976,984, filed on Oct. 31, 2022, now Pat. No. 12,345,083, (Continued)

(51) Int. Cl.

*E05D 7/06* (2006.01)
*E05D 7/00* (2006.01)
(Continued)

(52) U.S. Cl.

CPC ............. *E05D 7/009* (2013.01); *E05D 15/26* (2013.01); *E05D 7/1061* (2013.01); *E05D 2007/1094* (2013.01); *E05D 2700/12* (2013.01)

(58) Field of Classification Search

CPC ......... E05D 11/0054; E05D 2011/0063; E05D 2011/0072; E05D 3/122; E05D 1/00;
(Continued)

(56) References Cited

U.S. PATENT DOCUMENTS 375,038 A * 12/1887 Wright .................. E05D 7/0423 16/246
375,039 A * 12/1887 Wright .................. E05D 7/0423 16/388
(Continued)

FOREIGN PATENT DOCUMENTS

AU 2018275010 A1 * 7/2019 ........... E05D 7/0423
CA 3081874 A1 12/2020
(Continued)

OTHER PUBLICATIONS

US Final Office Action for U.S. Appl. No. 17/976,984; Report Mail Date Oct. 10, 2024; 8 Pages.
(Continued)

*Primary Examiner* — Chuck Y Mah
(74) *Attorney, Agent, or Firm* — IceMiller LLP

(57) ABSTRACT

An adjustable hinge includes a first body, a second body, and an adjustment mechanism. The first body and the second body are each configured to secure to a mounting edge of a door panel. The first and second bodies are pivotally coupled to each other. The adjustable hinge has a closed position in which the first body and the second body are configured to support the first and second door panels such that an inside face of each door panel is coplanar with the other and an open position in which the inside faces are opposed to one another. The adjustment mechanism is disposed in the first body or the second body and is configured to increase or decrease a gap defined between the mounting edge of the first door panel and the mounting edge of the second door panel when the adjustable hinge is in the closed position.

5 Claims, 60 Drawing Sheets

Related U.S. Application Data which is a continuation of application No. 16/890,016, filed on Jun. 2, 2020, now Pat. No. 11,486,177.

(60) Provisional application No. 63/441,594, filed on Jan. 27, 2023, provisional application No. 62/857,882, filed on Jun. 6, 2019.

(51) Int. Cl.
*E05D 15/26* (2006.01)
*E05D 7/10* (2006.01)

(58) Field of Classification Search
CPC ......... E05D 5/06; E05D 7/009; E05D 7/1061; E05D 7/0423; E05D 15/26; E05D 15/262; E05D 15/264; E05D 15/266; E05D 3/02; E05D 2007/1094; E05D 2015/268; E05D 2700/12; E05D 2007/0461; E05Y 2900/132; E05Y 2900/502; E05Y 2600/46; E05Y 2600/41; E05Y 2600/632; E05Y 2201/484; E05Y 2201/496; E05Y 2201/10; E05Y 2201/11; E05F 1/1215; B64C 1/1461
See application file for complete search history.

(56) References Cited

U.S. PATENT DOCUMENTS 947,168 A 1/1910 Trimmer
1,668,839 A 5/1928 Thomas
1,782,490 A 11/1930 Torgerson
2,541,567 A 2/1951 Barrett
2,557,716 A 6/1951 Allee
2,790,198 A 4/1957 Schoen
3,111,208 A 11/1963 Harold
3,152,355 A 10/1964 Raymond
3,210,798 A 10/1965 Tice
3,484,895 A 12/1969 Mock
3,584,332 A 6/1971 Taylor
3,695,330 A * 10/1972 Hasbrouck ................ E05D 1/02 136/238
3,696,463 A 10/1972 Watson
3,703,742 A 11/1972 Konishi
3,720,255 A 3/1973 Ueda
3,828,394 A 8/1974 Horgan
3,907,021 A 9/1975 Smith
4,237,577 A 12/1980 Chapel
4,387,760 A 6/1983 Greschbach
4,543,687 A 10/1985 Law
4,922,987 A 5/1990 Marontate
4,953,611 A 9/1990 Verstraten
4,999,876 A 3/1991 Nass
5,150,501 A * 9/1992 Pasternak ............... E05D 15/26 16/272
5,327,684 A * 7/1994 Herbst ...................... E05D 7/02 16/382
5,329,667 A * 7/1994 Erskine ..................... E05D 1/04 16/269
5,375,296 A 12/1994 Zaleskie
5,483,770 A 1/1996 Marinoni
5,611,173 A 3/1997 Headrick et al.
5,694,665 A 12/1997 Strickland et al.
5,742,980 A 4/1998 Nitta
5,941,027 A 8/1999 Hallsten
5,943,825 A 8/1999 Procton et al.
5,971,187 A * 10/1999 Clee ....................... B65D 11/18 16/382
6,141,830 A * 11/2000 Shimooka ............. E05D 7/0423 16/245
6,276,025 B1 8/2001 Leibman
6,336,249 B1 1/2002 Plumley
6,367,201 B1 4/2002 Massey et al.
6,516,494 B2 2/2003 Nakamoto et al.
6,618,900 B2 9/2003 Spork
6,719,363 B2 4/2004 Erlandsson
6,763,639 B2 7/2004 Bennett et al.
6,789,358 B2 9/2004 Procton et al.
6,928,713 B2 8/2005 Baer
6,938,665 B2 9/2005 Lewis, Jr.
6,955,205 B2 10/2005 Lewis
7,246,412 B2 7/2007 Pacholke
7,735,882 B2 6/2010 Abdollahzadeh et al.
7,895,713 B2 3/2011 Williams, Jr.
8,074,699 B2 12/2011 Jones et al.
8,375,659 B2 2/2013 Bogenhagen et al.
8,448,384 B2 5/2013 Wernlund et al.
8,499,418 B2 * 8/2013 Deveze ..................... E05D 5/14 16/250
8,677,564 B2 3/2014 Pelekanos
8,695,165 B2 4/2014 Pelekanos
8,739,367 B2 6/2014 Park
8,844,604 B2 9/2014 Pelekanos et al.
8,966,823 B1 3/2015 Van Camp
9,032,589 B2 5/2015 Pelekanos
9,157,265 B2 10/2015 Pelekanos
9,157,267 B2 10/2015 Pelekanos
9,169,682 B2 10/2015 Reynard
9,428,259 B2 8/2016 Savian
9,605,457 B2 3/2017 Humble
9,624,716 B2 4/2017 Mitchell et al.
9,863,183 B2 1/2018 Johnson et al.
9,976,329 B1 5/2018 Lucci et al.
10,125,527 B2 11/2018 Smalls
10,683,688 B2 6/2020 Nußbaum
10,704,316 B2 7/2020 Kendall
10,745,962 B2 8/2020 Mitchell
10,844,655 B2 11/2020 Kindt et al.
11,085,299 B2 8/2021 Mathers
11,486,177 B2 11/2022 Mitchell
2001/0011583 A1 8/2001 Spork
2003/0024072 A1 * 2/2003 Nussbaum ................ E05D 7/04 16/235
2003/0106269 A1 6/2003 Bauman et al.
2005/0120517 A1 6/2005 Bonham
2007/0094846 A1 5/2007 Ishida
2008/0276418 A1 11/2008 Peters
2009/0152879 A1 6/2009 Pala
2010/0012280 A1 1/2010 Hans
2010/0162644 A1 7/2010 Campbell et al.
2011/0005691 A1 1/2011 Schneider
2011/0099754 A1 * 5/2011 Stull ......................... E05D 5/06 16/245
2013/0186038 A1 7/2013 Lang
2013/0283566 A1 * 10/2013 Wach ...................... E05F 1/123 16/245
2015/0135480 A1 * 5/2015 Bartels ...................... E05D 7/04 16/237
2016/0024826 A1 1/2016 Smith
2016/0047151 A1 2/2016 Pelekanos et al.
2016/0194068 A1 7/2016 Savian et al.
2016/0201369 A1 7/2016 Criddle
2016/0215544 A1 * 7/2016 Smalls .................. E05D 5/0223
2016/0237729 A1 * 8/2016 Kohlweiss ................ E05D 3/02
2016/0327085 A1 11/2016 Carrera Gonzalez
2017/0198507 A1 7/2017 Humble et al.
2017/0247920 A1 * 8/2017 Dolman .................... E05D 7/04
2019/0078367 A1 3/2019 Xiao
2019/0136607 A1 5/2019 Lewis
2020/0386024 A1 12/2020 Mitchell
2021/0262259 A1 8/2021 Duer
2023/0046401 A1 2/2023 Mitchell
2024/0183205 A1 6/2024 McMillian et al.
2024/0254827 A1 8/2024 McMillian et al.

FOREIGN PATENT DOCUMENTS

CN 201268999 Y * 7/2009
CN 203626469 U * 6/2014
DE 102010004772 B3 * 1/2011 ........... E05D 7/0027
EP 2275631 A2 * 1/2011 ............ E05D 5/125
EP 2294957 A2 * 3/2011 ............... A47K 3/30

(56) References Cited

FOREIGN PATENT DOCUMENTS

| | | | | |
|---|---|---|---|---|
| FR | 3140643 A1 * | 4/2024 | .......... | E05D 7/0045 |
| KR | 20160015907 A | 2/2016 | | |
| KR | 101875113 B1 | 8/2018 | | |

OTHER PUBLICATIONS

U.S. Appl. No. 17/976,984, filed Oct. 31, 2022, Michael Mitchell.
U.S. Appl. No. 18/423,484, filed Jan. 26, 2024, Cody McMillian.
U.S. Appl. No. 29/925,821, filed Jan. 26, 2024, Austin Mundy.
Canadian Office Action Issued in Canadian Application No. 3,081,874 dated Mar. 14, 2024, 5 Pages.
Brio Weatherfold, http://briousa.com/wp-content/uploads/sites/3/2016/08/Brio-Weatherfold-4s-Brochure.pdf, known at least as early as Jun. 29, 2018, 36 pgs.
Brio Dual Point Lock, http://briousa.com/wp-content/uploads/sites/3/2016/08/Brio-286-Dual-Point-Lock-Brochure-USA. pdf, known at least as early as Jun. 29, 2018, 20 pgs.
Brio Flush Bolt Range, http://briousa.com/wp-content/uploads/sites/3/2017/11/Brio-Flush-Bolt-Range-Brochure.pdf, known at least as early as Jun. 29, 2018, 16 pgs.
Kolbe Windows and Doors, https://www.kolbewindows.com/doors/vistaluxe-folding, known at least as early as Jun. 29, 2018, 4 pgs.
Marvin Windows and Doors, https://www.marvin.com/WebDoc/Marvin%20ADM%20CMOBFD.pdf, known at least as early as Jun. 29, 2018, 7 pgs.
Western Window Systems, https://westernwindowsystems.com/classic-line/series-9500-folding-door-systems/, known at least as early as Jun. 29, 2018, 19 pgs.
Assa Abloy, https://www.assaabloyentrance.us/en/products/automatic-doors/automatic-folding-doors/, known at least as early as Oct. 4, 2021, 3 pgs.
Pending U.S. Appl. No. 18/423,484, filed Jan. 26, 2024.
Pending Design U.S. Appl. No. 29/925,821, filed Jan. 26, 2024.

* cited by examiner

CONTINUOUS LOCKING HINGE ASSEMBLIES AND FOLDING DOOR ASSEMBLIES INCLUDING THE SAME

CROSS-REFERENCE TO RELATED APPLICATIONS

This application claims priority to, and the benefit of, U.S. Provisional Patent Application Ser. No. 63/441,594, filed Jan. 27, 2023, and this application is a continuation-in-part of U.S. patent application Ser. No. 17/976,984, filed Oct. 31, 2022, which is a continuation of U.S. patent application Ser. No. 16/890,016, filed Jun. 2, 2020, now U.S. Pat. No. 11,486,177, which claims priority to, and benefit from, U.S. Provisional Patent Application Ser. No. 62,857,882, filed Jun. 6, 2019. The entire contents of each of the above applications are hereby incorporated by reference.

FIELD OF DISCLOSURE

The present disclosure relates to folding door assemblies. More particularly, the present disclosure relates to folding door assemblies including a continuous locking hinge assembly including a locking feature and/or an integrated weather seal.

BACKGROUND

Folding door assemblies can provide for large openings between building spaces when open and can prevent liquid intrusion, prevent thermal conduction, and/or provide acoustic isolation when closed. Typically, folding door assemblies include door panels that are connected to each other by multiple, surface-mounted hinges located on edges of each door panel. The end panels may utilize pivot hinges at the top and bottom of their outermost edges and the panels can be supported by roller hardware or bogies attached near the top ends such that the panels hang from and are guided by an overhead rail or track. The panels can be guided at the bottom by roller hardware that rides in a sill or on a floor track. The roller hardware is typically installed in grooves, channels, or mortises that are machined in the top and bottom ends of the panels.

To lock the panels in a closed position, locking hardware can be mounted to the panel edge or face and be driven into the sill. The locking hardware may be flush on the panel or may be installed within an end of a panel requiring machining of the end of the panel.

In the closed position, the gaps or spaces between adjacent panels are sealed by weather seals attached to each panel. To attach the weather seals, each panel is machined to include mounting slots along the edges to receive the weather seals.

SUMMARY

This disclosure relates generally to door panel assemblies having continuous hinge assemblies that include pivots, roller assemblies, weather seals, and/or a locking system. The hinge assemblies may be secured to the door panels without requiring additional machining of the panels, e.g., grooves, channels, or mortises. The door panel assemblies may include an adjustment mechanism to adjust a gap between adjacent door panels.

In an embodiment of the present disclosure, a continuous hinge assembly includes a first leaf, a second leaf, an upper pivot, and a lower pivot. The first leaf has an uppermost end and a lowermost end and is configured to be secured to an edge of a first panel with the uppermost end disposed adjacent a top end of the first panel and the lowermost end disposed adjacent a bottom end of the first panel. The second leaf has an uppermost end and a lowermost end and is configured to be secured to an edge of a second panel adjacent the edge of the first panel with the uppermost end disposed adjacent a top end of the second panel and the lowermost end disposed adjacent a bottom end of the second panel. The upper pivot is formed between the first leaf and the second leaf and is disposed adjacent the uppermost ends of the first and second leaves. The lower pivot is formed between the first leaf and the second leaf and is disposed adjacent the lowermost ends of the first and second leaves. The upper and lower pivots are coaxially aligned with one another to define a pivot axis between the first and second leaves. The first and second leaves are configured to pivot relative to one another about the pivot axis. The first and second leaves have a closed position in which the first and second panels are aligned on edges with one another to form an extended wall and an open position in which the first and second panel are out of alignment with one another.

In embodiments, the continuous hinge assembly includes a locking assembly having an upper shoot bolt with an upper tip. The locking assembly may have a retracted position in which the upper tip of the upper shoot bolt is disposed at or below the uppermost end of the hinge assembly and an extended position in which the upper tip of the upper shoot bolt extends in a direction parallel to the pivot axis above the uppermost end of the hinge assembly. The upper shoot bolt may be configured to be disposed between the edge of the first panel and the edge of the second panel in the closed position. The locking assembly may include an upper shoot bolt guide secured to the first leaf adjacent the uppermost end thereof. The upper shoot bolt guide may define a pair of finger catches on opposite sides thereof. The first leaf may include a pair of opposed retaining fingers with each of the retaining fingers received within one of the pair of finger catches to secure the upper shoot bolt guide relative to the first leaf.

In some embodiments, the locking assembly includes a lower shoot bolt having a lower tip. In the retracted position of the locking assembly, the lower tip of the lower shoot bolt may be disposed at or above the lowermost end of the hinge assembly and in the extended position of the locking assembly the lower tip of the lower shoot bolt may extend in a direction parallel to the pivot axis below the lowermost end of the hinge assembly. The locking assembly may include a lock lever that is rotatable between a locked position and an unlocked position to transition the shoot bolts between the extended and retracted positions. The upper and lower shoot bolts may be coaxially aligned with one another.

In certain embodiments, the locking assembly includes a latch configured to secure the first and second leaves in the closed position. The latch may include a latch key and have a locked position in which the latch key is configured to extend between the first and second leaves to secure the first and second leaves in the closed position. The locking assembly may include a latch release button configured to retract the latch from the locked position towards an unlocked position in which the first and second leaves are permitted to move from the closed position towards the open position. The latch release button may include a release cam that is operably engaged with the latch. The latch release cam may be configured to operably engage the latch to translate the latch towards the unlocked position as the latch release button is depressed. The latch release button may be configured to move in a direction orthogonal to the latch to translate the latch towards the unlocked position. The latch may be biased towards the locked position. The latch may engage the latch release button to bias the latch release button towards the undepressed position. In the locked position of the lock lever, the lock lever may prevent access to the latch release button.

In particular embodiments, the latch is attached to the first leaf and the second leaf includes a latch strike configured to engage the latch as the first and second leaves approach the closed position to transition the latch from the locked position towards the unlocked position. The latch strike may be configured to permit the latch to return to the locked position when the first and second leaves are in the closed position.

In embodiments, the continuous hinge assembly includes an upper roller assembly that extends from the uppermost surface of the first leaf. The upper roller assembly may include a first roller configured to support the first and second leaves. The first roller may be configured to roll along a track as the first and second leaves transition between the open and closed position. The continuous hinge assembly may include a lower roller assembly that extends from the lowermost surface of the first leaf. The lower roller assembly may include a lower guide roller that is configured to extend into and translate into a channel of a sill as the first and second leaves transition between the open and closed positions. The lower guide roller may define a longitudinal axis coaxial with the pivot axis.

In some embodiments, each of the first and second leaves includes a mounting segment that is configured to be secured and in contact with the edge of the respective first or second panel. Each of the first and second leaves may include an offset segment that is parallel to and laterally offset from the mounting segment. Each of the first and second leaves may include a top plate having a mounting flange secured to the offset segment and configured to be positioned between the offset segment and an edge of the respective one of the first or second panels. Each of the first and second leaves may include an alignment finger that may be configured to extend along a surface of one of the first or second panels to position the respective one of the first or second leaves relative to the one of the first or second panels.

In certain embodiments, the continuous hinge assembly includes a weather strip that is secured to the first leaf or the second leaf and configured to form a seal between the first and second leaves. The seal may be formed from the uppermost ends to the lowermost ends of the first and second leaves in the closed position. The weather strip may be positioned entirely between the first and second leaves in the closed position of the continuous hinge assembly.

In another embodiment of the present disclosure, a door panel system includes first, second, and third panels, a first hinge, and a second hinge. The first, second, and third panels each have a top end and a bottom end. The first hinge pivotally couples the first panel to the second panel and has an uppermost end adjacent the top end of each of the first and second panels and a lowermost end adjacent the bottom end of each of the first and second panels. The second hinge pivotally couples the second panel to the third panel. The door panel system has a closed configuration in which the first, second, and third panels are aligned edge to edge with one another and an open configuration in which the first, second, and third panels are stacked parallel with one another and orthogonal to the closed configuration.

In another embodiment of the present disclosure, a continuous hinge assembly includes a first leaf, a second leaf, and a locking assembly. The first leaf is configured to secure to a first panel and the second leaf is configured to secure to a second panel. The first and second leaves have a closed position in which the first and second leaves are nested with one another and an open position in which the first and second leaves are pivoted apart about a common pivot axis. The locking assembly is configured to prevent the first and second leaves from pivoting from the closed position towards the open position. The locking assembly is disposed between the first leaf and the second leaf when the first and second leaves are nested with one another.

In embodiments, the locking assembly includes a latch having a latch key. The latch may have a locked position in which the latch key is disposed between a first edge of the first leaf and a second edge of the second leaf in the closed position to prevent the first and second leaves from pivoting from the closed position towards the open position. The latch may have an unlocked position in which the latch key is withdrawn from between the first and second edges.

In some embodiments, the locking assembly includes a locking lever that is pivotal between an unlocked position and a locked position. The locking assembly may include an upper shoot bolt and a lower shoot bolt that are each operably coupled to the locking lever such that in the locked position the upper and lower shoot bolts are each in an extended position to prevent pivoting of the first and second leaves from the closed position and in the unlocked position the upper and lower shoot bolts are each in a retracted position in which the first and second leaves are permitted to pivot relative to one another.

In another embodiment of the present disclosure, a continuous hinge assembly includes a first leaf and a second leaf. The first leaf is configured to secure to a first panel and extend along a majority of a hinged edge of the first panel. The second leaf is configured to secure to a second panel and to extend along a majority of a hinged edge of the second panel. The first leaf and the second leaf have a closed position in which the first leaf and the second leaf are nested with one another and an open position in which the first leaf and the second leaf are pivoted apart about a common pivot axis.

In embodiments, the continuous hinge assembly includes a locking assembly that is configured to secure the first leaf and the second leaf from pivoting from the closed position toward the open position. The locking assembly may be disposed within the first leaf and the second leaf when the first leaf and the second leaf are nested within one another. The locking assembly may include a locking lever that is pivotal between an unlocked position and a locked position. An upper shoot bolt and a lower shoot bolt are each operably coupled to the locking lever such that in the locked position the upper and lower shoot bolts are each in an extended position to prevent pivoting of the first and second leaves from the closed position and in the unlocked position, the upper and lower shoot bolts are each in a retracted position in which the first and second leaves are permitted to pivot relative to one another.

In some embodiments, the hinge assembly includes a top pivot assembly that is secured to a top end of the first leaf and a top end of the second leaf. The top pivot assembly may include a first side and a second side. The first side may be secured to the top end of the first leaf and the second side may be secured to the top end of the second leaf. The top pivot assembly may define a pivot axis such that the first leaf and the second leaf pivot relative to one another about the pivot axis between the closed position and the open position. The first leaf may define a cavity and the pivot axis may pass through the cavity of the first leaf. The second leaf may define a cavity and the pivot axis may pass through the cavity of the second leaf.

In certain embodiment, the first leaf has a first extraction profile, and the second leaf has a second extrusion profile that is different from the first extrusion profile. The hinge assembly may include a weather strip that is secured to the section leaf. The weather strip may be configured to engage the first leaf when in the closed position to form a seal between the first leaf and the second leaf. The first leaf may include a cover that is secured thereto. The cover may be configured to cover fasteners that secure the first leaf to the first panel. The cover may be engaged by the weather strip to form at least a portion of the seal between the first leaf and the second leaf in the closed position.

In particular embodiments, the hinge assembly includes a gap adjustment mechanism that is disposed in the first side of the second side of the top pivot assembly. The gap adjustment mechanism may be configured to adjust a thickness of the top pivot assembly. The gap adjustment mechanism may include a body that is rotatably fixed to the first side of the second side of the top pivot assembly, the body may define a pivot axis and may be configured to receive and rotate about a pivot pion disposed therethrough. The gap adjustment mechanism may include an adjustment screw that extends in a direction orthogonal to the pivot axis such that rotation of the adjustment screw in a first direction increases the thickness of the top pivot and rotation of the adjustment screw in a second direction opposite the first direction decreases a thickness of the top pivot.

In another embodiment of the present disclosure, surface mounted hardware for a folding door assembly includes a first leaf and a second leaf. The first leaf is configured to secure to an unmachined hinged edge of a first panel of a fooling door assembly and the second leaf is configured to secured to an unmachined hinged edge of a second panel of the folding door assembly. The first leaf and the second leaf having a closed position in which the first and second leaves are configured to support the first and second panels in a parallel planar relation within one another and an open position in which the first and second leaves are configured to support the first and second panels in a stacked relationship with one another.

In another embodiment of the present disclosure, an adjustable hinge includes a first body, a second body, and an adjustment mechanism. The first body is configured to secure to a mounting edge of a first door panel. The second body is configured to secure to a mounting edge of a second door panel. The second body is pivotally coupled to the first body. The adjustable hinge has a closed position in which the first body and the second body are configured to support the first door panel and the second door panel such that an inside face of the first door panel and an inside face of the second door panel are coplanar with one another. The adjustable hinge has an open position in which the first body and the second body are configured to support the first door panel and the second panel such that the inside face of the first door panel and the second door panel are opposed to one another. The adjustment mechanism is disposed in one of the first body or the second body. The adjustment mechanism is configured to increase or decrease a gap defined between the mounting edge of the first door panel and the mounting edge of the second door panel when the adjustable hinge is in the closed position.

In embodiments, the adjustment mechanism includes an adjustment screw. Rotation of the adjustment screw in a first direction may increase the gap and rotation of the adjustment screw in a second direction opposite the first direction decreases the gap. The adjustment screw may define a rotation axis. The rotation axis may be parallel to the inside face of one of the first door panel or the second door panel in the closed position.

In some embodiments, the adjustable hinge assembly includes a first anchor and a second anchor. The first anchor may be configured to directly secure to the mounting edge of the first door panel. The first body may be secured directly to the first anchor. The second anchor may be configured to directly secured to the mounting edge of the second door panel. The second body may be secured directly to the second anchor.

In another embodiment of the present disclosure, an adjustable hinge includes a pin, a first body, a second body, and an adjustment mechanism. The pin defines a pivot axis. The first body includes a first connection plate. The second body includes a second connection plate. The second body is pivotally coupled to the first body. The pin extends between the first body and the second body such that the first body and the second body pivot with respect to each other about the pivot axis between a closed position in which the first connection and the second connection plate are coplanar with one another and an open position in which the first connection plate and the second plate face opposite directions from one another. The adjustment mechanism is disposed within one of the first body or the second body. The adjustment mechanism is configured to increase or decrease a gap defined between the first connection plate and the second connection plate in the closed position. The adjustment mechanism includes a carriage and an adjustment screw. The carriage has a rack. The adjustment screw is operably engaged with the rack such that rotation of the adjustment screw in a first direction increases the gap and rotation of the adjustment screw in a second direction opposite the first direction decreases the gap.

In embodiments, when the first body and the second body are in the open position, the pivot axis is disposed between the first connection plate and the second connection plate. The first connection plate and the second connection plate may define a plate distance therebetween in the open position. The plate distance may remain constant in response to rotation of the adjustment screw. The adjustment screw may define a rotational axis. The pivot axis and the rotational axis may be perpendicular to one another. The pivot axis and the rotational axis may intersect.

In another embodiment of the present disclosure, an adjustable hinge includes a pin knuckle and a receiver knuckle. The pin knuckle includes a pivot pin and a first connection plate. The pivot pin defines a pivot axis. The receiver knuckle includes a second connection plate. The receiver knuckle is pivotally coupled to the pin knuckle about the pivot axis. The receiver knuckle and the pin knuckle are pivotable with respect to each other between a closed position in which the first connection plate and the second connection plate are coplanar with one anther and an open position in which the first connection plate and the second connection plate face in opposite directions from one another. The receiver knuckle defines an adjustment channel having a length. The receiver knuckle includes an adjustment mechanism. The adjustment mechanism includes a carriage and adjustment screw. The carriage is slidingly disposed within the adjustment channel. The carriage defines a pivot pin hole to receive the pivot pin therein. The adjustment screw is operably engaged with the carriage such that rotation of the adjustment screw translates the carriage within the adjustment channel along the length thereof such that the gap defined between the first connection plate and the second connection plate in the closed position is adjusted.

In embodiments, rotation of the adjustment screw in a first direction translates the carriage in a first direction within the adjustment channel and rotation of the adjustment screw in a second direction opposite the first direction translates the carriage in a second direction opposite the first direction. Rotation of the adjustment screw in the first direction may increase the gap and rotation of the adjustment screw in the second direction may decrease the gap.

In some embodiments, the length of the adjustment channel defines a minimum thickness and a maximum thickness of the gap. The minimum thickness of the gap may be 0 inches and the maximum thickness of the gap may be 0.5 inches.

In another aspect of the present disclosure, a threshold assembly has an interior side, an exterior side opposite the interior side, a top side, and a bottom side opposite the top side. The threshold assembly includes a substrate and a sill deck. The sill deck is attached to the substrate. The sill deck includes a deck cover and sill track. The sill cover is positioned over a portion of the substrate. The deck cover extends toward the exterior side of the threshold assembly. The sill track has an attachment wall, an exterior wall, and a bottom wall. The attachment wall is positioned on an exterior side of the substrate. The exterior wall is positioned on an exterior side of the substrate and defines the exterior side of the threshold assembly. The attachment wall and the exterior wall define a channel therebetween. The channel is open upward and closed on the bottom by the bottom wall.

In embodiments, the sill deck includes a leg extending from the attachment wall towards the interior side of the threshold assembly. The leg spaces the attachment wall apart from the top surface of the sill deck.

In some embodiments, the threshold assembly includes a shoot bolt receptacle. The shoot bolt receptacle defines a shoot bolt cup configured to receive a shoot bolt therein. The entire sill deck may be monolithically formed. The attachment wall and the exterior wall may be substantially parallel with respect to one another. The substrate may have a bottom surface and the sill track may have a bottom surface that may be coplanar with the bottom surface of the substrate.

In certain embodiments, the threshold assembly includes a drain plug attached to the sill track. The drain plug defines a drain channel that may be in fluid communication with the channel of the sill track. The drain plug may be configured to drain liquids from the drain channel of the sill track.

In particular embodiments, the threshold assembly includes a threshold cap. The threshold cap may include a nosing at an interior side thereof and may define a drain channel on an exterior side of the nosing. The threshold cap may be secured to the sill deck and positioned at least partially over the drain channel and a portion of the deck cover of the sill deck. The threshold assembly may include a weather seal secured to the threshold cap. The weather seal may extend in an exterior direction from the threshold cap. The weather seal may be configured to engage an interior side of a door panel to form a weather resistant seal with the interior side of the door panel.

In another embodiment of the present disclosure, a threshold assembly has an interior side, an exterior side opposite the interior side, a top side, and a bottom side opposite the top side. The threshold assembly includes a sill deck and a sill track. The sill deck has a vertical wall and a top surface. The top surface declines from the vertical wall towards the exterior side of the threshold assembly. The sill track has an attachment wall, an exterior wall, and a bottom wall defining a channel therebetween. The exterior wall defines the exterior side of the threshold assembly and the bottom wall forms the lowest surface of the top side of the threshold assembly.

In embodiments, the sill track is monolithically formed with the sill deck. The sill track may be removably secured to the sill deck. The sill track may be spaced apart from the sill deck by a leg extending from the attachment wall.

In another aspect of the present disclosure, a sill deck has an interior side and an exterior side opposite the interior side. The sill deck includes a deck cover, an attachment wall, an exterior wall, and a bottom wall. The deck cover is configured to be disposed at least partially over a substrate. The attachment wall is configured to be dispose on an exterior side of a substrate. The exterior wall is positioned on an exterior side of the attachment wall. The attachment wall and the exterior wall define an upwardly open channel therebetween. The bottom wall closes a bottom of the channel. The bottom wall is configured to be in direct contact with a surface at grade.

In embodiments, the bottom wall is configured to support a majority of a weight of a door panel system. The deck cover may be configured to at least partially underlay a door panel in a closed position thereof. The exterior wall may be configured to be positioned on an exterior side of the door panel in a closed position thereof.

In some embodiments, the sill deck includes a front wall extending directly from an exterior end of the deck cover. The front wall may be disposed in a vertical orientation and configured to be positioned on an exterior side of a substrate and on an interior side of the attachment wall. The sill deck may include a leg extending from the attachment wall to the front wall. The entire sill deck may be monolithically formed.

In another embodiment of the present disclosure, a continuous hinge assembly for a door panel system includes a first leaf, a second leaf, a handle, a locking mechanism, and a lock lever. The first leaf is configured to secure to an edge of a first door panel. The second leaf is configured to secure to an edge of the second door panel. The second leaf is pivotally coupled to the first leaf. The continuous hinge assembly has a closed position in which the first leaf and the second leaf are configured to support the first door panel and the second door panel with interior surfaces thereof coplanar with one another. The continuous hinge assembly having an open position in which the first leaf and the second leaf are configured to support the first door panel and the second door panel with interior surface thereof out of plane with one another. The handle is mounted to one of the first leaf or the second leaf. The handle has a first end segment and a second end segment opposite the first end segment. The handle is configured to be engaged to transition the hinge assembly between the closed position and the open position thereof. The locking mechanism is disposed in one of the first leaf or the second leaf. The locking mechanism includes a bottom shoot bolt and a top shoot bolt. The locking mechanism has a locked configuration in which the top shoot bolt and the bottom shoot bolt extend from the one of the first leaf or the second leaf to prevent the continuous hinge assembly from moving towards the open position from the closed position and an unlocked configuration in which the continuous hinge assembly is allowed to move towards the open position from the closed position. The lock lever is pivotally coupled to the handle. The lock lever includes an end portion. The lock lever having a locked state in which the end portion of the lock lever is disposed adjacent to the first end segment of the handle and an unlocked state in which the end portion is disposed adjacent to the second end segment. The locked state corresponds to the locked configuration of the locking mechanism and the unlocked state corresponds to the unlocked configuration of the locking mechanism.

In embodiments, the locking mechanism includes a bottom shoot bolt rack, a top shoot bolt rack, and a rack gear. The bottom shoot bolt rack may be coupled to the bottom shoot bolt. The top shoot bolt rack may be coupled to the top shoot bolt. The rack gear may be disposed between and meshingly engaged with the bottom shoot bolt rack and the top shoot bolt rack. The lock lever may be coupled to the rack gear such that pivoting the lock lever between the locked state and the unlocked state simultaneously translates the bottom shoot bolt rack and the top shoot bolt rack in opposite directions from one another.

In some embodiments, the hinge assembly includes a throw adjustment mechanism that adjusts a throw distance of the top shoot bolt or the bottom shoot bolt in the locked configuration thereof. The throw adjustment mechanism may include a plurality of ports that are spaced apart from one another by a distance and a first adjustment point. The throw adjustment mechanism may be configured to adjust the throw distance by an integer of the distance based on the port aligned with the first adjustment point. The throw adjustment mechanism may include a second adjustment point separated from the first adjustment point by an integer and a half distance from the first adjustment point such that the throw distance is adjustable by a half integer of the distance. The hinge assembly may be configured as a floating hinge.

In another embodiment of the present disclosure, a handle assembly includes a handle and a lock lever. The handle has a first end segment, a second end segment opposite the first end segment, and a handle side surface. The lock lever is pivotally coupled to the handle. The lock lever includes an end portion and a lever side surface. The lock lever has a locked state in which the end portion of the lock lever is disposed adjacent to the first end segment of the handle and an unlocked state in which the end portion is disposed adjacent to the second end segment of the handle. In the locked state and the unlocked state the lock lever side surface is positioned congruent to the handle side surface.

In embodiments, the handle has an interior surface that extends from the first end segment and the second end segment. The lock lever may have an interior surface. In one of the locked state or the unlocked state the interior surface of the lock lever may be congruent with the interior surface of the handle. In the other of the locked state or the unlocked state the interior surface of the lock lever may be non-congruent with the interior surface of the handle.

In some embodiments, a position of the end portion of the lock lever relative to the handle provides a visual indication of the state of the lock lever. The end portion of the lock lever may be formed to provide visual indication that the lock lever is in the locked state or the unlocked state. A position of the end portion of the lock lever relative to the handle may provide a visual indication of the state of the lock lever.

In another embodiment of the present disclosure, a continuous hinge assembly for a door panel system includes a first leaf, a second leaf, a handle, and a lock lever. The first leaf is configured to secure to an edge of a first door panel. The second leaf is configured to secure an edge of a second door panel. The second leaf is pivotally coupled to the first leaf. The hinge assembly has a closed position in which the first leaf and the second leaf are configured to support the first door panel and the second door panel with interior surfaces thereof coplanar with one another. The hinge assembly has an open position in which the first leaf and the second leaf are configured to support the first door panel and the second door panel with interior surface thereof out of plane with one another. The handle is mounted to one of the first leaf or the second leaf. The handle has a first end segment and a second end segment opposite the first end segment. The handle is configured to be engaged to transition the hinge assembly between the closed position and the open position thereof. The lock lever is pivotally coupled to the handle. The lock lever includes an end portion. The lock lever has a locked state in which the end portion of the lock lever is disposed adjacent to the first end segment of the handle and the hinge assembly is prevented from moving towards the open position from the closed position. The locking lever has an unlocked state in which the end portion is disposed adjacent to the second end segment and the hinge assembly is allowed to move towards the open position from the closed position.

In embodiments, the hinge assembly is configured as a floating hinge. The handle may define a finger well with the one of the first leaf or the second leaf. The finger well may be configured to provide a grip for a user to transition the hinge assembly between the open position and the closed position. The handle may include a handle side surface and the lock lever may include a lever side surface. The lever side surface may be congruent with the handle surface in the locked state and the unlocked state.

In some embodiments, the handle has an interior surface that extends from the first end segment to the second end segment. The lock lever may have an interior surface. In one of the locked state or the unlocked state the interior surface of the lock lever may be congruent with the interior surface of the handle. In the other of the locked state or the unlocked state the interior surface of the lock lever may be non-congruent with the interior surface of the handle.

In certain embodiments, a position of the end portion of the lock lever relative to the handle provides a visual indication of the state of the lock lever. The end portion of the lock lever may be formed to provide visual indication that the lock lever is in the locked state or the unlocked state.

In another embodiment in accordance with the present disclosure, a door panel system includes a first door panel, a second door panel, a third door panel, a first hinge assembly, and a second hinge assembly. The first door panel has a first mounting edge. The second door panel has a second mounting edge and a third mounting edge opposite the second mounting edge. The third door panel has a fourth mounting edge. Each of the first door panel, the second door panel, and the third door panel are suitable for use as a hinged door panel. The first hinge assembly is secured to the first mounting edge of the first door panel and the second mounting edge of the second door panel to pivotally couple the first door panel and the second door panel to each other. The second hinge assembly is secured to the third mounting edge of the second door panel and the fourth mounting edge of the third door panel to pivotally couple the second door panel and the third door panel to each other. The door panel system has a closed posture in which an interior surface of the first door panel, an interior surface of the second door panel, and an interior surface of the third door panel are coplanar with one another. The door panel system having a fully open posture in which first door first door panel, the second door panel, and the third door panel are stacked relative to one another such that the interior surfaces of the first door panel and the second door panel oppose one another and the interior surface of the first door panel, the interior surface of the second door panel, and the interior surface of the third door panel are substantially parallel with one another.

In another embodiment in accordance with the present disclosure, a door panel system includes a first door panel, a second door panel, a third door panel, a first hinge assembly, and a second hinge assembly. The first door panel has a first mounting edge. The second door panel has a second mounting edge and a third mounting edge opposite the second mounting edge. The third door panel has a fourth mounting edge. The third door panel defines a through bore configured to receive a handle set common to hinged doors. The handle set is actuatable between a latched configuration in which a latch of the handle set extends from the third door panel and an unlatched configured in which the latch is retracted within the third door panel. The first hinge assembly is secured to the first mounting edge of the first door panel and the second mounting edge of the second door panel to pivotally couple the first door panel and the second panel to each other. The second hinge assembly secured to the third mounting edge of the second door panel and the forth mounting edge of the third door panel to pivotally couple the second panel and the third door panel to each other. The door panel system has a close posture in which an interior surface of the first door panel, an interior surface of the second door panel, an interior surface of the third door panel are coplanar with one another. When the handle set is in the latched configuration it is configured to resist pivoting of the third door from the closed posture when the door panel system is in the closed posture.

In embodiments, the door panel system has a fully open posture in which the first door panel, the first door panel, the second door panel, and the third door panel system are stacked relative to one another such that that the interior surfaces of the first door panel and the second door panel oppose one another and the interior surface of the first door panel, the interior surface of the second door panel, and the interior surface of the third door panel are substantially parallel with one another.

In another embodiment in accordance with the present disclosure, a door panel system includes a first door panel, a second door panel, a third door panel, a first hinge assembly, and a second hinge assembly. The second door panel has a second mounting edge and a third mounting edge opposite the second mounting edge. The third door panel has a fourth mounting edge. The first hinge assembly is secured to the first mounting edge of the first door panel and the second mounting edge of the second door panel to pivotally couple the first door panel and the second door panel to each other. The second hinge assembly secured to the third mounting edge of the second door panel and the forth mounting edge of the third door panel to pivotally couple the second panel and the third door panel to each other. The door panel system has a close posture in which an interior surface of the first door panel, an interior surface of the second door panel, an interior surface of the third door panel are coplanar with one another. The door panel having an operating posture in which the interior surface of the first door panel and the interior surface of the first door panel and the interior surface of the second door panel are fixed coplanar with one another and third door panel is configured to function as a hinged door panel with respect to the second door panel.

In embodiments, in the operating posture the interior surface of the third door panel is out of plane is out of plane with the interior surfaces of the first door panel and the second door panel. The first door panel, the second door panel, and the third door panel may be suitable for use as a hinged door. The third door panel may define a through bore to receive a handle set common to hinged doors. The handle set may be actuatable between a latched configuration and an unlatched configuration. The handle set configured to selectively retain the third door panel in the closed posture in the latched configuration.

Further, to the extent consistent, any of the aspects described herein may be used in conjunction with any or all of the other aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
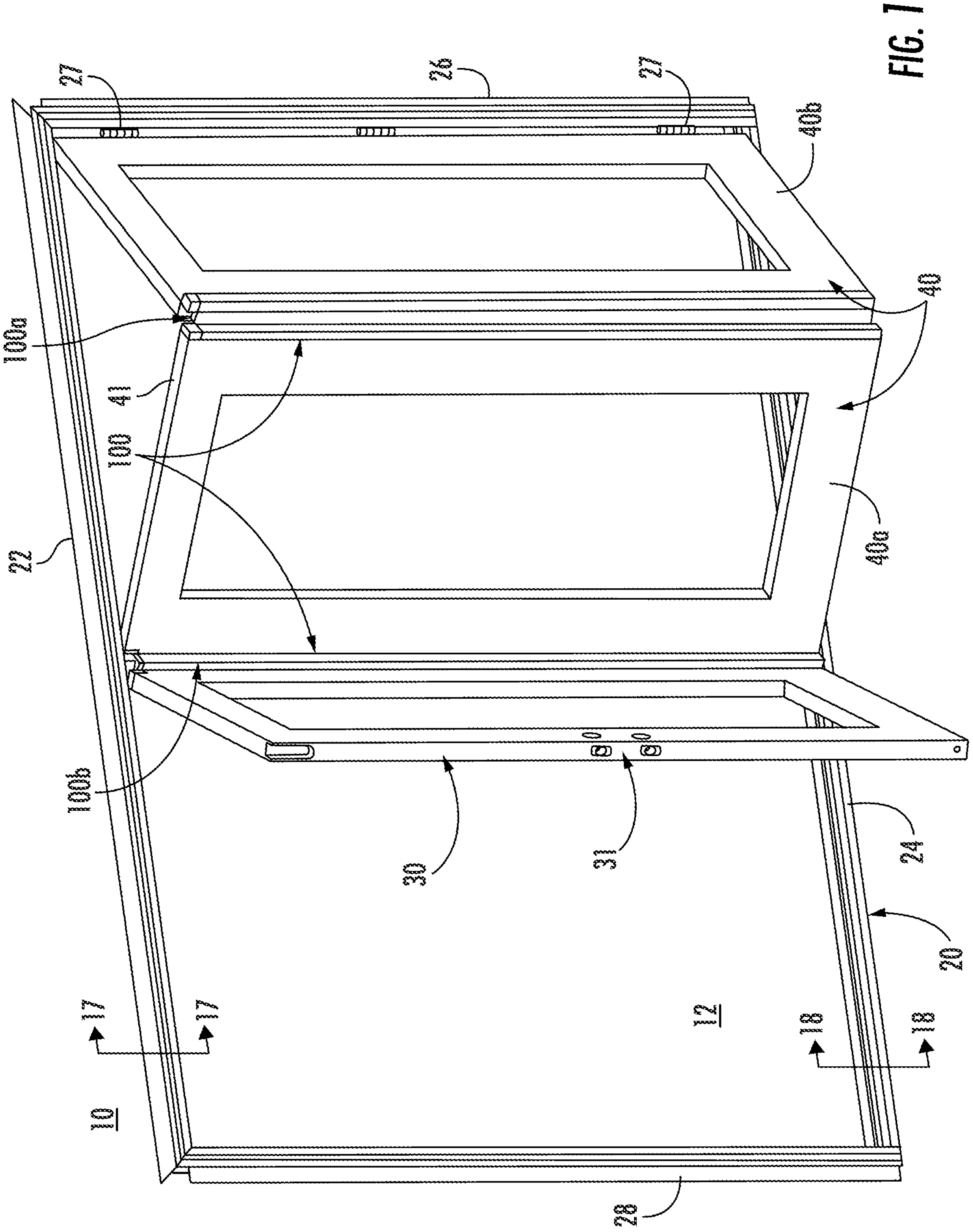
FIG. 1 is a perspective view of an example door panel system provided in accordance with the present disclosure in an open configuration.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used herein, the term "interior" refers a side of an opening or surface that faces a space to be isolated or enclosed by a door or moveable wall and may include, but is not limited to, an interior space, a meeting room, or a portion of a larger gathering space. In addition, as used herein, the term "exterior" refers to a side of the opening or surface that faces an external environment to the space to be isolated or enclosed by the door or moveable wall and may include, but is not limited to, an exterior to a building, a lobby, a gathering space, or a performance space.

Figure 2:
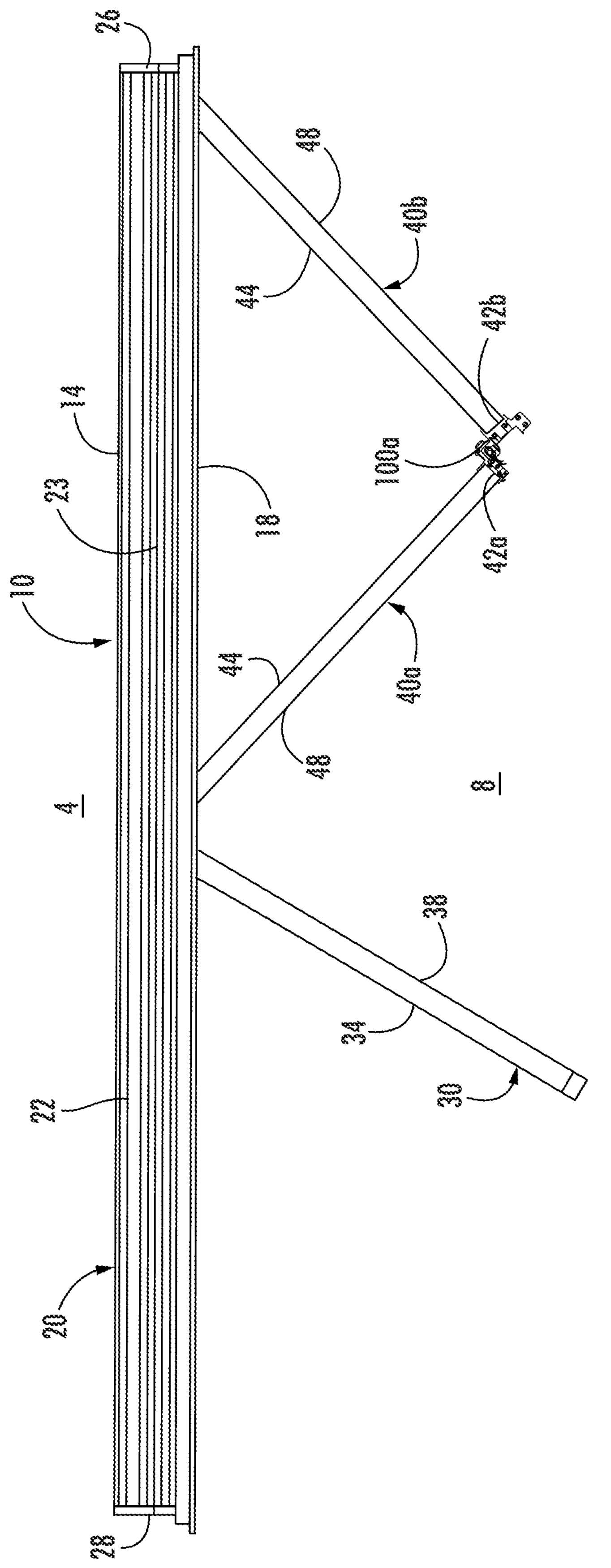
FIG. 2 is a top view of the door panel system of FIG. 1.

Referring now to FIGS. 1 and 2, an example door panel system is provided in accordance with the present disclosure and referred to generally as door panel system 10. The door panel system 10 includes a frame 20, an operating panel 30, secondary panels 40, and continuous hinges 100. The door panel system 10 is configured to selectively separate an interior space 4 from an exterior space 8 with an interior side 14 configured to face the interior space 4 and an external side 18 configured to face the exterior space 8.

The frame 20 defines an opening 12 between the interior space and the exterior space and includes a top guide rail 22, a bottom sill 24, a fixed jamb 26, and an operating jamb 28 that surround the opening 12. The guide rail 22 forms a top edge of the opening 12. The sill 24 opposes the guide rail 22 to form a bottom edge of the opening 12. The fixed jamb 26 interconnects the guide rail 22 and the sill 24 and forms a side edge of opening 12. The operating jamb 28 interconnects the guide rail 22 and the sill 24, opposes the fixed jamb 26, and forms a side edge of the opening 12.

As shown, the door panel system 10 includes one operating panel 30 and two secondary panels 40. The door panel system 10 has a closed position (FIG. 19) in which the operating panel 30 and each of the secondary panels 40 are aligned such that interior and exterior surfaces of each panel 30, 40 are substantially coplanar with one another, this may be referred to as a parallel planar relationship. In embodiments, the door panel system 10 may include one operating panel 30 and a plurality of secondary panels 40. The number of secondary panels 40 is only limited by the size of the opening 12. In particular embodiments, the door panel system 10 only includes secondary panels 40. The operating panel 30 and each of the secondary panels 40 may have similar widths, with the width of each panel 30, 40 being defined in the closed position as a distance along the top guide rail 22. In embodiments, the operating panel 30 has a first width and each of the secondary panels 40 has a second width larger than the first width. In the closed position, the operating panel 30 and the secondary panels 40 form a barrier between the interior side 14 and the exterior side 18 of the door panel system 10 to close the opening 12. In the closed position, the operating panel 30 and the secondary panels 40 may substantially seal the opening 12 to prevent penetration of water and air through the opening 12. In some embodiments, in the closed position, the operating panel 30 and the secondary panels 40 may form an acoustic barrier between the interior and exterior sides 14, 18 of the door panel system 10.

With continued reference to FIGS. 1 and 2, the door panel system 10 is in an open position in which at least one of the operating panel 30 or one of the secondary panels 40 are out of alignment with another one of the panels 30, 40. In open positions, passage through the opening 12 between the interior side 14 and the exterior side 18 of the door panel system 10 may be permitted. To transition between the closed position and the open position, the operating panel 30 and/or the secondary panels 40 pivot relative to one another about continuous hinges 100. As detailed below, the operating panel 30 may transition to an open position with each of the secondary panels 40 remaining in the closed position. In a fully open position (FIG. 23), the panels 30, 40 are stacked with one another adjacent the fixed jamb 26 of the frame 20 with interior surfaces 34, 44 or exterior surfaces 38, 48 of adjacent panels 30, 40 parallel and in opposition to one another. In the fully open position, the interior surfaces 34, 44 or the exterior surfaces 38, 48 of adjacent panels 30, 40 may be in contact with one another.

Referring briefly back to FIG. 1, the continuous hinge 100 may be assembled as a locking hinge, e.g., hinge 100*a*, or as a sliding hinge, e.g., hinge 100*b*. The continuous hinge 100 is versatile allowing the same hinge 100 to be assembled as a locking or sliding hinge based on the position within the door panel system 10. In addition, the door panels, e.g., panels 30, 40, do not require machining to receive the continuous hinge 100 in either the locking or sliding hinge configuration. As detailed below, a number of unique components of the continuous hinge 100 have been duplicated to reduce inventory requirements for assembling the continuous hinge 100 in a variety of configurations. For example, the continuous hinge 100*a* between the secondary panels 40 is configured as a locking hinge 100*a* with a pivot assembly and a locking assembly 300 being added to the continuous hinge 100. In contrast, the continuous hinge 100*b* between the operating panel 30 and the secondary panel 40 is configured as a sliding hinge 100*b* with a top guide roller or bogie assembly 400 and a lower guide assembly 450 being added to the continuous hinge 100. The flexibility of the continuous hinge 100 may allow for a reduction in inventory parts and simplified assembly. A reduction in inventory parts and simplified assembly may reduce costs associated with manufacturing, construction, and/or maintenance of a door panel system using the continuous hinges 100.

Figure 3:
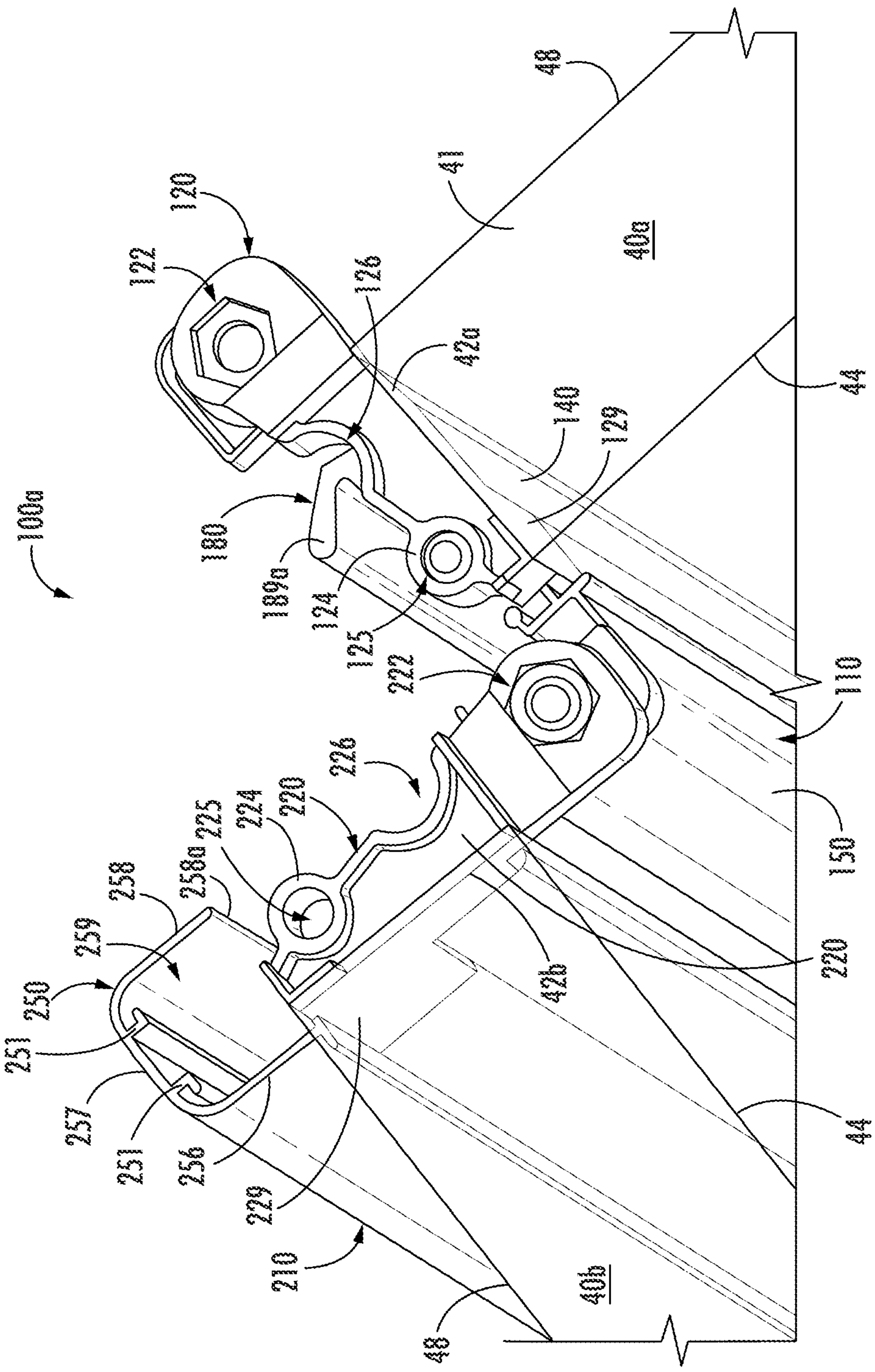
FIG. 3 is an enlarged perspective view of a portion of a locking hinge of the door panel system of FIG. 1.
Figure 4:
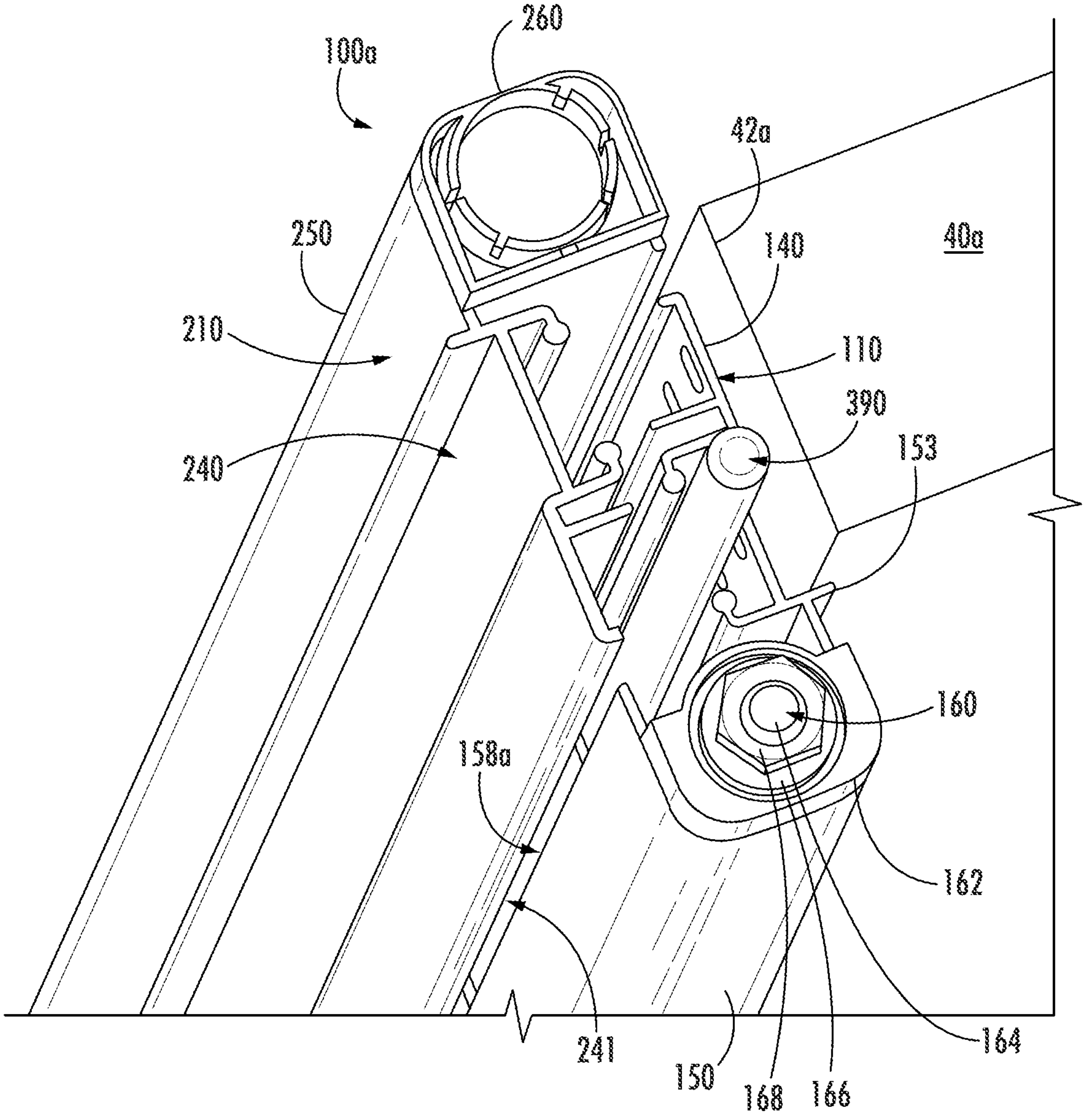
FIG. 4 is an enlarged perspective view of the portion of the locking hinge of the door panel system of FIG. 3 in a closed position with elements of the locking hinge removed to illustrate internal components thereof.
Figure 5:
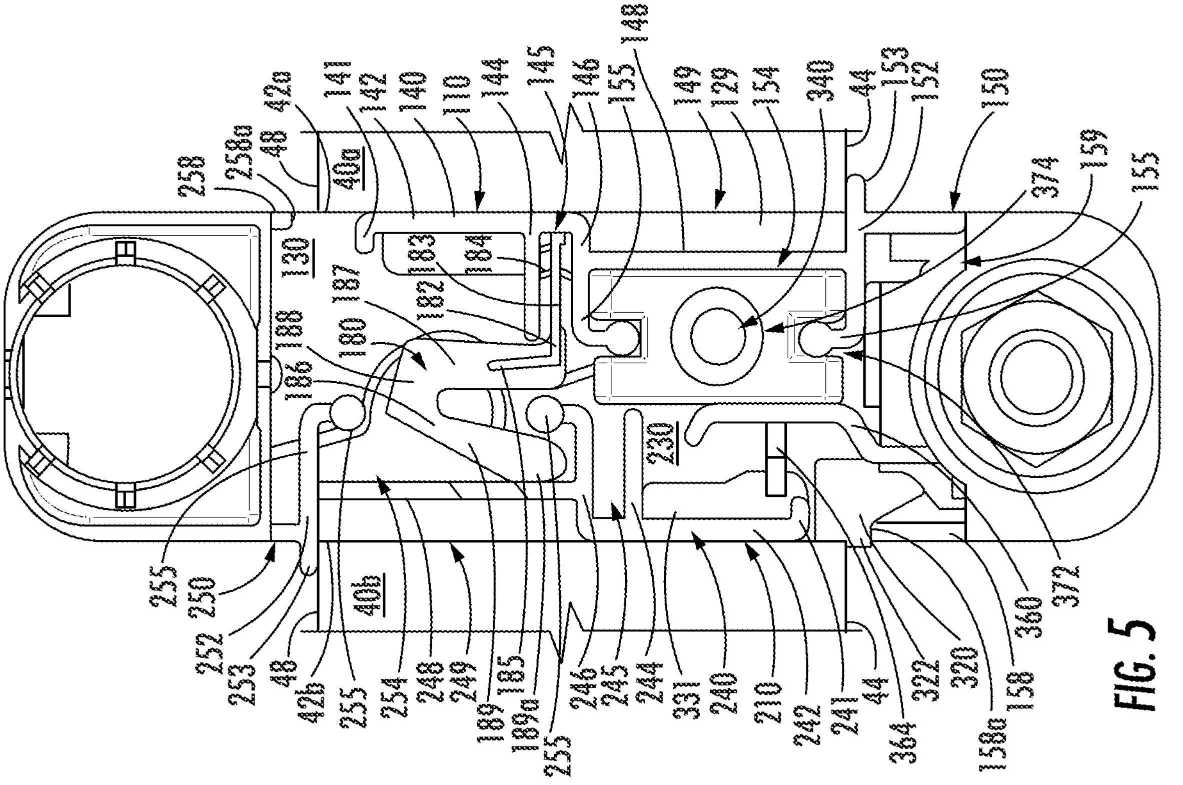
FIG. 5 is a top view of the locking hinge of FIG. 3 in the closed position with a top end plates removed to show internal components of the locking hinge.

Referring to FIGS. 3-5, the continuous hinge 100*a* is secured between adjacent panels 40 to support the panels 40 and facilitate movement between the fully open and closed positions. The continuous hinge 100*a* extends continuously along a majority of a height of the panels 40 with an uppermost end of the continuous hinge 100*a* adjacent a top surface of the panels 40 and a lowermost end of the continuous hinge 100*b* adjacent a bottom end of the panels 40. As noted above, the continuous hinge 100*a* is a locking hinge; however, it is contemplated that a sliding hinge may also be used between adjacent secondary panels 40 based on a position within a door panel assembly 10. The continuous hinge 100 includes a first leaf 110 secured to a side edge 42*a* that extends between an interior surface 44 and the exterior surface 48 of one panel, e.g., secondary panel 40*a*, and a second leaf 210 secured to a side edge 42*b* of an adjacent panel, e.g., another secondary panel 40*b*. As described in greater detail below, the first and second leaves 110, 210 are pivotally coupled to one another to form the continuous hinge 100. The second leaf 210 is similar to the first leaf 110 and is rotated 180 degrees about a central longitudinal axis of the continuous hinge 100*a* with like elements represented with a similar label with a leading "2" replacing the leading "1" of the similar element of the first leaf 110. As such, the first leaf 110 will be described in detail with only differences in structure and assembly of the second leaf 210 detailed herein for reasons of clarity and brevity.

The first leaf 110 may be formed as an extrusion and cut to a desired length and includes an edge plate 140 and a shell 150. The edge plate 140 has a mounting segment 142 and an offset segment 148 that are substantially parallel to one another and offset from one another. The mounting segment 142 is secured directly to the side edge 42*a* of the secondary panel 40*a* with a locking edge 141 of the mounting segment 142 positioned adjacent a surface, e.g., exterior surface 48, of the secondary panel 40*a*. The mounting segment 142 may be secured to the side edge 42*a* with one or more fasteners passing through the mounting segment 142 and into the secondary panel 40*a*. The one or more fasteners may be screws, nails, bolts, or any other suitable fastener. In some embodiments, the mounting segment 142 is at least partially adhered to the side edge 42*a* by an adhesive. When the mounting segment 142 is secured to the side edge 42*a*, the offset segment 148 defines a gap 149 between the offset segment 148 and the side edge 42. With particular reference to FIG. 3, a mounting flange 129 of a top plate 120 may be positioned within the gap 149 to secure the top plate 120 to the first leaf 110 and/or to form a seal between the edge plate 140 and the side edge 42*a*. The offset segment 148 may be secured to the side edge 42 with one or more fasteners passing through the offset segment 148 and the mounting flange 129 and into the secondary panel 40*a*. Additionally or alternatively, the mounting flange 129 may be adhered to the offset segment 148 and/or the side edge 42*a* with an adhesive.

The edge plate 140 also includes a transverse segment 146 that interconnects the mounting segment 142 and the offset segment 148. The transverse segment 146 extends from a side of the mounting segment 142 opposite a side secured to the side edge 42*a* of the secondary panel 40*a*. The transverse segment 146 may terminate at the offset segment 148 or may extend beyond the offset segment 148. The transverse segment 146 may be oriented substantially orthogonal to the mounting segment 142 and the offset segment 148. The edge plate 140 may include a seal segment 144 that extends from the side of the mounting segment 142 opposite the side secured to the side edge 42*a* of the secondary panel 40*a* and may be parallel to the transverse segment 146. The seal segment 144 may extend a distance substantially equal to a distance the transverse segment 146 extends from the mounting segment 142 or may extend a lesser or a greater distance than the transverse segment 146 from the mounting segment 142. The seal segment 144 and the transverse segment 146 define a seal channel 145 therebetween. The seal channel 145 may receive a portion of a weather strip 180 as detailed below.

The shell 150 of the first leaf 110 includes an edge wall 152 that connects with the offset segment 148 of the edge plate 140. Specifically, the offset segment 148 terminates opposite the transverse segment 146 at an edge wall 152. The edge wall 152 is substantially parallel to the transverse segment 146 and orthogonal to the offset segment 148. The edge wall 152 includes an alignment finger 153 that is configured to extend beyond the side edge 42*a* of the secondary panel 40*a* and along a surface of the secondary panel 40, e.g., the interior surface 44, to align or position the first leaf 110 relative to the secondary panel 40*a*. The edge wall 152 and the transverse segment 146 may each extend beyond the offset segment 148 in a direction away from the side edge 42*a* to define a hollow 154 therebetween. The edge wall 152 and the transverse segment 146 may each include retaining fingers 155 that extend into the hollow 154 in opposition to one another. The hollow 154 may be configured to receive a shoot bolt assembly 340 that is retained within the hollow 154 by the retaining finger 155 as described in greater detail below.

The structure of a portion of the shell 150 of the first leaf 110 is obscured in FIGS. 3-5. For this reason, the structure of the shell 150 of the first leaf 110 will be described with reference to the shell 250 of the second leaf 210 that is best shown in FIG. 3. The shell 250 includes a first wall 256, a second wall 257, and a third wall 258 which define a cavity 259 having a substantially rectangular cross-section. The first wall 256 extends in a direction substantially orthogonal to the edge wall 252 in a direction away from the edge plate 240. The second wall 257 has a first end connected to the first wall 256 and extends in a direction orthogonal to the first wall 256 and substantially parallel to the edge wall 252 to a second end connected to the third wall 258. The third wall 258 is substantially parallel to the first wall 256 and orthogonal to the second wall 257 and the edge wall 252. The third wall 258 is spaced apart from the edge wall 252 such that a gap is defined therebetween. The third wall 258 terminates at a shell edge 258*a* that opposes the locking edge 141 of the first leaf 110 when the continuous hinge 100*a* is in the closed position as shown in FIG. 5. The shell 250 may also include a pivot finger 251 or a pair of pivot fingers 251 that extend into the cavity 259 from the second wall 257 toward the edge wall 252. The pivot finger(s) 251 may be configured to secure and/or align one or more components received within the cavity 259 relative to the shell 250.

With particular reference to FIG. 5, the continuous hinge 100 may include a weather strip 180 that is configured to form a seal within the continuous hinge 100 between the interior space and the exterior space when the continuous hinge 100 is in a closed position. Specifically, the weather strip 180 includes a rigid insert 182 and a flexible member 186. The rigid insert 182 includes a retention portion 183 that is received within the seal channel 145 of the first leaf 120 to secure the weather strip 180 within the continuous hinge 100. The retention portion 183 may include a plurality of arms 184 that extend outward to engage walls defining the seal channel 145, e.g., seal segment 144 and/or transverse segment 146. The rigid insert 182 also includes a seal tab 185 that extends into the flexible member 186. The rigid insert 182 may be formed of a rigid material including, but not limited to, a thermoset plastic, a metal, or a metal alloy. In embodiments, the rigid insert 182 may be formed of a flexible material such as natural or synthetic rubber or a rubberized material.

The flexible member 186 is secured to the seal tab 185 to support the flexible member 186 relative to the first leaf 110. The flexible member 186 may be formed around the seal tab 185, may be integrally formed with the seal tab 185, or may be bonded to the seal tab 185. In some embodiments, the flexible member 186 and the rigid insert 182 are monolithically formed with one another. The flexible member 186 has a substantially U or V shaped cross-section with a first arm 187 secured to the seal tab 185 and a second arm 189 configured to abut an offset plate 248 of second leaf 210 when the continuous hinge 100 is in the closed position. The first and second arms 187, 189 are connected by a bridge 188. The bridge 188 may bias the second arm 189 away from the first arm 187 such that when the second arm 189 engages the offset plate 248, the bridge 188 urges the second arm 189 towards the offset plate 248 to form a seal between the second arm 189 and the offset plate 248. In particular embodiments, a tip 189*a* of the second arm 189 may be captured between the offset plate 248 and a retention finger 255 of the second leaf 210 to enhance a seal between the first leaf 110 and the second leaf 210. The seal between the second arm 189 and the offset plate 248 may be water and/or airtight. The weather strip 180 may be selected based on the external space. For example, the weather strip 180 may be selected to provide a seal against one or more of the following elements snow, ice, wind, extreme wind (hurricane), and/or in extreme cold and/or extreme heat conditions.

Figure 6:
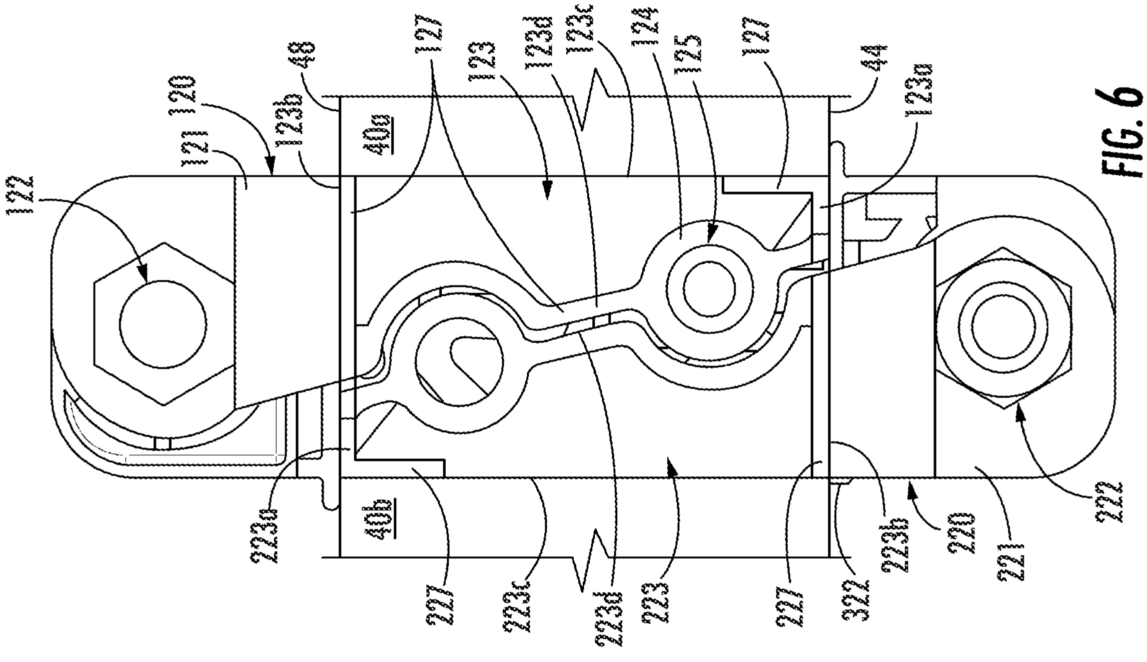
FIG. 6 is a top view of the locking hinge of FIG. 5 including the top end plates.

With additional reference to FIG. 6, the continuous hinge 100 includes the top plate 120 and a bottom plate 130 (FIG. 5) associated with the first leaf 110 and a top plate 220 and a bottom plate 230 (FIG. 5) associated with the second leaf 210. The top plates 120, 220 are secured to an uppermost end of the first or second leaf 110, 210, respectively, and the bottom plates 130, 230 are secured to a lowermost end of the first or second leaf 110, 210, respectively. Each of the top and bottom plates 120, 130, 220, 230 has similar features to one another and may be referred to collectively as end plates. Specifically, the top plates 120, 220 are rotated 180 degrees relative to one another about the central longitudinal axis of the continuous hinge 100 and the bottom plates 130, 230 are rotated 180 degrees relative to one another about the central longitudinal axis of the continuous hinge 100. A significant structural difference between the top and bottom plates 120, 130, 220, 230 is the face which the mounting flange of the respective plate, e.g., mounting flange 129, with the mounting flange extending from a bottom surface of the top plates 120, 220 and extending from a top surface of the bottom plates 130, 230. As such, only the features of the top plate 120 will be detailed herein for reasons of brevity with similar features labeled in a similar manner for the top plate 220 and the bottom plates 130, 230.

The top plate 120 has a substantially planar body 123 that is configured to cap, cover, or seal a portion of a top end of the first leaf 110. As noted above, the top plate 120 includes a mounting flange 129 (FIG. 5) that extends orthogonally from the body 123 adjacent a first end 123*a* of the body 123 and is captured within the gap 149 (FIG. 5) between the edge plate 140 and the edge 42*a* of the secondary panel 40*a*. The body 123 is sized and dimensioned to extend between the interior and exterior surfaces 44, 48 of the secondary panel 40*a* and to sit adjacent a top end 41 of the secondary panel 40*a*. As shown in the FIG. 3, the body 123 is positioned just below the top end 41 of the secondary panel 40*a* and may include one or more ridges 127 that extend to a plane co-planer with the top end 41. In embodiments, the body 123 is spaced apart a distance from the top end 41 of the panel 40*a*. The body 123 has a side edge 123*c* that extends between the first and second ends 123*a*, 123*b* and is configured to abut the side edge 42*a* of the secondary panel 40*a*. The body 123 also includes an oblique edge 123*d* that extends between the first and second ends 123*a*, 123*b* and is opposite the side edge 123*c*. The oblique edge 123*d* is substantially linear and forms an oblique angle with each of the first and second ends 123*a*, 123*b* of the body 123.

The top plate 120 also includes an extension 121 that extends from a second end 123*b* of the body 123 opposite the first end 123*a*. The extension 121 is coplanar with the body 123 and is sized and dimensioned to extend over a portion of the shell 250 of the second leaf 210 when the continuous hinge 100 is in the closed position as shown in FIG. 5. The extension 121 includes a first or pivot opening 122 that extends through the extension 121 to provide access to the cavity 259 of the second leaf 210. The pivot opening 122 may define a circular or hexagonal opening. In some embodiments, the pivot opening 122 is a hexagonal opening that receives an insert as described in greater detail below. The oblique edge 123*d* may continue to define an edge of the extension 121.

The body 123 includes a shoot bolt ring 124 that has a second or shoot bolt opening 125 defined therethrough that provides access to the chamber 154 of the first leaf 110 (FIG. 6). The shoot bolt ring 124 may extend beyond the oblique edge 123*d* of the body 123. The shoot bolt ring 124 may also extend above a plane defined by the body 123 in a manner similar to the ridges 127. The shoot bolt opening 125 may be sized and dimensioned to allow a shoot bolt, e.g., shoot bolt 390, to pass through the shoot bolt opening 125. The body 123 also includes a shoot recess 126 profiled into the oblique edge 123*d* that is sized and dimensioned to receive the shoot bolt ring 224 of top plate 220 when the continuous hinge 100 is in the closed position.

As detailed above, the continuous hinge 100 is secured to side edges of adjacent panels of a door panel system, e.g., side edges 42, without additional machining to the side edges of the panels. For example, the continuous hinge 100 does not require machining of grooves, mortises, channels, and the like in the side edges. The continuous hinge 100 is secured to the side edges by one or more fasteners that pass through the continuous hinge 100 and into the side edge. By not requiring additional machining of the side edges of the panels, assembly of a door panel system 100 may be simplified which may reduce an amount of time required to assemble the door panel system. By reducing the amount of time and/or reducing machining for assembly of a door panel system, a cost of the door panel system may be reduced. In addition, the continuous hinge 100 may include the weather strip 180 that is configured to provide a weather seal within the continuous hinge 100. The weather strip 180 may be customizable based on the weather seal required for a particular application. Further, the weather strip 180 may be replaceable when the continuous hinge 100 is in an open position which may reduce complexity of maintenance compared to other door panel systems.

Figure 19:
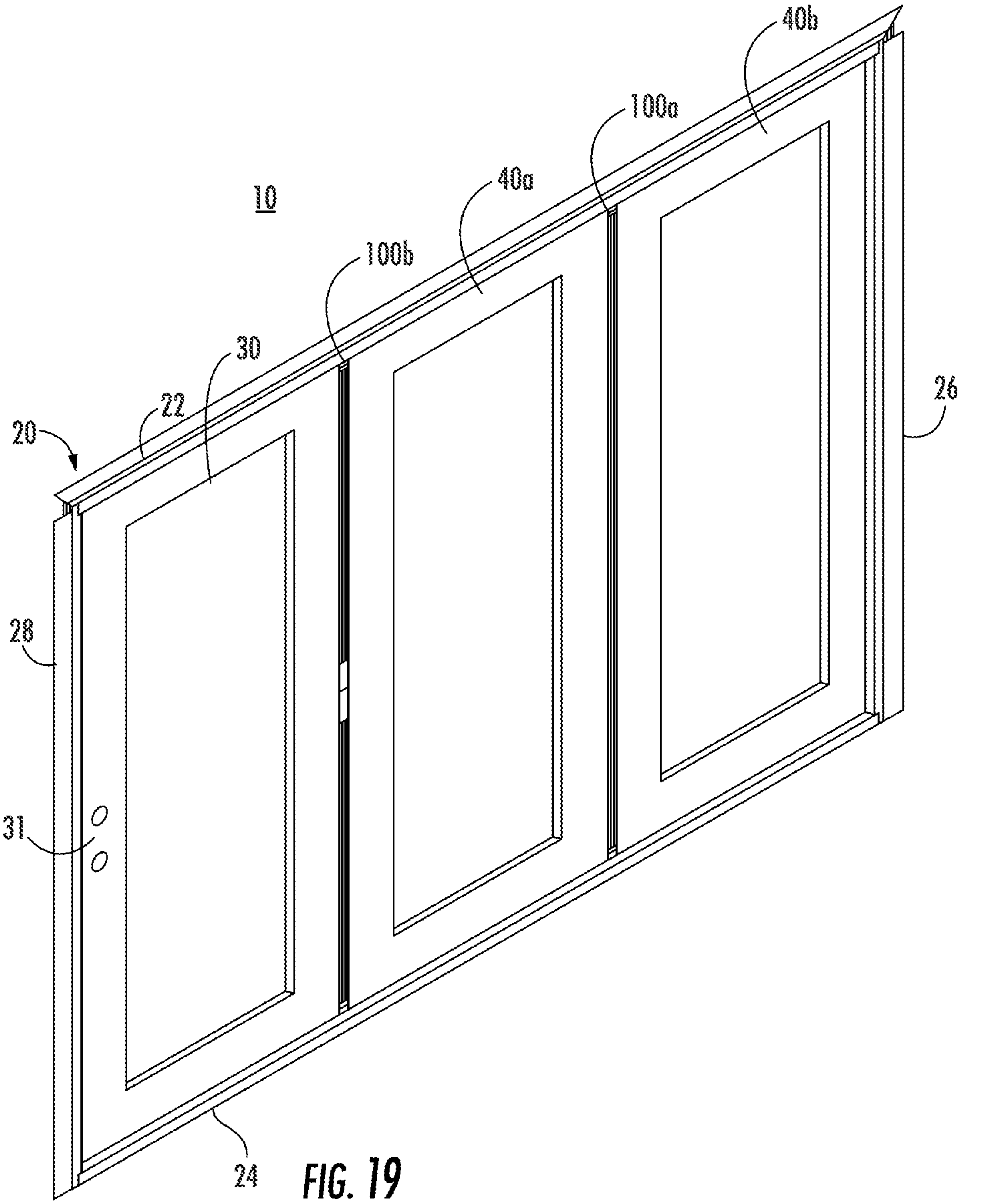
FIG. 19 is a perspective view of the door panel system of FIG. 1 in a closed configuration.
Figure 20:
FIG. 20 is a top view of the door panel system of FIG. 19.

Referring briefly back to FIG. 1, in open position of the continuous hinge 100*a*, the continuous hinge 100*a* may be disposed outside of the opening 12 and out of alignment with the top guide rail 22 and the bottom sill 24. In the closed position of the continuous hinge 100*a*, the continuous hinge 100*a* is disposed within the opening 12 between the top guide rail 22 and the bottom sill 24 of the frame 20 as shown in FIG. 19.

With particular reference to FIG. 4, when configured as a locking hinge, the continuous hinge 100*a* includes a top pivot 160 and a bottom pivot 170 (FIG. 15) secured to the shell 150 of the first leaf 110 and blank inserts 260 secured to the shell 250 of the second leaf 210. The top plate 220 of the second leaf 210 is coupled to the top pivot 160 and the bottom plate 230 of the second leaf 210 is coupled to the bottom pivot 170 to pivotally couple the second leaf 210 to the first leaf 110 about the top and bottom pivots 160, 170. The top and bottom pivots 160, 170 are similar to one another; as such, only the top pivot 160 will be detailed herein for brevity.

The top pivot 160 includes a housing 162, a pivot post 164, a bearing 166, and a retainer 168. The housing 162 is secured in the cavity 159 of the shell 158 of the first leaf 110. The pivot post 164 extends from the housing 162 and passes through the pivot opening 222 of the top plate 220 of the second leaf 210. The bearing 166 is disposed about the pivot post 164 below the top plate 220. The retainer 168 is disposed about the pivot post 164 and is configured to retain the pivot post 164 within the pivot opening 222. The pivot post 164 defines a pivot axis between the first and second leaves 110, 210.

Figure 9:
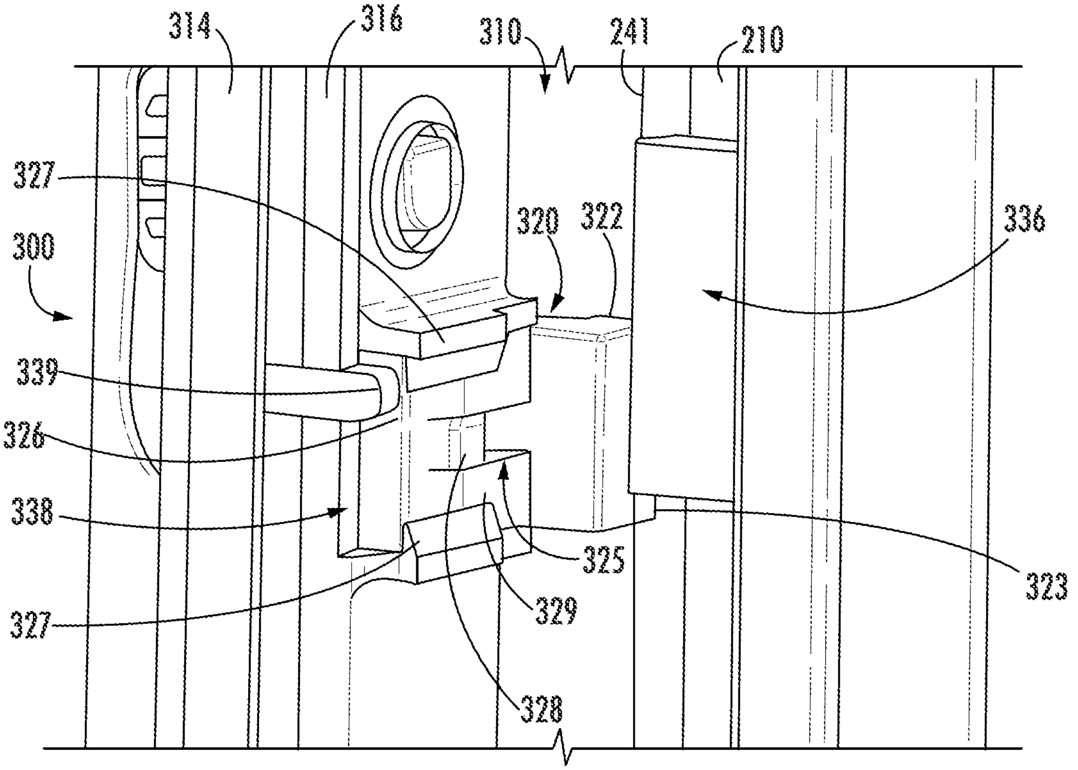
FIG. 9 is a front perspective view of the locking assembly of FIG. 7 in a locked configuration.
Figure 10:
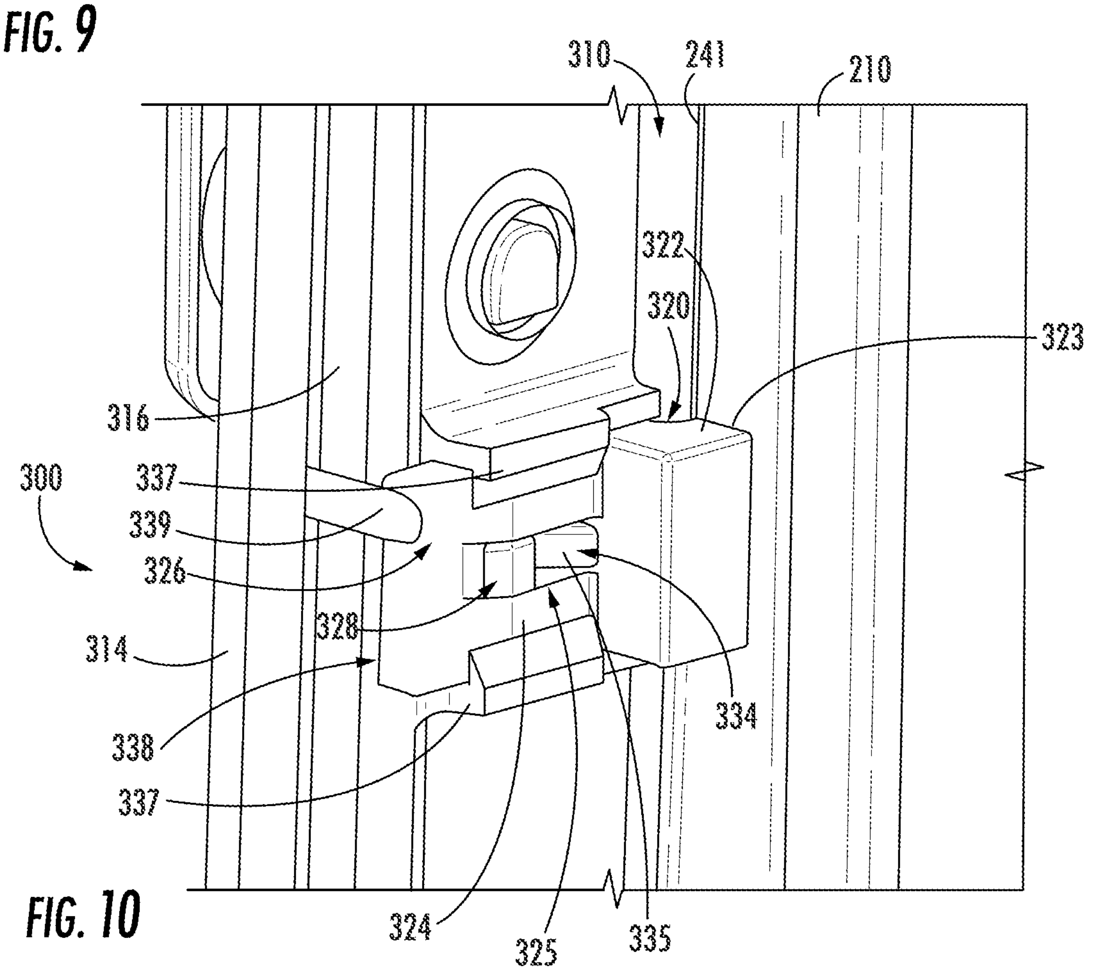
FIG. 10 is a front perspective view of the locking assembly of FIG. 9 in an unlocked configuration.
Figure 11:
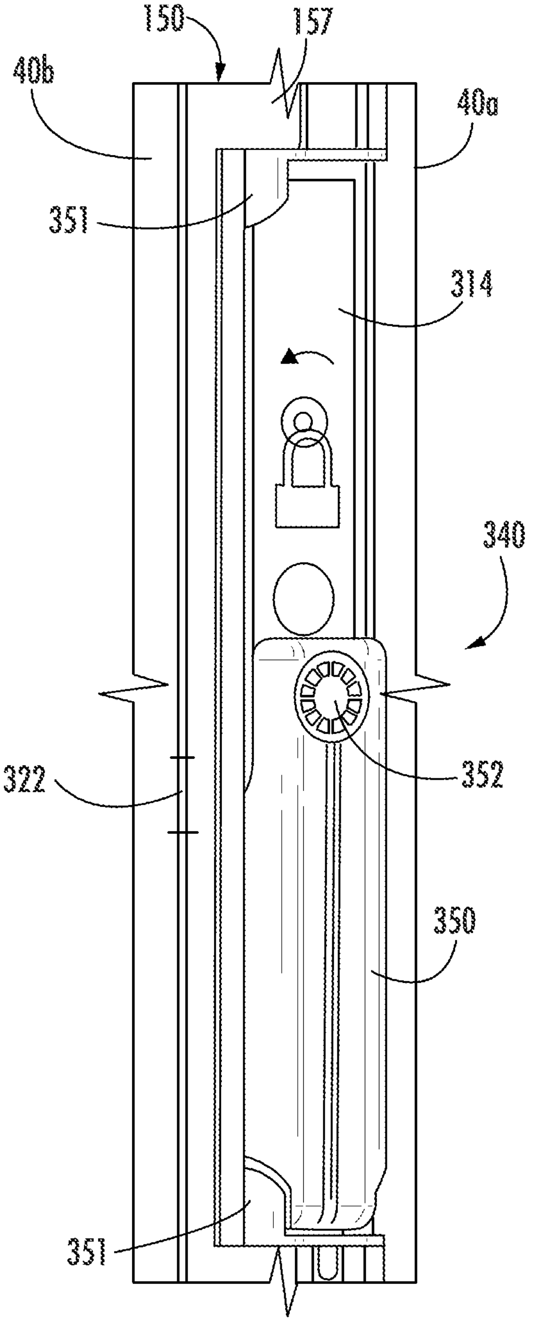
FIG. 11 is another rear perspective view of the locking assembly of FIG. 7 with a locking lever of the locking assembly in a locked position.

Referring to FIGS. 7-10, the continuous hinge 100*a* includes a locking assembly 300 that is configured to lock the continuous hinge 100*a* in the closed position. The locking assembly 300 may include a hinge lock mechanism 310 that is configured to selectively secure the first and second leaves 110, 210 in the closed position. The lock mechanism 310 is secured within a lock niche 312 defined in the shell 150 of the first leaf 110 and includes a latch 320 and a latch release button 330. The lock mechanism 310 is disposed substantially within the cavity 159 (FIG. 5) of the shell 150 and is supported by a lock face 314 and a lock housing 316 of the locking assembly 300. The lock face 314 and the lock housing 316 are disposed within the lock niche 312 at a position in the continuous hinge 100 comfortable for operation, e.g., in a range of about 24 inches to about 60 inches from a floor. The lock housing 316 is disposed within the shell 150 along the second wall 157 and includes latch retainers 337 that define a latch slot 338 that receive the latch 320. The latch retainers 337 allow the latch 320 to translate within the latch slot 338 between a locked position (FIGS. 7 and 9) and an unlocked position (FIG. 10). The lock housing 316 also includes a biasing flange 339 that supports a biasing member (not shown) configured to urge the latch 320 towards the locked position. The biasing member may be a coil spring or a compression spring.

Figure 7:
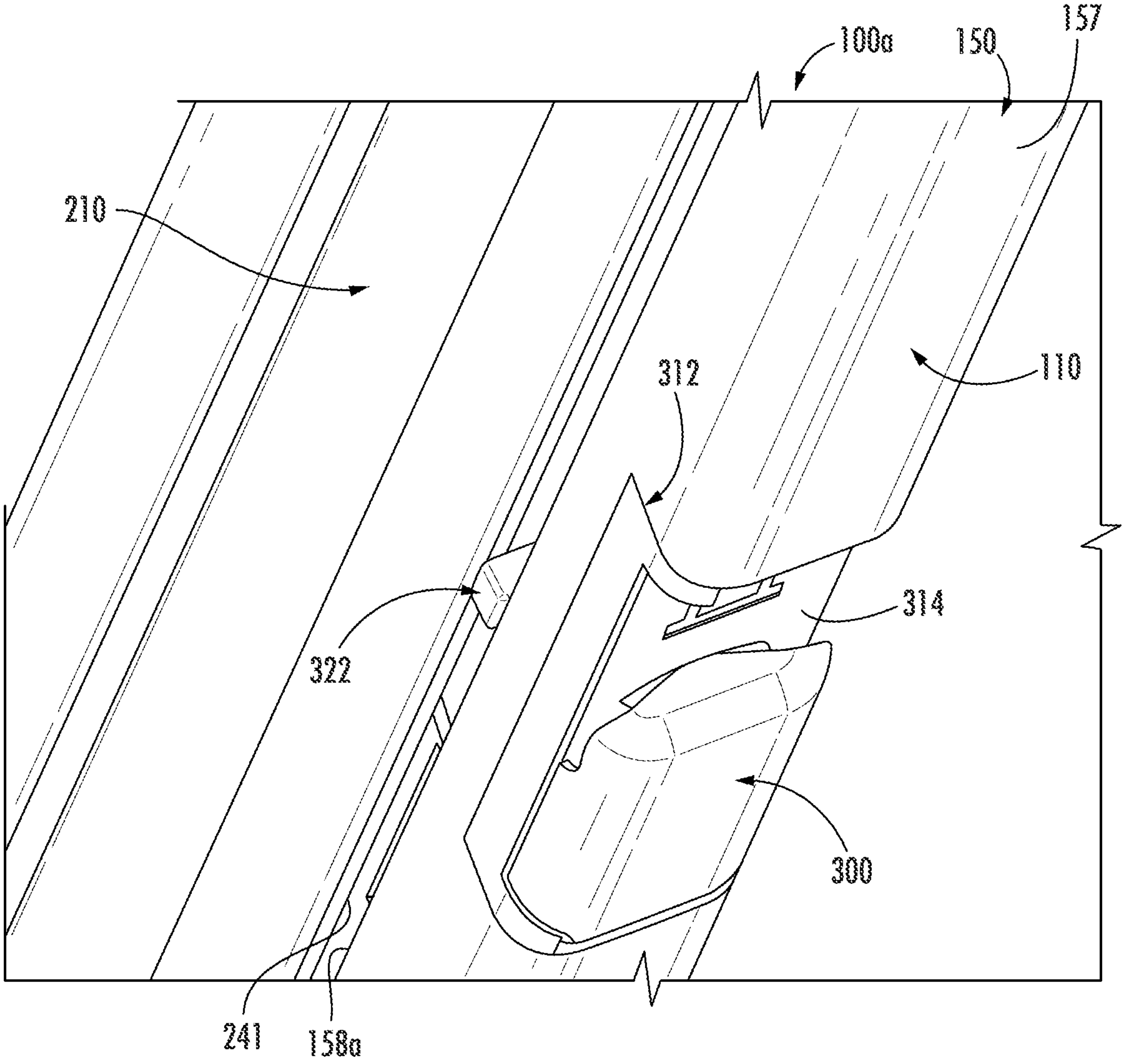
FIG. 7 is an enlarged rear perspective view of another portion of the locking hinge of FIG. 3 illustrating a locking assembly with the locking hinge in a locked position.
Figure 8:
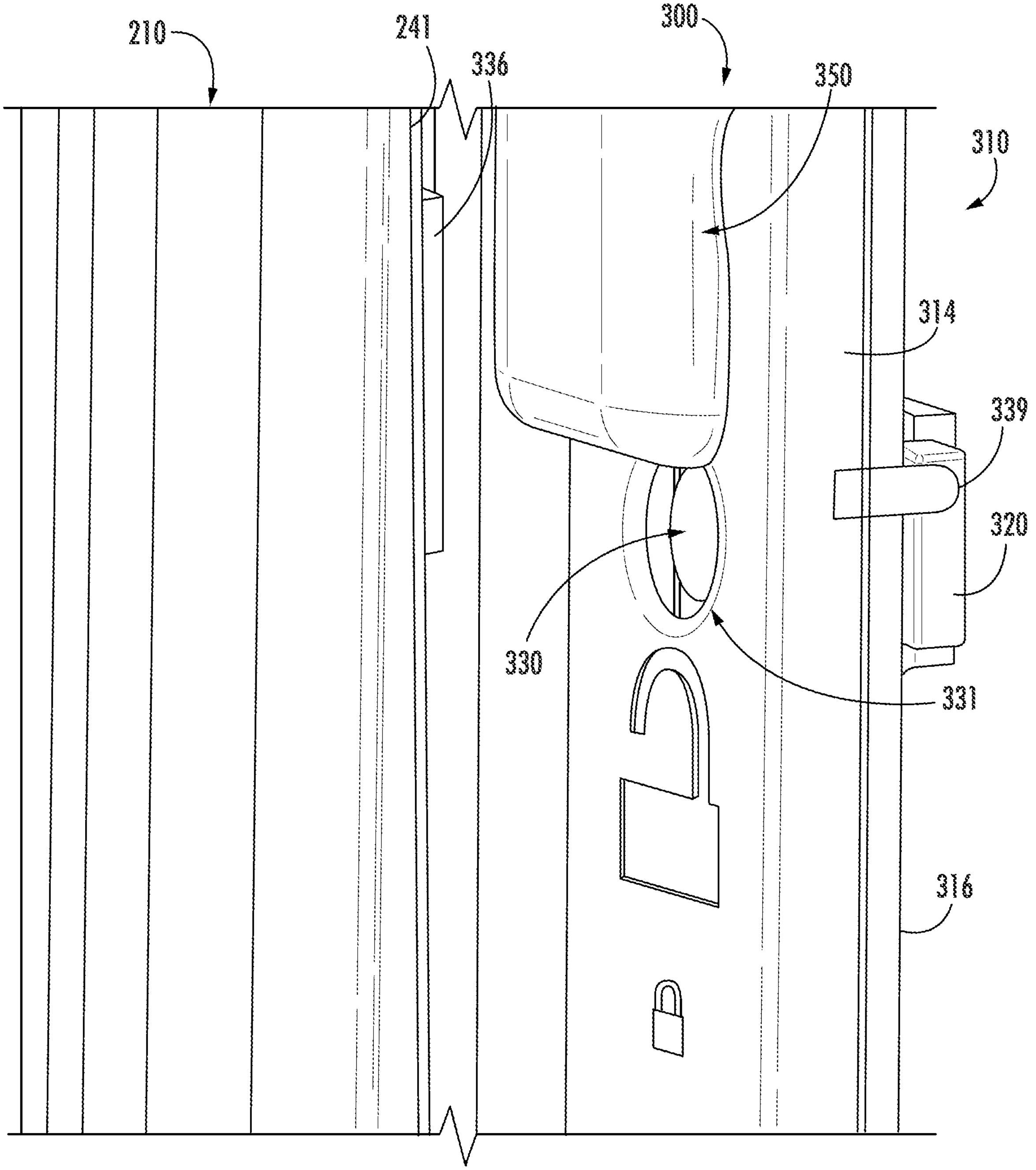
FIG. 8 is an enlarged respective view of the locking assembly of FIG. 7 in an open position with a panel and the first leaf removed to illustrate internal components of the locking assembly.

The latch 320 includes a body 324 and a latch key 322 that extends from the body 324. With particular reference to FIG. 7, when the continuous hinge 100*a* is in the closed position, the locking edge 241 of the second leaf 210 opposes the shell edge 158*a* of the first leaf 110 leaving a gap therebetween. In the locked position, the latch key 322 is configured to be positioned between the locking edge 241 and the shell edge 158*a* to prevent the first and second leaves 110, 210 from moving from the closed position. Specifically, the latch key 322 prevents the shell 150 of the first leaf 110 from rotating towards the second leaf 210 to prevent the first and second leaves 110, 210 from moving from the closed position. The latch body 324 may define a biasing pocket 326 extending in a direction parallel to translation of the latch 320 within the latch slot 338. The biasing pocket 326 is configured to receive the biasing member that is engaged with the biasing flange 339 to urge the latch 320 towards the locked position.

The latch release button 330 is received within a button hole 331 defined through the lock face 314 and the lock housing 316 and in communication with the latch slot 338. The release button 330 includes a retainer 332 (FIG. 13) and a release cam 334. The retainer 332 is configured to prevent the release button 330 from extending beyond the lock face 314. The latch 320 includes a cam slot 325 defined through the latch body 324. The cam slot 325 is aligned with the button hole 331 and receives the release cam 334 therewithin. The release cam 334 includes a tapered release surface 335 that is engaged with an end of the cam slot 325. The release button 330 has an undepressed position in which the release cam 334 is positioned within cam slot 325 to limit translation of the latch 320 towards the locked position. Specifically, the release surface 335 is engaged with the end of the cam slot 325 to prevent the latch 320 from extending beyond the locked position. The release button 330 also has a depressed position in which the release button 330 is depressed into the button hole 331 such that the release cam 334 extends through the cam slot 325 such that the release surface 335 engages the end of the cam slot 325 to translate the latch 320 against the bias of the biasing member towards the unlocked position as shown in FIG. 10. The latch 320 may interact with the release surface 335 to bias the release button 330 towards the undepressed position.

The cam slot 325 may include a roller 328 supported by the latch body 324 within the cam slot 325 adjacent the end of the cam slot 325 engaged by the release surface 335. The roller 328 may reduce frictional forces between the release surface 335 and the latch 320 such that a force required to depress the release button 330 from the undepressed position to the depressed position is reduced. The roller 328 may also prevent the latch 320 from binding in the locked and/or unlocked position. In the unlocked position, the latch key 322 is withdrawn from between the shell edge 158*a* and the locking edge 241 such that the first and second leaves 110, 210 can rotate to an open position from the closed position.

With particular reference to FIG. 9, the locking edge 241 of the second leaf 210 may engage the latch key 322 to translate the latch 320 towards the unlocked position as the first and second leaves 110, 210 transition from an open position to the closed position. When the first and second leaves 110, 210 reach the closed position, the biasing member returns the latch 320 to the locked position. The latch key 322 includes a leading edge 323 that is configured to engage the locking edge 241 such that the locking edge 241 translates the latch 320 towards the unlocked position. The second leaf 210 may include a latch strike 336 that is secured to the second leaf 210 and positioned to engage the leading edge 323 as the first and second leaves 110, 210 approach the closed position to translate the latch 320 towards the unlocked position. In the closed position of the first and second leaves 110, 210, the latch strike 336 may reinforce and/or stiffen the locking edge 241 to prevent the first and second leaves 110, 210 from inadvertently moving from the closed position.

Figure 13:
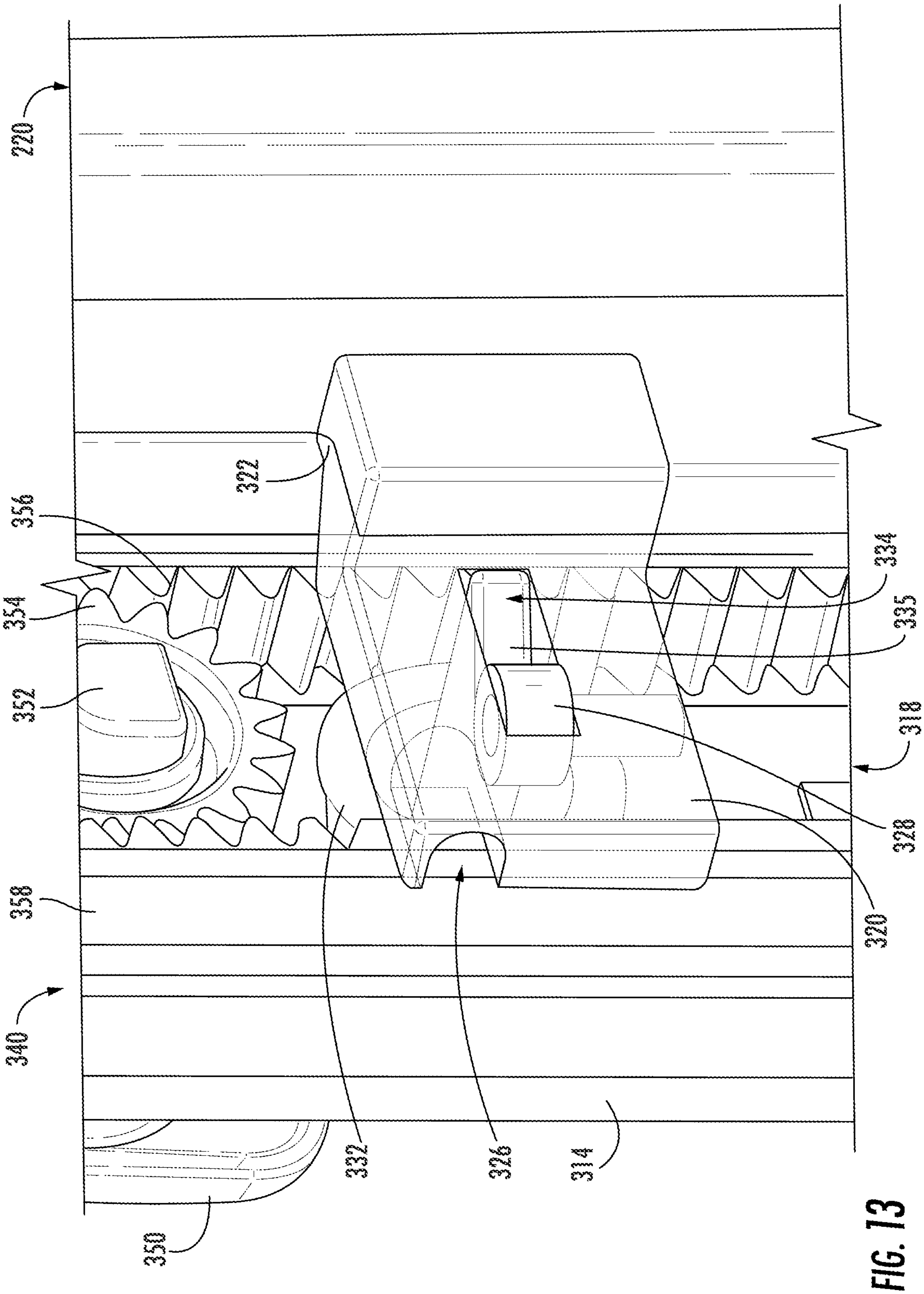
FIG. 13 is an enlarged front perspective view of the locking assembly of FIG. 10 with a locking housing removed and a body of a latch of the locking assembly in phantom to show internal components of the locking assembly.
Figure 14:
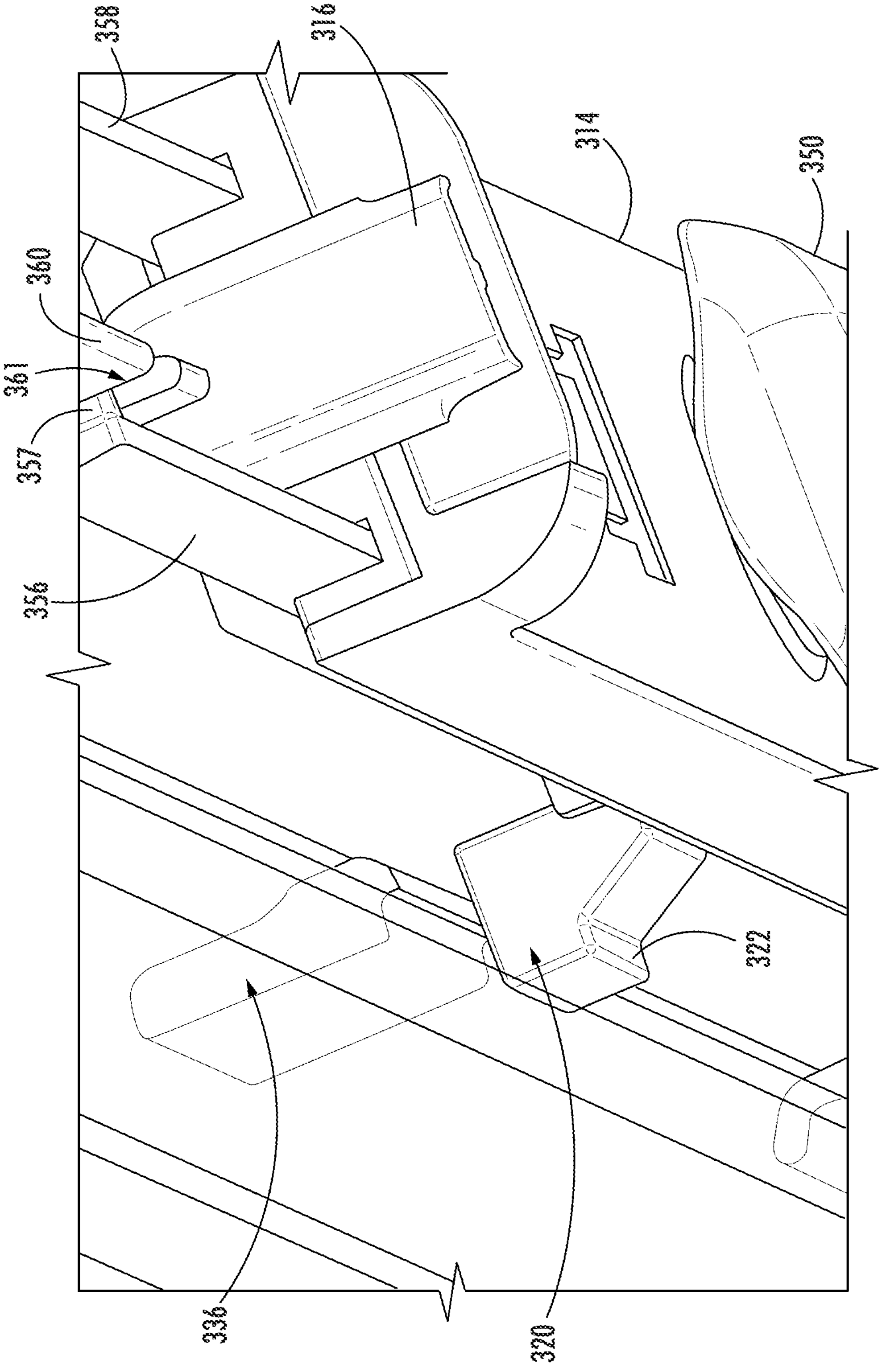
FIG. 14 is an enlarged top, rear perspective view of components of the locking assembly of FIG. 7.
Figure 15:
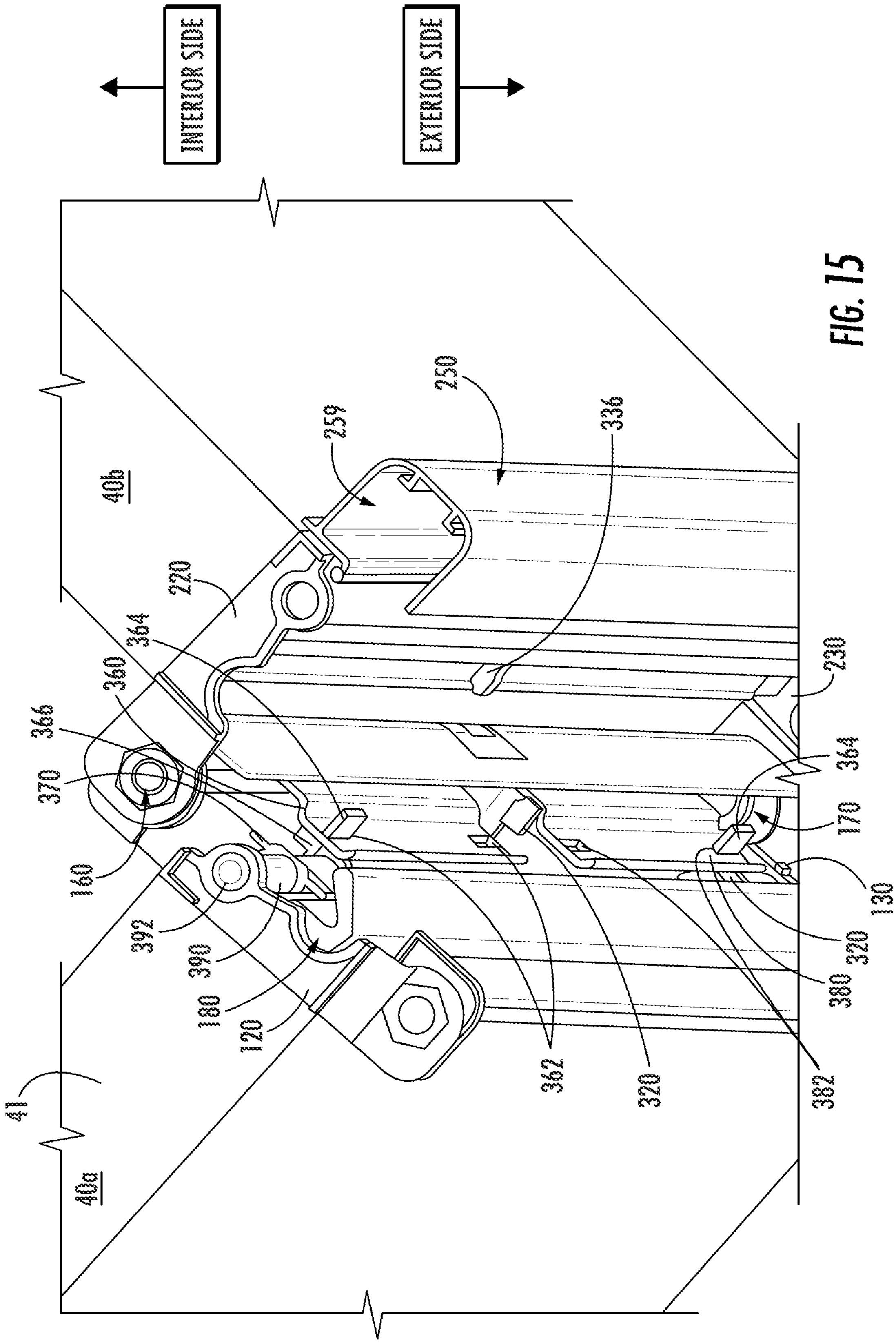
FIG. 15 is a front perspective view of the locking hinge of FIG. 2.
Figure 16:
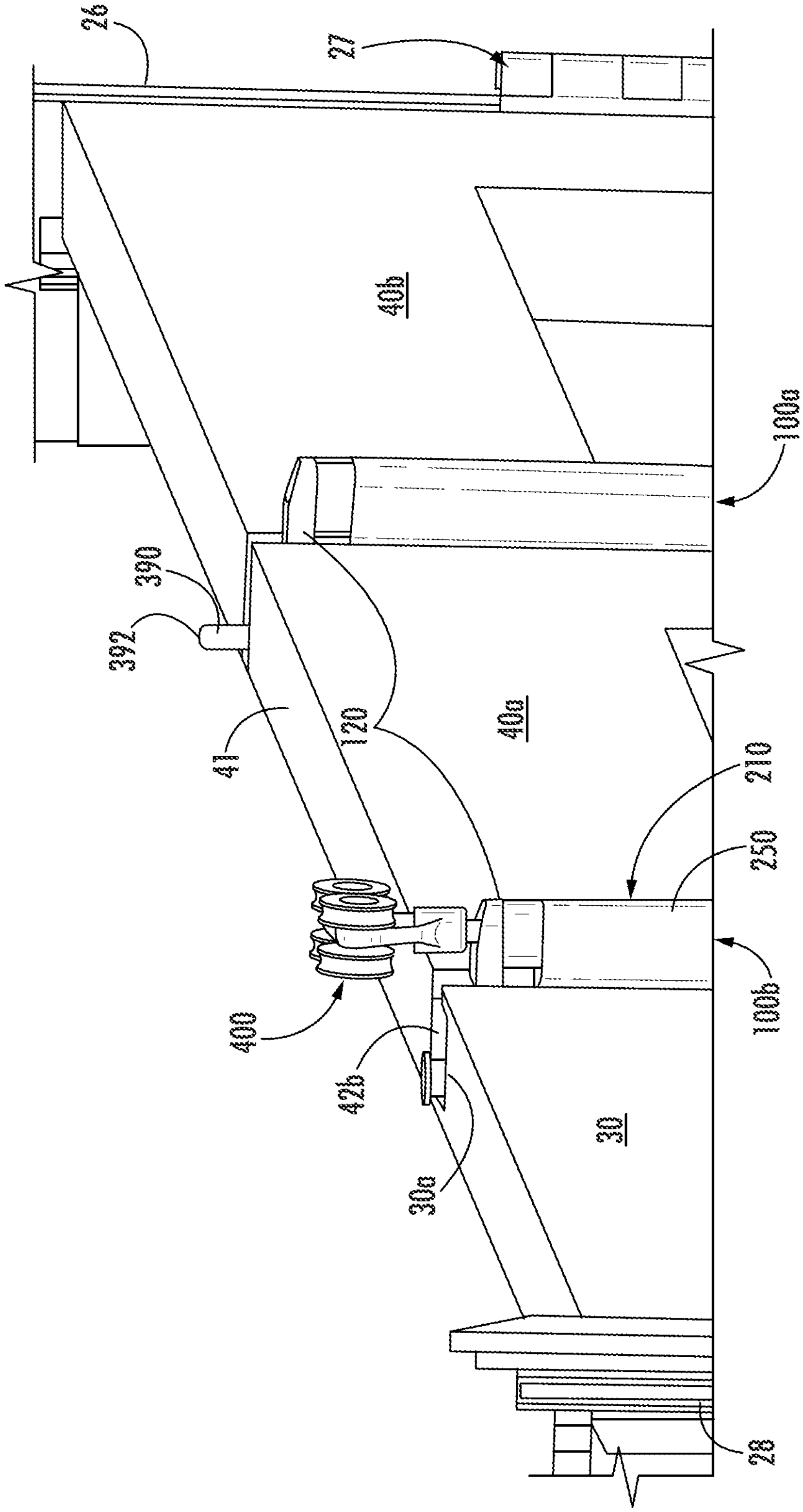
FIG. 16 is a top perspective view of a portion of the door panel system of FIG. 1 in a closed configuration.

Referring now to FIGS. 11-15, the locking assembly 300 may also include a shoot bolt assembly 340 configured to transition top and bottom shoot bolts 390 between a retracted position (FIG. 15) and an extended position (FIG. 16). The shoot bolt assembly 340 is actuated between the retracted and extended positions by rotation of a lock lever 350 between a locked position (FIG. 14) and an unlocked position (FIG. 15). The lock lever 350 is secured to the lock face 314 by a lever pivot 352. The lever pivot 352 is rotatably fixed to the lock lever 350 such that the lever pivot 352 cooperates with rotation of the lock lever 350. The lock face 314 may include stops 351 to prevent the lock lever 350 from rotating beyond the locked and/or unlocked positions. The lock face 314 may also include visual indicia to indicate whether the lock lever 350 is in the locked and/or unlocked position. In addition, in the locked position, the lock lever 350 may cover the button hole 331 to prevent actuation of the latch release button 330 when the lock lever 350 is in the locked position.

The shoot bolt assembly 340 includes the lock lever 350, a rack 356, 358, a link 360, 380, an actuator 364, a shoot bolt guide 370, and a shoot bolt 390. The shoot bolt assembly 340 may include a top shoot bolt 390, a bottom shoot bolt 390, or both top and bottom shoot bolts 390.

With particular reference to FIG. 13, the lock pivot 352 passes through the lock face 314 and into an actuation channel 318 defined between the lock face 314 and the lock housing 316. The lock pivot 352 is rotatably fixed to a lever gear 354 disposed within the actuation channel 318. The lock pivot 352 may be shaped or keyed to the lever gear 354 such that the lock pivot 352 may slide in and out of the lever gear 354 while being rotatably fixed relative to the lever gear 354. The lock pivot 352 may be secured within the lever gear 354 by a pin (not shown) passing through the lock pivot 352.

The lever gear 354 is meshingly engaged with a top rack 356 and a bottom rack 358. The top and bottom racks 356, 358 are disposed within the actuation channel 318 on either side of the lever gear 354 in opposition to one another. As shown, the top rack 356 is disposed adjacent the third wall 158 of the shell 150 and the bottom rack 358 is disposed adjacent the first wall 156 of the shell 150. The top and bottom racks 356, 358 are configured to translate in opposite directions in response to rotation of the lock lever 350. For example, as the lock lever 350 rotates from the unlocked position to the locked position, the top rack 356 translates upward and the bottom rack 358 translates downward such that both the top and bottom racks 356, 358 translate in opposite directions away from the lock pivot 352. Similarly, as the lock lever 350 rotates from the locked position to the unlocked position, the top rack 356 translates downward and the bottom rack 358 translates upwards such that both the top and bottom racks 356, 358 translate in opposite directions towards the lock pivot 352.

Referring now to FIG. 14, the top rack 356 extends through a slot in a top surface of the lock face 314 and includes a foot 357. The foot 357 is received within a groove 361 defined in the top link 360 and is configured to translate the top link 360 vertically. The foot 357 may be coupled to the top link 360 by one or more fasteners. The bottom rack 358 may also extend through a slot in the top surface of the lock face 314 to allow for a full actuation of the shoot bolt 390 associated with the bottom rack 358. Similarly and not shown for simplicity, the bottom rack 358 extends through a slot in the bottom surface of the lock face 314 and includes a foot (not shown) that is received within a groove (not shown) of the bottom link 380 and a portion of the top rack 356 may extend through a slot in the bottom surface of the lock face 314. The foot of the bottom rack 358 may be longer than the foot 357 of the top rack 356 such that the top and bottom links 360, 380 may be aligned with one another.

Figure 12:
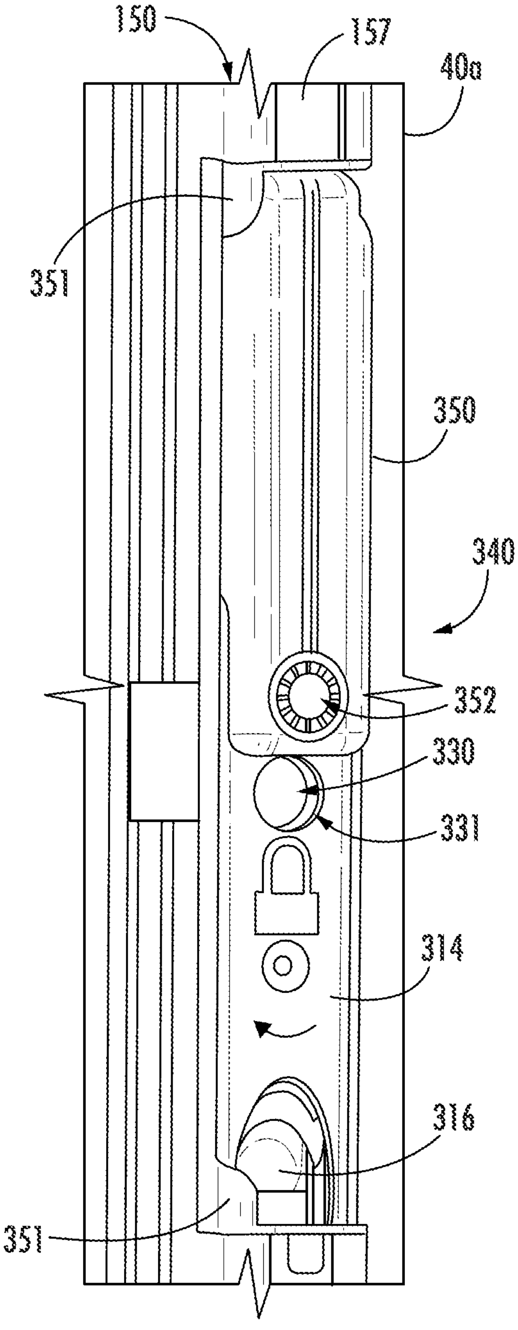
FIG. 12 is a rear perspective view of the locking assembly of FIG. 11 with the locking lever in an unlocked position.

With reference to FIG. 15, the top and bottom links 360, 380 are each coupled to a respective one of the top or bottom shoot bolts 390 to extend the shoot bolts 390 when the lock lever 350 is in the locked position (FIG. 11) and to retract the shoot bolts 390 when the lock lever 350 is in the unlocked position (FIG. 12). In the extended position (FIG. 16), the top shoot bolt 390 extends beyond the top plate 120 and into a locking hole 23 (FIG. 2) defined in the top rail 22 of the frame 20 and the bottom shoot bolt 390 extends beyond the bottom plate 130 and into the bottom sill 24 of the frame 20 to secure the continuous hinge 100 in position within the frame 20 and prevent the panels 40 from moving from the closed position. In the retracted position (FIG. 15), the shoot bolts 390 are at or within the top and bottom plates 120, 130, respectively, such that the continuous hinge 100 is moveable from the closed position.

The top link 360 is positioned between the top rack 356 and the top shoot bolt 390 and is configured to operably couple translation of the top rack 356 to translation of the top shoot bolt 390. The top link 360 includes an opening 362 that passes through the top link 360 adjacent a top of the top link 360. The opening 362 receives a bolt actuator 364 that passes through the opening 362. The bolt actuator 364 is coupled to the top shoot bolt 390. The actuator 364 may include a shoot holder 366 in the form of a ring that extends around the shoot bolt 390 to couple the actuator 364 to the shoot bolt 390. The shoot bolt 390 may pass through a shoot bolt guide 370.

Referring briefly back to FIG. 5, the shoot bolt guide 370 includes finger catches 372 and a shoot passage 374. The finger catches 372 are defined in opposite ends of the shoot bolt guide 370 and are configured to receive the opposing retaining fingers 155 of the first leaf 110 to secure the shoot bolt guide 370 within the first leaf 110. The retaining fingers 155 may also align the shoot bolt guide 370 with the shoot bolt opening 125 of the top plate 120. The shoot passage 374 passes through the shoot bolt guide 370 and is configured to guide translation of the shoot bolt 390 through the shoot bolt opening 125 of the top plate 120. The shoot bolt 390 may include a tapered leading end 392 to guide the shoot bolt 390 through the shoot bolt opening 125 and/or into the top rail 22 as detailed below.

With reference to FIG. 15, the bottom link 380 is positioned between the bottom rack 358 and the bottom shoot bolt 390 and is configured to operably couple translation of the bottom rack 358 to translation of the bottom shoot bolt 390. The bottom link 380 includes an opening 382 that passes through the bottom link 380 adjacent a bottom of the bottom link 380. The opening 382 receives a bolt actuator 364 that passes though the opening 382. The bolt actuator 364 is coupled to the bottom shoot bolt 390. The bottom shoot bolt 390 and the top shoot bolt 390 are coaxial with one another about a common longitudinal axis. The bolt actuation 364 may include a shoot holder 366 in the form of a ring that extends around the shoot bolt 390 to couple the actuator 364 to the shoot bolt 390. The shoot bolt 390 may pass through a shoot bolt guide 370 that is secured within the first leaf 110 in a similar manner to the shoot bolt guide 370 adjacent the top plate 120 detailed above. The bottom shoot bolt 390 is configured to extend through the bottom plate 130 into the sill 24 as detailed below.

As detailed above, several of the components of the shoot bolt assembly 340 may be used to operably couple the rotation of the lock lever 350 to movement of the top shoot bolt 390 or to movement of the bottom shoot bolt 390. For example, the top and bottom rack 356, 358 may be interchangeable with one another and the top and bottom links 360, 380 may be interchangeable with one another. In addition, the actuator 364 and the shoot bolt guide 370 may be used in the top or bottom positions. Reducing the number of unique components to manufacturer the continuous hinge 100 may decrease inventory costs, tooling costs, and supply costs.

Figure 17:
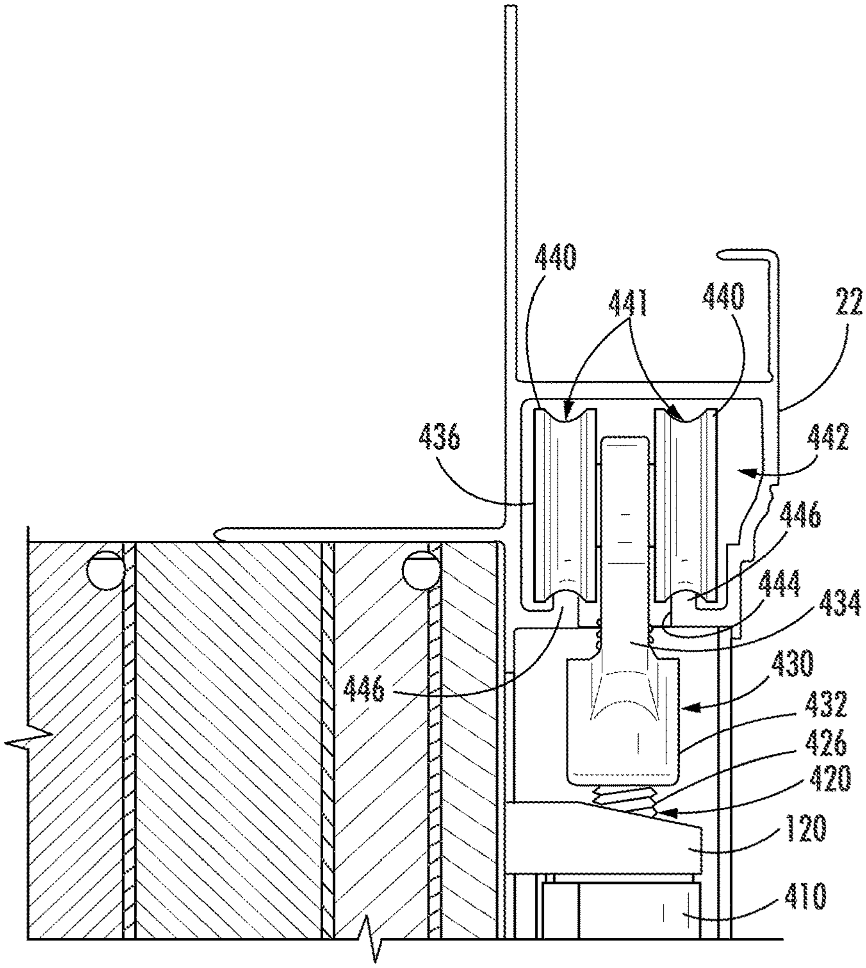
FIG. 17 is a cross-sectional view taken along the section line 17-17 of FIG. 1.
Figure 18:
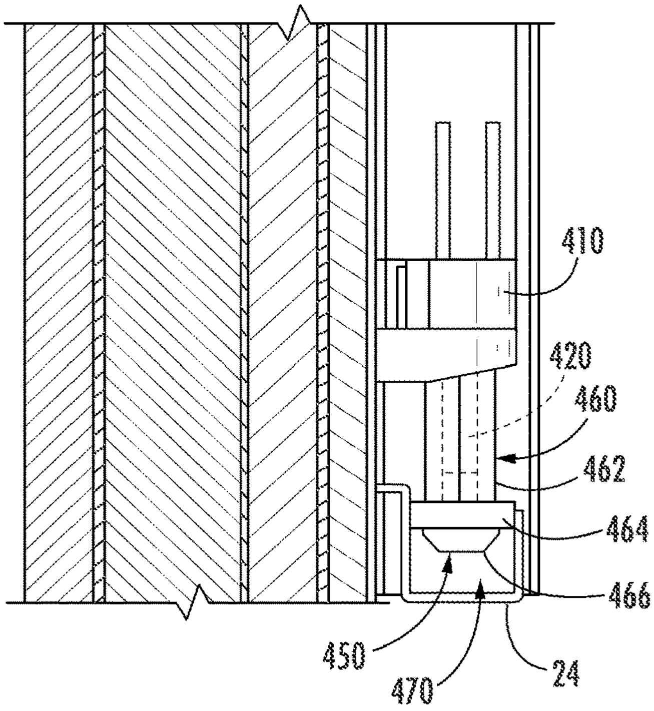
FIG. 18 is a cross-sectional view taken along the section line 18-18 of FIG. 1.

Referring now to FIGS. 16-18, the continuous hinge 100*b* secured between the operating panel 30 and the secondary panel 40*a* is assembled as a sliding hinge. The first and second leaves of the continuous hinge 100*b* are assembled and secured to the panels 30, 40 in a similar manner to the continuous hinge 100*a* detailed above. Although not explicitly shown, the first leaf of the continuous hinge 100*b* is secured to an edge 30*a* of the operating panel 30 and the second leaf of the continuous hinge 100*b* is secured to an edge 42*b* of the secondary panel 40*a*. However, unlike the continuous hinge 100*a* detailed above which pivots about a pivot axis passing through the shell 150 of the first leaf 110, the continuous hinge 100*b* pivots about a pivot axis passing through the shell 250 of the second leaf 210. The continuous hinge 100*b* includes an upper roller assembly or bogey 400 secured within the shell 250 and passing through the top plate 120 and a lower roller assembly 450 secured within the shell 250 and passing through the bottom plate 130. The upper and lower roller assemblies 400, 450 are coaxial with one another about the pivot axis of the continuous hinge 100*b*.

With particular reference to FIG. 17, the upper roller assembly 400 includes an insert 410, a pivot shaft 420, a truck 430, and rollers 440. The insert 410 is received in a top portion of the cavity 259 of the shell 258 of the second leaf 210 (FIG. 3). The insert 410 is secured within the cavity 259 in a manner similar to the top pivot 102 detailed above. The insert 410 may engage the pivot fingers 251 to secure the insert 410 within the cavity 259 and to position the insert 410 relative to the second leaf 210. The insert 410 includes a threaded hole (not shown) that receives the pivot shaft 420 therethrough. The pivot shaft 420 may include a lower threaded portion that is secured within the insert 410. The pivot shaft 420 includes an upper threaded portion 426 that extends above the top plate 120. The pivot shaft 420 may include a non-threaded pivot surface between the lower threaded portion and the upper threaded portion 426. The pivot surface may be configured to be positioned within the pivot opening 122 (FIG. 3) of the top plate 120 to provide a smooth surface for engagement between the pivot shaft 420 and the top plate 120.

The truck 430 includes a mount 432, axle mounts 434, and axles 436. The mount 432 is substantially cylindrical and defines a threaded hole therethrough. The mount 432 is threaded onto the upper threaded portion 426 of the pivot shaft 420. The axle mounts 434 each extend from the sides of the mount 432 an angle to avoid interference with the pivot shaft 420. The angle and length of the axle mounts 434 are determined to allow for clearance of rollers 440 with one another and with the pivot shaft 420. Each of the axle mounts 434 supports an axle 436 that passes through an upper portion of the respective axle mount 434. A roller 440 is received on either end of each axle 436 such that the upper roller assembly 400 includes four rollers 440. In embodiments, the truck 430 may include a single axle mount 434 and two rollers 440. In other embodiments, the truck 430 may include two axle mounts 434 with one roller 440 on each axle 436. In still other embodiments, the upper roller assembly 430 may include more than two axle mounts 434 with one or two rollers 440 on each axle 436.

The top guide rail 22 may define a roller channel 442 and a shaft slot 444 positioned between tracks 446. The rollers 440 each define a groove 441 that is configured to receive a respective one of the tracks 446 such that the rollers 440 roll along the tracks 446. The rollers 440 are configured to hang from the tracks 446 to support the weight of the continuous hinges 100 and the panels 30, 40. As shown in FIG. 16, the upper roller assembly 400 and hinges 27 on the fixed jamb 26 are the only elements of the door panel system 10 configured to support the weight of the panels 30, 40 and the continuous hinges 100. As such, the upper roller assembly 400 is sized to evenly distribute the weight of the continuous hinges 100 and the panels 30, 40 along the track 446 as the panels 30, 40 move between the open and closed positions as detailed below.

The lower roller assembly 450 includes an insert 410, a pivot shaft 420, and a roller guide assembly 460. The insert 410 is received in a bottom portion of the cavity 259 of the shell 258 of the second leaf 210. The insert 410 is secured in a manner similar to the bottom pivot 104 detailed above. The insert 410 may engage the pivot fingers 251 to secure the insert 410 within the cavity 259 and to position the insert 410 relative to the second leaf 210. The insert 410 includes a threaded hole (not shown) that receives the pivot shaft 420 therethrough. The pivot shaft 420 may include an upper threaded portion that is secured within the insert 410. The pivot shaft 420 includes a lower threaded portion 426 that extends below the bottom plate 130. The pivot shaft 420 may include a non-threaded pivot surface between the upper threaded portion and the lower threaded portion 426. The pivot surface may be configured to be positioned within the pivot opening (not explicitly shown) of the bottom plate 130 to provide a smooth surface for engagement between the pivot shaft 420 and the bottom plate 130.

The roller guide assembly 460 includes a housing 462 and a roller 464 disposed about a lower portion of the housing 462. The housing 462 is threaded over the lower threaded portion 426 of the pivot shaft 420. The roller 464 is rotatable relative to the housing 462 about the pivot axis that is coaxial with a central longitudinal axis of the housing 462. The roller 464 is sized to fit within a guide channel 470 defined in the sill 24. The roller 464 is configured to slide within the guide channel 470 to retain the lower portion of the continuous hinge 100*b* within the opening 12 of the frame 20. The housing 462 may include a bottom tip 466 that extends below the roller 464. The bottom tip 466 is configured to be positioned above a bottom of the guide channel 470. The position of the roller 464 within the channel 470 may be adjusted by threading or unthreading the housing 462 over the pivot shaft 420. As noted above, the entire weight of the panels 30, 40 and the continuous hinges 100 are supported by the upper roller assembly 400 and the hinges 27 such that the lower roller assembly 450 is not configured to support a vertical load. In embodiments, the continuous hinge 100*b* may be provided without a lower roller assembly 450.

Referring now to FIGS. 19-24, the operation of the door panel system 10 will be detailed with additional references to the locking assembly of FIGS. 7-15. Initially referring to FIGS. 19 and 20, the door panel system 10 is in the closed configuration with each of the operating panel 30 and secondary panels 40 in a closed position. In the closed position, each of the operating panels 30 and secondary panels 40 are aligned on edges with one another such that an inner and outer surface 34, 38, 44, 48 of each panel 30, 40 is coplanar with the inner and outer surfaces 34, 38, 44, 48 of the other panels 30, 40. In the closed configuration, the door panel system 10 may function as a wall or a barrier to prevent intrusion of air and water and prevent passage of animals or individuals therethrough. In the closed configuration, the latch 320 of any of the locking assemblies 310 is in the locked position. In addition, the lock lever 350 of any locking hinges, e.g., locking hinge 100*a*, is in the locked position such that the associated shoot bolts 390 are extended into the top rail 22 and/or bottom sill 24 to prevent the locking hinge from moving from the closed position.

The operating panel 30 may also include a lockset 31 adjacent the operating jamb 28 to prevent the operating panel 30 from moving from the closed position. The lockset 31 may include an operating latch and/or a deadbolt. The lockset 31 may be a single point lockset or a multipoint lockset and may include upper and lower extension bolts similar to the shoot bolts 390 detailed above.

Figure 21:
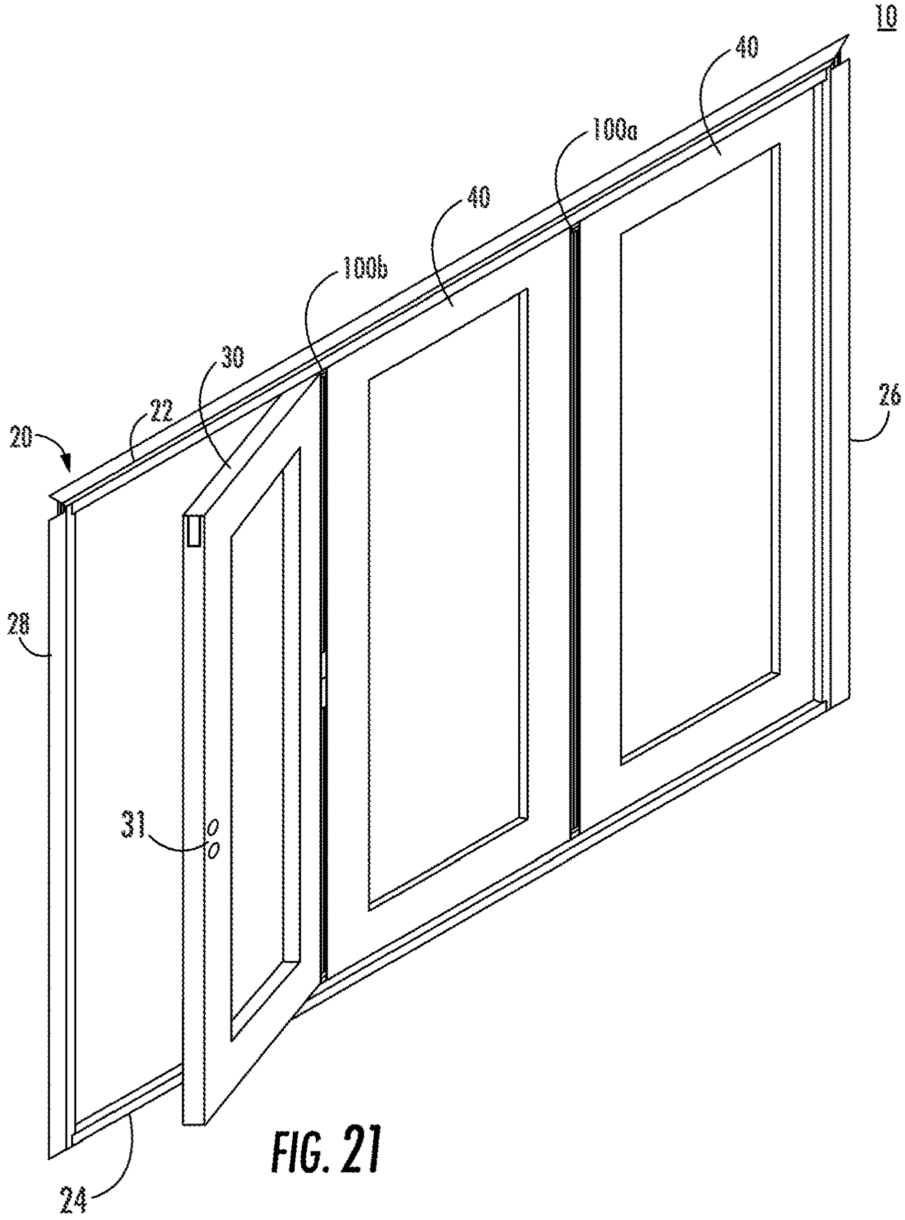
FIG. 21 is a perspective view of the door panel system of FIG. 1 with a locking hinge in a locked position and an operating panel in an open position.
Figure 22:
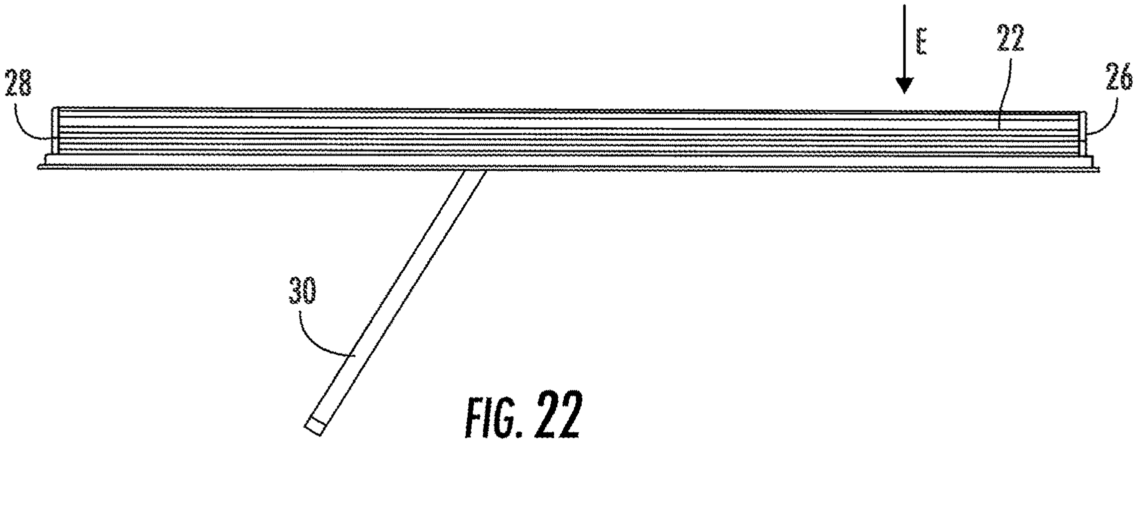
FIG. 22 is a top view of the door panel system of FIG. 21.

With reference to FIGS. 21 and 22, the operating panel 30 may be used as a standard door with the secondary panels 40 in the closed position. Specifically, with the locking assembly 310 in the locked position and the lock lever 350 in the locked position with the shoot bolts 390 extended, the lockset 31 may be used to open and close the operating panel 30 by pivoting the hinge 100*b* between an open and closed position.

With the operating panel 30 in an open position, the secondary panels 40 can be moved to an open position by operating the locking assembly 300 of the continuous hinge 100*a*. First, the lock lever 350 is rotated from the locked position (FIG. 11) to the unlocked position (FIG. 12). Rotation of the lock lever 350 translates the shoot bolts 390 from the extended position to the retracted position such that the tips 392 of the shoot bolts 390 are at or within the top and bottom plates 120, 130, respectively. Rotation of the lock lever 350 also exposes the latch release button 330. With the lock lever 350 in the unlocked position, the latch release button 330 is depressed to translate the latch 320 from extended position to the retracted position such that the latch key 322 is withdrawn from between the first and second leaves 110, 210. With the latch release button 330 depressed, the continuous hinge 100*a* can be pushed outward, e.g., towards the exterior as indicated by arrow E in FIG. 22. Once the continuous hinge 100*a* moves from the closed position, the latch release button 330 can be released.

Figure 23:
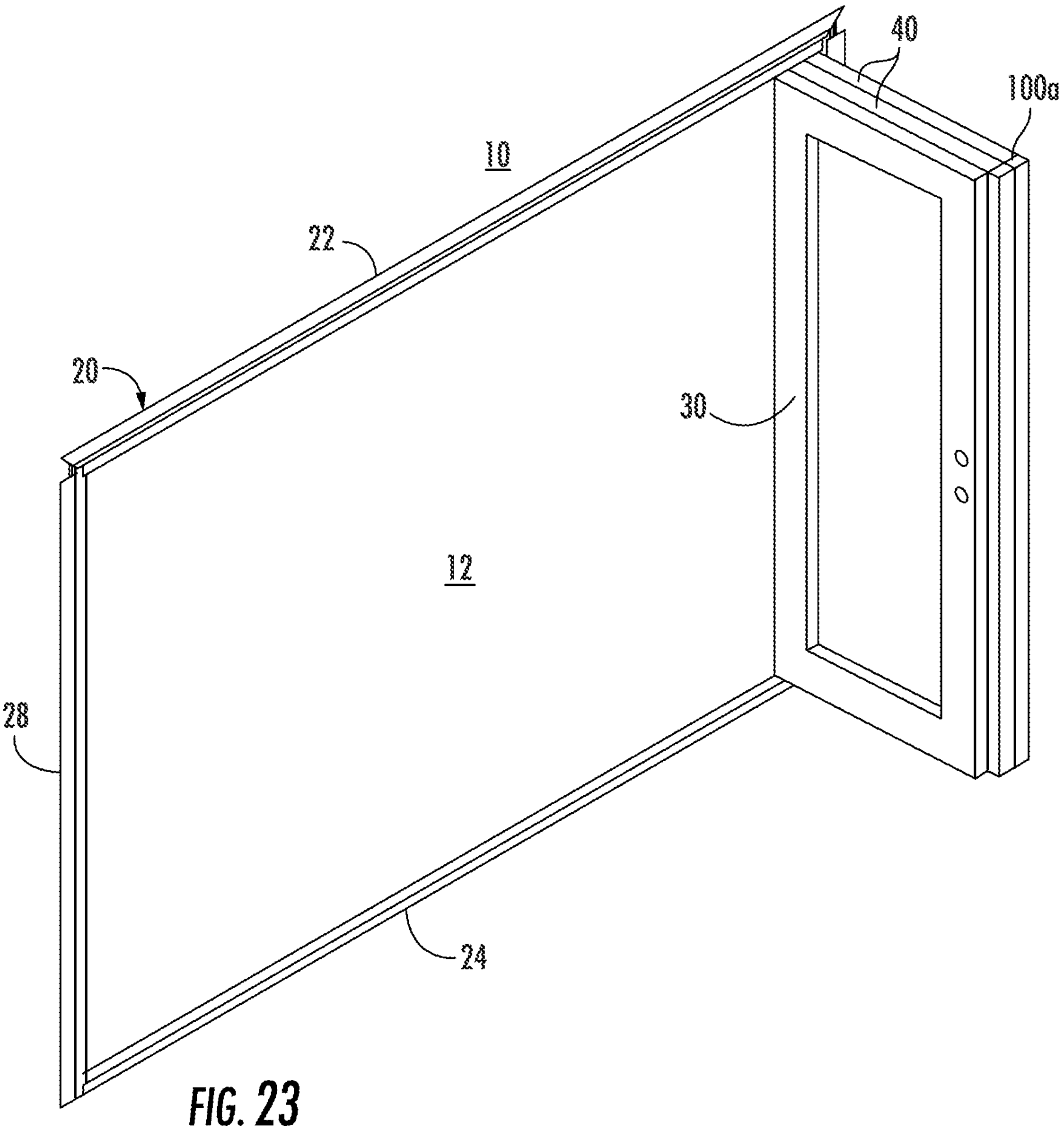
FIG. 23 is a perspective view of the door panel system of FIG. 1 in a fully open configuration.
Figure 24:
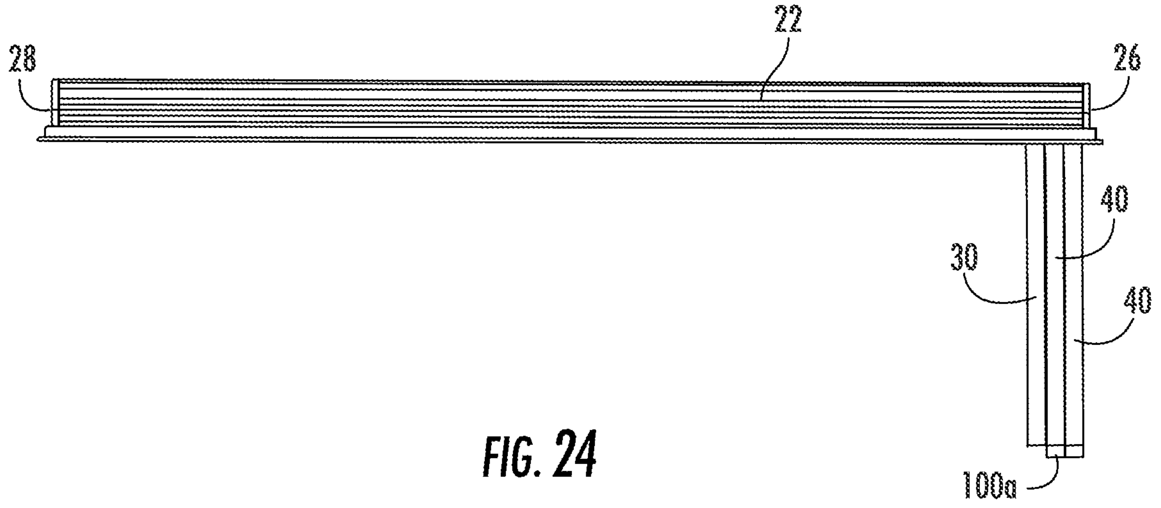
FIG. 24 is a top view of the door panel system of FIG. 23.

With the operating panel 30 and the secondary panels 40 in open positions, the operating panel 30 and the secondary panels 40 can be slid towards the fixed jamb 26 of the frame 20 until the panels 30, 40 are stacked relative to one another in a fully open configuration as shown in FIGS. 23 and 24. In the fully open configuration, the panels 30, 40 are parallel to one another and stacked such that interior or exterior surfaces of adjacent panels oppose one another. In some embodiments, the interior or exterior surfaces of adjacent panels may be in contact with one another.

To transition the door panel system from the fully open configuration to the closed configuration, the operating panel 30 or a sliding hinge, e.g., hinge 100*b*, can be drawn towards the operating jamb 28. As the operating panel 30 or the sliding hinge is drawn towards the operating jamb 28, the panels 30, 40 move towards the closed position. As the secondary panels 40 approach the closed position, the locking hinge 100 approaches its closed position. As the locking hinge 100*a* approaches its closed position, the latch key 322 of the latch 320 may engage the locking edge 241 of the second leaf 210 to urge the latch 320 towards the retracted position until the locking hinge 100*a* achieves the closed position. When the locking hinge 100*a* achieves the closed position, the latch key 322 is urged into the locked position between the locking edge 241 and the shell edge 158*a* as shown in FIG. 7. In the locked position, the latch 320 prevents the secondary panels 40 from moving from the closed position. To fully secure the secondary panels 40 in the closed position, the lock lever 350 is rotated from the unlocked position (FIG. 12) to the locked position (FIG. 11) to extend the shoot bolts 390 into the top rail 22 and the bottom sill 24, respectively. When the panels 40 are in the closed position, the shoot bolts 390 are substantially aligned with locking holes 23 (FIG. 2) in the top rail 22 and the bottom sill 24 such that the tapered tip 392 may engage the locking holes 23 to fully align the hinge 100*b* with the frame 20 as the shoot bolts 390 are extended. In addition, as the locking hinge 100 approaches its closed position, a weather strip, e.g., weather strip 180, may form a seal within the continuous hinge 100 as detailed above. With the secondary panels 40 in the closed position, the operating panel 30 may be pivoted to the closed position and operated using the lockset 31.

Figure 26:
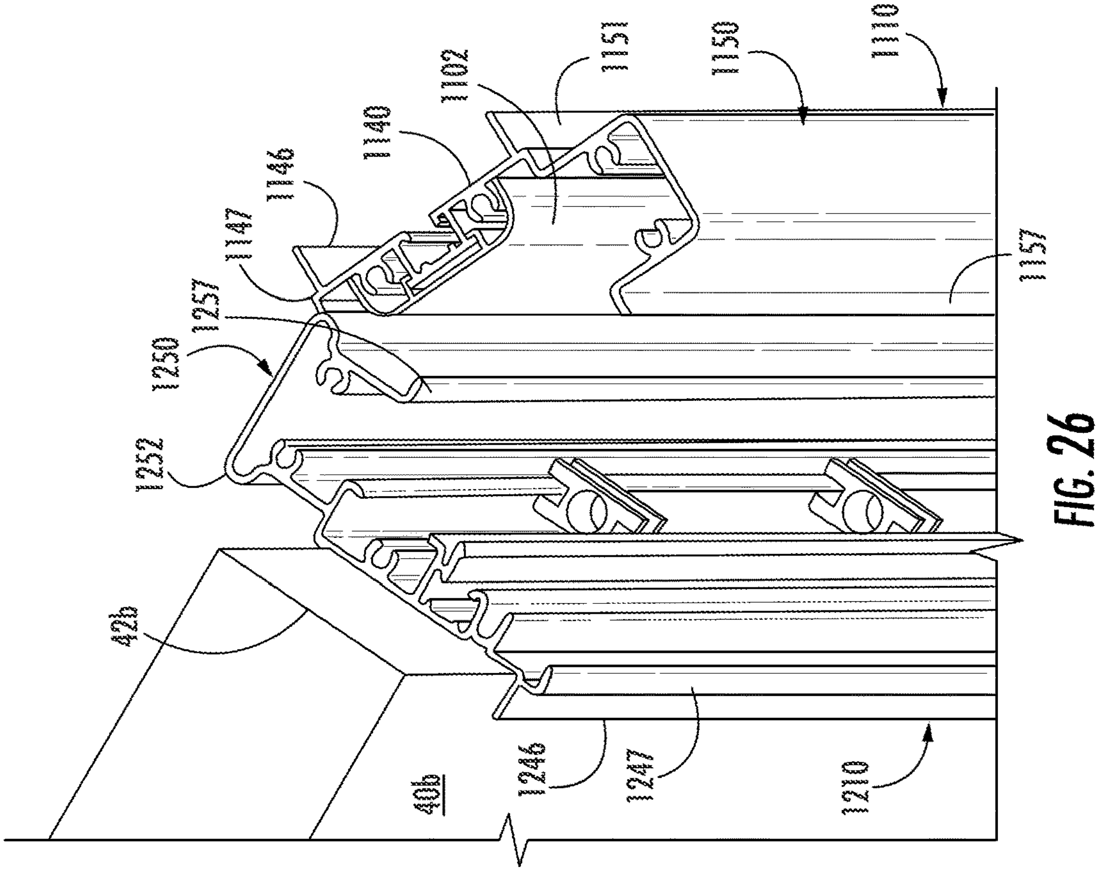
FIG. 26 is a perspective view of the leaves of the locking hinge of FIG. 25.
Figure 25:
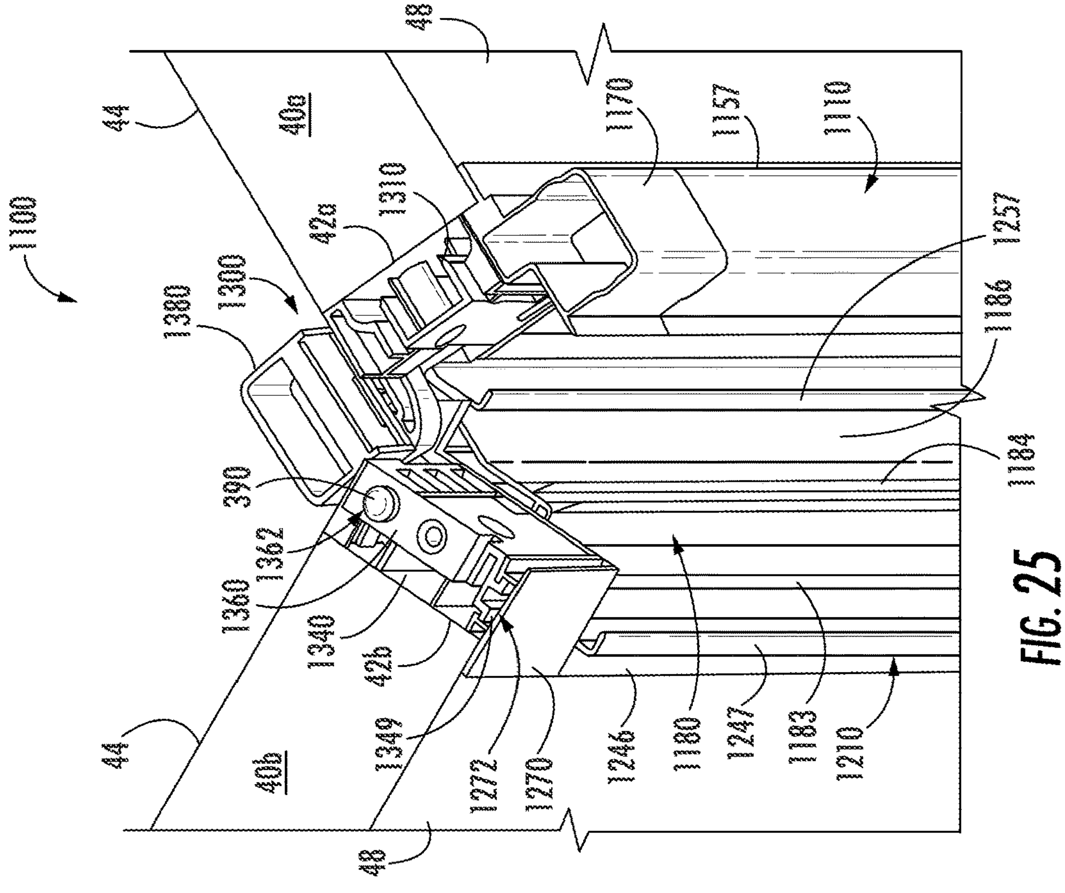
FIG. 25 is perspective view of a top portion another example locking hinge provided in accordance with the present disclosure.
Figure 35:
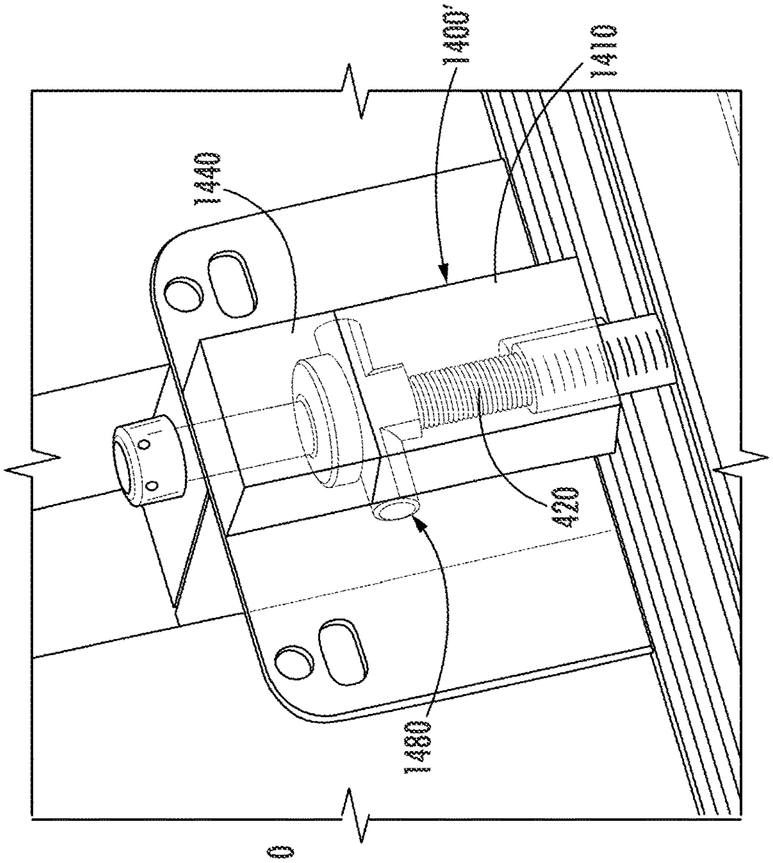
FIG. 35 is a perspective view of an example bottom pivot assembly of a sliding hinge provided in accordance with the present disclosure.

Referring now to FIGS. 25 and 26, a continuous hinge 1100 is provided in accordance with an example embodiment of the present disclosure. The continuous hinge 1100 includes a first leaf 1110, a second leaf 1210, a top pivot assembly 1300, and a bottom pivot assembly 1400' (FIG. 35). Components of the bottom pivot assembly 1400' are similar to the top pivot assembly 1300 with components flipped about a central lateral axis of the continuous hinge 1100 with like elements represented with a similar label with a leading "14" replacing the leading "13" of the similar element of the top pivot assembly 1300.

The continuous hinge 1100 is secured between adjacent panels 40 to support the panels 40 and facilitate movement of the panels 40 between the fully open and fully closed positions in a manner similar to the continuous hinge 100 detailed above. The continuous hinge 1100 extends continuously along a majority of a height of the panels 40 with an uppermost end of the continuous hinge 1100 adjacent a top surface of the panels 40 and a lowermost end of the continuous hinge 1100 adjacent a bottom end of the panels 40. As noted above with respect to the continuous hinge 100, the continuous hinge 1100 may be a locking hinge or a sliding hinge based on a position of the continuous hinge 1100 within a door panel assembly 10 (FIG. 1). In addition, a pivot axis of the continuous hinge 1100 may be on an exterior side of the panels 40 or an interior side of the panels 40 depending on the location of the hinge 1100 within a door assembly, e.g., door assembly 10.

The continuous hinge 1100 includes a first leaf 1110 that is secured to a side edge 42*a* that extends between an interior surface 44 and the exterior surface 48 of one panel, e.g., secondary panel 40*a*, and a second leaf 1210 that is secured to a side edge 42*b* of an adjacent panel, e.g., another secondary panel 40*b*. As described in greater detail below, the first and second leaves 1110, 1210 are pivotally coupled to one another by the top and bottom pivot assemblies 1300 to form the continuous hinge 1100. The first and second leaves 1110, 1210 may each be formed of an extrusion and cut to a desired length. The first and second leaves 1110, 1210 may be formed of aluminum, steel, thermoset plastic, or other suitable material.

Figure 27:
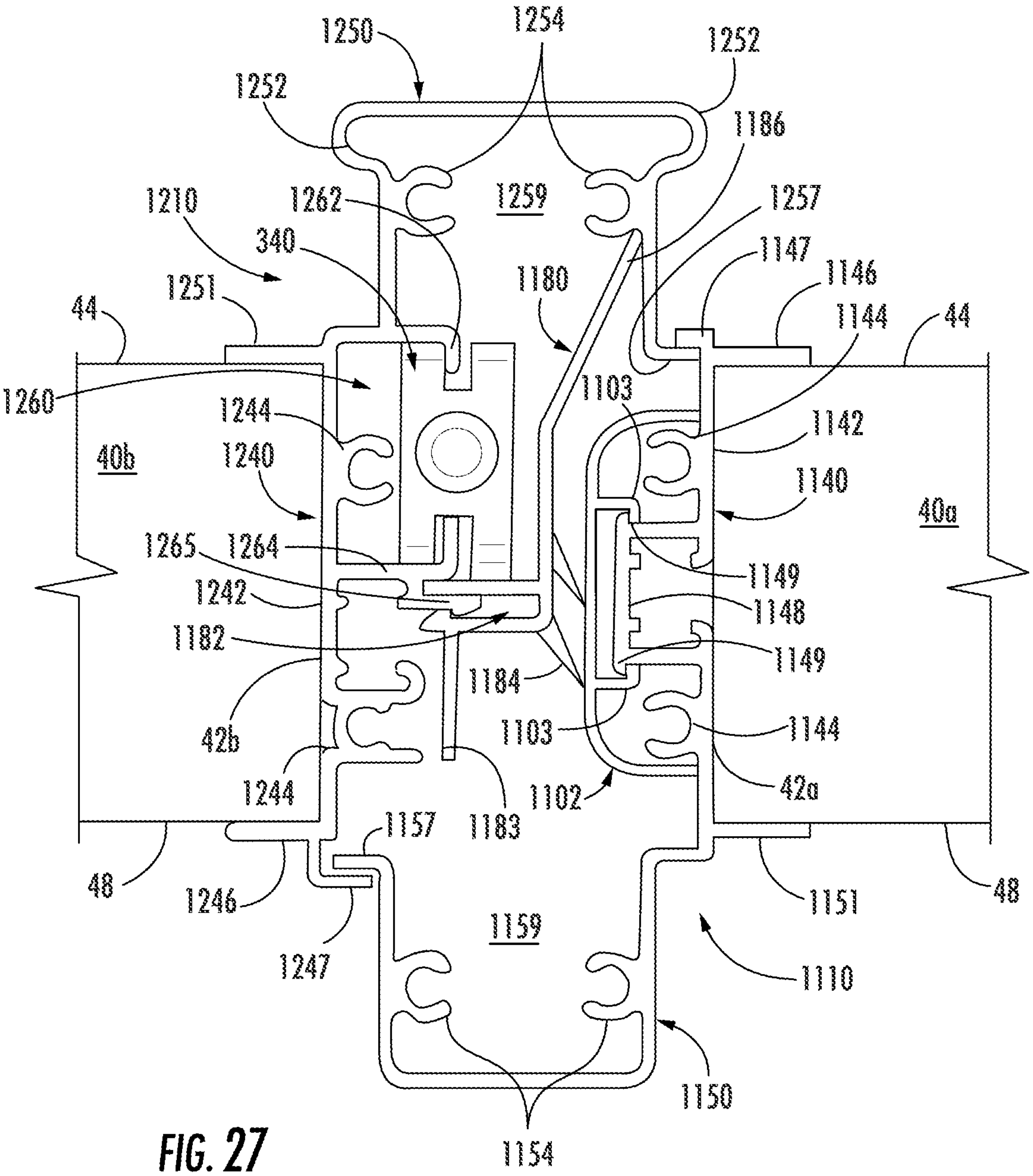
FIG. 27 is a top view of the leaves of FIG. 26.

Referring now to FIGS. 26 and 27, the first leaf 1110 includes an edge plate 1140 and a shell 1150. The edge plate 1140 includes a mounting segment 1142 and a cover mount 1148. The edge plate 1140 is secured to the side edge 42*a* of the panel 40*a* with one or more fasteners passing through the mounting segment 1142 and into the panel 40*a*. The one or more fasteners may be screws, nails, bolts, or any other suitable fastener. In some embodiments, the mounting segment 1142 is at least partially adhered to the side edge 42*a* by an adhesive. The cover mount 1148 extends in a direction parallel to and offset from the mounting segment 1142. The cover mount 1148 includes retention tabs 1149 that extend from the ends thereof to secure a cover 1102 to the first leaf 1110. The mounting segment 1142 may be continuous along the side edge 42*a* or may include a break along a portion where the cover mount 1148 connects two portions of the mounting segment 1142.

The cover 1102 includes retention fingers 1103 that engage the retention tabs 1149 to secure the cover 1102 to the first leaf 1110. The cover 1102 covers the mounting segment 1142 and the one or more fasteners that secure the first leaf 1110 to the panel 40. The cover 1102 may be designed to improve the aesthetics of the hinge 1100 when the hinge 1100 is in the open position. In the closed position of the hinge 1100, the cover 1102 may form a portion of a barrier or seal between the interior and exterior of the door panel assembly. For example, the cover 1102 may be engaged by a weather strip 1180 that forms a seal within the hinge 1100. The cover 1102 may be formed of aluminum, steel, thermoset plastic, thermoformed plastic, or other suitable material.

The edge plate 1140 also includes hinge mount receivers 1144 that are configured to receive fasteners that secure the pivot assemblies 1300, 1400 to the first leaf 1110 as detailed below. The edge plate 1140 may also include an interior alignment finger 1146 that is disposed along the interior face 44 of the panel 40*a* to align the first leaf 1110 with the panel 40*a*. The interior alignment finger 1146 may also enclose a corner of the panel 40*a* between the side edge 42*a* and the interior face 44. Enclosing the corner may improve a seal between the interior and exterior side of the panels 40 formed by the hinge 1100. The edge plate 1140 may also include a mating cover 1147 that extends towards the second leaf 1210 and may be positioned interior of the interior face 44 of the panel 40. As detailed below, the mating cover 1147 is configured to receive and cover a portion of the second leaf 1210 and form a seal with the second leaf 1210 and may act as a stop for movement towards the closed position of the hinge 1100.

The shell 1150 extends from an exterior side of the edge plate 1140 and beyond the exterior face 48 of the panel 40*a*. The shell 1150 includes an exterior alignment finger 1151 that is disposed along the exterior face 48 of the panel 40*a* to align the first leaf 1110 with the panel 40*a*. The exterior alignment finger 1151 may also enclose a corner of the panel 40*a* between the side edge 42*a* and the exterior face 48. Enclosing the corner may improve a seal between the interior and exterior side of the panels 40 formed by the hinge 1100. As shown, the exterior alignment finger 1151 is parallel to the interior alignment finger 1146 such that the panel 40*a* is sandwiched between the interior and exterior alignment fingers 1146, 1151 with the thickness of the panel 40 being disposed between the fingers 1146, 1151.

The shell 1150 extends in a direction away from the exterior face 48 of the panel 40*a* to form a cavity 1159 having a substantially rectangular cross-section. The shell 1150 also includes cover mount receivers 1154 that oppose one another. The cover mount receivers 1154 are configured to receive fasteners that secure caps or covers to the first leaf 1110 as detailed below. The shell 1150 also includes a mating finger 1157 that extends towards the second leaf 1210 and nests within a portion of the second leaf 1210 when the hinge 1100 is in a closed position thereof as shown in FIG. 27.

Continuing to refer to FIGS. 26 and 27, the second leaf 1210 includes an edge plate 1240 and a shell 1250. The edge plate 1240 includes a mounting segment 1242 that is secured to the side edge 42*b* of the panel 40*b* with one or more fasteners passing therethrough and into the panel 40*b*. In some embodiments, the mounting segment 1242 is at least partially adhered to the side edge 42*a* by an adhesive. The edge plate 1240 includes hinge mount receivers 1244 that oppose the hinge mount receivers 1144 of the first leaf 1110 when the hinge 1100 is in a closed position. The hinge mount receivers 1244 are configured to receive fasteners that secure the pivot assemblies 1300, 1400' to the second leaf 1210 as detailed below.

The edge plate 1240 may also include an exterior alignment finger 1246 that is disposed along the exterior face 48 of the panel 40*b* to align the second leaf 1210 with the panel 40*b*. The exterior alignment finger 1246 may also enclose a corner of the panel 40*b* between the side edge 42*b* and the exterior face 48. Enclosing the corner may improve a seal between the interior and exterior side of the panels 40 formed by the hinge 1100. The edge plate 1240 may also include a mating cover 1247 that extends towards the first leaf 1110 and may be positioned exterior of the exterior face 48 of the panel 40. As shown, in the closed position, the mating cover 1247 may be positioned externally of the mating finger 1157 of the first leaf 1110 such that in the closed position, the mating finger 1157 is nested within the mating cover 1247 to form a seal with the first leaf 1110 and may act as a stop for movement towards the closed position of the hinge 1100.

The shell 1250 extends from an interior side of the edge plate 1240 and beyond the interior face 44 of the panel 40*b*. The shell 1250 includes an interior alignment finger 1251 that is disposed along the interior face 44 of the panel 40*b* to align the second leaf 1210 with the panel 40*b*. The interior alignment finger 1251 may also enclose a corner of the panel 40*b* between the side edge 42*b* and the interior face 44. Enclosing the corner may improve a seal between the interior and exterior side of the panels 40 formed by the hinge 1100. As shown, the interior alignment finger 1251 is parallel to the exterior alignment finger 1246 such that the panel 40*b* is sandwiched between the interior and exterior alignment fingers 1246, 1251 with the thickness of the panel 40 being disposed between the fingers 1246, 1251.

The shell 1250 extends in a direction away from the interior face 44 of the panel 40*b* to form a cavity 1259 having a substantially rectangular cross-section. The shell 1250 may include lateral wings 1252 adjacent an internal edge of the shell 1250 that extend laterally from the edges of the shell 1250. The lateral wings 1252 form a grip that allows for a user to grip the hinge 1100. The grip formed by the lateral wings 1252 may allow a user to draw the hinge 1110 towards the closed position and/or to slide the hinge 1110 within the door assembly 10.

The shell 1250 also includes cover mount receivers 1254 that oppose one another. The cover mount receivers 1254 are configured to receive fasteners that secure the pivot assemblies 1300, 1400 to the second leaf 1210 as detailed below. The cover mount receivers 1254 may be positioned between the wings 1252 and the interior face 44 of the panel 40. The shell 1250 also includes a mating finger 1257 that extends toward the first leaf 1110 and nests within the mating cover 1147 of the first leaf 1110 when the hinge 1100 is in a closed position thereof as shown in FIG. 27.

The second leaf 1210 also includes a hollow 1260 defined adjacent the edge plate 1240. The hollow 1260 is sized to receive a shoot bolt assembly 340 that is retained within the hollow 1260 by opposed retaining fingers 1262. The second leaf 1210 may also include a weather strip retainer 1264. The weather strip retainer 1264 may include an insert 1265 that extends away from the mounting segment 1242 and towards the first leaf 1110. The insert 1265 may be received within a channel 1182 of the weather strip 1180 to retain the weather strip 1180 within the hinge 1100.

The weather strip 1180 may include one or more sealing fins 1184 that extend towards and engage the cover 1102 when the hinge 1100 is in the closed portion. The weather strip 1180 may also include a sealing wall 1186 that extends from the channel 1182 towards the cavity 1259 of the shell 1250. The sealing wall 1186 may engage one of the cover mount receivers 1254 to secure the weather strip 1180 within the hinge 1100. Specifically, the weather strip 1180 may be fixed to the second leaf 1210 by the cooperation of the channel 1182 and the sealing wall 1186 such that the weather strip 1180 is substantially fixed relative to the second leaf 1210. The weather strip 1180 may include an extension 1183 that extends in an exterior direction from the channel 1182 in a direction parallel to the lateral wings 1252. The extension 1183 may cover portions of the second leaf 1210 when the hinge 1100 is in an open position. Covering portions of the second leaf 1210 may improve the aesthetics of the hinge 1100 when the hinge is in the open position such that the weather strip 1180 and internal portions of the hinge 1100 are visible. The second leaf 1210 may include a locking assembly, e.g., locking assembly 300 (FIG. 7), that is configured to extend and retract a shoot bolt assembly 340 as detailed above.

Figure 28:
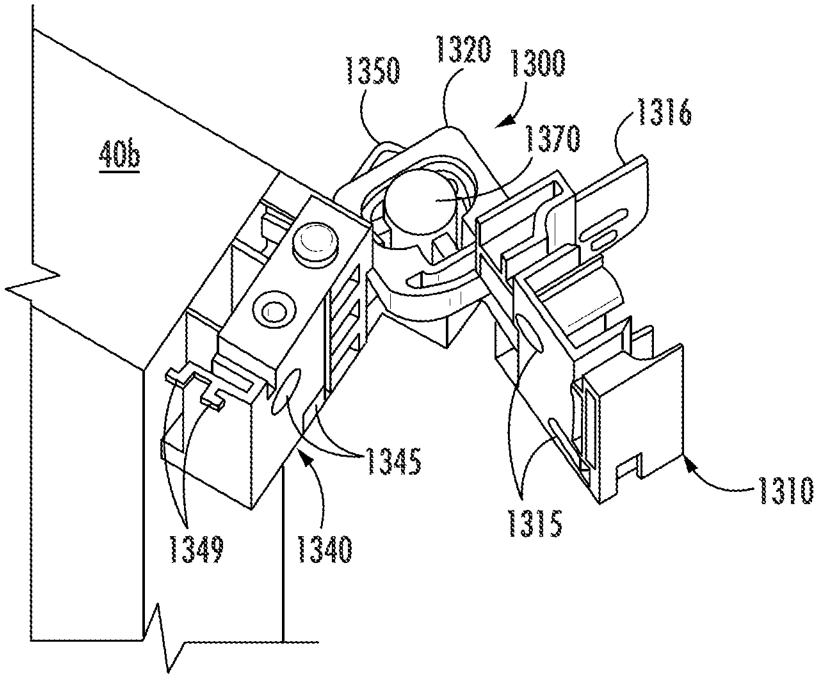
FIG. 28 is a perspective view of a top pivot assembly of the locking hinge of FIG. 25.
Figure 29:
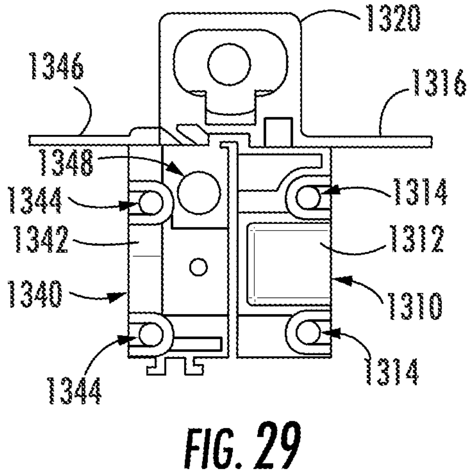
FIG. 29 is a top view of first and second sides of the top pivot assembly of FIG. 28.
Figure 30:
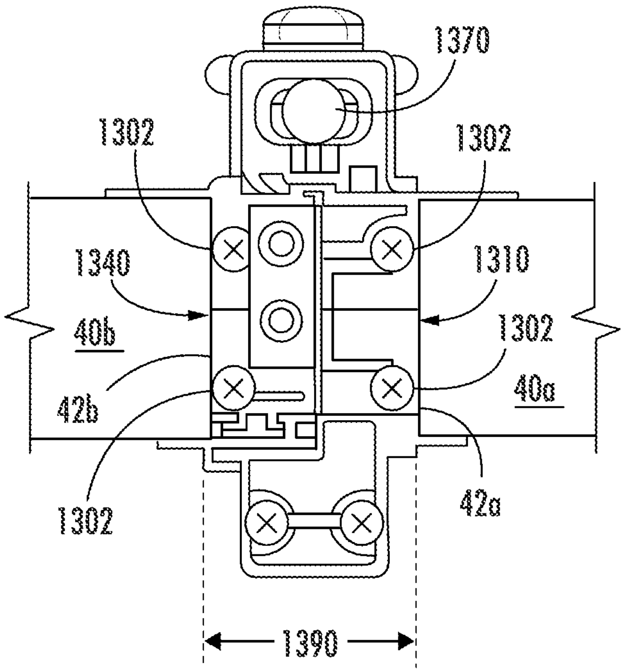
FIG. 30 is a top view of the of the locking hinge of FIG. 25 with a cover removed.

Referring to FIGS. 28-30, the top pivot assembly 1300 includes a first side 1310 and a second side 1340. The first side 1310 includes a mounting portion 1312 and a first pivot mount 1320 and the second side 1340 includes a mounting portion 1342 and a second pivot mount 1350. The mounting portions 1312, 1342 are attached to a respective one of the first and second leaves 1110, 1210 (FIG. 25) and are positioned substantially between the panels 40*a*, 40*b* when the hinge 1100 is in the closed position. Specifically, fasteners 1302 (FIG. 30) extend through fastener openings 1314, 1344 of a respective one of the first and second sides 1310, 1340 and into a respective one of the hinge mount receivers 1144, 1244 of the first or second leaves 1110, 1210. Additionally or alternatively, the mounting portions 1312, 1342 may be secured directly to a respective one of the panels 40*a*, 40*b* by a fastener (not shown) passing through a fastener opening 1315, 1345 into a respective one of the panels 40*a*, 40*b*. The mounting portions 1312, 1342 may also include alignment tabs 1316, 1346 that extend along an interior or exterior face of a respective panel 40*a*, 40*b* to position the respective first or second side 1310, 1340 relative to the panel 40*a*, 40*b*. The alignment tabs 1316, 1346 may define a fastener opening that receives a fastener that passes through the alignment tab 1316, 1346 and into one of the panels 40*a*, 40*b* to secure the first or second side 1310, 1340 to the panel 40*a*, 40*b*.

Figure 34:
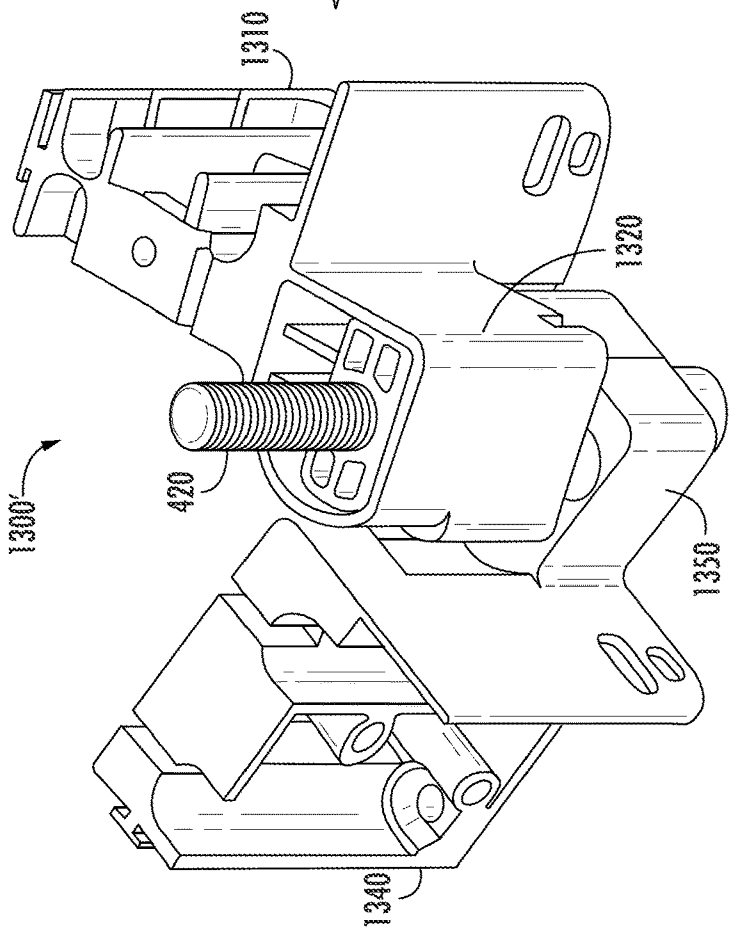
FIG. 34 is a perspective view of an example top pivot assembly of a sliding hinge provided in accordance with the present disclosure.

The pivot mounts 1320, 1350 extend from the respective mounting portion 1312, 1342 and are positioned on the interior or exterior side of the panels 40*a*, 40*b* when the hinge 1100 is in the closed position depending on a direction that the hinge 1100 pivots from the closed position towards the open position. As shown, the pivot mounts 1320, 1350 extend towards the interior side of the panels 40*a*, 40*b* as the hinge 1100 is a locking hinge and moves external of the frame when moved from the closed position towards the open position. Alternatively, the pivot mounts 1320, 1350 may extend towards the exterior side of the panels 40*a*, 40*b* when the hinge 1100 is a sliding hinge and remains within the frame as the hinge moves from the closed position towards the open position as shown in FIGS. 34 and 35.

Figure 32:
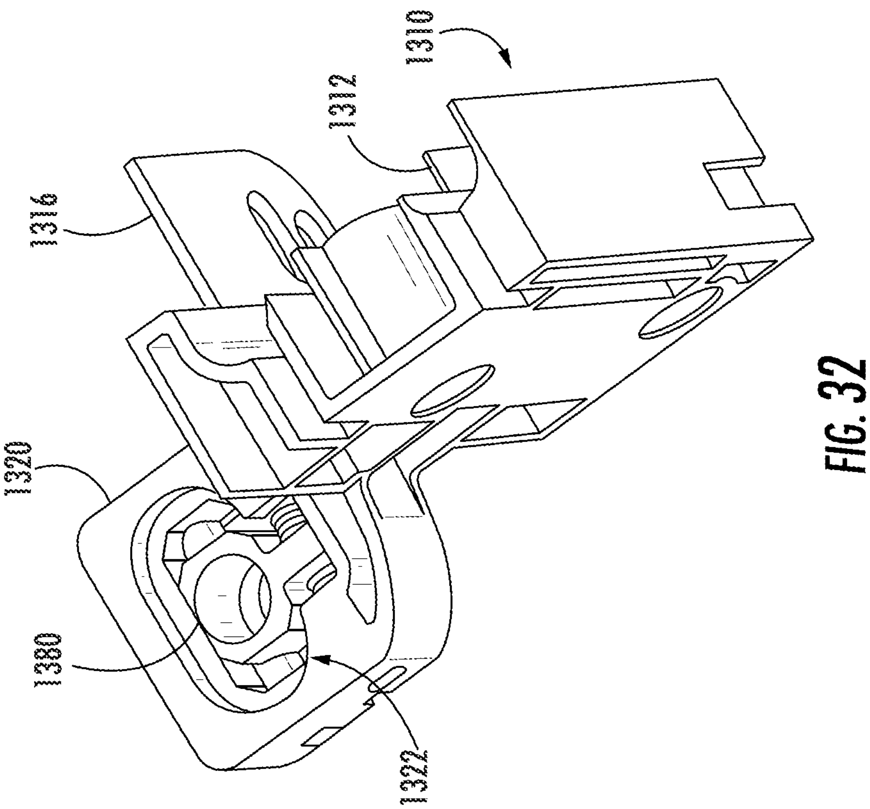
FIG. 32 is a perspective view of the first side of the top pivot assembly of FIG. 28.
Figure 31:
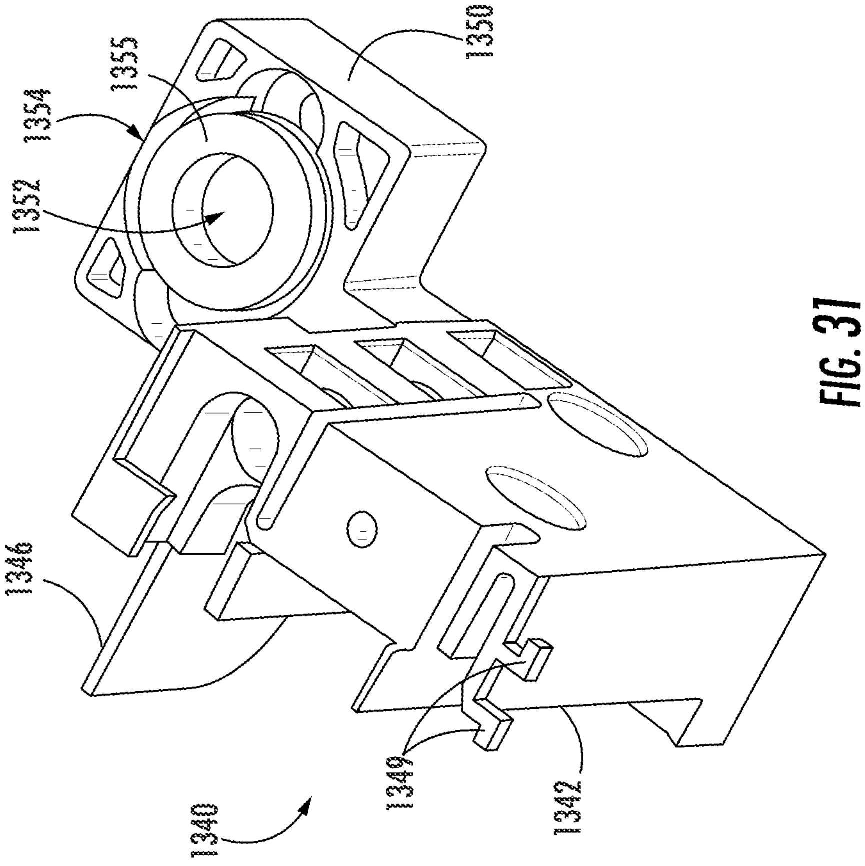
FIG. 31 is a perspective view of the second side of the top pivot assembly of FIG. 28.

With additional reference to FIGS. 31 and 32, the pivot mounts 1320, 1350 receive a pivot pin 1370 (FIG. 30) that pivotably connects the first and second sides 1310, 1340 of the top pivot assembly 1300 to one another about a pivot axis that extends along a longitudinal axis of the pivot pin 1370. The pivot mount 1350 of the second side 1340 defines a pin opening 1352 and a bearing recess 1354. The pin opening 1352 may pass entirely through the pivot mount 1350 and be sized and dimensioned to receive a shaft of the pivot pin 1370. The bearing recess 1354 is coaxially aligned with the pin opening 1352 and is dimensioned to receive a bearing 1355, e.g., a thrust bearing. The bearing 1355 is sized to compliment the pivot pin 1370 such that the second side 1340 rotates about the pivot axis defined by the pivot pin 1370. The pivot mount 1320 of the first side 1310 is disposed over, or on top of, the pivot mount 1350 of the second side 1340. The pivot mount 1320 defines an adjustment opening 1322 that is sized and dimensioned to receive a gap adjustment mechanism 1380 and the pivot pin 1370 therein.

Figure 33:
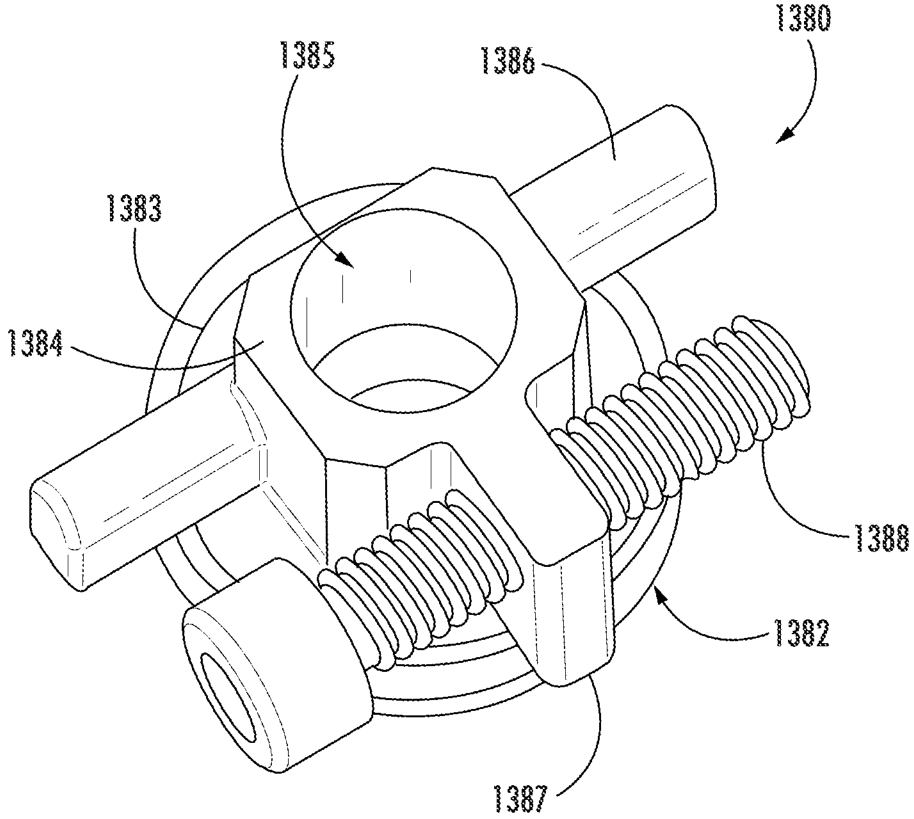
FIG. 33 is a perspective view of a gap adjustment mechanism of the top pivot assembly of FIG. 28 provided in accordance with the present disclosure.

Referring to FIG. 33, the gap adjustment mechanism 1380 includes a body 1382, a fixed pin 1386, and an adjustment screw 1388. The gap adjustment mechanism adjusts a gap 1390 (FIG. 30) between the panels 40*a*, 40*b* when the hinge 1100 is in the closed position. The gap 1390 is defined as a distance between the side edges 42*a*, 42*b* of the panels 40*a*, 40*b*. As the mounting portions 1312, 1342 of the first and second sides 1310, 1340 in the closed position of the hinge 1100 are disposed within the gap 1390, the gap 1390 can be defined as a thickness of the mounting portions 1312, 1342. The body 1382 includes a disk 1383 and a collar 1384. The disk 1383 and the collar 1384 cooperate to define a pin opening 1385 that passes through the body and is sized and dimensioned to cooperate with the pivot pin 1370 such that the first side 1310 rotates about the pivot axis defined by the pivot pin 1370. The fixed pin 1386 extends in a direction orthogonal to the pivot axis passing through the body 1382 and in a direction parallel to the thickness of the mounting portion 1312 of the first side 1310. The fixed pin 1386 is received within the adjustment opening 1322 to rotatably fix the body 1382 relative to the pivot mount 1320. The collar 1384 includes a screw tab 1387 that extends in a direction perpendicular to the longitudinal axis of the fixed pin 1386. The screw tab 1387 includes a threaded hole that receives the adjustment screw 1388 therethrough. The adjustment screw 1388 engages the mounting portion 1312 to adjust a position of the adjustment assembly 1380 within the adjustment opening 1322 such that the position of the first side 1310 relative to the second side [1312] 1340 is adjusted to adjust a size of the gap 1390. The head of the adjustment screw 1388 may be accessible when the hinge 1100 is installed to allow for adjustment after installation. The adjustment mechanism 1322 allows for a fine adjustment of the gap 1390 between the panels 40*a*, 40*b*. In addition, the adjustment mechanism 1322 may allow for a plumb adjustment of one of the panels 40*a*, 40*b*.

As shown, the first side 1310 includes the adjustment mechanism 1380; however, the adjustment mechanism 1380 may be housed in the second side 1340. Also as shown, the pivot mount 1320 of the first side 1310 is disposed over or on top of the pivot mount 1350 of the second side 1340; however, this may be reversed with the pivot mount 1350 of the second side 1340 being disposed over or on top of the pivot mount 1320 of the first side 1310. In some embodiments, the pivot mounts 1320, 1350 of the first and second sides 1310, 1340 each include a bearing without an adjustment mechanism and in other embodiments, both of the pivot mounts 1320, 1350 include an adjustment mechanism.

Referring briefly back to FIG. 25, the second side 1340 may include a shoot bolt guide plate 1360 that is secured to the top of the mounting portion 1342 thereof. The shoot bolt guide plate 1360 includes a bolt opening 1362 that is defined therethrough. The bolt opening 1362 is sized and dimensioned to allow a shoot bolt 390 to pass therethrough to guide the shoot bolt 390 into the frame 20. The shoot bolt guide plate 1360 may be secured to the mounting portion 1342 by one or more fasteners.

The hinge 1100 may include a first hinge cap 1170, a pivot cap 1180, and a second hinge cap 1270. The first hinge cap 1170 is disposed on the top end of the first leaf 1110 between the first leaf 1110 and the first side 1310 of the top pivot assembly 1300. The first hinge cap 1170 may follow the external shape of the extrusion of the first leaf 1110 such that when the first hinge cap 1170 is secured to the first leaf 1110 there are no incongruities between the first leaf 1110 and the first hinge cap 1170. The first hinge cap 1170 may be secured to the first leaf 1110 by the fasteners 1302 (FIG. 30) passing therethrough and sandwiching the first hinge cap 1170 between the first leaf 1110 and the first side 1310 of the top pivot assembly 1300. The first hinge cap 1170 may also be secured to the first leaf 1110 by fasteners passing through first hinge cap 1170 and received in the cover mount receivers 1154 of the shell 1150. The first hinge cap 1170 may substantially seal a top of the first leaf 1110 to prevent ingress of foreign material and/or water from the first leaf 1110. The first hinge cap 1170 may improve the aesthetics of the hinge 1100 by covering a portion of the pivot assembly 1300.

The pivot cap 1180 is disposed over or on top of the pivot mount 1320 of the first side 1310 of the top pivot assembly 1300 to cover the pivot mount 1320. The pivot cap 1180 may snap over the pivot mount 1320 to secure the pivot cap 1180 to the pivot mount 1320. The pivot cap 1180 may retain the pivot pin 1370 within the pivot mounts 1320, 1350. Similar to the first hinge cap 1170, the pivot cap 1180 may substantially seal a top of the pivot mount 1320 to prevent ingress of particulates and/or moisture into the pivot assembly. The pivot cap 1180 may improve the aesthetics of the hinge 1100 by configured a portion of the pivot assembly 1300.

The second hinge cap 1270 is disposed on the top end of the second leaf 1210 between the second leaf 1210 and the second side 1340 of the top pivot assembly 1300. The second hinge cap 1270 may follow the external shape of the extrusion of the second leaf 1210 such that when the second hinge cap 1270 is secured to the second leaf 1210 there are no incongruities between the second leaf 1210 and the second hinge cap 1270. The second hinge cap 1270 may be secured to the second leaf 1210 by the fasteners 1302 (FIG. 30) passing therethrough and sandwiching the second hinge cap 1270 between the second leaf 1210 and the second side 1340 of the top pivot assembly 1300. The second hinge cap 1270 may define a groove 1272 that receives fingers 1349 of the second side 1340 of the pivot assembly 1300 to secure the second hinge cap 1270 to the second side 1340. The second hinge cap 1270 may substantially seal a top of the second leaf 1210 to prevent ingress of foreign material and/or water from the second leaf 1210. The second hinge cap 1270 may improve the aesthetics of the hinge 1100 by covering a portion of the pivot assembly 1300.

With reference to FIGS. 34 and 35, a top pivot assembly 1300' and a bottom pivot assembly 1400' of a sliding hinge are shown. The top pivot assembly 1300' and the bottom pivot assembly 1400' are similar to the top pivot assembly 1300 detailed above with the exception of replacing the hinge pin 1370 with a pivot shaft 420 that secures to an upper roller assembly 400 (FIG. 17) with respect to the top pivot assembly 1300' or a lower roller assembly 450 (FIG. 18) with respect to the bottom pivot assembly 1400'.

Figure 36:
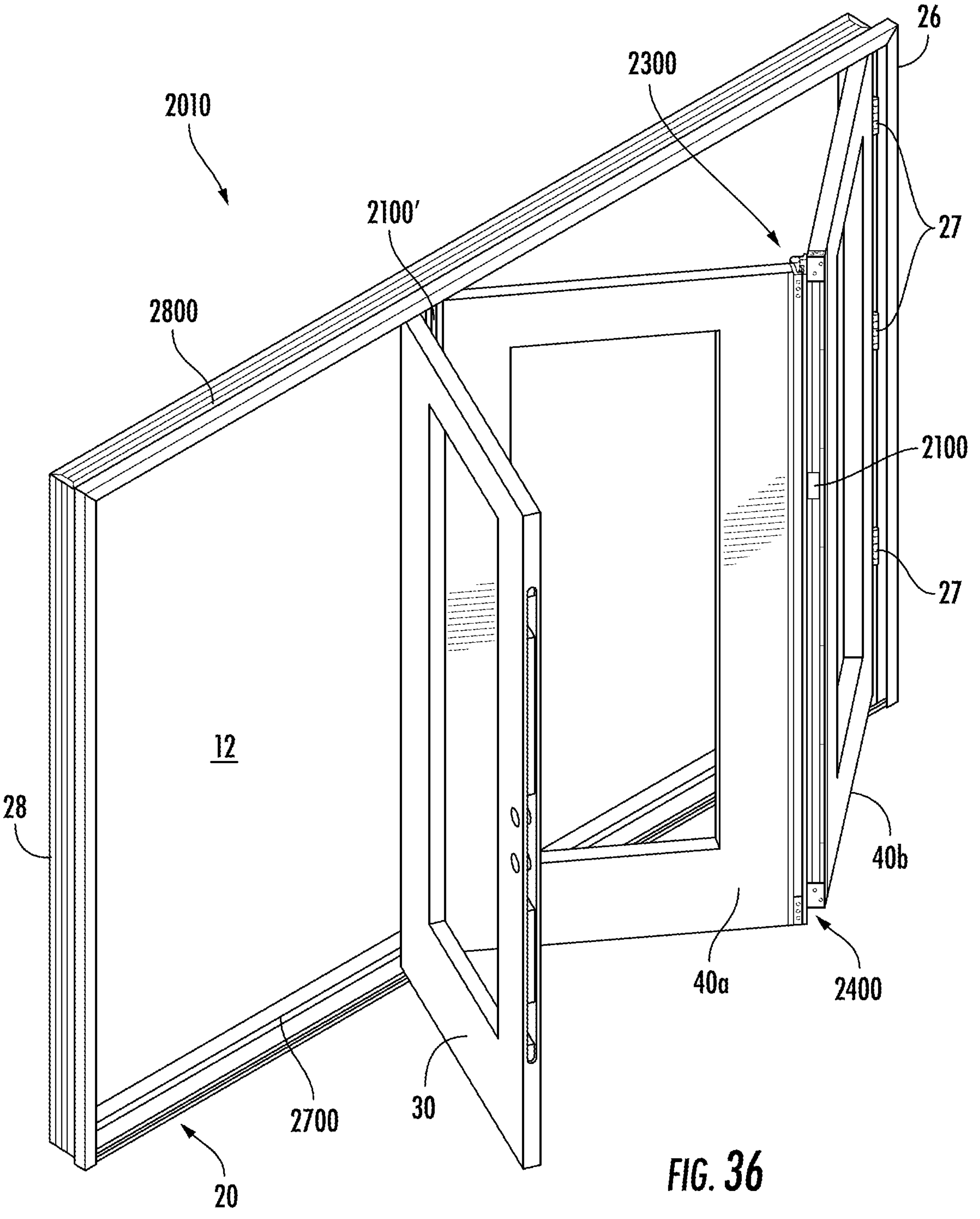
FIG. 36 is a perspective view of another door panel system provided in accordance with the present disclosure in an open position.
Figure 37:
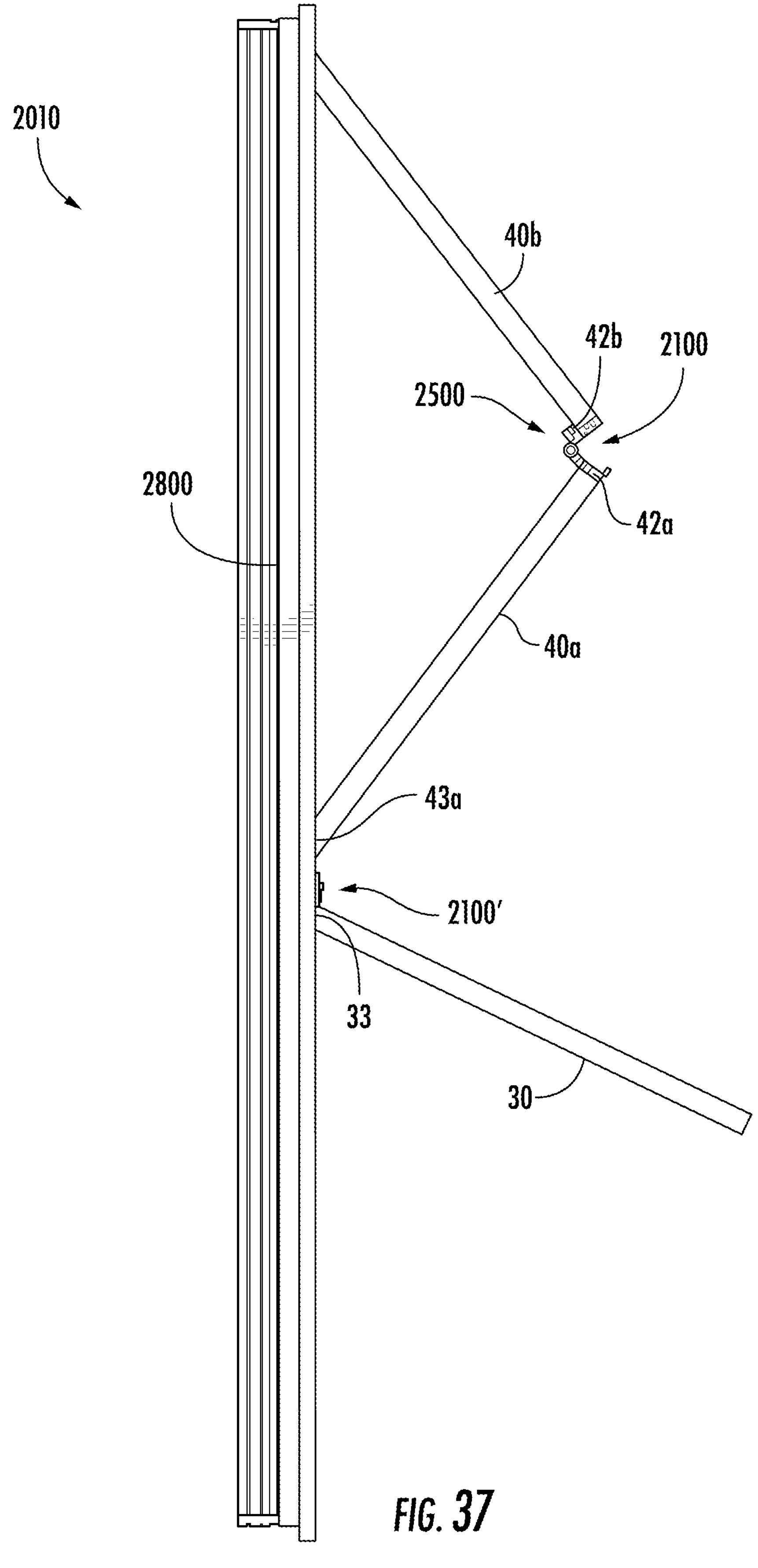
FIG. 37 is a top view of the door panel system of FIG. 36.

Referring now to FIGS. 36 and 37, a door panel system 2010 is provided in accordance with embodiments of the present disclosure. The door panel system 2010 is installed within a frame 20, that defines an opening 12. The door panel system 2010 may include an operating panel 30 and secondary panels 40*a*, 40*b* (collectively "door panels 30, 40*a*, 40*b*") secured to each other by continuous hinges 2100, 2100'. The continuous hinges 2100, 2100' attach the door panels 30, 40*a*, 40*b* to the frame 20 and facilitate movement between fully open and closed positions thereof. As described above, the door panels 30, 40*a*, 40*b* may be standard door panels for use as hinged door panels that do not require additional machining for compatibility with the door panel system 2010. The door panel system 2010 may function in a manner similar to door panel system 10 detailed above albeit with different components as detailed below. For example, the operating panel 30 may function as a standard hinged door with the secondary panels 40*a*, 40*b* fixed in the closed position thereof. In certain embodiments, the door panel system 10 may have five, seven, nine, or eleven door panels. In particular embodiments, the door panel system 10 may have more than eleven door panels. In some embodiments, the door panel system 10 may include only secondary panels. When the door panel system 10 includes only secondary panels an operating panel is not included.

Figure 38:
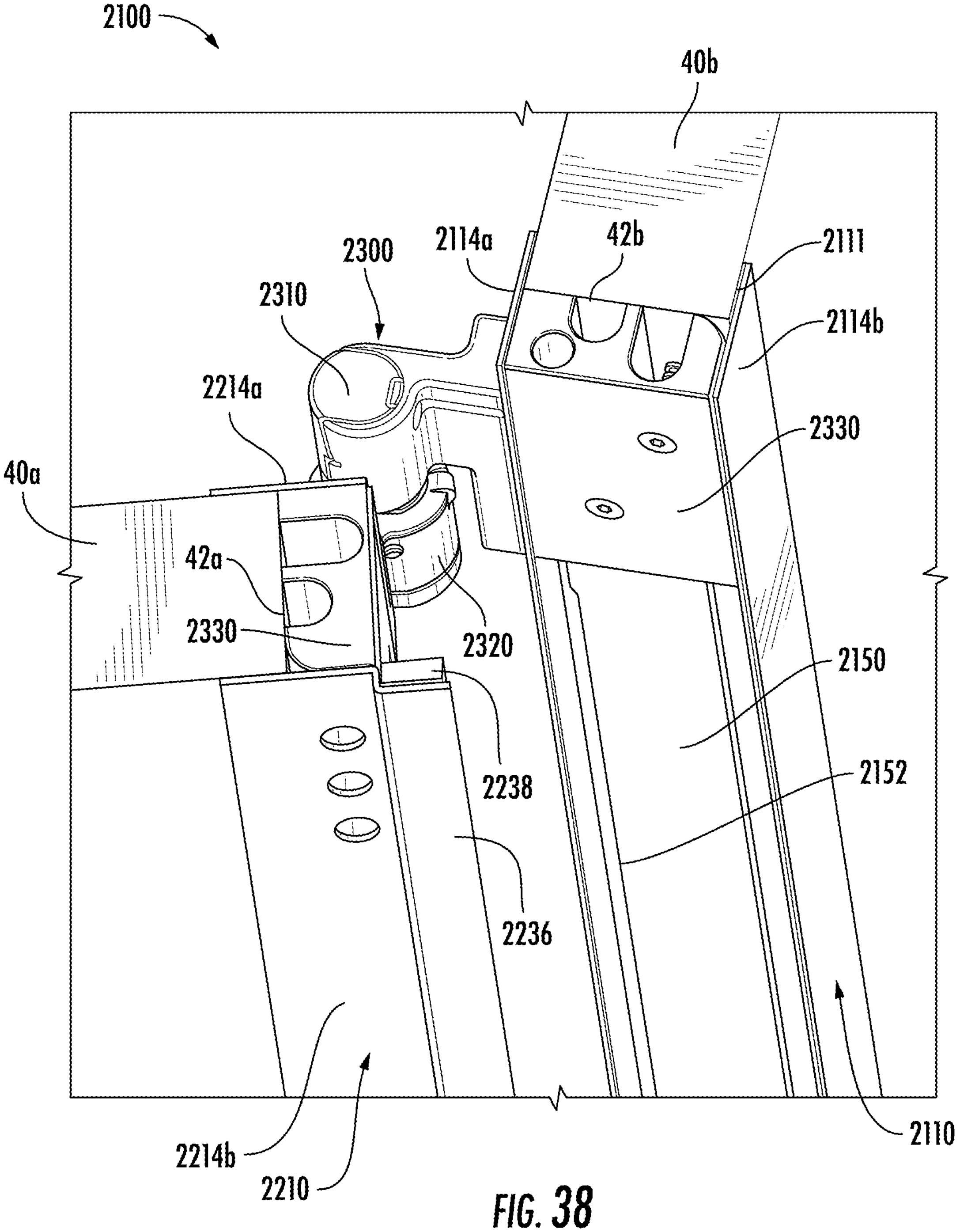
FIG. 38 is an enlarged perspective view of a portion of the door panel system of FIG. 36 illustrating a continuous hinge having a first leaf, a second leaf, an upper pivot assembly, and a trim.

With additional reference to FIG. 38, the continuous hinge 2100 includes a first leaf 2110, a second leaf 2210, an upper pivot assembly 2300, and a lower pivot assembly 2400 (FIG. 36). The first leaf 2110 is attached to an edge 42*b* of the secondary panel 40*b* and the second leaf 2210 is attached to an edge 42*a* of the secondary panel 40*a*. The first leaf 2110 and the second leaf 2210 attach to and extend along a majority of a respective edge 42*a*, 42*b* such that the first leaf 2110 and the second leaf 2210 have a length similar to a height of the respective door panel 30, 40*a*, 40*b*. For example, the first leaf 2110 may have an uppermost end 2111 adjacent a top surface of the secondary panel 40*b* and a lowermost end 2113 (FIG. 57) adjacent a bottom end of the secondary door panel 40*a*. The second leaf 2210 is similar to the first leaf 2110 with like elements represented with a similar label with only the second leading number changed from that of the similar element of the first leaf 2110, e.g., 2110 referring to the first leaf and 2210 the second leaf. As such, the first leaf 2110 will be described in detail with only differences of the second leaf 2210 detailed herein for reasons of brevity.

Figure 39:
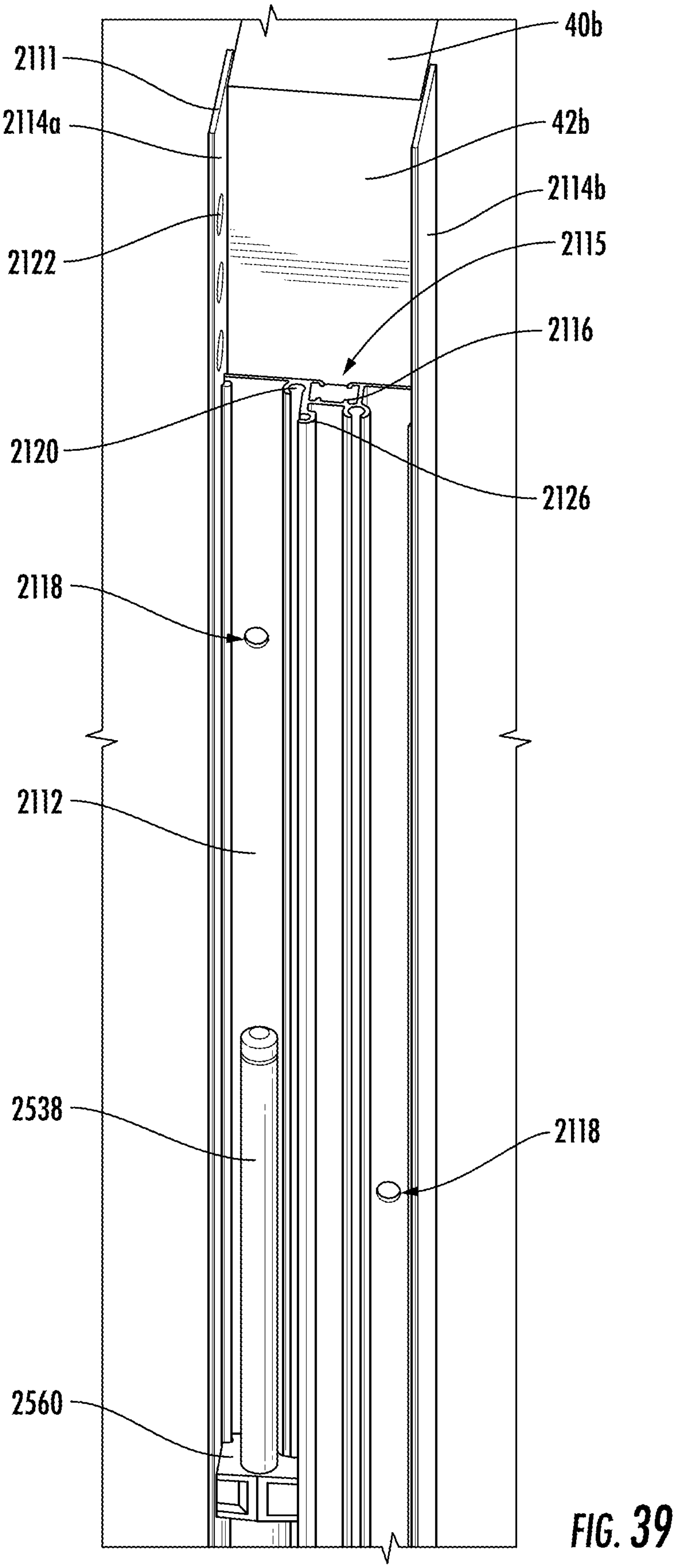
FIG. 39 is a perspective view of a portion of the first leaf of FIG. 38 with the trim removed.
Figure 40:
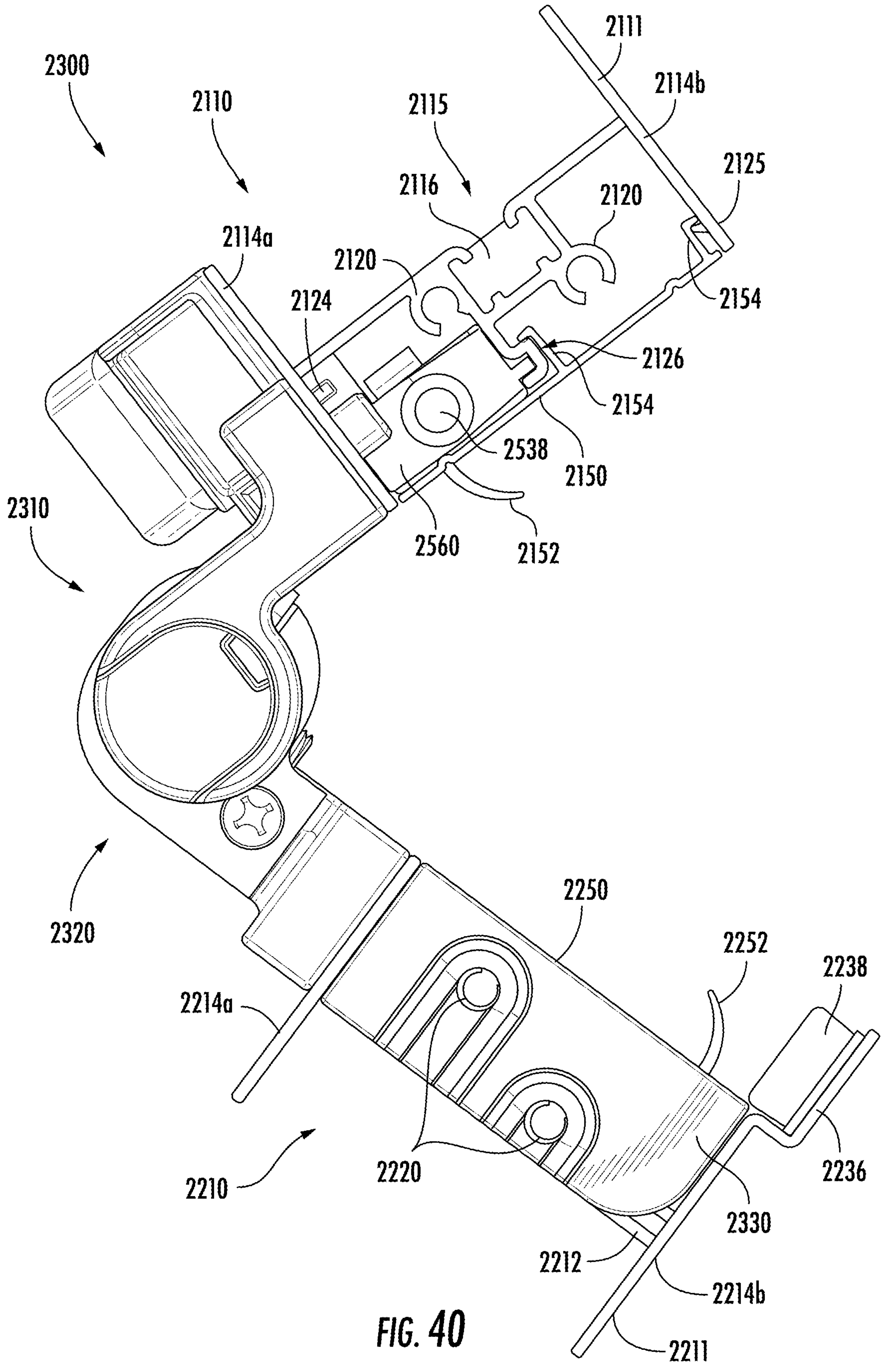
FIG. 40 is a top view of the continuous hinge of FIG. 38.

Referring now to FIGS. 39 and 40, the first leaf 2110 includes an edge plate 2112 and a shell 2114. The edge plate 2112 attaches the first leaf 2110 to the edge 42*b* of the secondary panel 40*b*. The shell 2114 includes a first or inside member 2114*a* and a second or outside member 2114*b* on opposite sides of the edge plate 2112. The edge plate 2112 extends between the two shell members 2114*a*, 2114*b* such that the shell 2114 and the edge plate 2112 have a substantially "I" or an "H" shape. The shell 2114 may have a length greater than the length of the edge plate 2112 such that a portion of the edge 42*b* is exposed, e.g., the edge plate 2112 may not cover a portion of the edge 42*b*. The edge plate 2112 attaches to the edge 42*b* with the shell members 2114*a*, 2114*b* engaged with an inside surface and an outside surface of the secondary panel 40*b*, respectively.

The edge plate 2112 may be a continuous member extending between the shell members 2114*a*, 2114*b* or may be formed of two or more members that extend between the shell members 2114*a*, 2114*b*. In some embodiments, the edge plate 2112 forms a cavity 2115 that receives an insulative member 2116 disposed therein. The insulative member 2116 may form a thermal break between two sides of the edge plate 2112. The insulative member 2116 may prevent or reduce heat transfer across the first leaf 2110 when there is a temperature differential across the door panel system 2010. For example, when the door panel system 2010 is installed in the frame 20 as an exterior door system there may be a temperature differential across the door panel system 2010 from an exterior side of the door panel system 2010 to an interior side of the door panel system 2010. The edge plate 2112 and the shell 2114 may be formed as unitary or monolithic structures. For example, the edge plate 2112 and the shell members may be an extrusion that is cut to length. In some embodiments, half the edge plate 2112 may be extruded with one shell member and the other half of the edge plate 2112 may be extruded with the other shell member and the halves may be joined together with the insulative member 2116. In particular embodiments, the edge plate 2112 and the shell 2114 may be formed from an extrusion with the edge plate 2112 cut in half and then rejoined with the insulative member.

The edge plate 2112 may have a plurality of holes 2118 longitudinally and laterally spaced from one another that receive fasteners therethrough to attach the first leaf 2110 to the edge 42*b* of the secondary panel 40*b*. Additionally or alternatively, the edge plate 2112 may be adhered or bonded to the edge 42*b*. The shell members 2114*a*, 2114*b* may include a sealing material and/or an adhesive material on a surface engaged with the inside surface or the outside surface of the secondary panel 40*b* to secure the respective shell member 2114*a*, 2114*b* to or to form a seal between the respective shell member 2114*a*, 2114*b* and the secondary panel 40*b*.

The edge plate 2112 has two knuckle anchor attachments 2120 that receive a fastener to attach a pivot anchor 2330 to the first leaf 2110. The knuckle anchor attachments 2120 may be connected directly to the edge plate 2112 or may be connected by a member offset from the edge plate 2112. The inside shell member 2114*a* may include holes 2122 defined therethrough adjacent the uppermost end 2111 and/or the lowermost end 2113, for the alignment and attachment of the pivot assemblies 2300, 2400 to the first leaf 2110.

The first leaf 2110 may have a rib 2124, a snap ridge 2125, and an attachment member 2126 protruding from the shell members 2114*a*, 2114*b* and the edge plate 2112. The rib 2124 and the attachment member 2126 provide attachment points for at least one shoot bolt guide 2560 and a trim 2150. The trim 2150 includes flexible snaps or pawl members 2154 that engage the snap ridge 2125 and the attachment member 2126 to secure the trim 2150 to the first leaf 2110. Additionally or alternatively, the trim 2150 may attach to the continuous hinge 2100 by fasteners, adhesives, or magnets. The trim 2150 may also include a flexible weather stripping 2152 to contact the trim 2250 of the second leaf 2210 forming a seal between the first leaf 2110 and the second leaf 2210.

With particular reference to FIG. 40, the outside member 2214*b* of the second leaf 2210 includes an offset portion 2236 that, in the fully closed position, overlaps with outside member 2114*b* of the first leaf 2110 to engage the outside member 2114*b* of the first leaf 2110 to create a weatherproof seal therewith. The offset portion 2236 may be a single piece of material or may be formed of multiple pieces of material. In some embodiments, the outside member 2114*b* of the first leaf 2110 may include an offset portion. In certain embodiments where a pivot assembly extends from the outside members, e.g., continuous hinge 2100', one of the inside members may include an offset portion.

Figure 41:
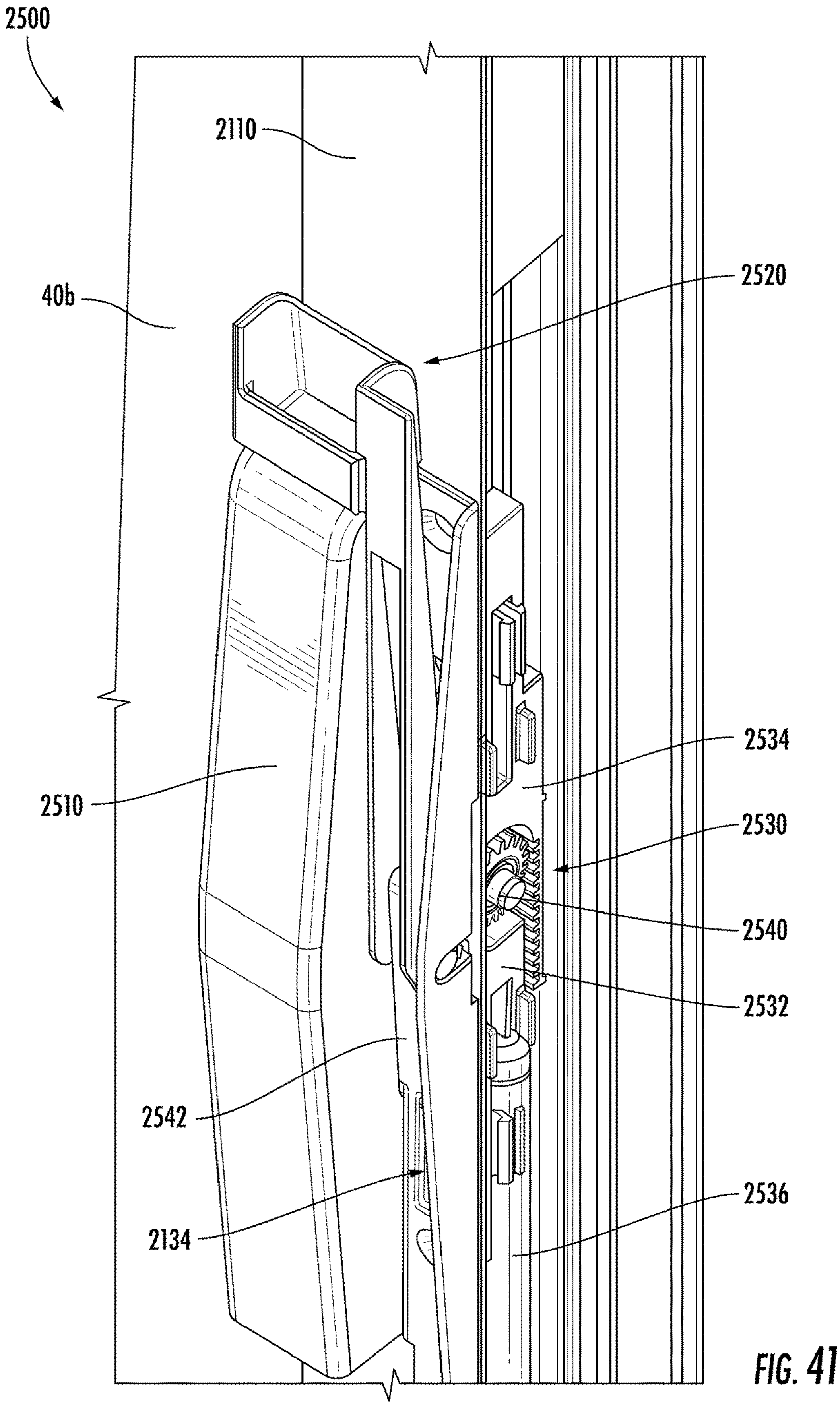
FIG. 41 is a right perspective view of a portion of the continuous hinge of FIG. 36 illustrating a handle assembly and a shoot bolt assembly of the continuous hinge with the handle in an unlocked state.
Figure 42:
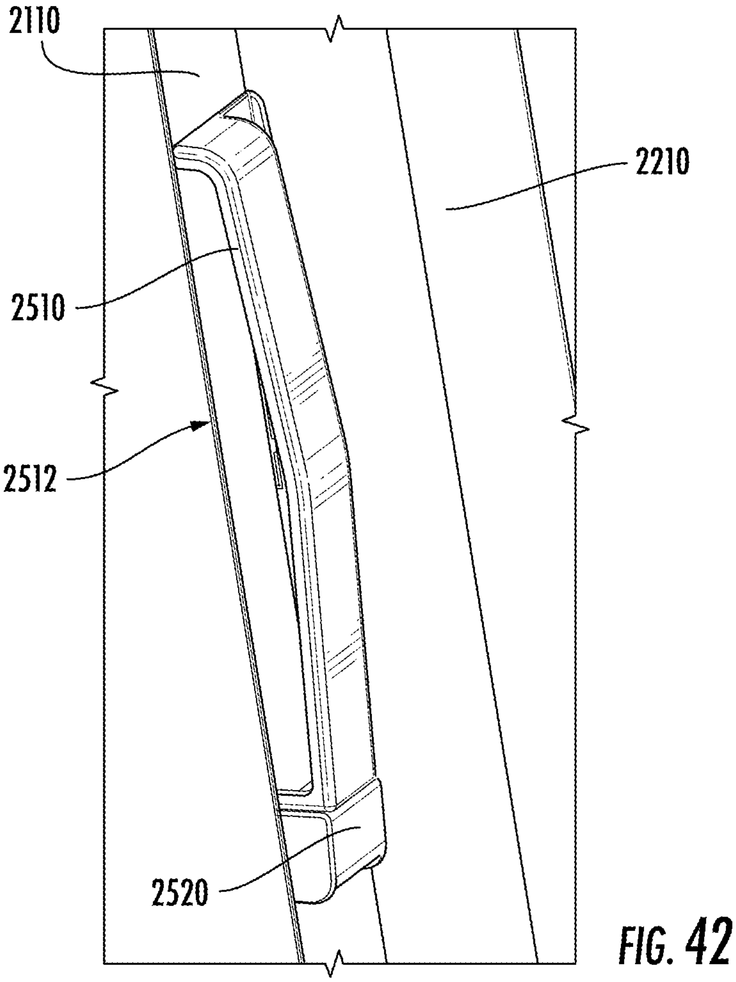
FIG. 42 is a left perspective view of the handle of FIG. 41 in a locked state.

Referring to FIGS. 41 and 42, a handle assembly 2500 for transitioning the door panel system 2010 between its open and closed positions and a panel locking mechanism between its locked and unlocked configurations is disclosed in accordance with the present disclosure. The panel locking mechanism may be a shoot bolt assembly 2530. The handle assembly 2500 includes a handle 2510 and a pivotable lever 2520. The handle 2510 may attach directly to an interior side of the secondary panel 40*b* or may attach to the first leaf 2110 as part of the continuous hinge 2100, 2100'. The handle 2510 may define a finger well 2512 between the handle 2510 and the first leaf 2110 or between the handle 2510 and the secondary panel 40*b*. The finger well 2512 may allow a user to pull the handle 2510 towards the user to move the secondary panels 40*a*, 40*b* toward the closed position or to push the handle 2510 away from the user to move the secondary panels 40*a*, 40*b* towards the open position.

Figure 43:
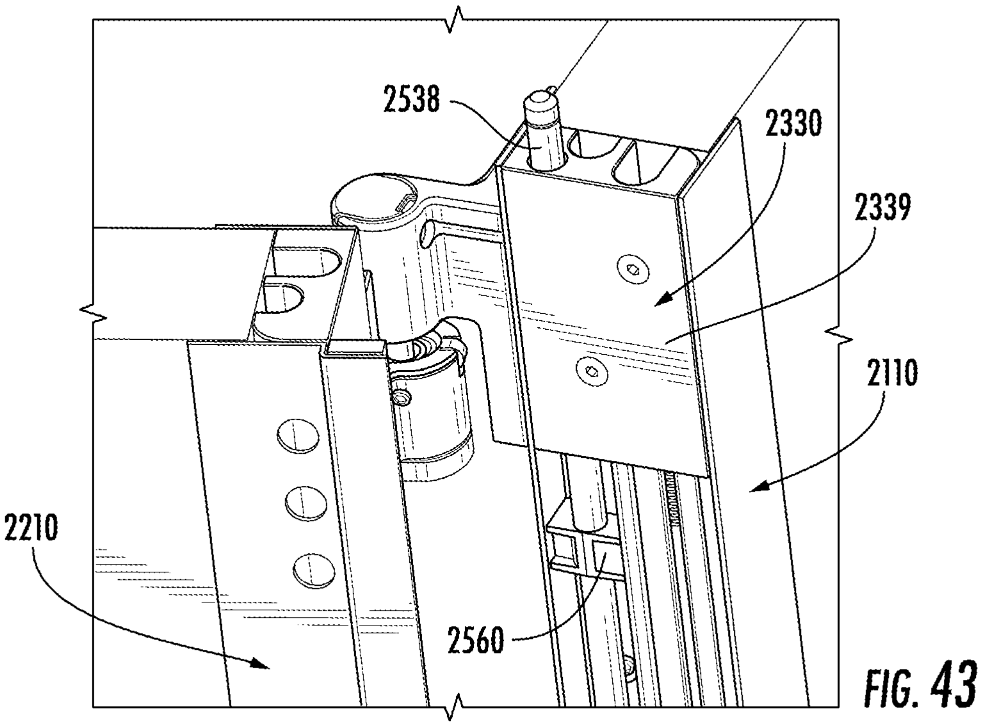
FIG. 43 is a perspective view of the portion of the door panel system of FIG. 38 with the top shoot bolt in a locked configuration and the trim removed.

With additional reference to FIG. 43, the lever 2520 connects to the shoot bolt assembly 2530 to actuate a shoot bolt 2538 of the shoot bolt assembly 2530. The inside shell member 2114*a* of the first leaf 2110 may define a lock pivot slot 2134 that allows the lever 2520 to connect with the shoot bolt assembly 2530 through the first leaf 2110. The lever 2520 may pivot between an unlocked state (FIG. 41) that corresponds to a locked configuration of the shoot bolts 2536, 2538 and a locked state (FIG. 42) that corresponds to an unlocked configuration of the shoot bolts 2538. The shoot bolt guides 2560 attach to the rib 2124 and the attachment member 2126 to retain and guide the shoot bolts 2536, 2538 within the first leaf 2110 as the shoot bolts 2536, 2538 translate between their locked and unlocked configurations. In the locked configuration, the shoot bolts 2536, 2538 extend from the top and bottom edge of the door panel system 2010 (FIG. 43). In the unlocked configuration, the shoot bolts 2536, 2538 are retracted within the door panel system 2010 such that tips of the shoot bolts 2536, 2538 are within the extremities of the first leaf 2110 (FIG. 38). In some embodiments the shoot bolts 2536, 2538 extend into the upper track 2800 and the support channel 2712 to prevent the door panel system 10 from unintentionally moving towards the open position. In certain embodiments, the shoot bolts 2536, 2538 may extend through the upper track 2800 and the bottom sill 2700 or sill extension 2710 into a hole that prevents the shoot bolts 2536, 2538 from moving within the upper track 2800 or the support channel 2712 to secure the door panel system 10 in the closed position. In other embodiments, the panel locking mechanism may include a locking mechanism to be used with or in the place of the shoot bolts 2536, 2538. In some embodiments, the panel locking system may at least partially be installed within the frame 20.

With particular reference to FIG. 41, the shoot bolt assembly 2530 includes a bottom shoot bolt rack 2532, a top shoot bolt rack 2534, and a rack gear 2540. The shoot bolt assembly 2530 simultaneously transitions the shoot bolts 2536, 2538 between the locked and unlocked configurations as the lever 2520 pivots between the locked and unlocked states. The lever 2520 attaches to the bottom shoot bolt rack 2532 such that pivoting the lever 2520 from the unlocked state to the locked state translates the bottom shoot bolt rack 2532 downward such that the shoot bolt 2536 translates toward the locked configuration. The rack gear 2540 is positioned between and is meshingly engaged with both the bottom shoot bolt rack 2532 and the top shoot bolt rack 2534 such that the rack gear 2540 rotates in response to translation of the bottom shoot bolt rack 2532 such that as the rack gear 2540 rotates in response to the bottom shoot bolt rack 2532 translating downward to simultaneously translates the top shoot bolt rack 2534 upward into the locked configuration. Alternatively, the lever 2520 may attach to the top shoot bolt rack 2532 such that the lever 2520 directly translates the top shoot bolt rack 2532 which is meshingly engaged with the rack gear 2540 to simultaneously translate the bottom shoot bolt rack 2532 in the opposite direction. In some embodiments, the shoot bolt racks 2532, 2534 may back drive the pivot lever 2520. In certain embodiments, the shoot bolt assembly 2530 may include an anti-back drive mechanism to prevent the shoot bolt racks 2532, 2534 from back driving the pivot lever 2520.

Referring to FIGS. 43-50, the pivot assembly 2300 of the continuous hinge 2100 is described in accordance with embodiments of the present disclosure. As detailed above, the continuous hinge 2100 has an upper pivot assembly 2300 and a lower pivot assembly 2400. The pivot assemblies 2300, 2400 pivotally couple the door panels 30, 40*a*, 40*b* relative to one another. The upper and lower pivot assemblies 2300, 2400 each include a pair of pivot anchors 2330, a pin knuckle 2310, and a receiver knuckle 2320. For brevity, only the upper pivot assembly 2300 will be described in detail with like elements of the lower pivot assembly 2400 represented with a similar label with only the second leading number changed from the similar element of the upper pivot assembly 2300, e.g., 2310 referring to the upper pin knuckle of the upper pivot assembly 2300 and 2410 referring to the lower pin knuckle of the lower pivot assembly 2400.

Figure 44:
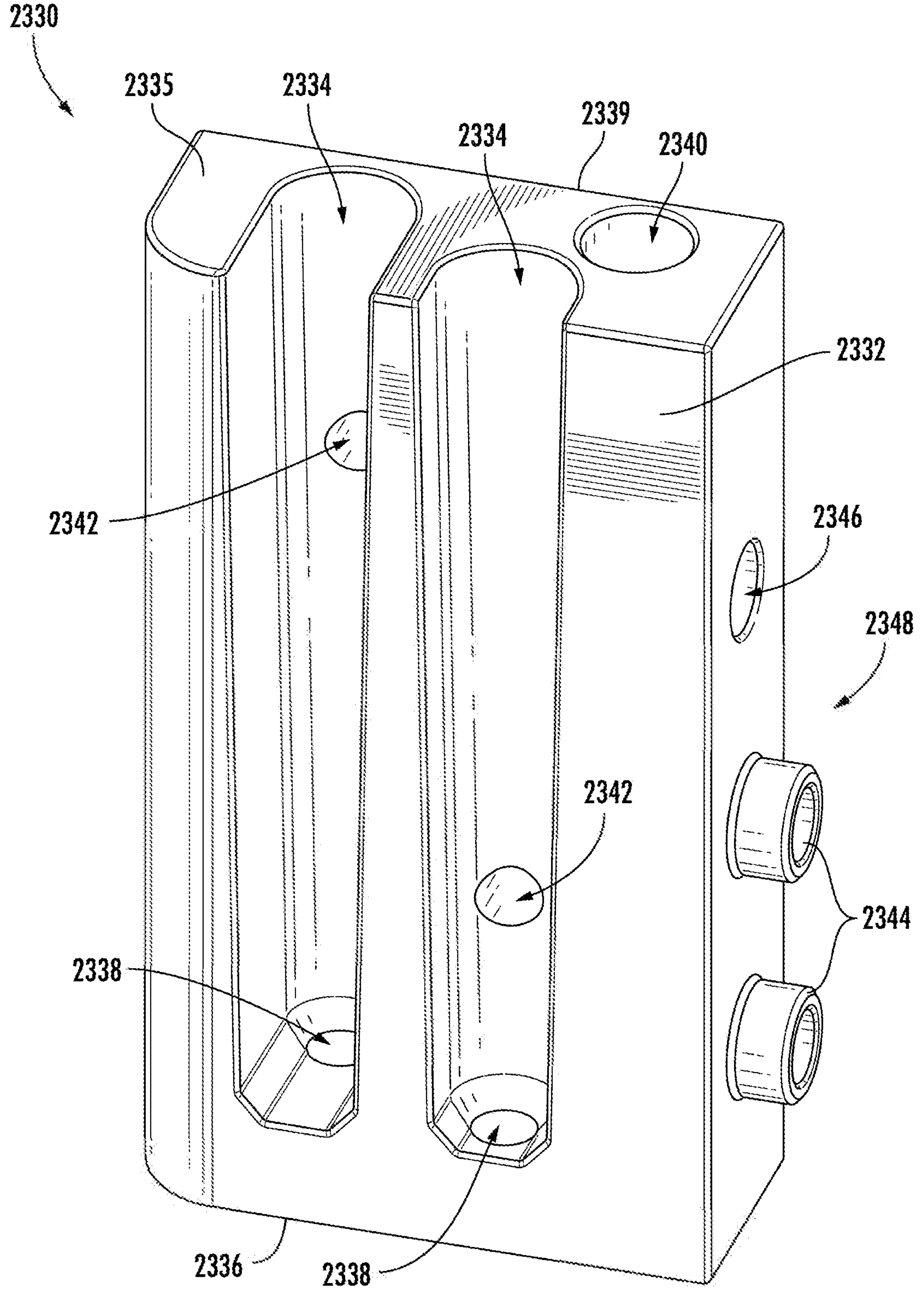
FIG. 44 is a perspective view of a pivot anchor of the upper pivot assembly of FIG. 38.

With particular reference to FIG. 44, the pivot anchors 2330 are described in accordance with embodiments of the present disclosure. The pivot assembly 2300 includes a first pivot anchor 2330 attached to the edge 42*b* between the shell members 2114*a*, 2114*b* of the first leaf 2110 to secure the pivot assembly 2300 to the secondary panel 40*b*. The other or second pivot anchor 2330 attaches to the edge 42*a* of the secondary panel 40*a* between the shell members 2214*a*, 2214*b* of the second leaf 2200 to secure the pivot assembly 2300 to the secondary panel 40*a*. The pivot anchors 2330 provide attachment points for the upper pivot assembly 2300 to pivotally couple the secondary panels 40*a*, 40*b* relative to one another. Individual pivot anchors 2330 may be modified or varied based on the position or rotation of the respective pivot anchor 2330 in the door panel system 2010. For example, a pivot anchor 2330 may define an optional shoot bolt hole 2340 to allow a shoot bolt to pass therethrough. In some embodiments, every pivot anchor 2330 may define a shoot bolt hole 2340 and include one or more plugs (not shown) that prevent ingress of water or air through the pivot anchor 2330 when a shoot bolt is not present.

The pivot anchor 2330 has a door panel attachment side 2332 and a fastener side 2339 (FIG. 43) opposite the door panel attachment side 2332. The door panel attachment side 2332 is in contact with the edge 42*b* of a secondary panel 40*b*. The pivot anchor 2330 has a leaf attachment side 2336 and a top side 2335 opposite the leaf attachment side 2336. The leaf attachment side 2336 defines leaf attachment holes 2338 such that the pivot anchor 2330 connects to the edge plate 2112 therethrough. The pivot anchor 2330 defines channels 2334 extending partially through the pivot anchor 2330 from the top side 2335 such that channels 2334 allow a tool to access fasteners coupling the pivot anchor 2330 through the leaf attachment holes 2338 in the leaf attachment side 2336 to the first leaf 2110. The pivot anchor 2330 has door panel attachment holes 2342 to fasten the pivot anchor 2330 directly to the edge 42*b* of the secondary panel 40*b*.

The pivot anchor 2330 has a pivot knuckle mounting side 2348 that includes one or more alignment studs 2344 and defines one or more alignment pockets 2346. The alignment studs 2344 protrude from the pivot knuckle mounting side 2348 and extend through the holes 2122 (FIG. 39) adjacent to the uppermost end 2111 of the inside shell member 2114*a* to secured and align the pivot anchor 2330 with the first leaf 2110. The alignment pocket 2346 aligns with the holes 2122 adjacent to the uppermost end 2111 of the inside shell member 2114*a*. The edge opposite the pivot knuckle mounting side 2348 of the pivot anchor 2330, may have a radius along the door panel attachment side 2332 to aid in assembly of the continuous hinge 2100. In order to accommodate a shoot bolt, e.g., shoot bolt 2536, 2538, the pivot anchor 2330 may include a shoot bolt hole 2340 defined therethrough to accommodate actuation of the shoot bolts between the locked and unlocked configurations as detailed above. The pin knuckle 2310 and a receiver knuckle 2320 of the pivot assembly 2300 are secured to a respective pivot anchor 2330 and leaf 2110, 2210 as shown in FIG. 43.

Figure 45:
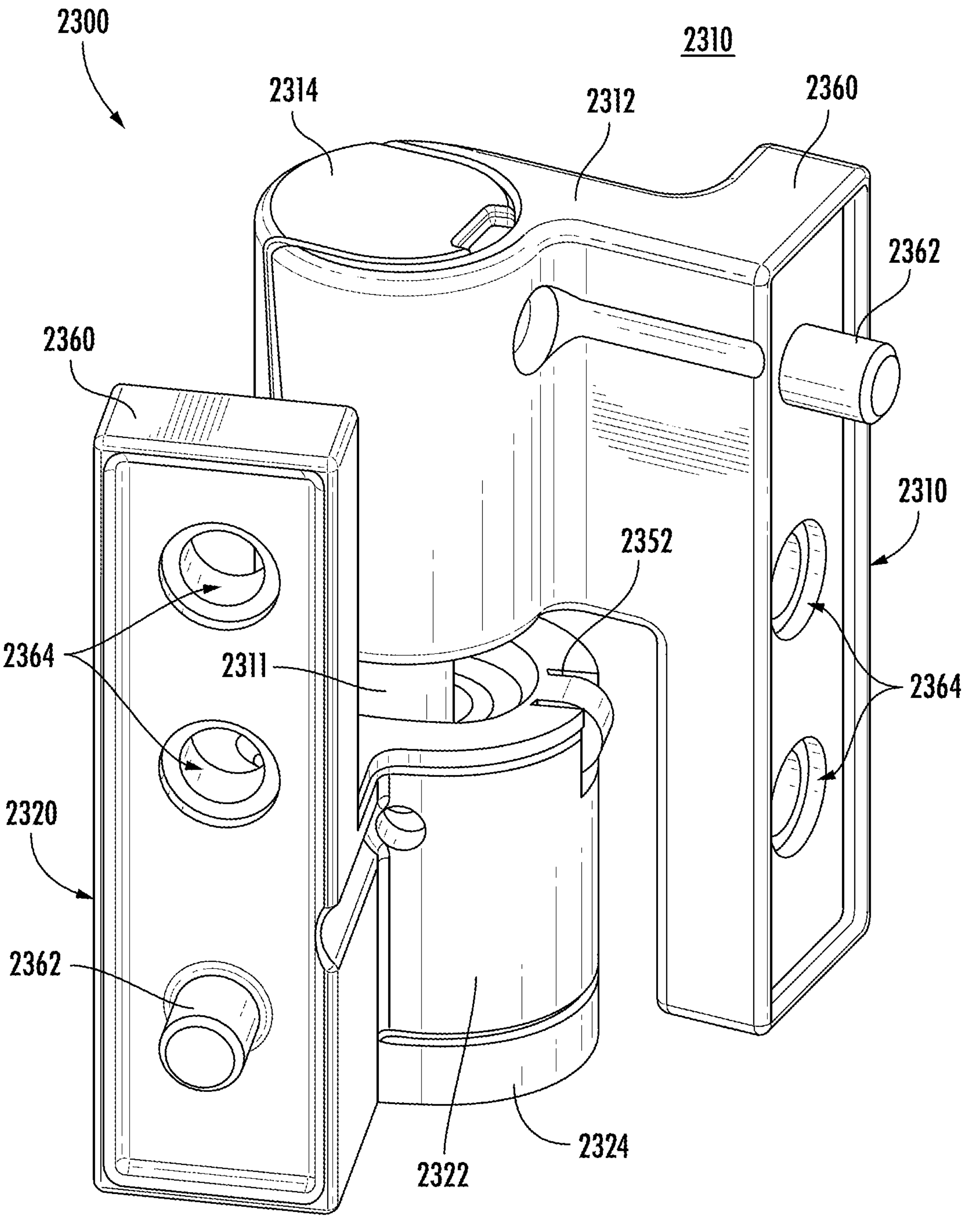
FIG. 45 is a perspective view of a portion of the pivot assembly of FIG. 38 having a pin knuckle and a receiver knuckle.

Referring now to FIG. 45, the pin knuckle 2310 has a pin knuckle body 2312 and the receiver knuckle 2320 has a receiver knuckle body 2322. Both the pin knuckle body 2312 and the receiver knuckle body 2322 have a connection plate 2360. The connection plate 2360 has a pivot alignment stud 2362 protruding from and counterbore holes 2364 defined therethrough. The pivot alignment studs 2362 correspond with and are received in a respective alignment pocket 2346 of the pivot anchor 2330 to align and connect the pivot knuckles 2310, 2320 with the respective pivot anchor 2330 (FIG. 44). Similarly, the alignment studs 2344 of the pivot anchor 2330 correspond with and are received in respective counterbore holes 2364 of the connection plates 2360 to align the pivot knuckles 2310, 2320 with the respective pivot anchor 2330 (FIG. 44). One or more of the alignment studs 2344 of the pivot anchor 2330 may have threaded holes to receive a fastener disposed through the counterbore holes 2364 to secure the pin knuckle 2310 or the receiver knuckle 2320 to a pivot anchor 2330 with the shell members 2114*a* and 2214*b* disposed therebetween.

Figure 46:
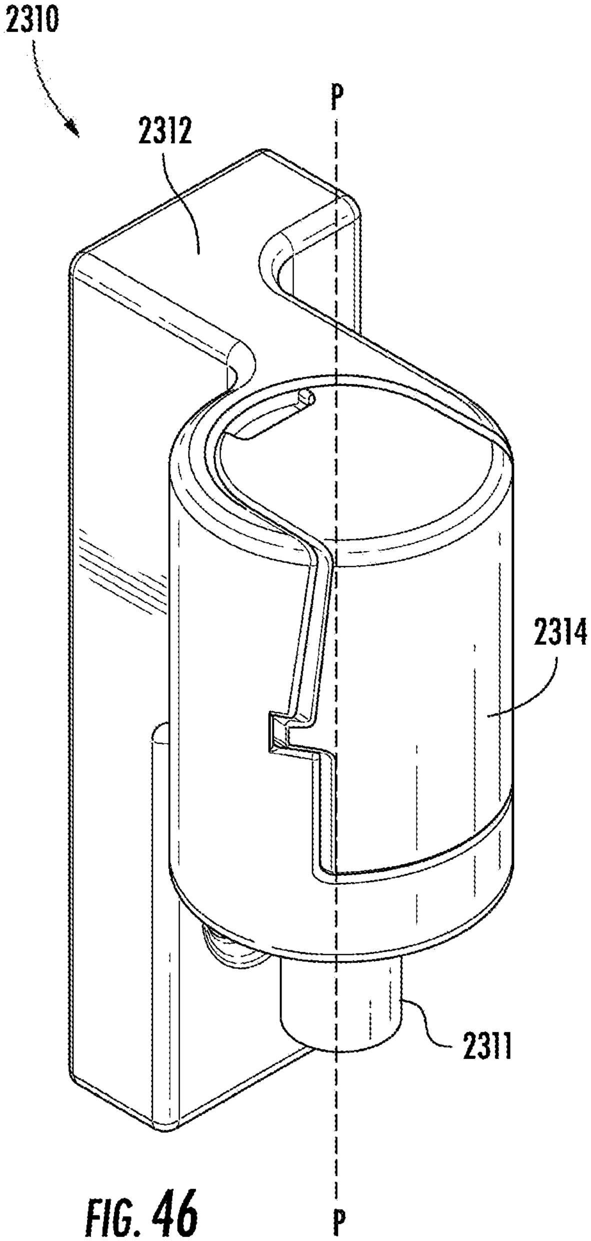
FIG. 46 is a perspective view of the pin knuckle of FIG. 45.
Figure 47:
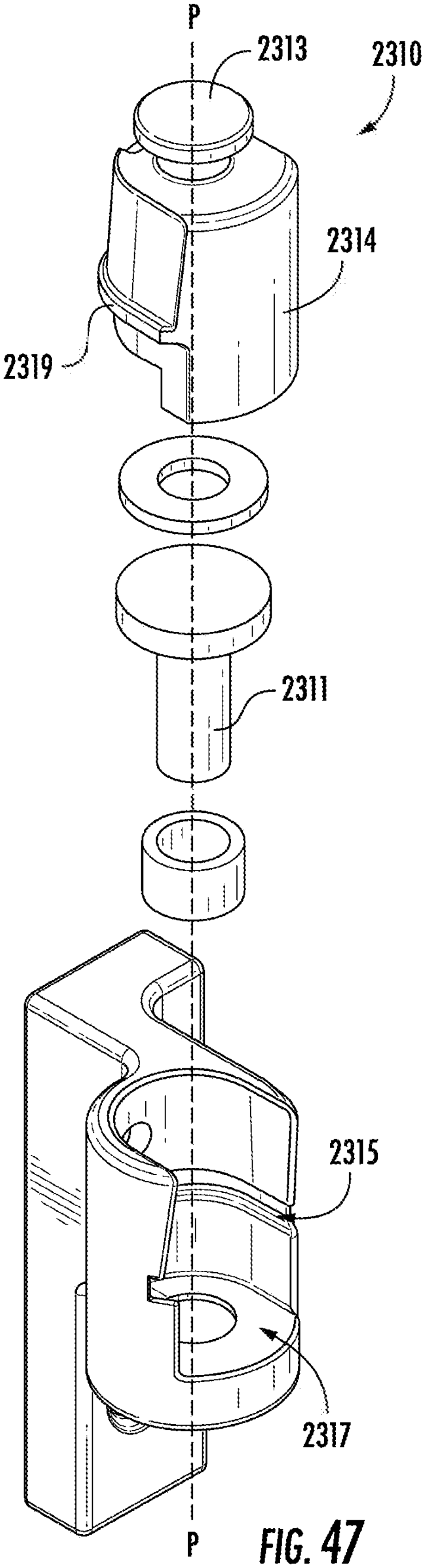
FIG. 47 is an exploded view of the pin knuckle of FIG. 46 illustrating parts thereof.

With additional reference to FIGS. 45-47, the pin knuckle 2310 includes the pin knuckle body 2312, a knuckle plug 2314, and a pivot pin 2311. The pivot pin 2311 defines a pivot axis P-P that passes through a central longitudinal axis of the pivot pin 2311. The knuckle plug 2314 retains the pivot pin 2311 in the pin knuckle body 2312. The pin knuckle body 2312 and the knuckle plug 2314 have a corresponding lip 2319 and defines a groove 2315 to align the knuckle plug 2314 and pin knuckle body 2312 relative to one another such that a cavity 2317 exists between to retain the pivot pin 2311. The pivot pin 2311 has a head 2313 to retain the pivot pin 2311 in the cavity 2317 formed between the pin knuckle body 2312 and the knuckle plug 2314. The pin knuckle body 2312 and knuckle plug 2314 may mate in a way to accommodate bearings disposed about the pivot pin 2311 and/or within the cavity 2317. The bearings may allow rotation of the pivot pin 2311 relative to the pin knuckle body 2312. The knuckle plug 2314 may secure to the pin knuckle body 2312 by a fastener. The knuckle plug 2314 may differ based upon its position in the door panel system 2010. For example, where the door panel system 2010 connects with the frame 20, as shown in FIG. 36, the knuckle plug 2314 may include a head 2313 to couple a guide assembly 2610 to a support assembly 2620 as discussed.

Figure 48:
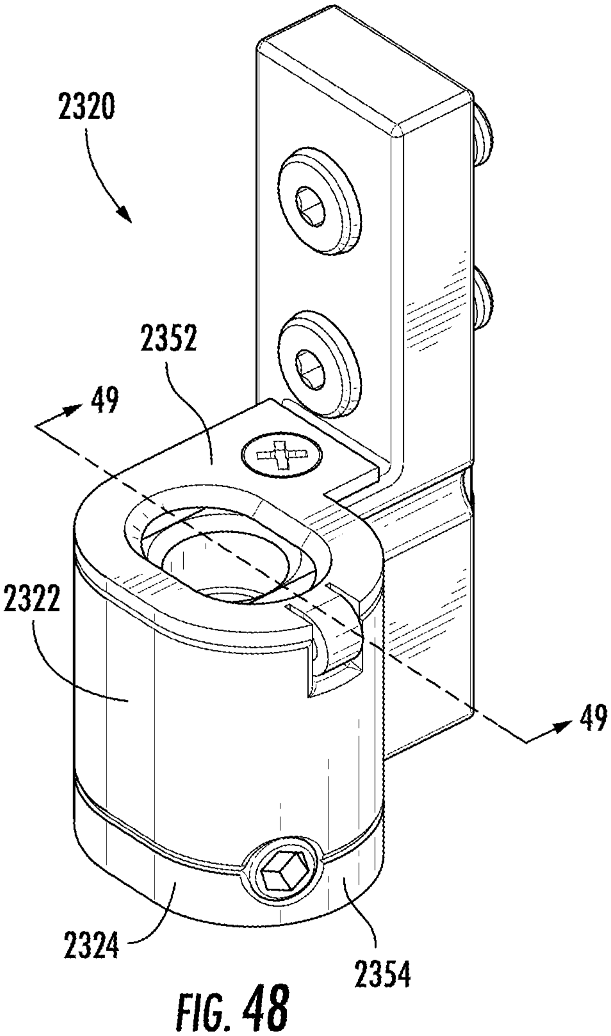
FIG. 48 is a perspective view of the receiver knuckle of FIG. 45.
Figure 49:
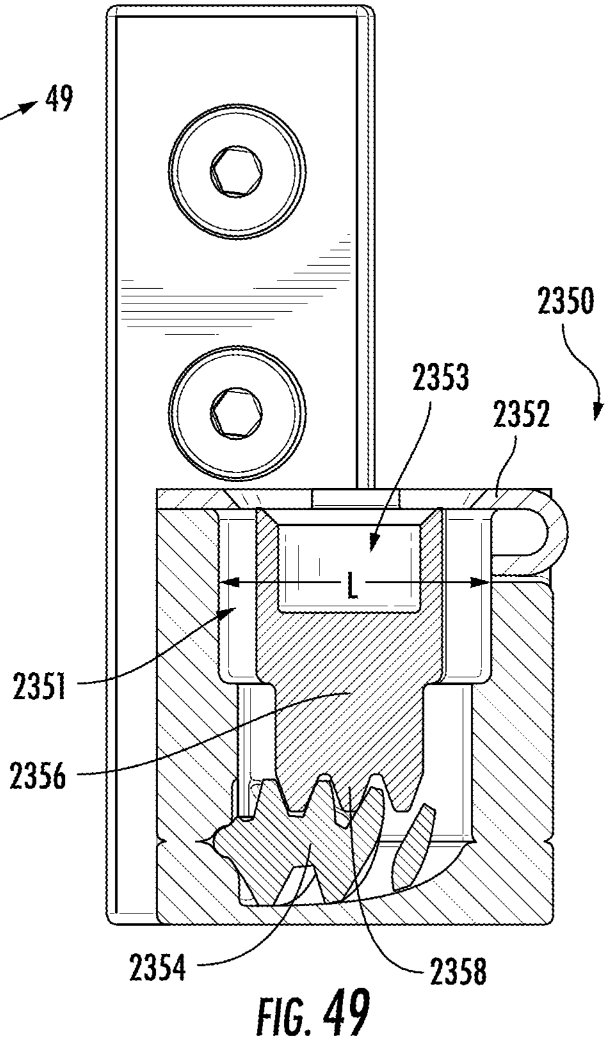
FIG. 49 is a cross-sectional view taken along line 49-49 of FIG. 48.
Figure 50:
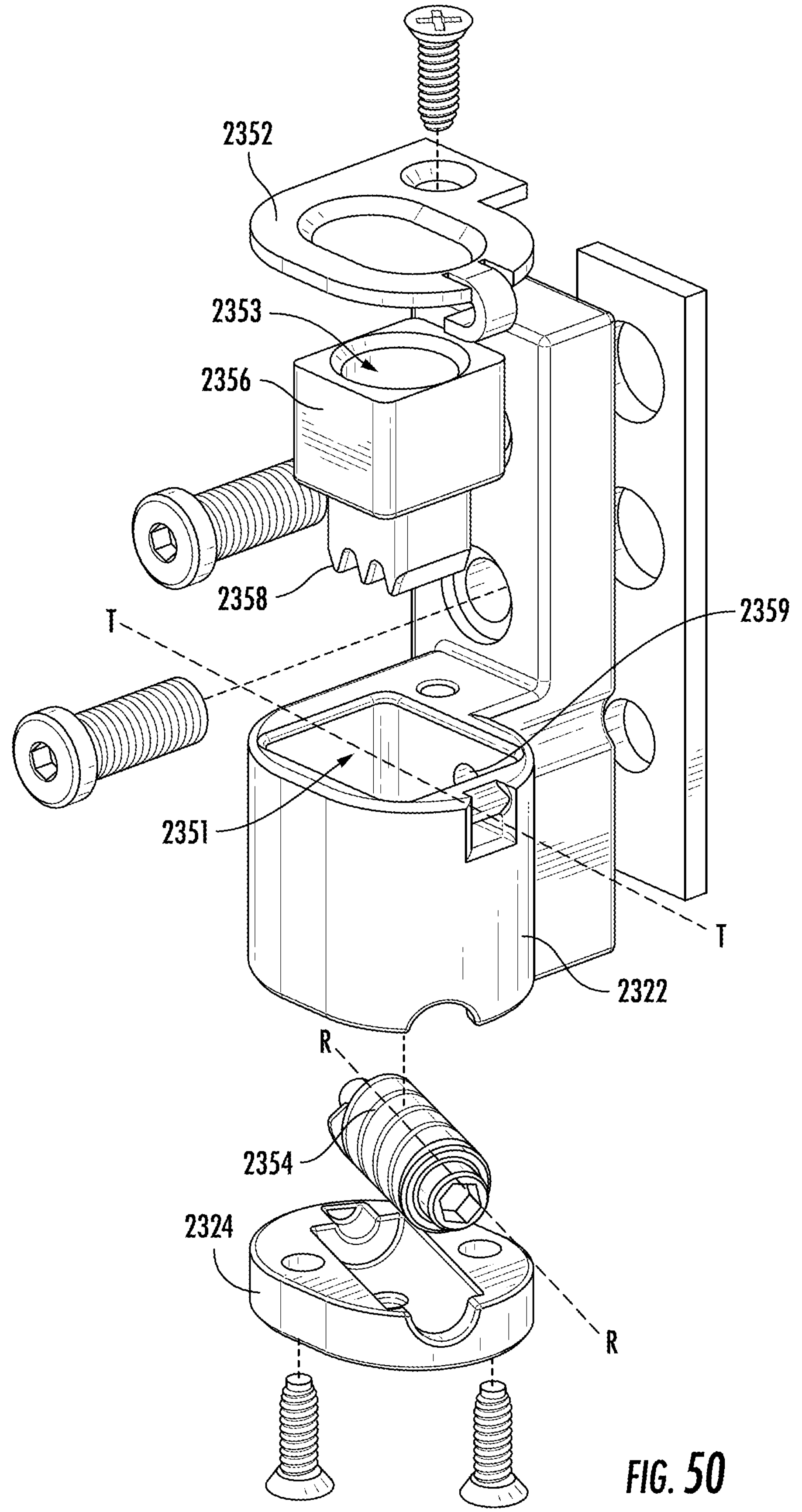
FIG. 50 is an exploded view the receiver knuckle of FIG. 48 illustrating parts thereof.

Referring now to FIGS. 48-50, the receiver knuckle 2320 is described in accordance with the present disclosure. The receiver knuckle 2320 receives the pivot pin 2311 to position the first leaf 2110 relative to the second leaf 2210 (FIG. 40). The receiver knuckle 2320 may include gap adjustment mechanism 2350 that allows for adjustment of the distance between the door panels 30, 40*a*, 40*b* when the door panel system 2010 is in the closed position. The receiver knuckle 2320 has the receiver knuckle body 2322, a knuckle cap 2324, a retention plate 2352, and a set screw 2359.

The gap adjustment mechanism 2350 includes an adjustment screw 2354 and a carriage 2356. The adjustment screw 2354 rotates about a rotation axis R-R and the carriage 2356 translates along a translation axis T-T. The carriage 2356 has teeth or a rack 2358 on one side of the carriage 2356 that engage the threads of the adjustment screw 2354 such that the rack 2358 translates in response to rotation of the adjustment screw 2354. In some embodiments, the translation axis T-T may be offset from the rotation axis R-R. For example, the rotation axis may be offset at an angle in a range of 10 degrees to 75 degrees, e.g., 21 degrees. Offsetting the rotation axis from the translation axis may increase access to a head of the adjustment screw 2354 when the door panel system 2010 is in the closed position. The adjustment screw 2354 may be a worm screw to allow for an offset between the rotation axis R-R and the translation axis T-T. The carriage 2356 defines a pivot pin hole 2353 to receive the pivot pin 2311 of the pin knuckle 2310. The pivot pin hole 2353 may be sized to accommodate a bearing disposed about the end of the pivot pin 2311.

When the receiver knuckle 2320 is assembled, the knuckle cap 2324 retains the adjustment screw 2354 while allowing rotation of the adjustment screw 2354 within the receiver knuckle 2320. The adjustment screw 2354 is retained in the receiver knuckle body 2322 such that the adjustment screw 2354 is offset from parallel with the door panels 30, 40*a*, 40*b*. In some embodiments, the adjustment screw 2354 is orthogonal to the pivot axis P-P. The receiver knuckle body 2322 of the receiver knuckle 2320 has an adjustment channel 2351 sized to slidingly receive the carriage 2356. The carriage 2356 sits within the adjustment channel 2351 with the rack 2358 of the carriage 2356 engaged with the threads of the adjustment screw 2354. The adjustment channel 2351 has a length L greater than the length of the carriage 2356. The shape and length L of the adjustment channel 2351 defines the adjustment path of the carriage 2356. The carriage 2356 may have flat portions along its length and width to engage the walls of the adjustment channel 2351 to prevent rotation of the carriage 2356 during operation, thereby maintaining engagement of the rack 2358 with the adjustment screw 2354. The retention plate 2352 operably retains the carriage 2356 in the adjustment channel 2351 and allows the carriage to receive the pivot pin 2311 to pivotally couple the pin knuckle 2310 and the receiver knuckle 2320. The set screw 2359 may engage with a flat portion of the carriage 2356 to fix the position of the carriage 2356 within the adjustment channel 2351, preventing unintended translation of the carriage 2356.

The gap adjustment mechanism 2350 allows for the adjustment of the gap between secondary panels 40*a* and 40*b* similar to the gap adjustment mechanism 2350 detailed above with respect to FIG. 30. Specifically, rotating the adjustment screw 2354 translates the carriage 2356 within the adjustment channel 2351 to adjust the gap or thickness between the first and second leaves 2110, 2210 and thus, a gap between the secondary panels 40*a* and 40*b*. For example, rotation of the adjustment screw 2354 clockwise may translate the carriage 2356 within the adjustment channel 2351 in a first direction such that the gap is increased and rotation of the adjustment screw 2354 counterclockwise may translate the carriage 2356 within the adjustment channel 2351 a second direction opposite the first direction such that the gap is decreased. The adjustment channel 2351 constrains movement of the carriage 2356 to translation within the adjustment channel 2351. In some embodiments, the adjustment channel 2351 may limit translation of the carriage 2356. For example, the adjustment channel 2351 may have a length sufficient to allow the carriage 2356 to translate such that the gap can be adjusted in a range of 0.25 inches to 1 inch in either direction for a total of adjustment of 0.5 inches to 2 inches, e.g., 0.375 inches in either direction or 0.75 inches total.

With the pivot pin 2311 received in the carriage 2356, rotation of the adjustment screw 2345 results in a corresponding adjustment of the position of the pivot pin 2311 relative to the edge 42*a* of the secondary panel 40*a*, thereby adjusting the gap between the secondary panels 40*a* and 40*b*. Additionally, the receiver knuckle 2320 may align the pivot pin axes P-P of the upper and lower pivot assemblies 2300, 2400 such that the pivot axes P-P are colinear. The pivot axis P-P defined by the pivot pin 2311 may pass through the gap adjustment mechanism 2350, as seen in FIG. 45. Adjustment of the gap between the door panels 30, 40*a*, 40*b* may allow for proper sealing of the flexible weather stripping 2152 and installation of the door panel system 2010 in the frame 20. Referring briefly back to FIG. 40, reducing the gap may allow the flexible weather stripping 2152 attached to the trim 2150 to engage the opposing trim 2250 when the door panel system 2010 is in the fully closed position. When installing the door panel system 2010 adjusting the gap with the gap adjustment mechanism 2350 may allow for proper engagement of operating panel 30 with the working jamb 28. For example, where operating panel 30 engages with the fixed jamb 28 before the door panel system is the fully closed position the gap adjustment mechanism 2350 may reduce the gap between the door panels 30, 40*a*, 40*b*. A reduction in the gap by the gap adjustment mechanism 2350 may allow the door panel system 2010 to enter the fully closed position. Alternatively, the gap adjustment mechanism may increase the gap between the door panels 30, 40*a*, 40*b* where the door panel system 2010 is in the fully closed position before the operating panel 30 can engage the operating jamb 28. The increase in the gap allows the operating panel 30 to engage with the operating jamb 28. Further, the operating panel 30 may have standard lock hardware installed to engage with the operating jamb 28 that often requires an appropriate clearance between the operating panel 30 and the operating jamb 28 to properly function. The gap adjustment mechanism 2350 additionally allows adjustment of the clearance between the operating panel 30 and the operating jamb 28 to allow proper engagement of the standard lock hardware to ensure proper locking.

Briefly referring back to FIG. 36, the frame 20 includes an upper track 2800 and a bottom sill 2700. The door panel system 2010 sits within frame 20 and moves between the fully open and the fully closed positions. The upper track 2800 guides the door panel system 2010, and the bottom sill 2700 supports and guides the door panel system 2010.

Now referring to FIGS. 51-54, the continuous hinge 2100 has a sliding assembly 2600 that includes a guide assembly 2610 and a support assembly 2620. The guide assembly 2610 sits within the upper track 2800 and translates within the upper track 2800 as the door panel system 2010 transitions between the open and closed position. The support assembly 2620 sits in the bottom sill 2700 to support and guide the door panel system 2010 with the support assembly 2620 translating within a support channel 2712 of the bottom sill 2700 as the door panel system 2010 transitions between the open and closed positions.

Figure 51:
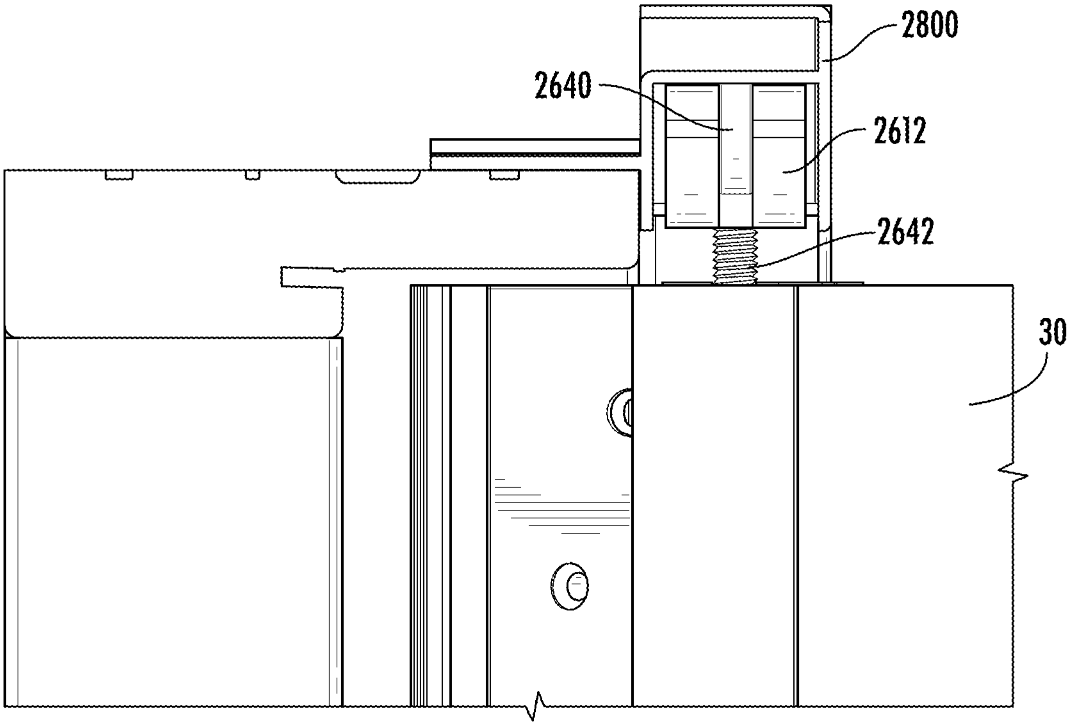
FIG. 51 is an end view showing a guide assembly within a guide track of the frame of FIG. 36.
Figure 52:
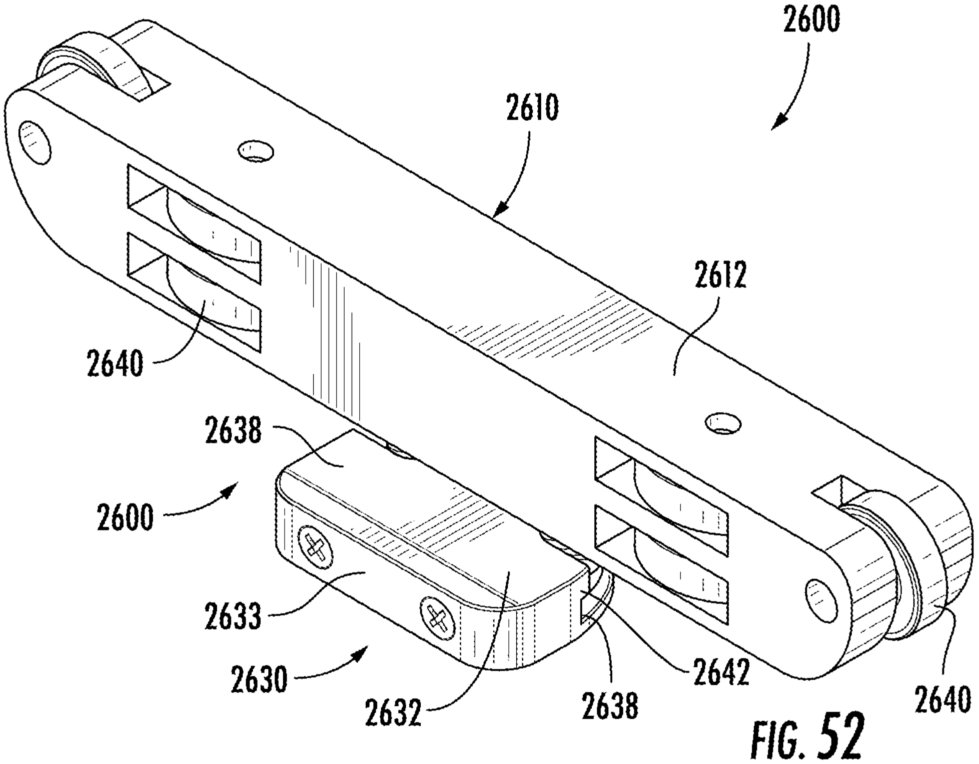
FIG. 52 is a perspective view of the guide assembly of FIG. 51.

With particular reference to FIGS. 51 and 52, the guide assembly 2610 includes a truck 2612, a height adjustment mechanism 2630, and rollers 2640. The guide truck 2612 has rollers 2640 disposed along the length and at the ends to allow for smooth guidance of the truck through the upper track 2800. The rollers 2640 protrude from the side of the guide truck 2612 to engage with the walls of the upper track 2800. The rollers 2640 may align along the length of the guide truck 2612 or be positioned offset from one another to engage opposite walls of the upper track 2800.

Figure 53:
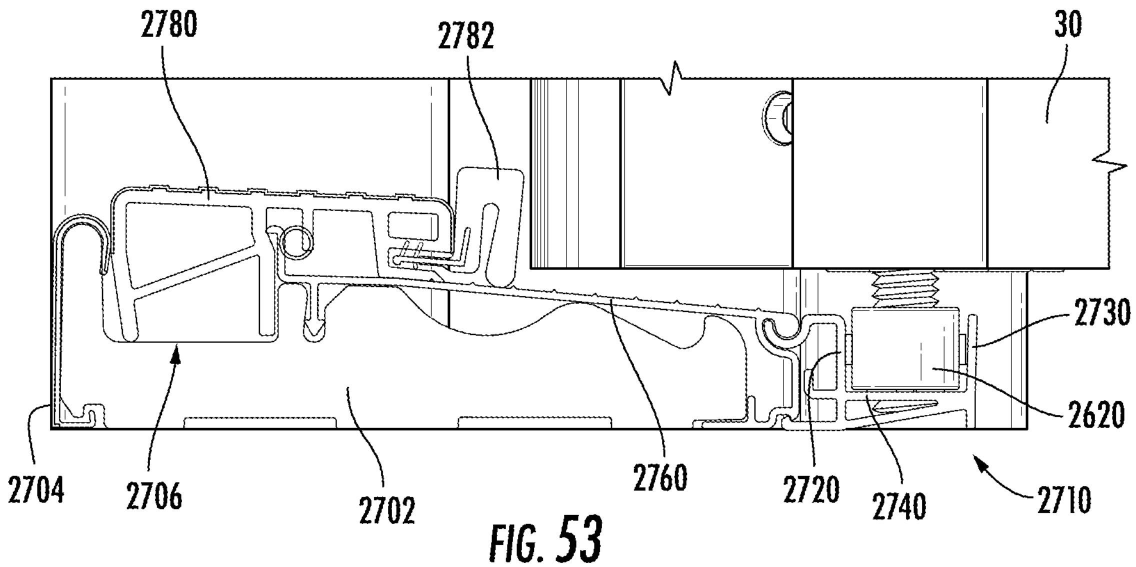
FIG. 53 is an end view showing a support assembly within the threshold assembly of FIG. 36.
Figure 54:
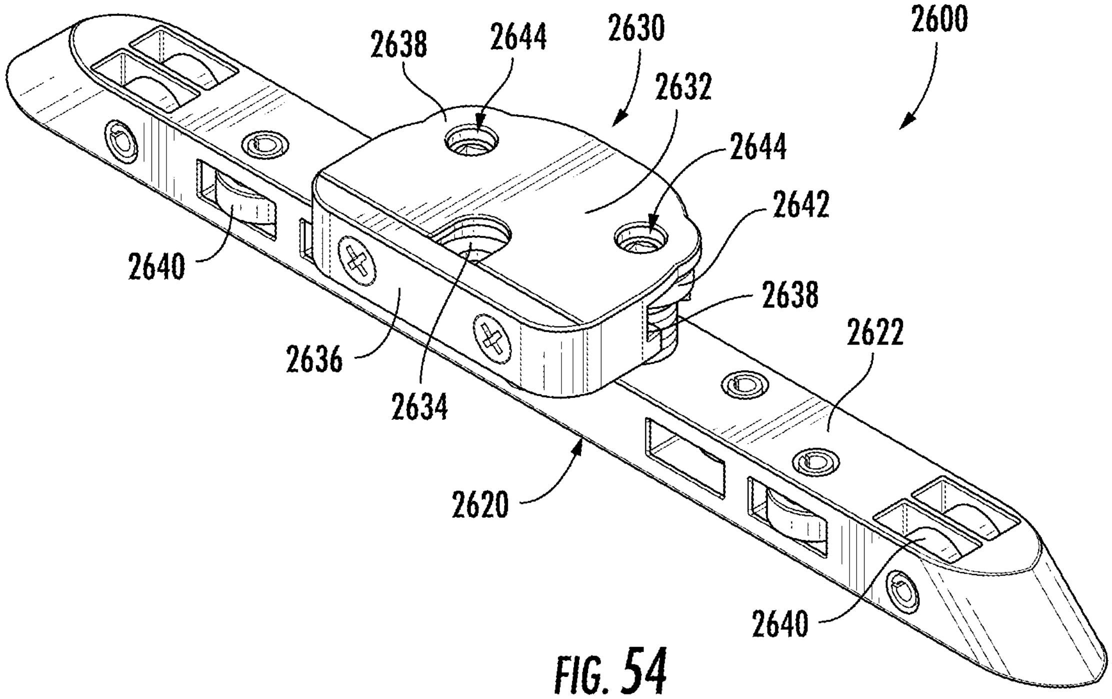
FIG. 54 perspective view of the support assembly of FIG. 53.

With particular reference to FIGS. 53 and 54, the support assembly 2610 includes a truck 2622, a height adjustment mechanism 2630, and rollers 2640. The support truck 2622 has two rollers 2640 at each end allowing the support truck 2622 to roll along the bottom sill 2700 or a bottom wall 2740 of the sill extension 2710. Like the guide truck 2612, the support truck 2622 has rollers 2640 protruding from each side of the truck to roll along an attachment wall 2720 and an exterior wall 2730 of the sill extension 2710. The rollers 2640 may align along the length of the support truck 2622 or be positioned offset from one another such that the rollers 2640 simultaneously contact opposite walls 2720 and 2730 of the sill extension 2710.

The height adjustment mechanism 2630 of the guide assembly 2610 and the support assembly 2620 adjusts the vertical position of the door panels 30, 40*a*, 40*b* within the frame 20. The height adjustment mechanism 2630 includes a receiver 2632, a face plate 2636, and jack screws 2642. The receiver 2632 has a plug slot 2634 to receive the head 2313 of a knuckle plug 2314 and the face plate 2636 retains the head 2313 of knuckle plug 2314 within the receiver 2632. The receiver 2632 defines two jack slots 2638 that receive the head of a jack screw 2642. The jack screws 2642 may be a socket head cap screw or the like. The receiver 2632 defines height adjustment holes 2644 therethrough positioned to align with the drive of the jack screws 2642 received in the jack slots 2638, allowing a tool access to the drive to rotate the jack screw 2642. The tool may be a screwdriver, an allen key, or similar tool for rotating the jack screws 2642. The jack screws 2642 attach the height adjustment mechanism 2630 to the guide and support trucks 2612, 2622.

With the gap adjustment mechanism 2630 attached to the guide truck 2610 and the support truck 2620, rotating the jack screws 2642 adjusts the distance between the trucks 2612, 2622 and the height adjustment mechanism 2630. Rotating the jack screws 2642 a first direction increases the distance between the guide and support trucks 2612, 2622 and the receivers 2632 and rotating a second direction opposite the first direction decreases the distance between the guide and support trucks 2612, 2622 and the receivers 2632. Rotating the jack screws 2642 such that the receiver 2632 and trucks 2612, 2622 are at their closest position may define a lowest height position and rotating the jack screws 2642 such that the receiver 2632 and the trucks 2612, 2622 are at their most distant position to one another may define a greatest height position. The two jack screws 2642 may turn individually allowing leveling of the door panels 30, 40*a*, 40*b* by turning one of the two jack screws 2642 more than the other or turning the jack screws 2642 in opposite directions.

Figure 55:
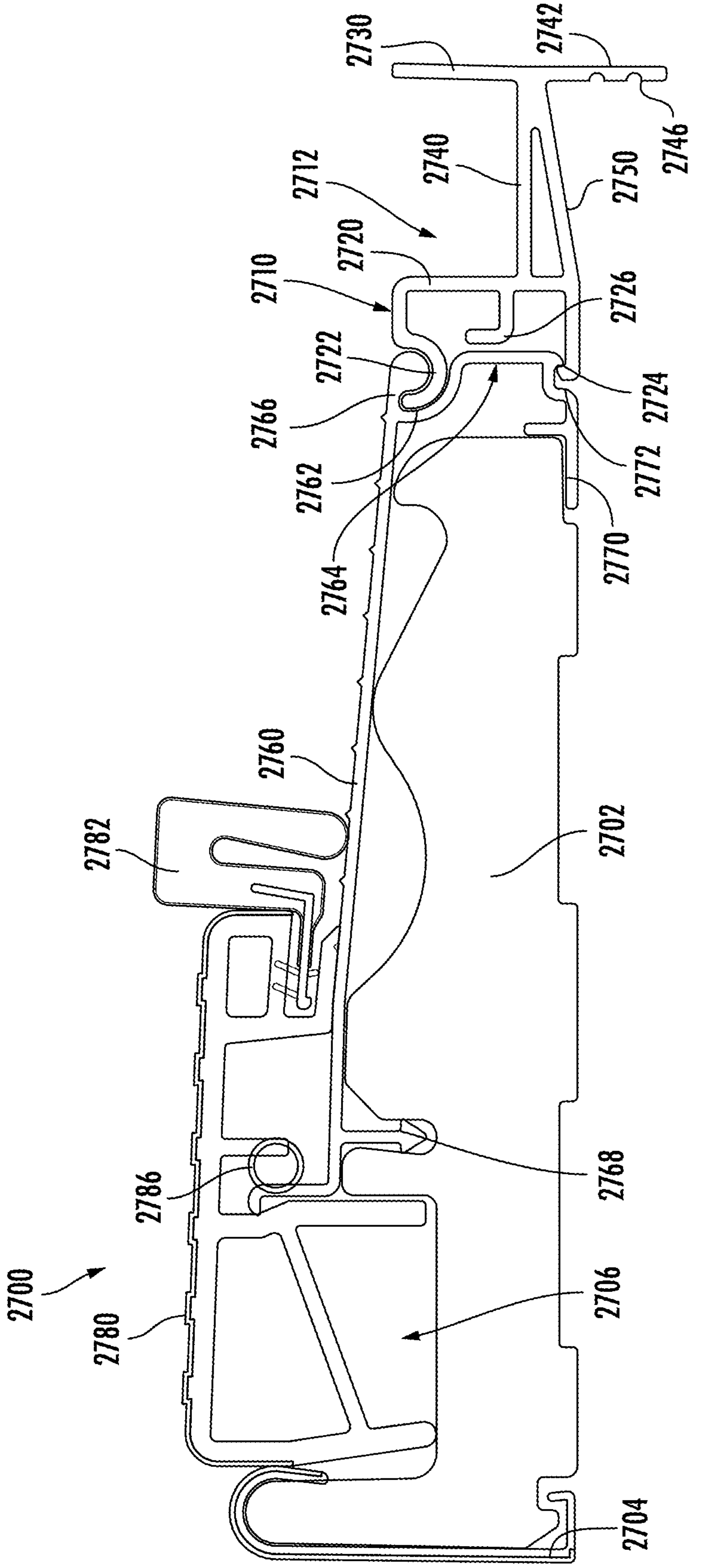
FIG. 55 is a profile view of a threshold assembly of the door panel system of FIG. 36 including a substrate, a sill deck, a threshold cap, and a sill extension.
Figure 56:
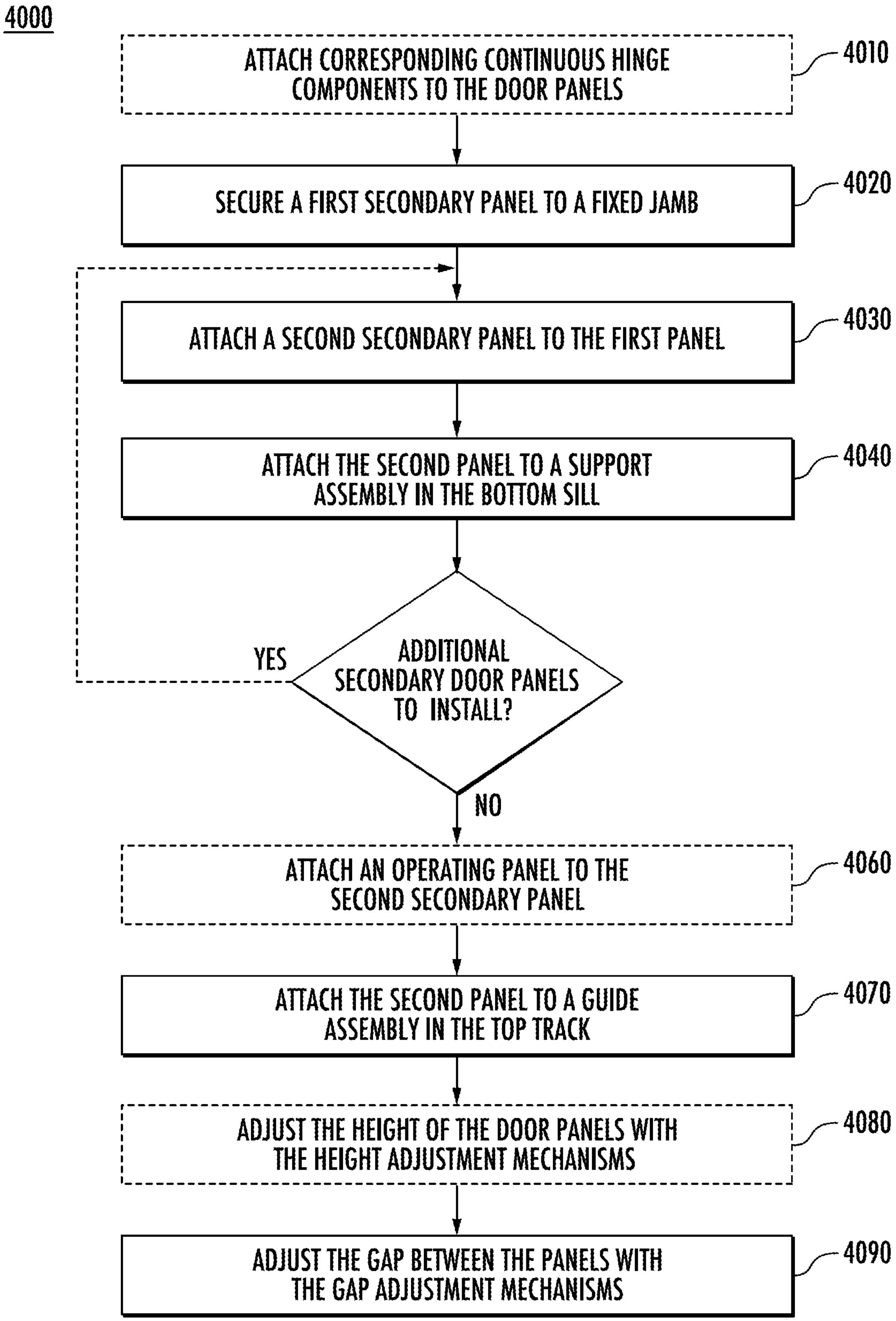
FIG. 56 is flow chart of a method of installing a door panel system in accordance with the present disclosure.

Referring to FIG. 55, the bottom sill 2700 includes a substrate 2702, a nosing 2704, a sill deck 2760, and a threshold cap 2780. The bottom sill 2700 may directly support the door panel system 2010. The threshold cap 2780 includes weather stripping 2782 and attaches to the substrate 2702 within a drain channel 2706. When the door panel system 2010 is in the closed position, the interior face of the door panels 30, 40*a*, 40*b* contact the weather stripping 2782, creating a weatherproof seal. The weather stripping 2782 may be selected based on the thickness of the door panels 30, 40*a*, 40*b* to form the weatherproof seal. The threshold cap 2780 may include secondary weather stripping 2786 in contact with the sill deck 2760.

The sill deck 2760 may have the same extrusion profile as a sill deck for use with a standard hinged door. The threshold cap 2780 may have the same extrusion profile as a standard threshold cap for use with a standard hinged door. For example, the sill deck 2760 and the threshold cap 2780 may be a Z-Series Bumper Outswing Sill from Endura Products®.

The bottom sill 2700 may include a sill extension 2710 to support the door panel system 2010. The sill extension 2710 attaches to the sill deck 2760 and allows for a standard sill deck to be used in door panel system 2010. Additionally or alternatively, use of the sill extension 2710 may ease and reduce costs of installing the door panel system 2010 in existing structures. For example, the bottom sill 2700 may be installed in an existing opening at grade. The sill extension 2710 has a support channel 2712 to receive and support the door panels 30, 40*a*, 40*b*.

The sill extension 2710 includes the support channel 2712 defined by an attachment wall 2720, an exterior wall 2730, and a bottom wall 2740. The attachment wall 2720 has legs extending therefrom that attach the sill extension 2710 to the sill deck 2760. A hooked leg 2722 extends from the attachment wall 2720 towards the sill deck 2760 and has a shape corresponding to a curved slot 2762 of the sill deck 2760. The curved slot 2762 of the sill deck 2760 extends along the length of the bottom sill 2700 and defines a sill extension attachment face 2764 of the sill deck 2760. The curved slot 2762 receives the hooked leg 2722 to attach the sill extension 2710 to the sill deck 2760. The curved slot 2762 of the sill deck 2760 may additionally include a pivot bulb 2766 for the hooked leg 2722 to pivot about during attachment of the sill extension 2710 to the bottom sill 2700. A retention leg 2724 extends from the attachment wall 2720 with a retention clip portion engageable with a lip 2772 of the bottom sill, to prevent unintentional detachment of the sill extension 2710 from the bottom sill 2700. A foot 2726 may extend from the attachment wall 2720 to abut the sill extension attachment face 2764 of the bottom sill to maintain the desired position of the sill extension 2710.

The exterior wall 2730 of the support channel 2712 may angle slightly away from the center of the support channel 2712. The angle may be between 0.5 degrees and 10 degrees away from vertical, e.g., 2 degrees away from vertical. This angle may compensate for deflection of the sill extension 2710 caused by the weight of the door panel system 2010 supported therein and may prevent interference between the exterior wall 2730 and the door panels 30, 40*a*, 40*b* or the support assembly 2620 while the door panel system transitions between the fully open position and the fully closed position. Alternatively, the exterior wall 2730 may be positioned vertically such that the exterior wall 2730 and the attachment wall 2720 are parallel, or such that the exterior wall 2730 and the bottom wall 2740 are perpendicular.

Beneath the support channel 2712, defined by the bottom wall 2740, a bottom leg 2742 may extend from the bottom wall 2740 and may align with the exterior wall 2730 or may be offset from the exterior wall 2730. A truss member 2750 may extend between the attachment wall 2720 and the exterior wall 2730, or between the attachment wall 2720 and the bottom wall 2740. The truss member 2750 extends between the attachment wall 2720 and bottom wall 2740, or the exterior wall 2730, at an angle between horizontal and vertical to add rigidity to the sill extension 2710. The truss member 2750 supports the sill extension 2710 and transfers the load of the door panels 30, 40, 40*b* supported by the sill extension 2710 to the bottom sill 2700. The sill extension 2710 may have a cantilever construction, supported by the sill deck 2760 along one side. Alternatively, the sill deck 2760 and the sill extension 2710 may be formed as a single extrusion. The bottom leg 2742 may extend orthogonally from the bottom wall 2740 or may extend at an angle away from perpendicular. The bottom leg 2742 may have score lines 2746 allowing removal of excess material of the bottom leg 2742. The bottom leg 2742 may act as a cover for a lower portion of the sill extension 2710. In some embodiments, the bottom leg 2742 may engage a surface to support the sill extension 2710. In such embodiments, a portion of the load from the door panels 30, 40*a*, 40*b* may be supported by the bottom leg 2742.

The above-described components may be made from steel, aluminum, or plastic. For example, the pivot anchor 2330 may be made of steel or aluminum. The pivot anchor 2330 may have a machined or cast.

With reference to FIGS. 56-60, a method 4000 of installing the door panel system is described in accordance with the present disclosure with reference to the door panel system 2010 of FIGS. 36 and 37.

Components of continuous hinges 2100 may be attached to the door panels 30, 40*a*, 40*b* prior to securement to the frame 20 (Step 4010). For example, a first leaf 2110 of a continuous hinge 2100 may be attached to the edge 42*b* of the secondary panel 40*b* and a second leaf 2210 may be attached to the edge 42*a* of the secondary panel 40*a*. With the first leaf 2110 and the second leaf 2210 attached to the secondary panels 40*a* and 40*b*, the upper and lower pivot assemblies 2300, 2400 may be attached to the secondary panels 40*a* and 40*b* in corresponding halves. Specifically, the pin knuckles 2310, 2410 may be attached to the edge 42*b* of the secondary panel 40*b* and the receiver knuckles 2320, 2420 may be attached to the edge 42*a* of the secondary panel 40*a*. In some embodiments, a shoot bolt assembly 2530 may be attached to the first leaf 2110 or the second leaf 2210. Similarly, the two halves of a second continuous hinge 2100' may be attached to the edge 42*a* of the secondary panel 40*a* and a hinge mounting edge 33 of the operating panel 30. In some embodiments, the door panels 30, 40*a*, 40*b* may be provided with components of the continuous hinges 2100 attached thereto. In certain embodiments, components of the continuous hinges 2100 are attached to the door panels 30, 40*a*, 40*b* just prior to installing the respective door panel into the door panel system 2010. For example, the components of the continuous hinge 2100 may be attached to the secondary panel 40*b*, the secondary panel 40*b* installed in the door panel system 2010, and then some component of the continuous hinge 2100 may be attached to the secondary panel 40*a* before it is installed into the door panel system 2010.

Figure 57:
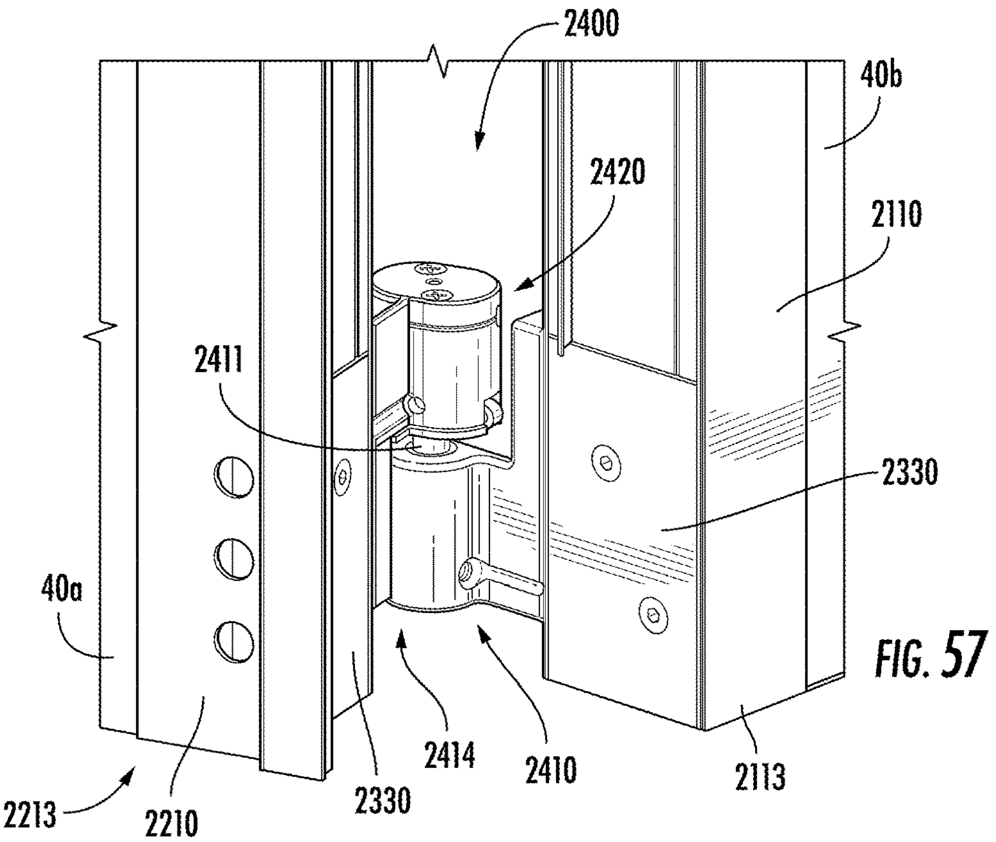
FIGS. 57-60 illustrate portions of the door panel system of FIG. 36 through steps of installation described in the method of FIG. 56.
Figure 58:
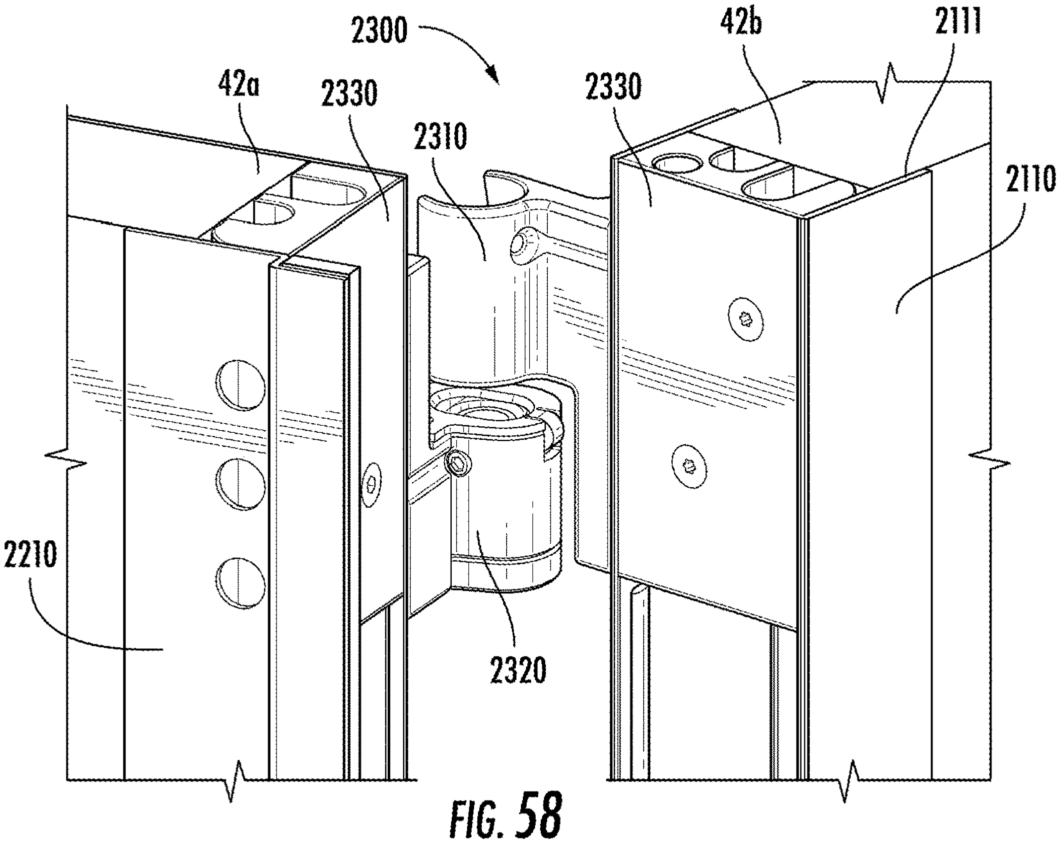

The installation of the door panel system 10 begins with securing the secondary panel 40*b* to the fixed jamb 26 by a hinge 27 (Step 4020). In some embodiments, the hinge 27 may be a standard hinge. With the secondary panel 40*b* secured to the fixed jamb 26, the secondary panel 40*a* is attached to the secondary panel 40*b* by assembly of the continuous hinge 2100 (Step 4030). Specifically, as shown in FIGS. 57 and 58, the receiver knuckle 2420 of the second leaf 2210 attached to the secondary panel 40*a* is placed over the pivot pin 2411 of the pin knuckle 2410 such that the pivot pin 2411 is received within the receiver knuckle 2420. The secondary panel 40*a* may then be positioned such that the receiver knuckle 2320 is aligned with the pin knuckle 2310 with the pivot pin 2311 removed. With receiver knuckle 2320 aligned, the pivot pin 2311 is inserted through the pin knuckle 2310 and secured by installation of the knuckle plug 2314.

Figure 59:
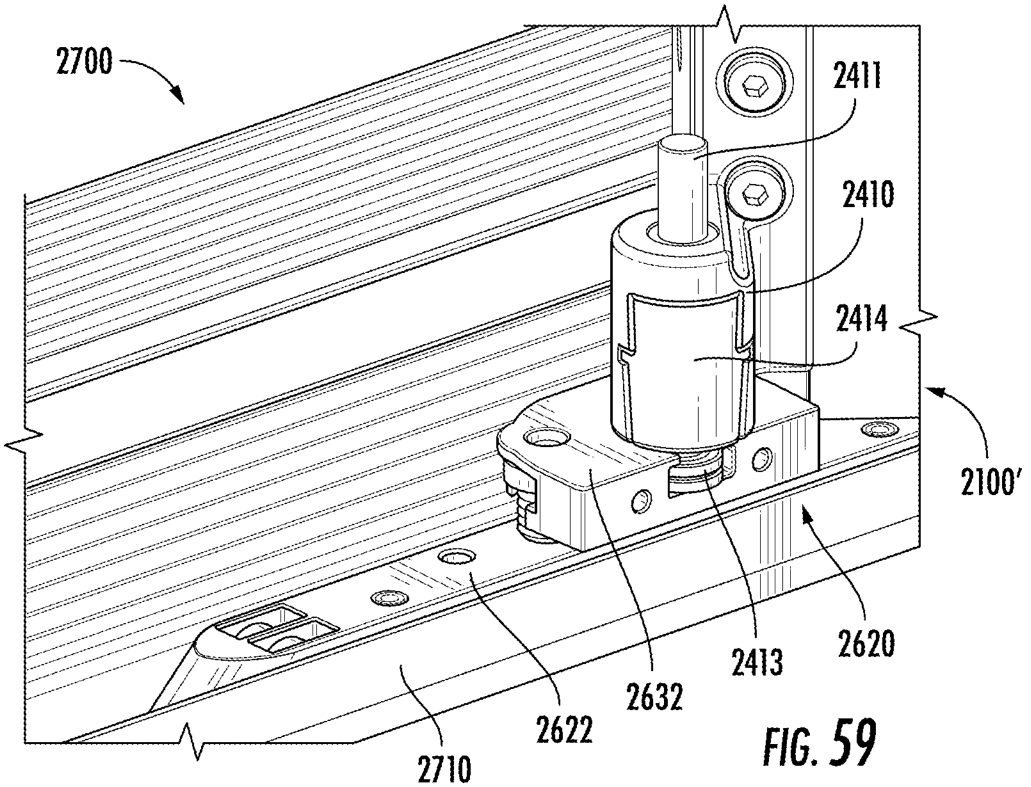

With the secondary panel 40*a* attached to the secondary panel 40*b*, the secondary panel is secured to and supported by the bottom sill 2700 as shown in FIG. 59 (Step 4040). The pin knuckle 2410 may include a head 2413 that is received in the support assembly 2620 to secure and support the secondary panel 40*a* in the bottom sill 2700. The support assembly 2620 may be positioned in the support channel 2712 and be positioned into alignment with the pin knuckle 2410 to receive the head 2413. Once the head 2413 is received in a plug slot 2634 of the receiver 2632 the face plate 2636 is installed to secure the head 2313 within the receiver 2632.

With the secondary panel 40*a* supported by the bottom sill 2700, an operating panel 30 or additional secondary panels are attached to the secondary panel 40*a*. For example, if additional secondary panels 40*a* are to be installed in the door panel system 2010, the first secondary panel is attached to the secondary panel 40*a* and then Steps 4030 and 4040 are repeated until all the secondary panels are installed and supported by the bottom sill 2700.

Once all the secondary panels are installed and supported by the bottom sill 2700, the operating panel 30 is installed in the door panel system 2010 (Step 4060). The operating panel 30 is installed in a manner similar to the secondary panel 40*a* by positioning the receiver knuckle 2420 over the pivot pin 2411 of the pin knuckle 2410 such that the pivot pin 2411 is received in the receiver knuckle 2420 to support the operating panel 30. The operating panel 30 may then be positioned such that the receiver knuckle 2320 is aligned with the pin knuckle 2310 with the pivot pin 2311 removed. With receiver knuckle 2320 aligned, the pivot pin 2311 is inserted through the pin knuckle 2310 and secured by installation of the knuckle plug 2314.

Figure 60:
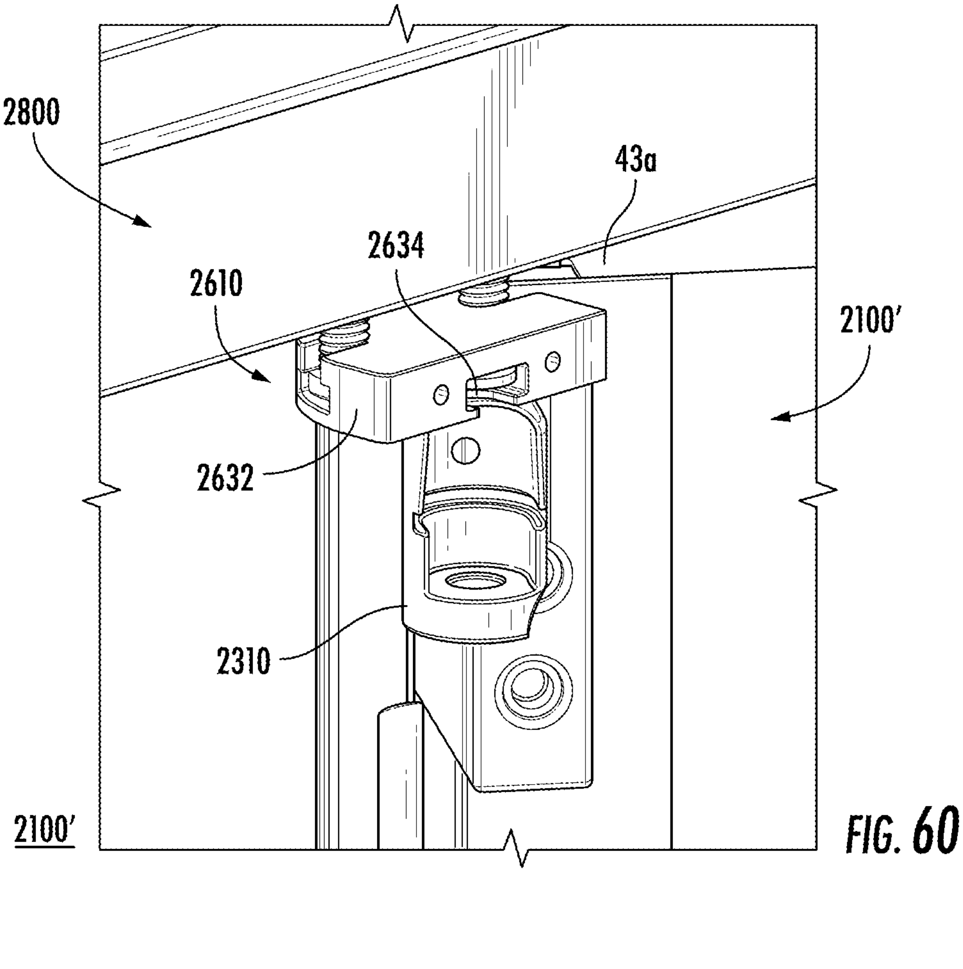

Once the knuckle plug 2314 is installed, the top of the continuous hinge 2100' is secured to the upper track 2800 (Step 4070). As shown in FIG. 60, a head 2313 may be secured in a plug slot 2634 of the height adjustment mechanism 2630. With the head 2313 installed in the plug slot 2634, the face plate 2636 is installed to secure the head 2313 within the receiver 2632.

When the operating panel 30 is attached to the secondary panel 40*a*, the height adjustment mechanisms 2630 may be used to adjust the heights of the door panels 30, 40*a*, 40*b* at each of the continuous hinges 2100' (Step 4080). When the operating panel 30 is attached to the secondary panel 40*a*, the gap adjustment mechanisms 2350 may be used to adjust gaps between the continuous hinges 2100, 2100' and/or to align the pivot axes of each continuous hinges 2100, 2100' (Step 4090). The gap adjustment mechanism 2350 may be adjusted before or after the height adjustment mechanisms 2630. The method 4000 may include installing standard hinged door lock and/or deadbolt assemblies in the operating panel 30 to engage the operating jamb 28.

Figure 61:
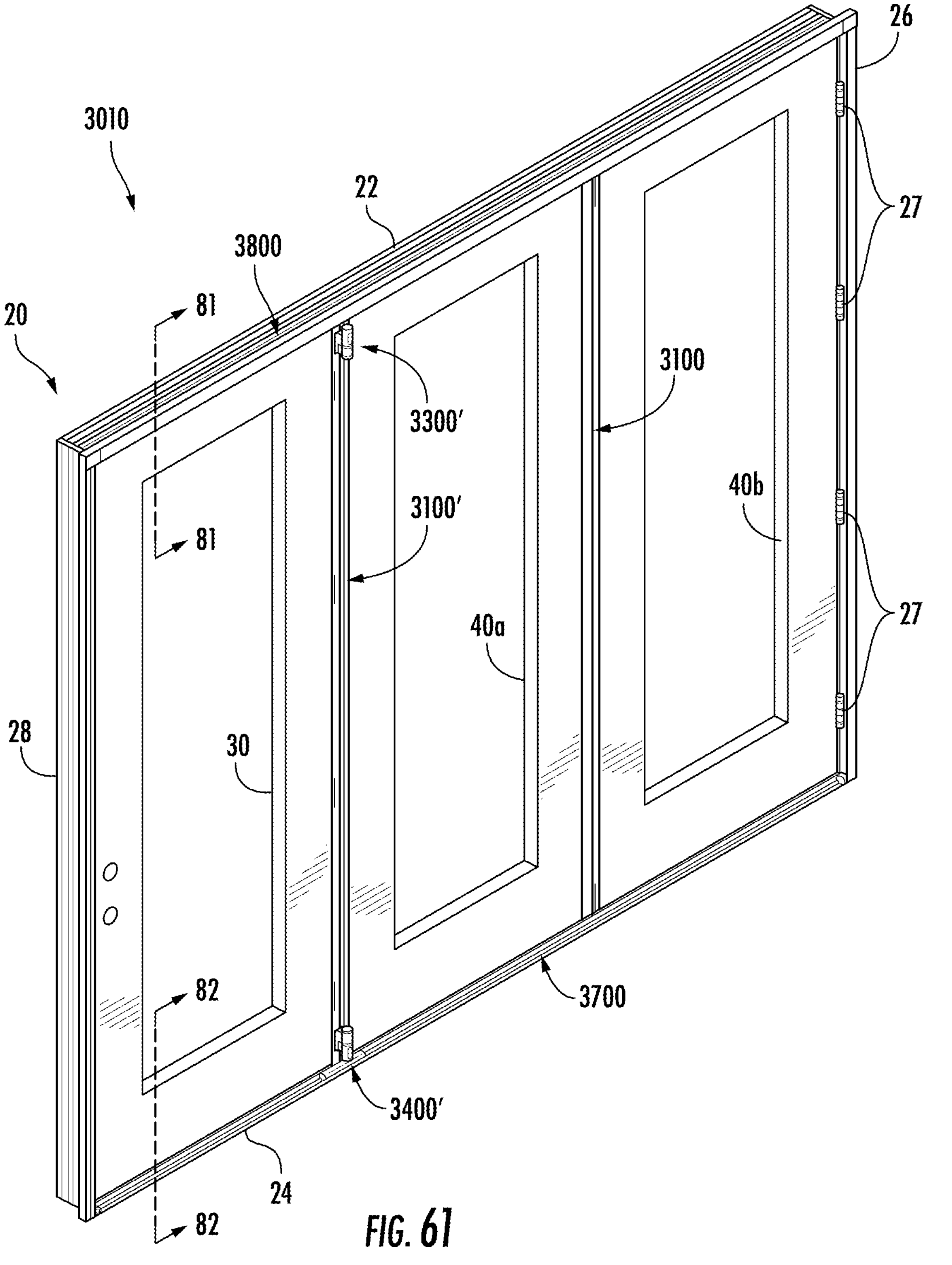
FIG. 61 is a perspective view of another door panel system in accordance with embodiments of the present disclosure in a closed position thereof.
Figure 62:
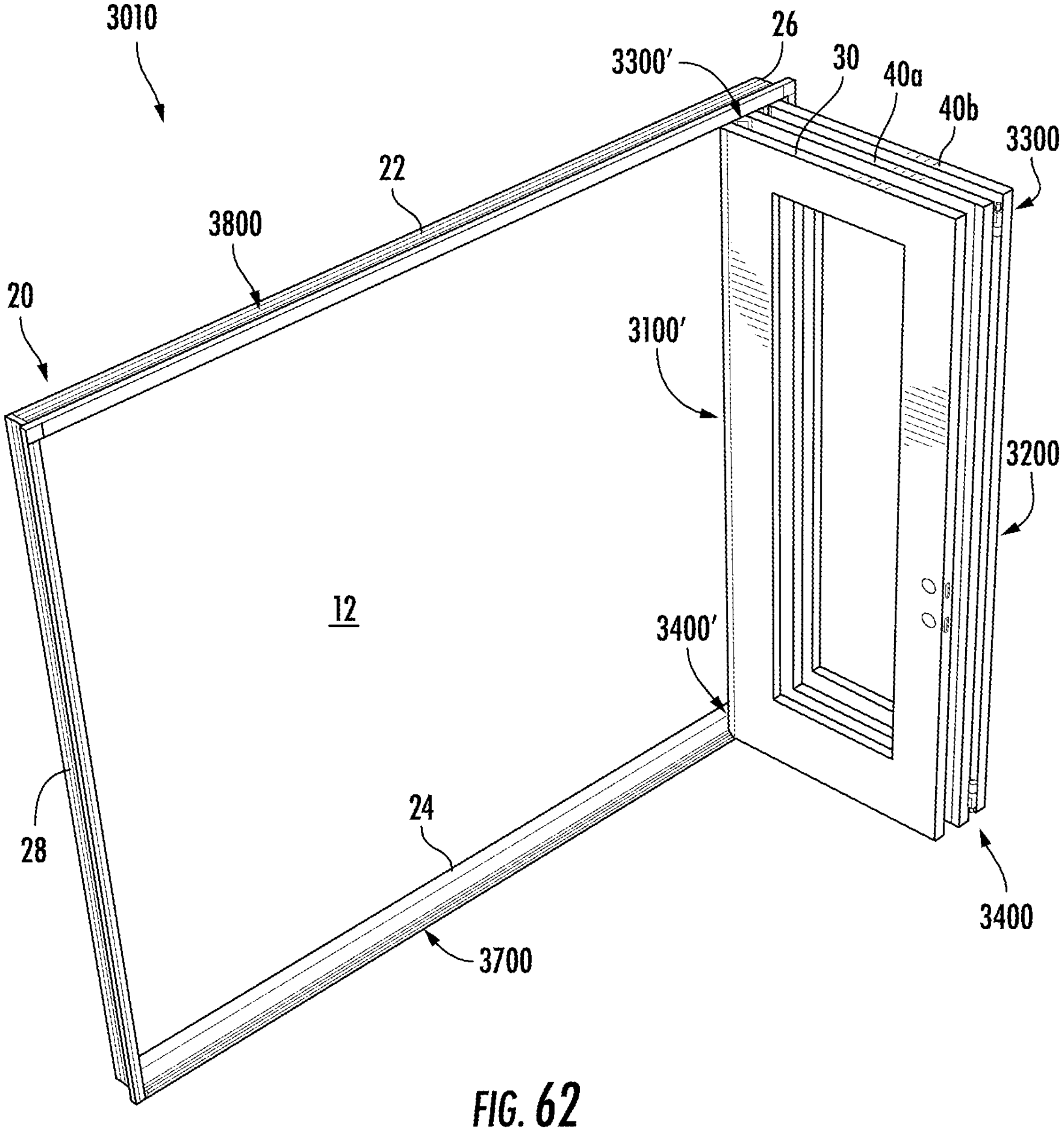
FIG. 62 is a perspective view of the door panel system of FIG. 61 in a fully open position thereof.
Figure 63:
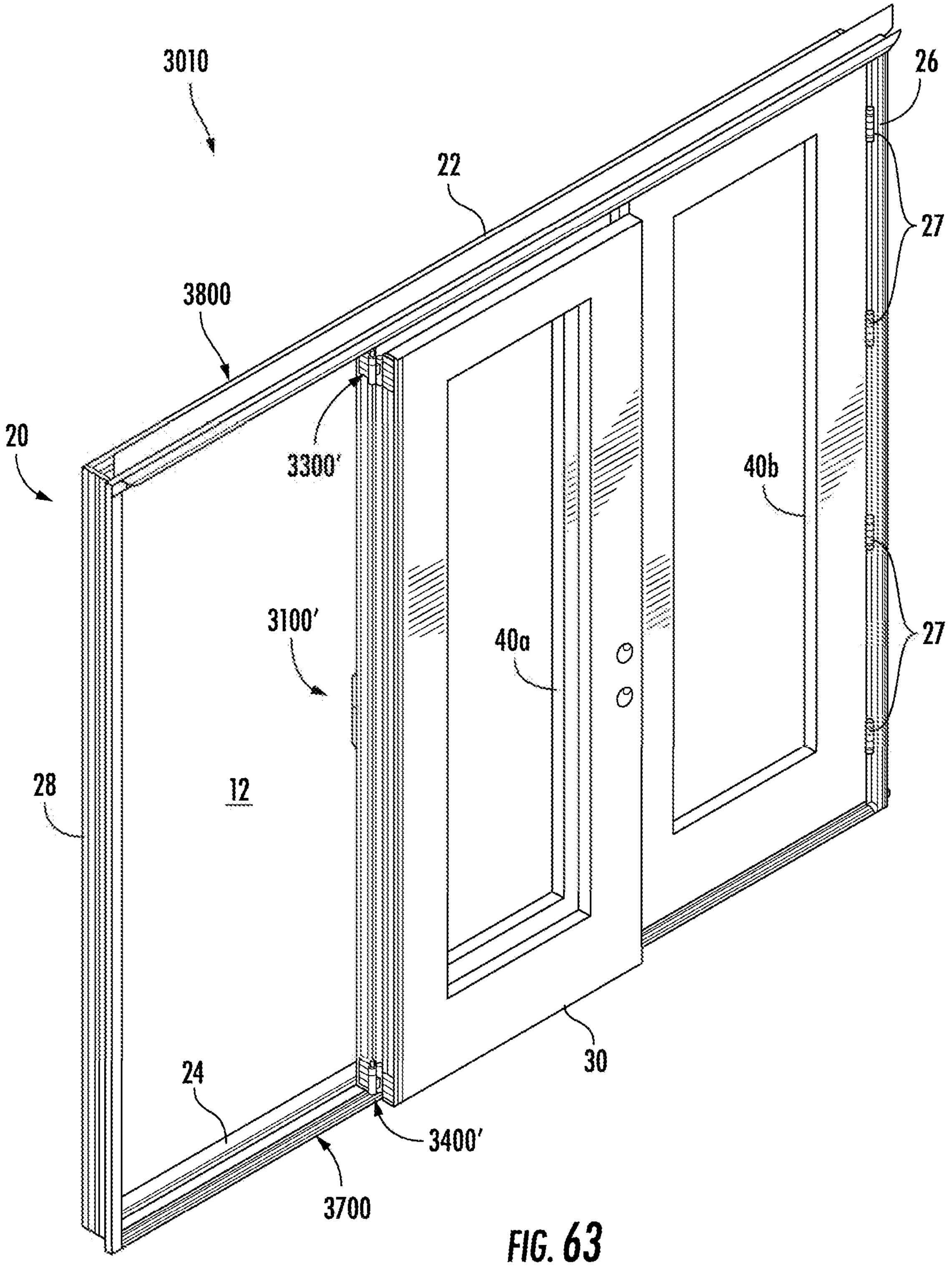
FIG. 63 is perspective view of the door panel system of FIG. 61 in an operating open position thereof.
Figure 64:
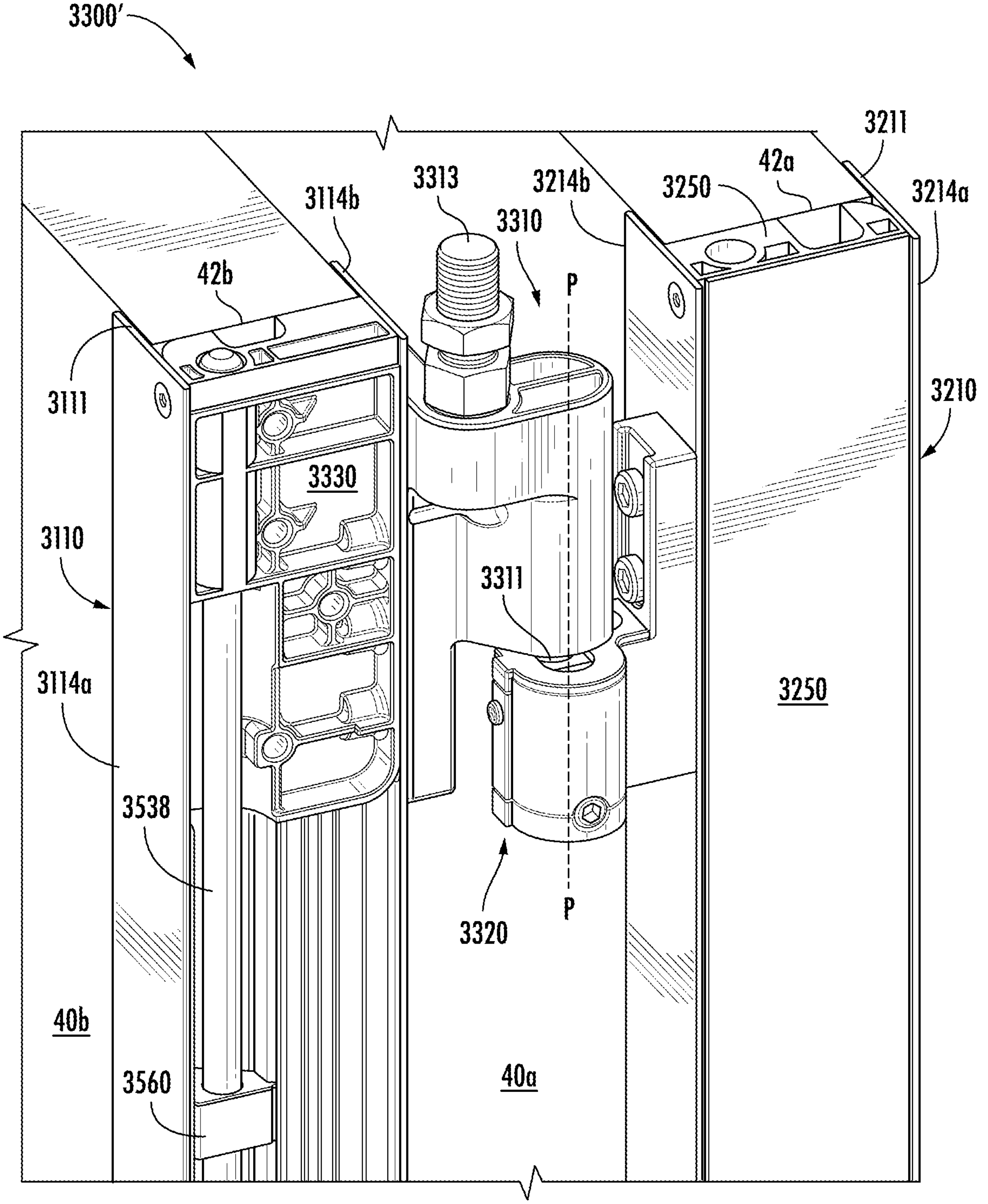
FIG. 64 is an enlarged perspective view of a portion of the door panel system of FIG. 62 illustrating an upper pivot assembly of a continuous hinge of the door panel system with a trim removed.

Referring now to FIGS. 61-63, a door panel system 3010 is provided in accordance with embodiments of the present disclosure. The door panel system 3010 is similar to the door panel system 2010 described above. Like elements are represented with similar labels with the leading number changed from a "2" to a "3".

The door panel system 3010 is installed within a frame 20 that defines an opening 12. The door panel system 3010 may include an operating panel 30, secondary panels 40*a*, 40*b* (collectively "the door panels 30, 40*a*, 40*b*), and continuous hinges 3100, 3100'. The continuous hinges 3100, 3100' to attach the door panels 30, 40*a*, 40*b*. The continuous hinges 3100, 3100' retain the panels 30, 40*a*, 40*b* to the frame 20 and facilitate movement between a closed posture (FIG. 61), a fully open posture (FIG. 62), and an operating open posture (FIG. 63). In the closed posture, the door panel system 3010 fills the opening 12 with the door panels 30, 40*a*, 40*b* aligned with each other such that the interior and exterior surfaces of the panels 30, 40*a*, 40*b* are substantially coplanar with each other. In the fully open posture the panels 30, 40*a*, 40*b* pivot and translate relative to the frame 20 and are stacked with one another such that the interior and exterior surfaces of the panels 30, 40*a*, 40*b* are substantially parallel with each other. In the operating open posture, the operating panel 30 pivots away from coplanarity with the secondary panels 40*a*, 40*b* while the secondary panels 40*a*, 40*b* remain coplanar with each other.

The frame 20 defines an opening 12 between the interior space and the exterior space and includes a top guide rail 22, a sill 24, a fixed jamb 26, and an operating jamb 28 that surround the opening 12. The top guide rail 22, the sill 24, the fixed jamb 26, and the operating jamb 28 may be conventional door jamb members. The top guide rail 22 forms a top edge of the opening 12. The sill 24 opposes the top guide rail 22 to form a bottom edge of the opening 12. The fixed jamb 26 interconnects the top guide rail 22 and the sill 24 to form a side edge of opening 12. The secondary panel 40*b* may be secure to the fixed jamb 26 by a hinge 27. The hinge 27 may be a conventional hinge. The operating jamb 28 interconnects the guide rail 22 and the sill 24, opposes the fixed jamb 26, and forms a side edge of the opening 12. The door panels 30, 40*a*, 40*b* may be traditional hinged door panels. The edges of door panels 30, 40*a*, 40*b* may be unmachined. The operating panel 30 may engage the operating jamb 28 with conventional door hardware, e.g., a doorknob or deadbolt. The operating panel 30 may define bores to operably receive conventional door hardware. The bores of the operating panel 30 may include a face bore, or more than one face bore, disposed through operating panel 30 to receive a doorknob or a deadbolt. Each face bore may be aligned with a cross bore or edge bore to receive the latch of the doorknob or the bolt of the deadbolt. The latch or the bolt may translate within the cross bore and engage the operating jamb 28. In some embodiments, the conventional lock hardware may be an electronic or programmable lock. For example, the programmable lock may be an ASSURE LOCK™ from YALE®.

With additional reference to FIGS. 64-68, the continuous hinge 3100, 3100' includes a first leaf 3110, a second leaf 3210, an upper pivot assembly 3300, 3300', and a lower pivot assembly 3400, 3400'. The upper pivot assembly 3300' and the lower pivot assembly 3400' are distinguished from the upper pivot assembly 3300 and the lower pivot assembly 3400 by the inclusion of a head 3313, 3413. The heads 3313, 3413 are configured to operably secure the door panel system 3010 to the frame 20 as described herein below. The continuous hinge 3100 may be a floating hinge that is free to move out of the frame 20 and the continuous hinge 3100' may be a support hinge that is confined within the frame 20 as shown in FIG. 62.

Continuing to refer to FIGS. 64-68, the first leaf 3110 is attached to an edge 42*b* of the secondary panel 40*b* and the second leaf 3210 is attached to an edge 42*a* of the secondary panel 40*a*. The first leaf 3110 and the second leaf 3210 are each attached to and extend along a majority of a respective edge 42*a*, 42*b*. The first leaf 3110 may have an uppermost end 3111 adjacent to a top surface of the secondary panel 40*b* and lowermost end adjacent to a bottom surface of the secondary panel 40*b*. The second leaf 3210 is similar to the first leaf 3110 with like elements represented with similar labels with the second leading number changed from the similar element of the first leaf 3110, e.g., the label "3110" referring to the first leaf and the label "3210" referring to the second leaf. Accordingly, the first leaf 3110 will be described in detail with only differences between the second leaf 3210 and first leaf 3110 detailed herein for reasons of brevity.

Figure 65:
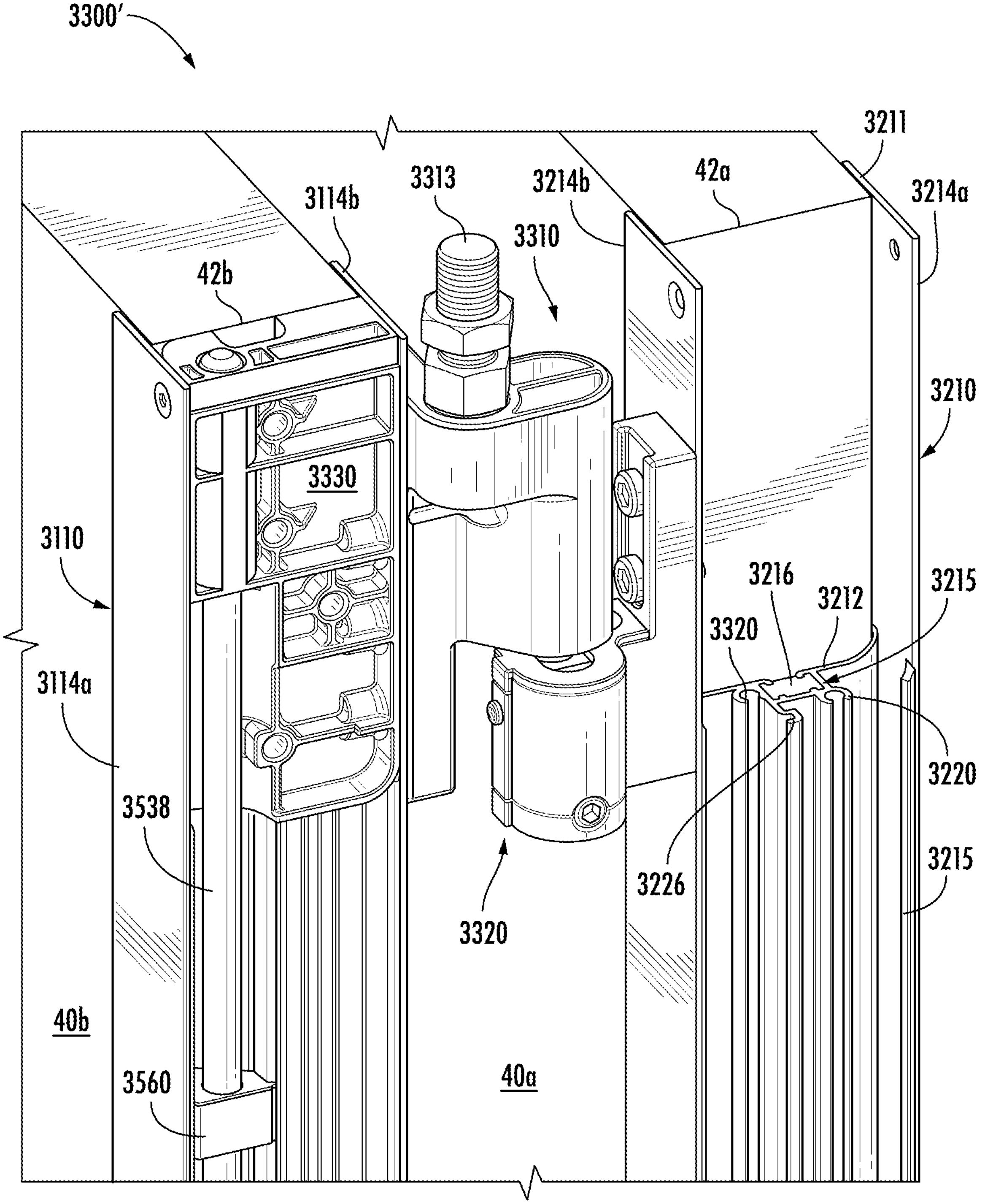
FIG. 65 is a perspective view of the upper pivot assembly of FIG. 64 with another trim and a pivot anchor of the continuous hinge removed.
Figure 68:
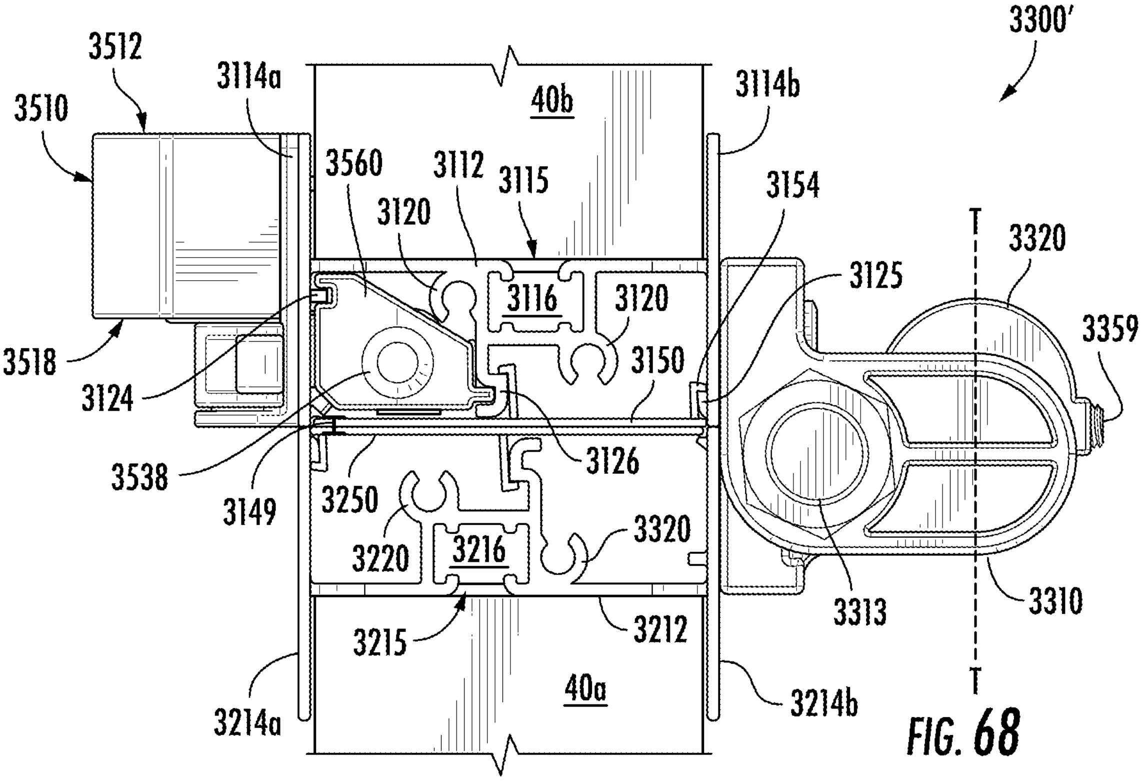
FIG. 68 is a top view of the upper pivot assembly of FIG. 67 with the pivot anchors removed.

With particular reference to FIG. 68, The first leaf 3110 includes an edge plate 3112 and a shell 3114. The edge plate 3112 of the first leaf 3110 is attached to the edge 42*b* of the secondary panel 40*b*. The shell 3114 includes a first or inside member 3114*a* and a second or outside member 3114*b* that are positioned on opposite sides of the edge plate 3112. The edge plate 3112 extends between the shell members 3114*a*, 3114*b* such that the first leaf 3110 has a substantially "I" or "H" shaped profile. The shell 3114 may have a length greater than a length of the edge plate 3112 such that when the first leaf 3110 is attached to the secondary panel 40*b* a portion of the edge 42*b* is exposed or not covered by the edge plate 3112 as shown in FIG. 65. The first leaf 3110 is attached to the edge 42*b* with a portion of the secondary panel 40*b* received between the shell members 3114*a*, 3114*b*.

The edge plate 3112 may be a continuous member extending between the shell members 3114*a*, 3114*b* or may be formed of two members that extend between the shell members 3114*a*, 3114*b*. The edge plate 3112 may define a cavity 3115. An insulative member 3116 may be disposed within the cavity 3115 to form a thermal break between the shell members 3114*a*, 3114*b*. The insulative member 3116 may prevent or reduce heat transfer across the first leaf 3110. For example, when the door panel system 3010 is installed in the frame 20 as an exterior door system the insulative member 3116 may reduce heat transfer from the exterior to the interior or vice versa.

With particular reference to FIGS. 65 and 68, the edge plate 3112 includes pivot anchor attachments 3120 that provide for attachment of a pivot anchor 3330 to the first leaf 3110. The pivot anchor attachments 3120 extend from the edge plate 3112 away from the edge 42*b*. The pivot anchor attachments 3120 may extend directly from the edge plate 3112 or may be offset from the edge plate 3112. The pivot anchor attachments 3120 may operably receive a fastener, e.g., a screw, to secure a pivot anchor 3330 thereto.

The first leaf 3110 may have a rib 3124, a snap ridge 3125, and an attachment member 3126 protruding from the shell members 3114*a*, 3114*b*, or the edge plate 3112. The rib 3124 and the attachment member 3126 provide attachment points for at least one shoot bolt guide 3560 and a trim 3150. The trim 3150 includes flexible snaps or pawl members 3154 that engage the snap ridge 3125 and the attachment member 3126 to secure the trim 3150 to the first leaf 3110. Additionally or alternatively, the trim 3150 may attach to the continuous hinge 3100, 3100' by fasteners, adhesives, or magnets. The trim 3150 may also include weather stripping (not shown) to contact the trim 3250 of the second leaf 3210 to form a weather resistant seal between the first leaf 3110 and the second leaf 3210. When the door panel system 3010 is in the closed posture, the trim 3150 of the first leaf 3110 and the trim 3250 of the second leaf 3210 engage each other to form a weather resistant seal between respective panels 30, 40*a*, 40*b*.

Figure 69:
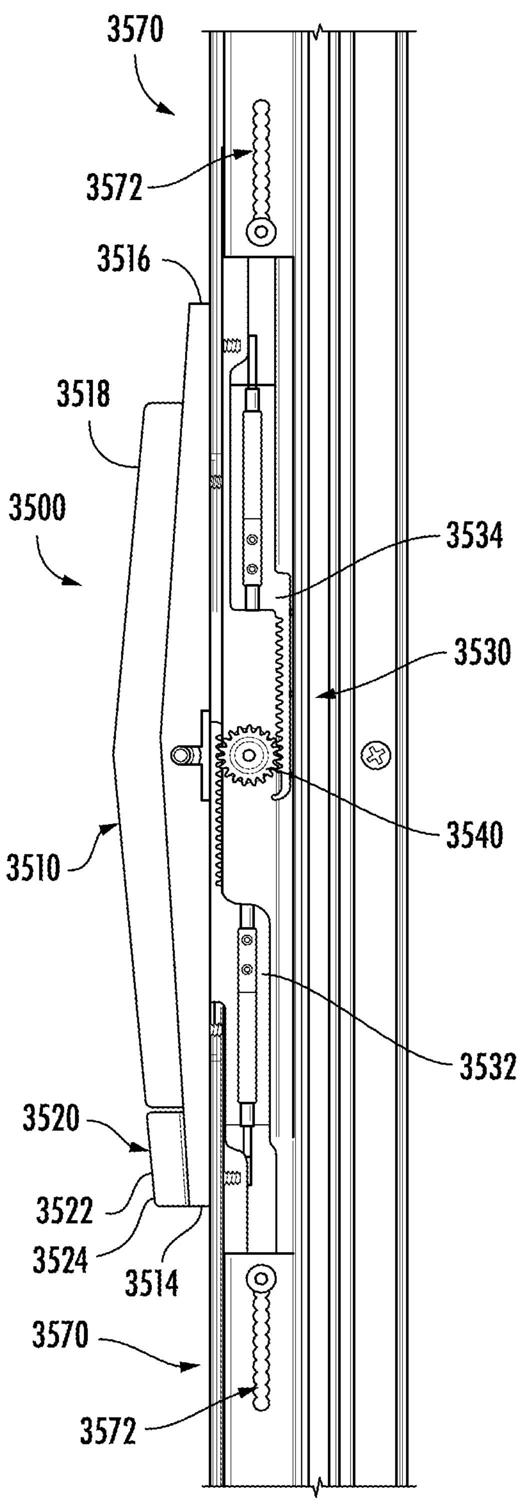
FIG. 69 is a side view of a handle assembly in a locked state thereof and a portion of a panel locking mechanism in a locked configuration thereof.
Figure 70:
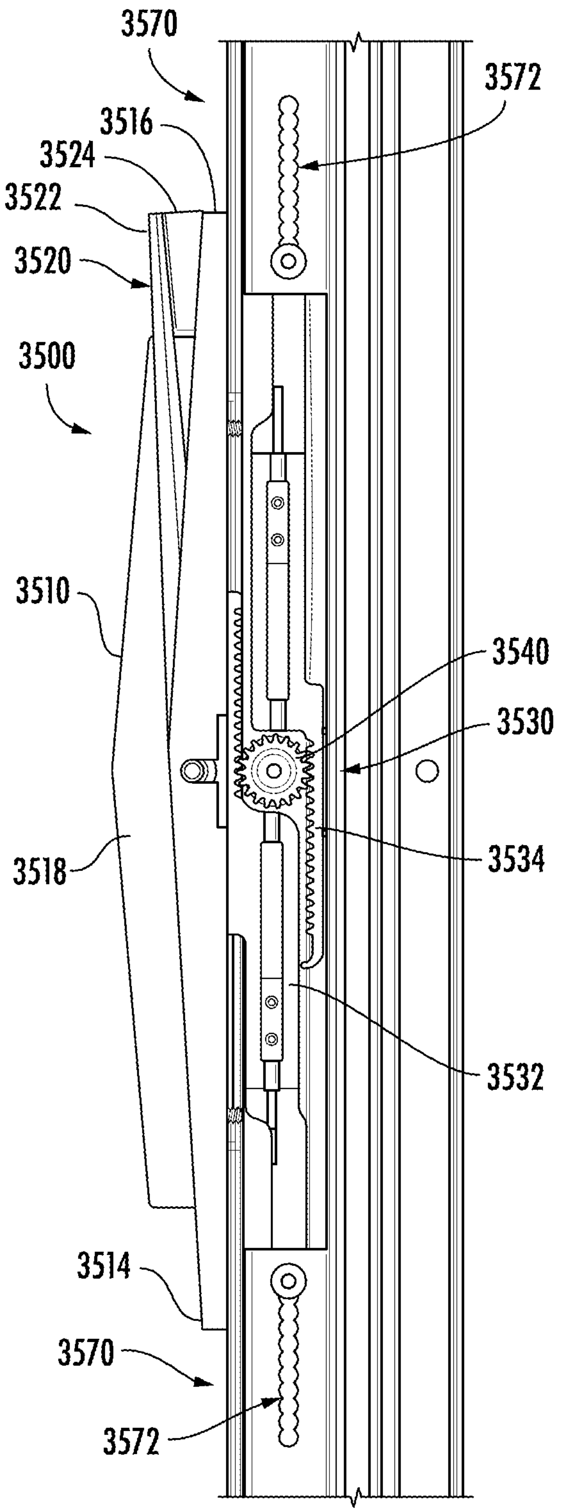
FIG. 70 is a side view of the handle assembly of FIG. 69 in an unlocked state thereof and the portion of the panel locking mechanism of FIG. 69 in an unlocked configuration thereof.
Figure 71:
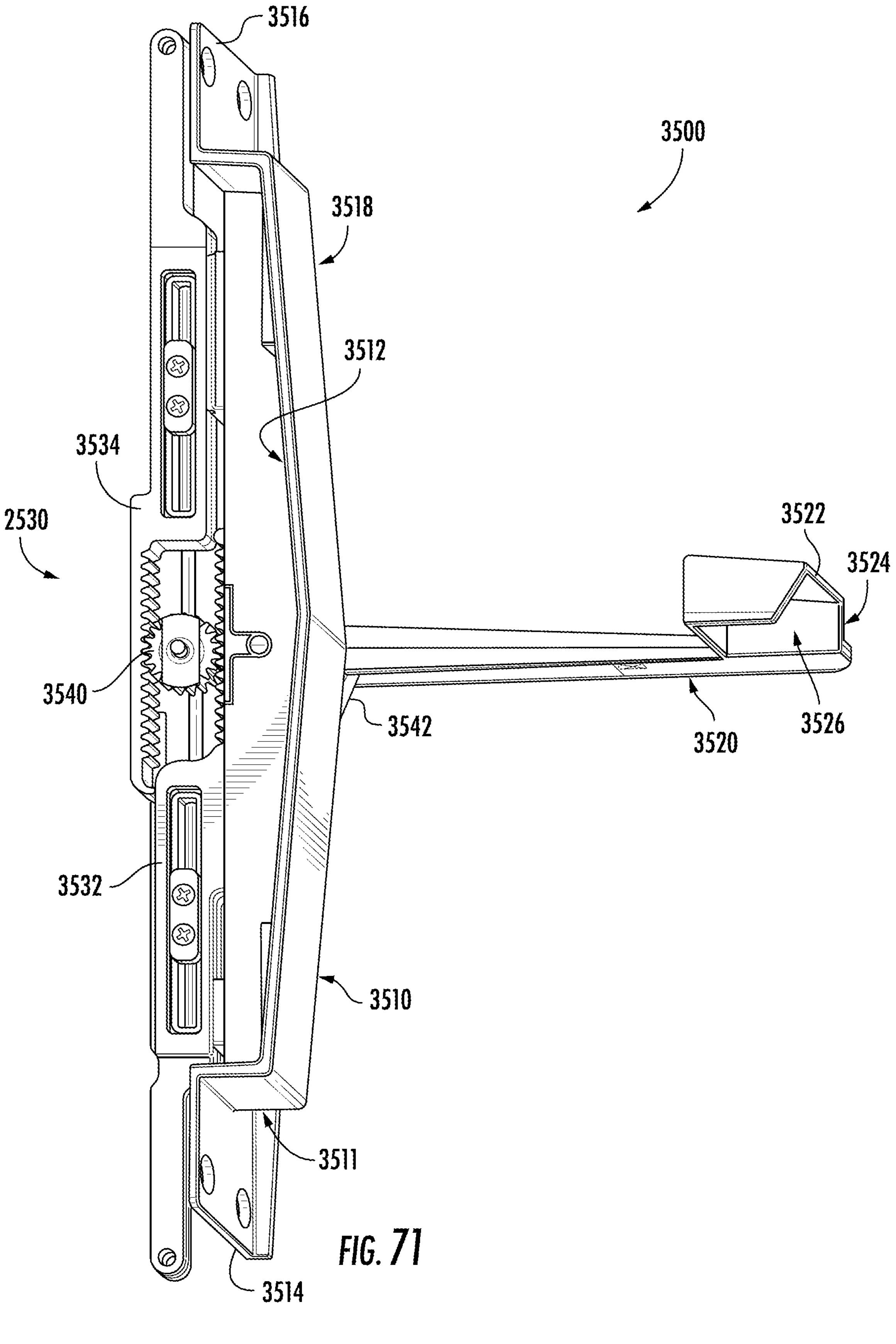
FIG. 71 is a detail perspective view of the handle assembly of FIG. 69 between the locked state and the unlocked states thereof and the portion of the panel locking mechanism of FIG. 69 between the locked and unlocked configurations thereof.

Referring to FIGS. 69-71, a handle assembly 3500 is disclosed in accordance with the present disclosure. The handle assembly 3500 transitions a panel locking mechanism 3530 between a locked configuration and an unlocked configuration thereof. In some embodiments, the handle assembly 3500 may transition the door panel system 3010 between the fully open posture and the closed posture. The handle assembly 3500 includes a handle 3510 and a lock lever 3520. The handle 3510 may attach directly to an interior side of the secondary panel 40*b* or may attach to the first leaf 3110 as part of the continuous hinge 3100, 3100'. The handle 3510 may be secured to the leaf 3110 at a first end segment 3514 and a second end segment 3516. The first end segment 3514 and the second end segment 3516 of the handle 3510 may dispose at opposite ends of the handle assembly 3500. The handle 3510 may define a finger well 3512 between the handle 3510 and the first leaf 3110 or between the handle 3510 and the secondary panel 40*a*, 40*b*. The finger well 3512 may allow a user to move the secondary panels 40*a*, 40*b* towards the closed posture or the fully open posture.

The lock lever 3520 connects to the panel locking mechanism 3530 to simultaneously actuate the bottom shoot bolt 3536 and the top shoot bolt 3538 of the panel locking mechanism 3530. The lock lever 3520 may pivot between an unlocked state (FIG. 69) that corresponds to a locked configuration of the locking mechanism 3530 and a locked state (FIG. 70) that corresponds to an unlocked configuration of the locking mechanism 3530. In the locked configuration, the shoot bolts 3536, 3538 extend from the top and bottom edge of the door panel system 3010 (FIG. 72) to engage the frame 20 and prevent the door panel system 3010 from moving from the closed posture towards the fully opened position. In the unlocked configuration, the shoot bolts 3536, 3538 are withdrawn within the door panel system 3010 such that tips of the shoot bolts 3536, 3538 are within the extremities of the first leaf 3110 (FIG. 64) and are disengaged from the frame 20 to allow the door panel system 3010 to move from the closed posture towards the fully open posture. The shoot bolt guides 3560 are slidingly attached to the rib 3124 and the attachment member 3126 to retain and guide the shoot bolts 3536, 3538 within the first leaf 3110 as the shoot bolts 3536, 3538 translate between the locked configuration and the unlocked configuration. In embodiments, an end portion 3522 of the lock lever 3520 may provide visual indication that the locking mechanism 3530 is in the locked state. For example, in the locked state the end portion 3522 of the lock lever 3520 may match the profile of the handle 3510 and in the unlocked state the end portion 3522 of the lock lever 3520 may project outwardly and disrupt the visual profile of the handle 3510 as shown in FIGS. 69 and 70. The handle 3510 may have a handle side surface 3518. The handle side surface 3518 may extend away from the first leaf 3110 perpendicularly. The lock lever 3520 may have a lock lever surface 3524 that extends along a length of the lock lever 3520. The lock lever surface 3524 may be parallel to the handle side surface 3518. When the lock lever 3520 is in the locked state and the unlocked state the lever side surface 3524 may be positioned congruent to the handle side surface 3518 as shown in FIGS. 69 and 70. The handle 3510 may have an interior surface 3511 that extend from the first end segment 3514 to the second end segment 3516. The lock lever 3520 may have an interior surface 3526. The interior surface 3526 of the lock lever 3520 may be congruent with the interior surface 3511 of the handle 3510 when the lock lever 3520 is in the locked state or the unlocked state. In embodiments, the interior surface 3526 of the lock lever 3520 may be congruent with the interior surface 3511 of the handle 3510 in only one of the locked state or the unlocked state. In such embodiments, interior surface 3526 of the lock lever 3520 may be non-congruent with the interior surface 3511 of the handle 3510 in the other of the locked state or the unlocked state.

With particular reference to FIG. 71, the panel locking mechanism 3530 includes a bottom shoot bolt rack 3532, a top shoot bolt rack 3534, a rack gear 3540, the bottom shoot bolt 3536, and the top shoot bolt 3538. The panel locking mechanism 3530 simultaneously transitions the shoot bolts 3536, 3538 between the locked and unlocked configurations as the lock lever 3520 pivots between the locked and unlocked states. The lock lever 3520 attaches to the bottom shoot bolt rack 3532 via a drive link 3542. The drive link 3542 translates the bottom shoot bolt rack 3532 downward toward the locked configuration in response to pivoting of the lock lever 3520 from the unlocked state to the locked state. The rack gear 3540 is positioned between and is meshingly engaged with both the bottom shoot bolt rack 3532 and the top shoot bolt rack 3534. As described above, pivoting of the lock lever 3520 translates the bottom shoot bolt rack 3532 and, in turn, rotates the rack gear 3540. Rotation of the rack gear 3540 simultaneously translates the top shoot bolt rack 3534 upward toward the locked configuration. Alternatively, the lock lever 3520 may attach to the top shoot bolt rack 3532 via the drive link 3542 such that the lock lever 3520 directly translates the top shoot bolt rack 3534, which is meshingly engaged with the rack gear 3540, to simultaneously translate the bottom shoot bolt rack 3532 in the opposite direction. In some embodiments, the shoot bolt racks 3532, 3534 may back drive the lock lever 3520. In certain embodiments, the shoot bolt assembly 2530 may include an anti-back drive mechanism to prevent the shoot bolt racks 3532, 3534 from back driving the lock lever 3520.

Figure 72:
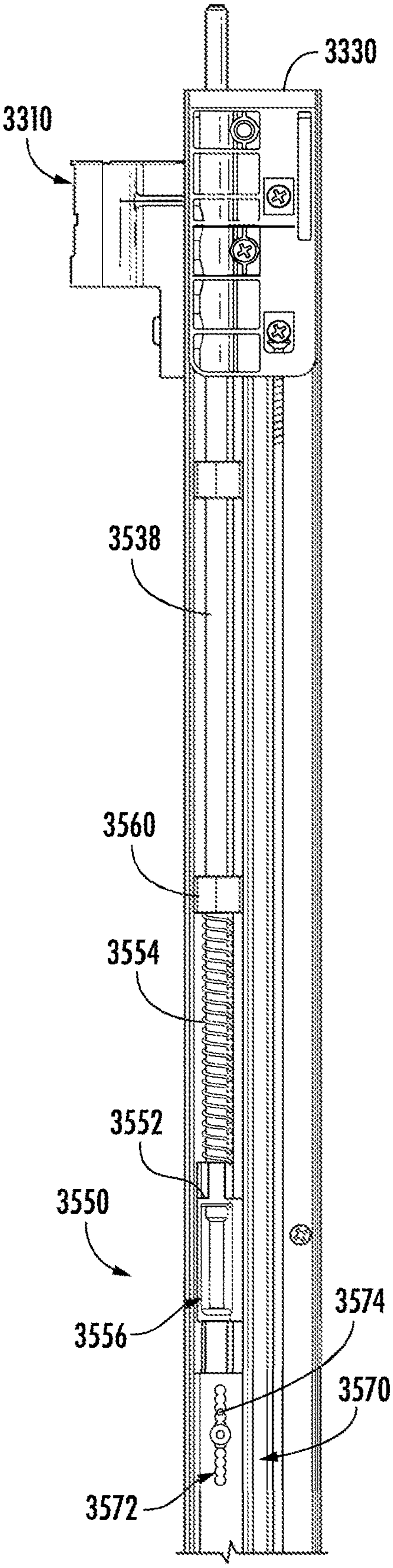
FIG. 72 is a side view of another portion of the panel locking mechanism of FIG. 69 having an anti-jamb mechanism.
Figure 73:
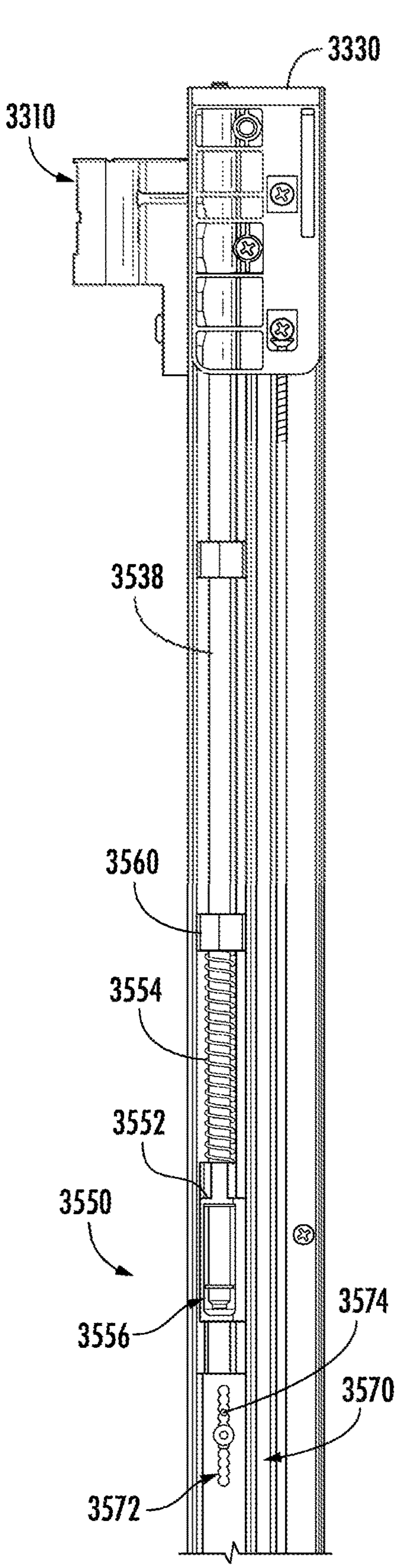
FIG. 73 is a side view of the panel locking mechanism of FIG. 72 with the anti-jamb mechanism in a retracted position thereof.

Referring to FIGS. 72 and 73, the panel locking mechanism 3530 includes an anti-jam mechanism 3550 to reduce the risk of damage to the shoot bolts 3536, 3538 as the shoot boots 3536, 3538 transition from the unlocked configuration to the locked configuration. The anti-jam mechanism 3550 may allow the panel locking mechanism 3530 to move from the unlocked configuration to the locked configuration with one or both of the shoot bolts 3536, 3538 remaining in a retracted configuration (FIG. 73). Specifically, the anti-jam mechanism 3550 may allow one or both of the shoot bolts 3536, 3538 to remain in a retracted configuration when the remainder of the panel locking mechanism 3530 is in the locked configuration. In addition, the anti-jam mechanism 3550 may extend the one or more shoot bolts 3536, 3538 from the retracted configuration to the locked configuration. For example, when transitioning the panel locking mechanism 3530 to the locked configuration the shoot bolts 3536, 3538 may be misaligned with a shoot bolt receptacle 3762 (FIG. 84) that receives the shoot bolts 3536, 3538 in the locked configuration thereof. In such cases, one or both of the shoot bolts 3536, 3538 may contact the frame 20, e.g., the sill 24, and may be prevented from moving toward the locked or extended configuration such that the one or both of shoot bolts 3536, 3538 may remain in a retracted position. Once the shoot bolts 3536, 3538 aligns with the shoot bolt receptacle 3762, the anti-jam mechanism 3550 may extend the shoot bolts 3536, 3538 into the shoot bolt receptacle 3762 and into the locked configuration.

The anti-jam mechanism 3550 includes a bolt holder 3552 and a spring 3554. The bolt holder 3552 defines a socket 3556. The bolt holder 3552 is operably secured to the bottom shoot bolt rack 3532 or the top shoot bolt rack 3534 and translates with the shoot bolt rack 3532, 3534 as the shoot bolt racks 3532, 3534 translate between the locked and unlocked configurations. The socket 3556 receives a portion of the shoot bolts 3536, 3538 to movably secure the shoot bolts 3536, 3538 within the socket 3556. The spring 3554 biases the shoot bolts 3536, 3568 toward the locked configuration. The spring 3554 may be a coil spring disposed about the shoot bolts 3536, 3538. The spring 3554 is disposed between the bolt holder 3552 and a shoot bolt guide 3560.

Referring to FIGS. 69, 70, 72, and 73, the bottom and top shoot bolt racks 3532, 3534 may include a throw adjustment mechanism 3570 to increase or decrease the throw of the shoot bolts 3536, 3538. The throw is the distance that the shoot bolts 3536, 3538 extend from the top or bottom edge of the secondary door panel 40*b* in the locked configuration. The throw adjustment mechanism 3570 may act as a linkage operably connecting the shoot bolts 3536, 3538 and the top and bottom shoot bolt racks 3532, 3534. The throw adjustment mechanism 3570 may connect the shoot bolt racks 3532, 3534 and the anti-jam mechanism 3550. The throw adjustment mechanism 3570 defines a plurality of ports 3572. The ports 3572 are disposed longitudinally along a first end segment and a second end segment of the throw adjustment mechanism 3570. The shoot bolts 3536, 3538, or the anti-jam mechanism 3550, may fasten to the throw adjustment mechanism 3570 through one of the ports 3572 defined in the first end segment. The shoot bolt racks 3532, 3534 may fasten to the throw adjustment mechanism 3570 through a port 3572 defined in the second end segment of the throw adjustment mechanism 3570. The throw may be adjusted by fastening the shoot bolts 3536, 3538 through a port 3572 located closer or further from the handle assembly 3500. For example, fastening the shoot bolts 3536, 3538 through a port 3572 closer to the handle assembly 3500 may shorten the throw and fastening the shoot bolts 3536, 3538 through a port 3572 further from the handle assembly 3500 may increase the throw. The plurality of ports 3572 may be spaced apart in 0.125-inch increments. The throw of the shoot bolts 3536, 3538, may be adjusted in a range of 0.25 inches to 1 inch by 0.0625-inch increments.

With particular reference to FIGS. 72 and 73, the throw adjustment mechanism 3570 may have two adjustment holes or points 3574 that allow for fastening the of the shoot bolts 3536, 3538 at increments that are half of the distance between the ports 3572. For example, as shown in FIGS. 72 and 73, an adjustment screw is received in a first adjustment point 3574 such that selecting when the adjustment screw is received in the first adjustment point 3574 each throw adjustment mechanism 3570 may be adjusted in increments of 0.125 inches by securing the adjustment screw through another port 3572. The throw adjustment mechanism 3570 may have a second adjustment hole or point 3574 that is offset from the first adjustment 3574 by a distance including a X.5 distance between the ports 3572. Continuing the example above, the second adjustment point 3574 may be 2.5 times the distance between the ports 3572 or 0.3125 inches. Thus, when the adjustment screw is received in the second adjustment point 3574 through a port 3572, the distance of may be half the distance between the ports 3572, e.g., 0.625 inches. As such, the throw adjustment mechanism 3570 can be adjusted by increments of 0.0625 inches when the ports 3572 are spaced apart by 0.125 inches.

Referring to FIGS. 74-80, the upper pivot assembly 3300 of the continuous hinge 3100, 3100' is described in accordance with embodiments of the present disclosure. As detailed above, the continuous hinge 3100, 3100' has an upper pivot assembly 3300, 3300' and a lower pivot assembly 3400, 3400'. The upper pivot assembly 3300' and the lower pivot assembly 3400' are distinguished from the upper pivot assembly 3300 and the lower pivot assembly 3400 by the inclusion of a head 3313, 3413. The heads 3313, 3413 are configured to operably secure the door panel system 3010 to the frame 20. The continuous hinge 3100 may be a floating hinge that is free to move out of the frame 20 and the continuous hinge 3100' may be a support hinge that is confined within the frame 20. The pivot assemblies 3300, 3400 pivotally couple the door panels 30, 40*a*, 40*b* relative to one another. Specifically, the upper pivot assembly 3300 and the lower pivot assembly 3400 pivot the continuous hinge 3100, 3100' between a closed position and an open position. The closed position of the continuous hinge 3100, 3100' corresponds the closed posture of the door panels 30, 40*a*, 40*b*. In the closed position, the shell members 3114*a*, 3214*a* of the leaves 3110, 3210 are substantially coplanar with one another and, thus, the door panels 30, 40*a*, 40*b* are in the closed posture. The open position of the continuous hinge 3100, 3100' corresponds to the fully open posture or the operating open posture of the panels 30, 40*a*, 40*b*. In the open position, the shell members 3114, 3214 of the leaves 3110, 3210 pivot and stack relative to each other and, thus, the door panels 30, 40*a*, 40*b* are in the fully open or operating open posture.

The upper and lower pivot assemblies 3300, 3400 each include a pair of pivot anchors 3330, a pin knuckle 3310, and a receiver knuckle 3320. For brevity, only the upper pivot assembly 3300, 3300' will be described in detail with like elements of the lower pivot assembly 3400, 3400' represented with a similar label with only the second leading number changed from the similar element of the upper pivot assembly 3300, e.g., 3310 referring to the upper pin knuckle of the upper pivot assembly 3300 and 3410 referring to the lower pin knuckle of the lower pivot assembly 3400.

Figure 67:
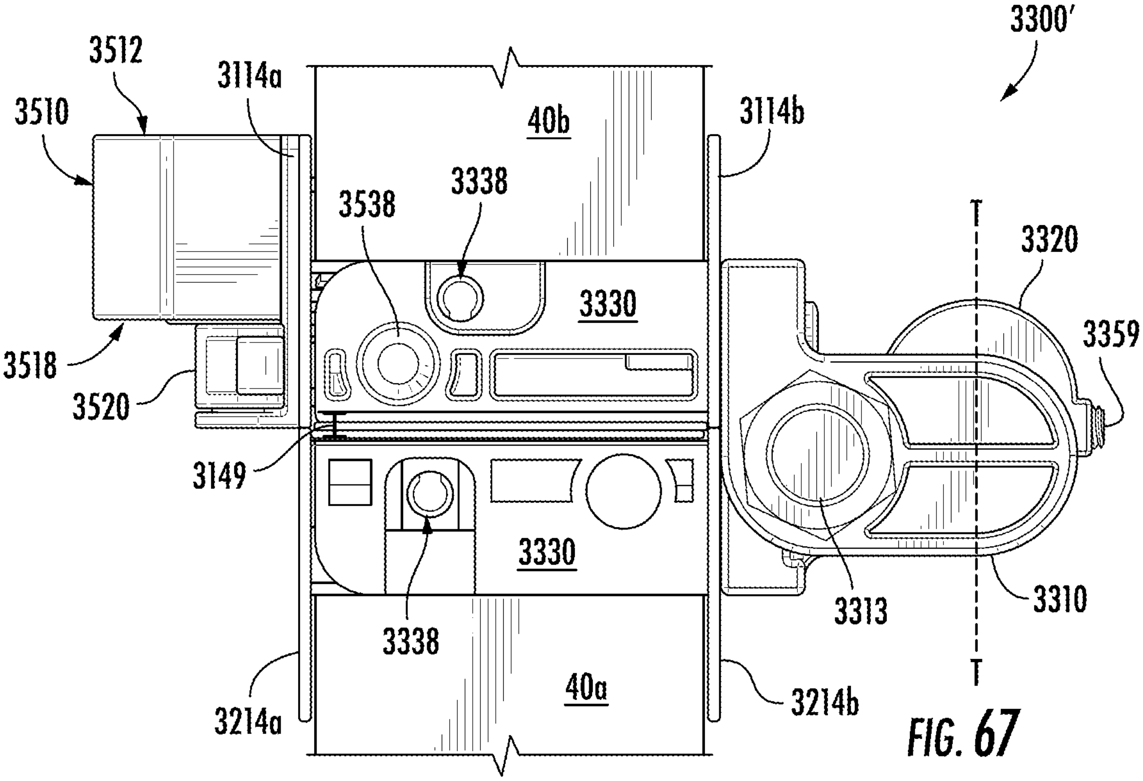
FIG. 67 is a top view of the upper pivot assembly of FIG. 66 with the door panel system in the fully closed position thereof.
Figure 74:
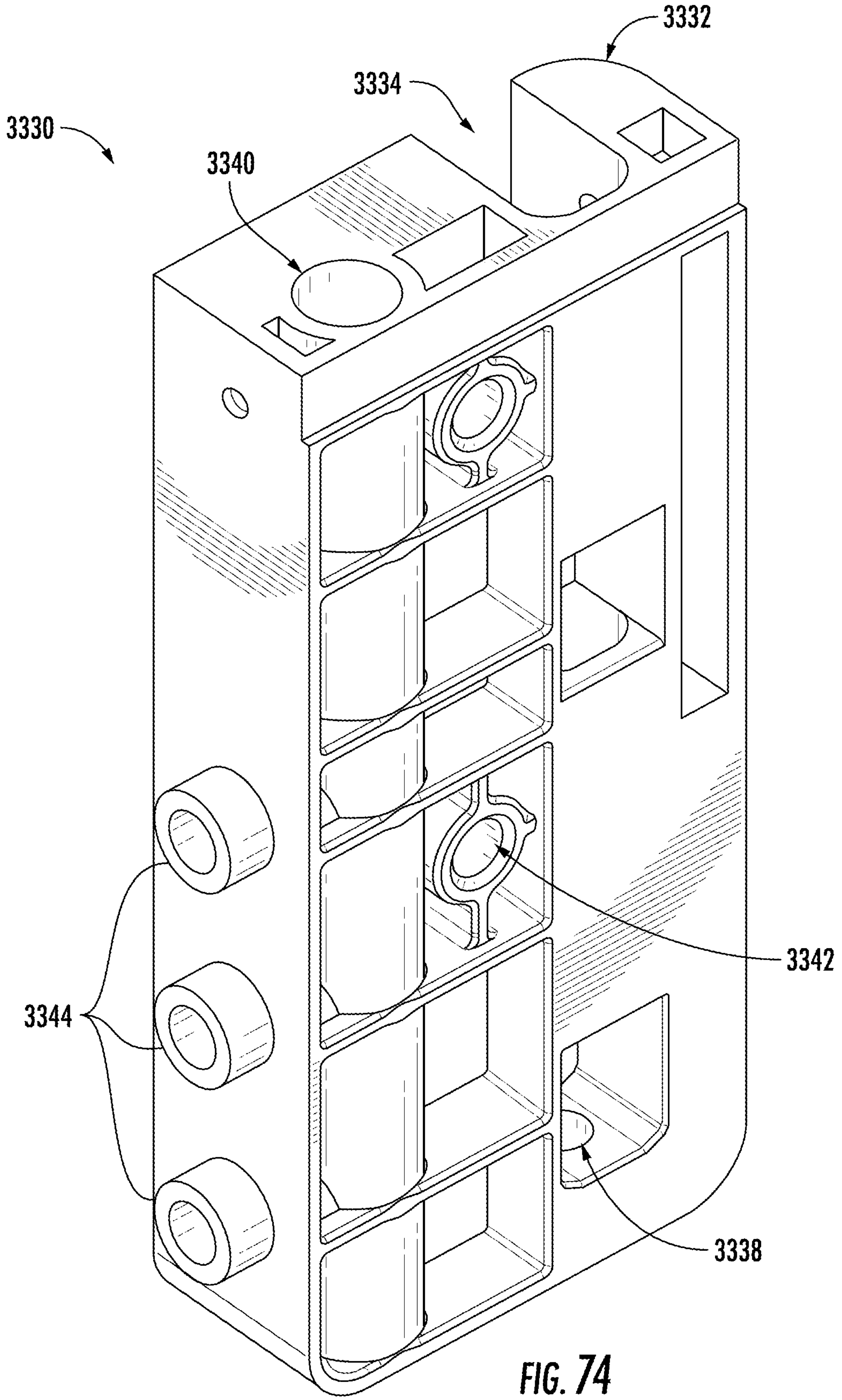
FIG. 74 is a perspective view of a pivot anchor of the upper pivot assembly of FIG. 64.

With particular reference to FIG. 74, the pivot anchors 3330 are described in accordance with embodiments of the present disclosure. The upper pivot assembly 3300 includes a first pivot anchor 3330 that is attached to the edge 42*b* between the shell members 3114*a*, 3114*b* of the first leaf 3110 to secure the upper pivot assembly 3300 to the secondary panel 40*b*. The other or second pivot anchor 3330 attaches to the edge 42*a* of the secondary panel 40*a* between the shell members 3214*a*, 3214*b* of the second leaf 3200 to secure the upper pivot assembly 3300 to the secondary panel 40*a*. The pivot anchors 3330 provide attachment points for the upper pivot assembly 3300 to pivotally couple the secondary panels 40*a*, 40*b* relative to one another. Individual pivot anchors 3330 may be modified or varied based on the position or rotation of the respective pivot anchor 3330 in the door panel system 3010. For example, a pivot anchor 3330 may define a tool channel 3334 that aligns with one of the pivot anchor attachments 3120 as shown in FIG. 67.

Continuing to refer to FIG. 74, the pivot anchor 3330 defines a leaf attachment hole 3338 that aligns with a pivot anchor attachment 3120 to secure the pivot anchor 3330 to the edge plate 3112. The pivot anchor 3330 may define a tool channel 3334 that extends partially through the pivot anchor 3330 such that the tool channel 3334 allows a tool to access fasteners coupling the pivot anchor 3330 through the leaf attachment hole 3338 to the first leaf 3110. The pivot anchor 3330 defines door panel attachment holes 3342 to fasten the pivot anchor 3330 directly to the edge 42*b* of the secondary panel 40*b*.

The pivot anchor 3330 includes one or more alignment studs 3344 that protrude from the pivot anchor 3330. The alignment studs 3344 may extend through the shell members 3114*a*, 3114*b* adjacent to the uppermost end 3111 of the first leaf 3110. The pivot anchor 3330, may have a radiused edge 3332 to aid in assembly of the continuous hinge 3100, 3100'. The radiused edge 3332 may allow clearance between the pivot anchor 3330 and the shell 3114 during assembly. The pivot anchor 3330 defines a shoot bolt hole 3340 to allow and guide actuation of the shoot bolts 3536, 3538 between the locked and unlocked configurations through the shoot bolt hole 3340. The pin knuckle 3310 and a receiver knuckle 3320 of the upper pivot assembly 3300 are secured to a respective pivot anchor 3330 and a respective leaf 3110, 3210 as shown in FIG. 67.

Figure 66:
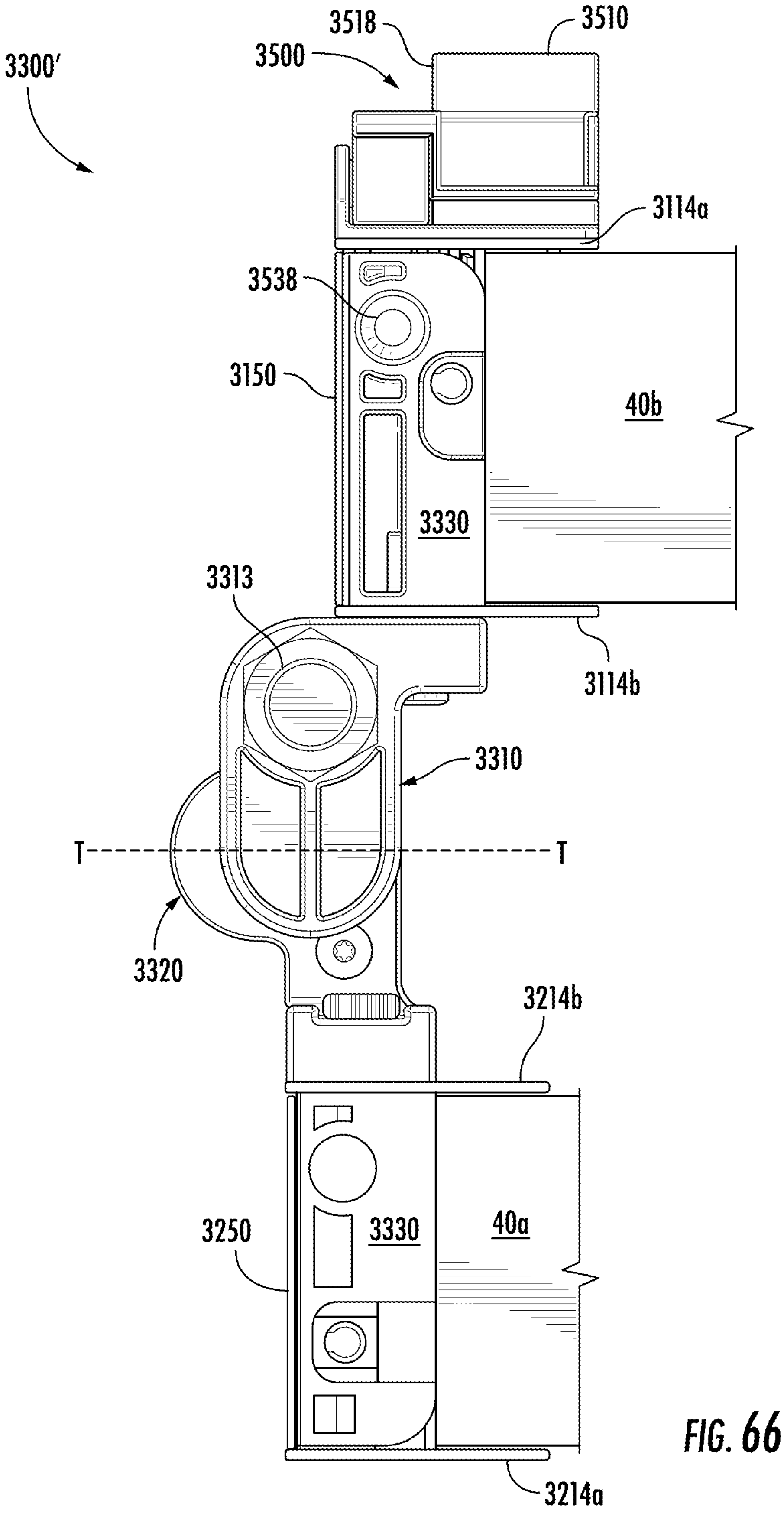
FIG. 66 is a top view of the upper pivot assembly of FIG. 64.
Figure 75:
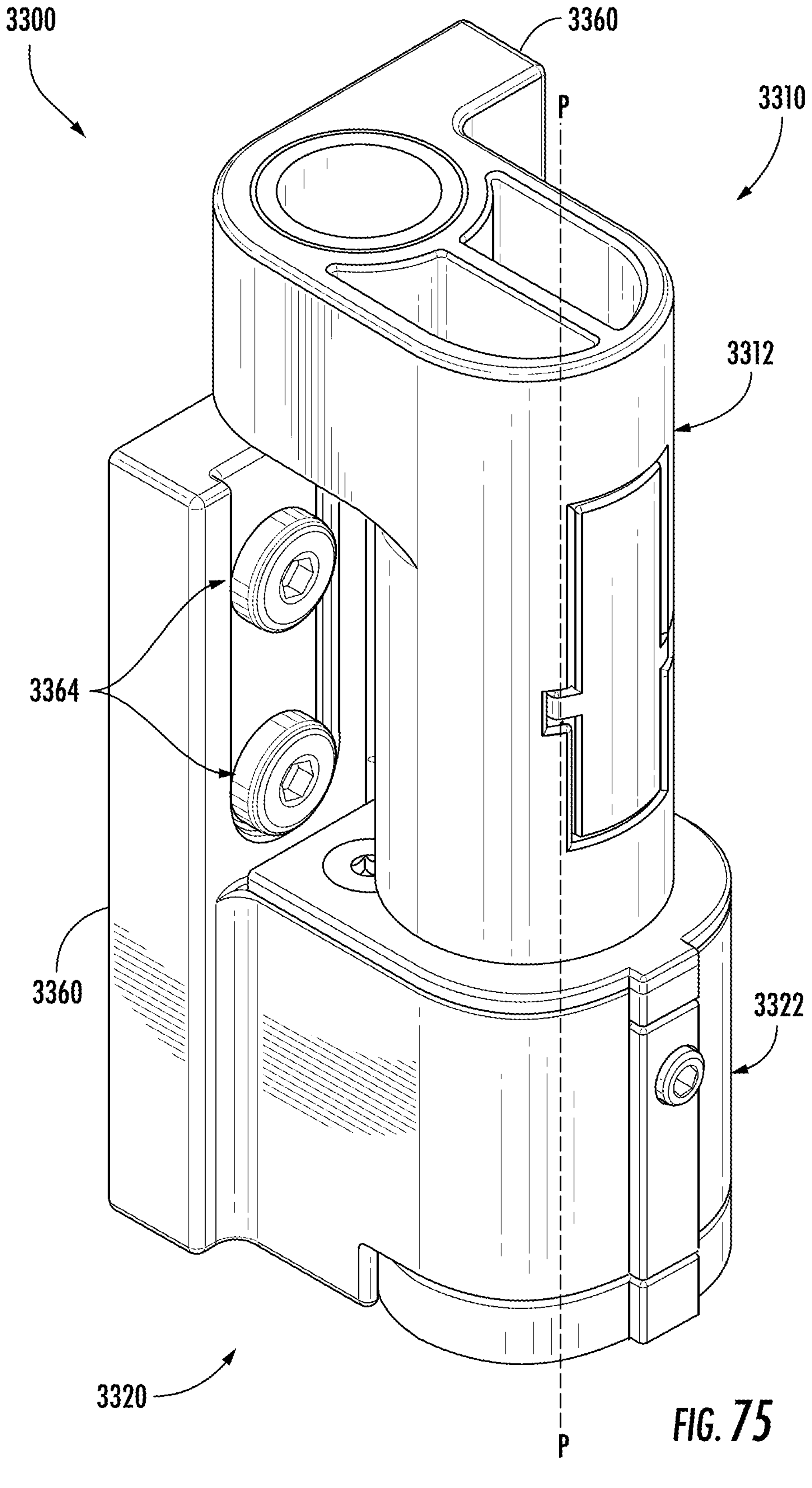
FIG. 75 is a perspective view of a portion of the pivot assembly of FIG. 64 having a pin knuckle and a receiver knuckle.

Referring now to FIG. 75, the upper pivot assembly 3300 is shown in accordance with embodiments of the present disclosure. The pin knuckle 3310 has a pin knuckle body 3312 and the receiver knuckle 3320 has a receiver knuckle body 3322. Both the pin knuckle body 3312 and the receiver knuckle body 3322 have a connection plate 3360. The connection plate 3360 defines alignment holes 3364. The alignment holes 3364 may be reverse counterbore holes to receive a fastener, as shown, with the counterbore defined on the reverse side of the connection plate 3360 to receive the alignment studs 3344. The alignment studs 3344 of the pivot anchor 3330 correspond with and are received in respective alignment holes 3364 of the connection plates 3360 to align the pivot knuckles 3310, 3320 with the respective pivot anchor 3330. When the upper pivot assembly 3300 is in the closed position the reverse side of the connection plate 3360 of the pin knuckle body 3312 and the reverse side of the connection plate 3360 of the receiver knuckle body 3322 may be aligned so as to be coplanar with each other as shown in FIGS. 75 and 67. In the open position, the connection plate 3360 of the pin knuckle body 3312 and the connection plate of the receiver knuckle body 3322 may be opposed to each other as shown in FIG. 66. In the open position, the connection plate 3360 of the of the pin knuckle body 3312 and the connection plate of the receiver knuckle body 3322 may have a constant distant from each other. In other words, adjustment of the gap 3149 may not change the distance between the connection plates 3360 in the open position, or the panels 30, 40*a*, 40*b* in the fully open posture. The shell members 2114*a* and 2214*b* may be disposed between the connection plates 3360 and the pivot anchor 3330. A pivot pin 3311 (FIG. 64) pivotally couples the pin knuckle 3310 to the receiver knuckle 3320. The pivot pin 3311 defines a pivot axis P-P that passes through a central longitudinal axis of the pivot pin 3311. The pivot pin 3311 may be a cylindrical pin.

Figure 76:
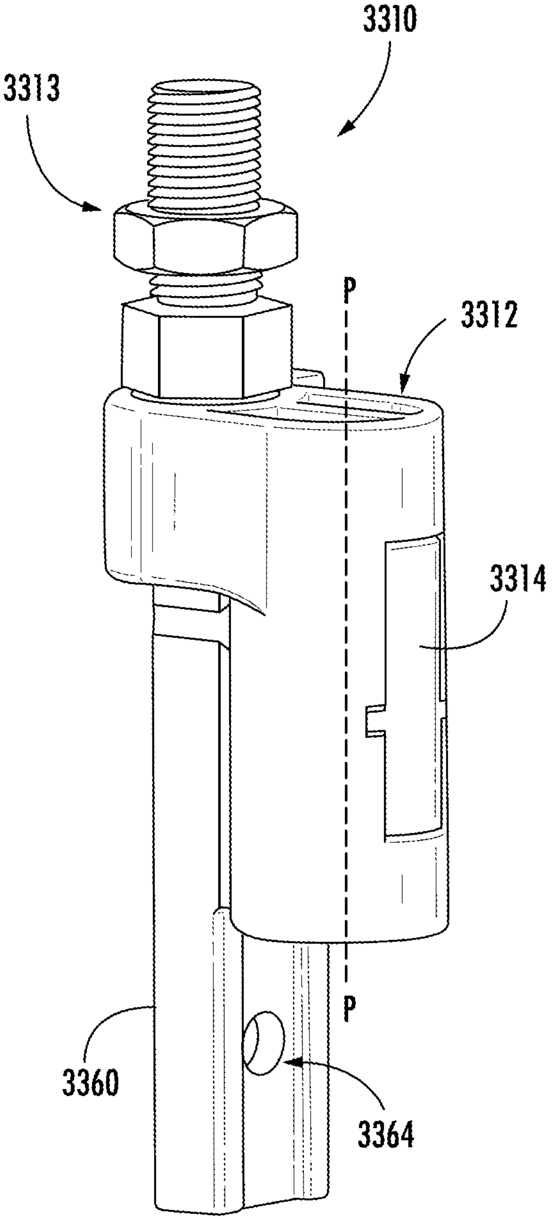
FIG. 76 is a perspective view of the pin knuckle of FIG. 75.
Figure 77:
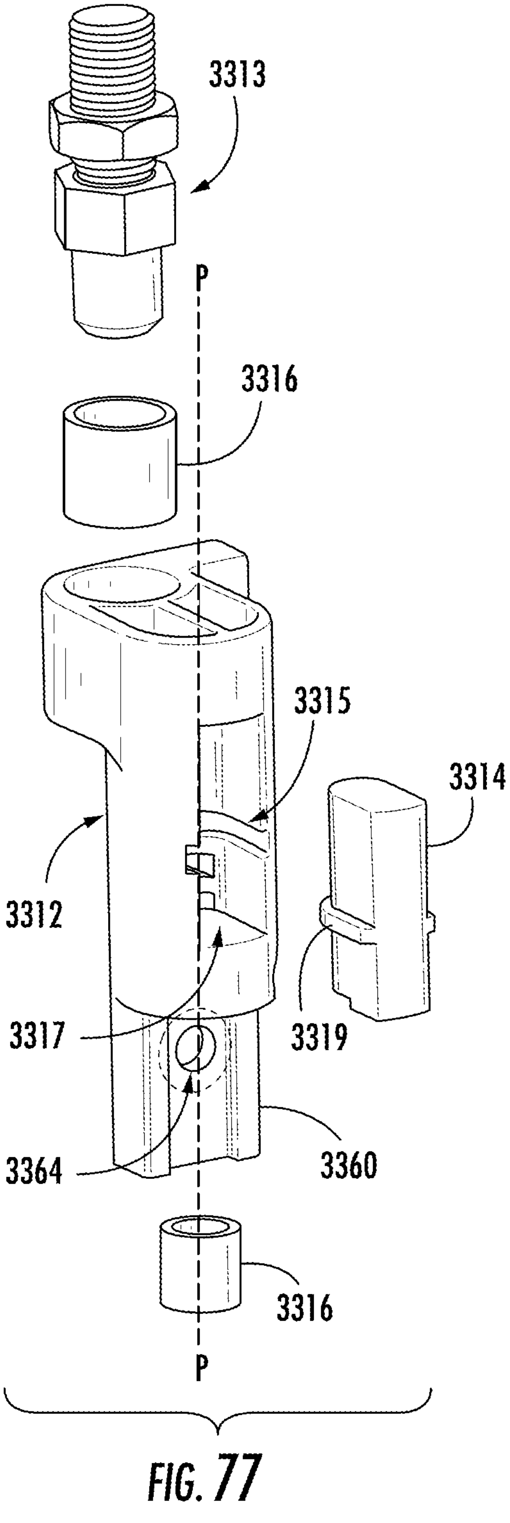
FIG. 77 is an exploded view, with parts separated, of the pin knuckle of FIG. 76 illustrating parts thereof.
Figure 81:
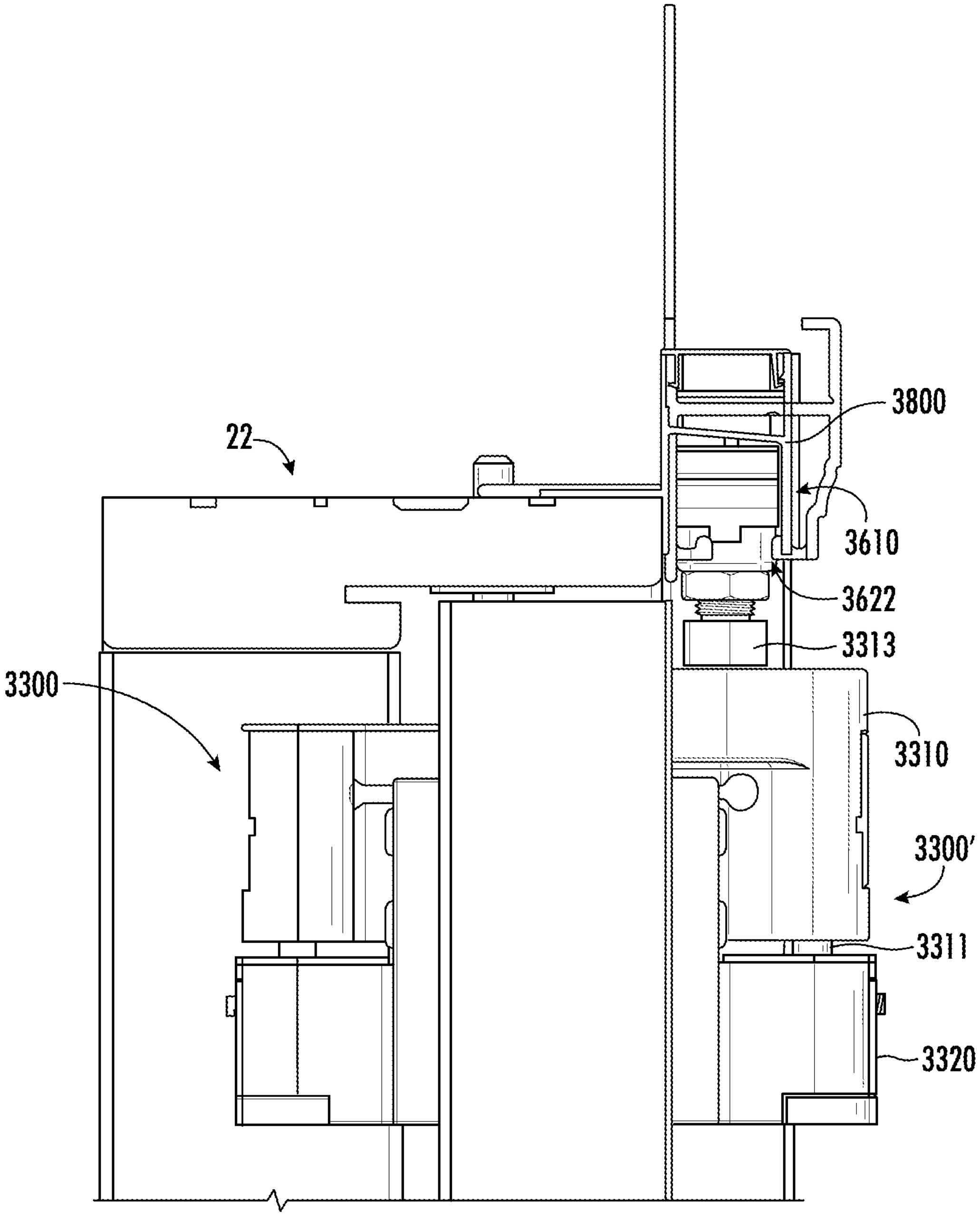
FIG. 81 is a cross-sectional view showing an upper track and guide assembly of the door panel system of FIG. 61 along line 81-81.

With additional reference to FIGS. 76 and 77, the pin knuckle 3310 includes the pin knuckle body 3312 and a knuckle plug 3314. The knuckle plug 3314 retains the pivot pin 3311 in the pin knuckle body 3312. The pin knuckle body 3312 defines a groove 3315 and the knuckle plug 3314 has a corresponding lip 3319 to align the knuckle plug 3314 and pin knuckle body 3312 relative to one another. The pin knuckle body 3312 defines a cavity 3317 to receive the pivot pin 3311. The pin knuckle 3310 may include bearings or bushings 3316 to assist rotational motion relative the receiver knuckle 3320 and the frame 20, e.g., to prevent binding of the pin knuckle 3310 relative to the receiver knuckle 3320. The knuckle plug 3314 may differ based upon its position in the door panel system 3010. For example, where the door panel system 3010 connects with the frame 20. As shown in FIGS. 76 and 77, the pin knuckle 3310 may include a head 3313 to couple the upper pivot assembly 3300' to a guide assembly 3610 that movably retains the door panel system 3010 to the frame 20. The head 3313 may also allow for vertical adjustment of the door panel system 3010 within respect to the frame 20. In some embodiments, the upper pivot assembly 3300 floats and does not connect to a guide assembly 3610 as shown in FIG. 81. In such embodiments, the head 3313 may be omitted from the pin knuckle 3310.

Figure 78:
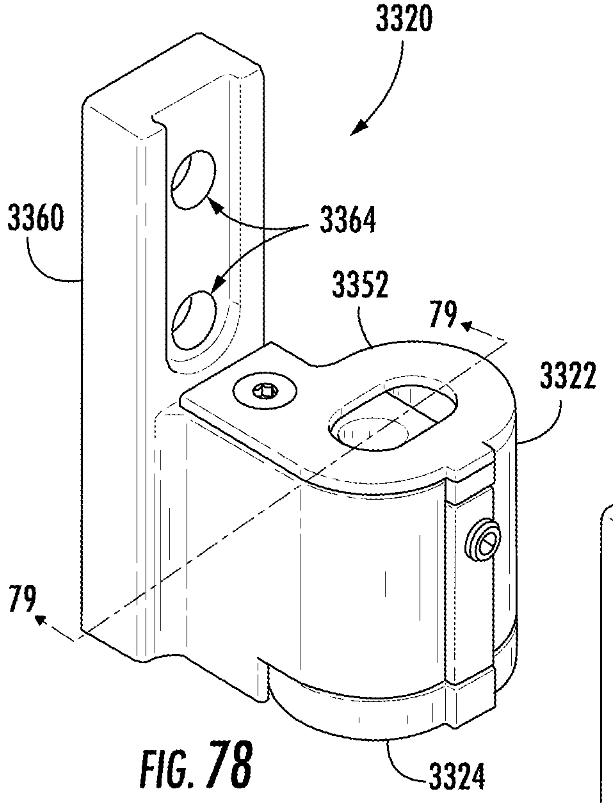
FIG. 78 is a perspective view of the receiver knuckle of FIG. 75.
Figure 79:
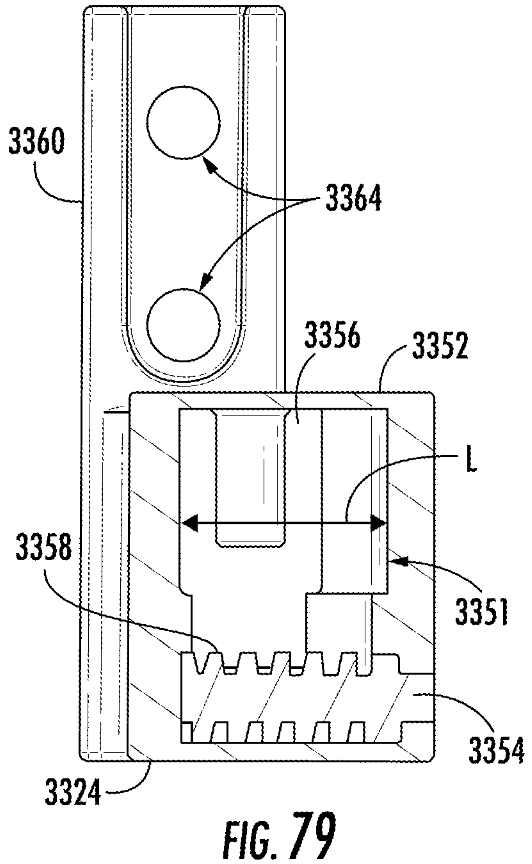
FIG. 79 is a cross-sectional view of the receiver knuckle of FIG. 78 taken along line 79-79 of FIG. 78.
Figure 80:
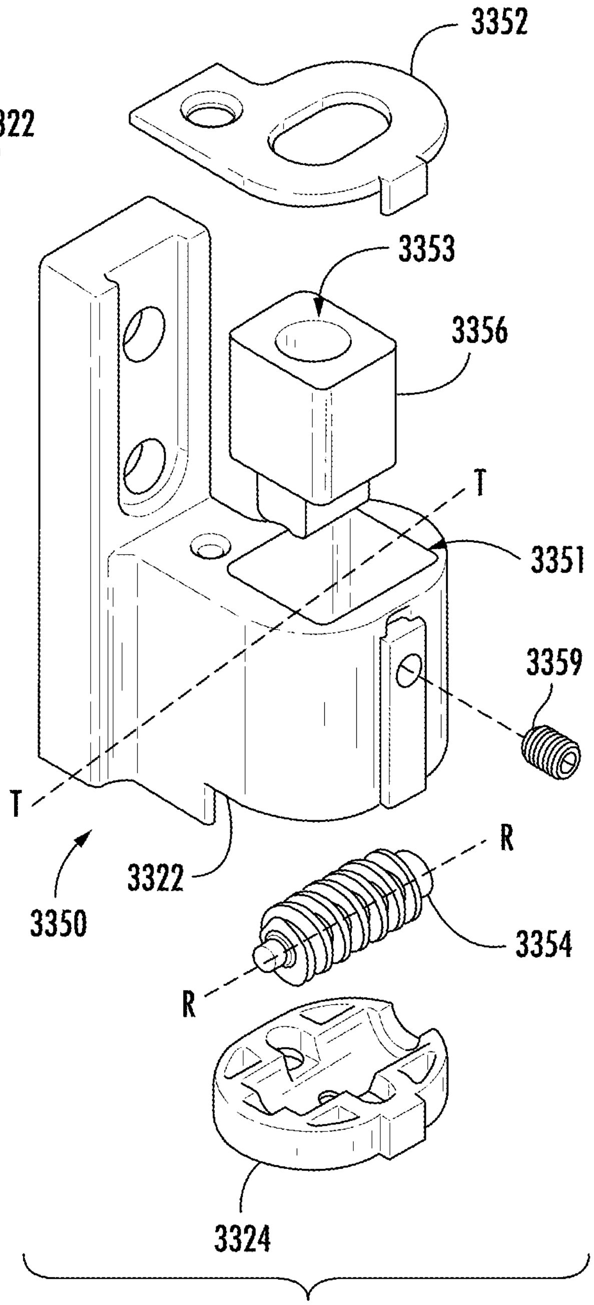
FIG. 80 is an exploded view, with parts separated, of the receiver knuckle of FIG. 78 illustrating parts thereof.

Referring now to FIGS. 78-80, the receiver knuckle 3320 is described in accordance with the present disclosure. The receiver knuckle 3320 receives the pivot pin 3311 to position the first leaf 3110 relative to the second leaf 3210 and as a result the respective panels 30, 40*a*, 40*b* relative to each other. The receiver knuckle 3320 includes a gap adjustment mechanism 3350 that allows for adjustment of the distance between the door panels 30, 40*a*, 40*b* when the door panel system 3010 is in the closed posture. The receiver knuckle 3320 includes the receiver knuckle body 3322, a knuckle cap 3324, a retention plate 3352, and a set screw 3359.

The gap adjustment mechanism 3350 includes an adjustment screw 3354 and a carriage 3356. The adjustment screw 3354 rotates about a rotation axis R-R and the carriage 3356 translates along a translation axis T-T. The carriage 3356 has teeth or a rack 3358 that engage the threads of the adjustment screw 3354 such that the carriage 3356 translates in response to rotation of the adjustment screw 3354. The translation axis T-T and the rotation axis R-R may be parallel with respect to one another. Orienting the translation axis T-T and the rotation axis R-R parallel to each other may reduce the chance of the adjustment screw 3354 being back driven during operation of the door panel system 3010 and the carriage 3356 moving out of position. The rotation axis R-R may be parallel to the interior or exterior face of the door panels 30, 40*a*, 40*b*. The adjustment screw 3354 may be a worm screw. The carriage 3356 defines a pivot pin hole 3353 to receive the pivot pin 3311. The pivot pin hole 3353 may be sized and dimensioned to accommodate a bearing or bushing disposed about the end of the pivot pin 3311 to assist in rotational motion between the pin knuckle 3310 and the receiver knuckle 3320.

When the receiver knuckle 3320 is assembled, the knuckle cap 3324 retains the adjustment screw 3354 while allowing rotation of the adjustment screw 3354 within the receiver knuckle body 3322. The adjustment screw 3354 is retained in the receiver knuckle body 3322 such that the adjustment screw 3354 may be parallel with the door panels 30, 40*a*, 40*b*. The receiver knuckle body 3322 of the receiver knuckle 3320 has an adjustment channel 3351 that slidingly receives the carriage 3356. The carriage 3356 sits within the adjustment channel 3351 with the rack 3358 of the carriage 3356 engaged with the threads of the adjustment screw 3354. The adjustment channel 3351 has a length L that is greater than the length of the carriage 3356. The shape and length L of the adjustment channel 3351 defines the adjustment path of the carriage 3356. The carriage 3356 may have flat sides to engage the walls of the adjustment channel 3351 to prevent rotation of the carriage 3356 during operation, thereby maintaining engagement of the rack 3358 with the adjustment screw 3354. The retention plate 3352 operably retains the carriage 3356 in the adjustment channel 3351 and allows the carriage to receive the pivot pin 3311 to pivotally couple the pin knuckle 3310 and the receiver knuckle 3320. The set screw 3359 may engage with a flat portion of the carriage 3356 to fix the position of the carriage 3356 within the adjustment channel 3351, preventing unintended translation of the carriage 3356, and thus maintaining alignment of the pivot axis P-P of the upper pivot assembly 3300 and the pivot axis P-P of the lower pivot assembly 3400.

The gap adjustment mechanism 3350 allows for the adjustment of a gap 3149 (FIG. 67) between respective panels 30 and 40*a* or 40*a* and 40*b*. Rotating the adjustment screw 3354 translates the carriage 3356 within the adjustment channel 3351 to increase or decrease the gap 3149. For example, rotation of the adjustment screw 3354 clockwise may translate the carriage 3356 within the adjustment channel 3351 in a first direction such that the gap is increased and rotation of the adjustment screw 3354 counterclockwise may translate the carriage 3356 within the adjustment channel 3351 a second direction opposite the first direction such that the gap is decreased. The adjustment channel 3351 constrains movement of the carriage 3356 to translation within the adjustment channel 3351. The adjustment channel 3351 may have a length L sufficient to allow the carriage 3356 to translate such that the gap can be adjusted in a range of 0.0625 inches to 0.5 inches in either direction for a total of adjustment of 0.125 inches to 1 inch, e.g., 0.375 inches in either direction or 0.75 inches total. The adjustment screw 3354 may have a pitch so that one complete turn of the adjustment screw 3354 translates the carriage 3356 a known distant. For example, one complete turn of the adjustment screw 3354 may translate the carriage 3356 0.125 inches in either direction within the adjustment channel 3351. In embodiments, adjusting the adjustment mechanisms 3350 of both the continuous hinges 3100, 3100' compound the total adjustment of the door panel system 3010. For example, where each adjustment mechanism 3350 is adjustable 0.125 inches in either direction from the center of the adjustment channel 3351 may allow for a total adjustment of the door panel system 3010 of 0.5 inches in either direction. In embodiments having more than two continuous hinges 3100, 3100' the total adjustment of the door panel system 3010 may be greater than 0.5 inches.

The gap adjustment mechanism 3350 allows for alignment of the pivot pin axes P-P of the upper and lower pivot assemblies 3300, 3400 such that the pivot axes P-P are colinear. The pivot axis P-P defined by the pivot pin 3311 may pass through the gap adjustment mechanism 3350, as seen in FIG. 75. Additionally or alternatively, adjustment of the gap 3149 between the door panels 30, 40*a*, 40*b* may allow for proper sealing of the weather stripping and installation of the door panel system 3010 in the frame 20. Reducing the gap 3149 may allow weather stripping attached to the trim 3150 to engage the opposing trim 3250 when the door panel system 3010 is in the fully closed posture to form a weather resistant seal. In some embodiments, the weather stripping may be deformed or compressed between the trims 3150, 3250 to form a weather resistant seal. When installing the door panel system 3010, adjusting the gap 3149 with the gap adjustment mechanism 3350 may allow for proper engagement of the operating panel 30 with the working jamb 28. For example, where the operating panel 30 engages with the fixed jamb 28 before the door panel system 3010 is in the closed posture the gap adjustment mechanism 3350 may reduce the gap 3149 between respective door panels 30, 40*a*, 40*b*. Such a reduction in the gap 3149 by the gap adjustment mechanism 3350 may allow the door panel system 3010 to enter the closed posture. Alternatively, the gap adjustment mechanism 3350 may increase the gap between respective door panels 30, 40*a*, 40*b* where the door panel system 3010 is in the closed posture before the operating panel 30 can engage the operating jamb 28. The increase in the gap allows the operating panel 30 to engage with the operating jamb 28 and the lock hardware of the operating panel 30 to function properly. The operating panel 30 may have standard lock hardware installed to engage with the operating jamb 28 that often requires an appropriate clearance between the operating panel 30 and the operating jamb 28 to properly function. The gap adjustment mechanism 3350 may allow adjustment of the clearance between the operating panel 30 and the operating jamb 28 to allow proper engagement of the standard lock hardware to ensure proper locking.

Briefly referring back to FIGS. 61 and 62, the frame 20 includes a top guide rail 22 and a bottom sill 24. The door panel system 3010 sits within frame 20 and moves between the fully open and the closed positions. The top guide rail 22 includes an upper track 3800 that guides the door panel system 3010, and the sill 24 includes a sill track 3700 that supports and guides the door panel system 3010.

Figure 82:
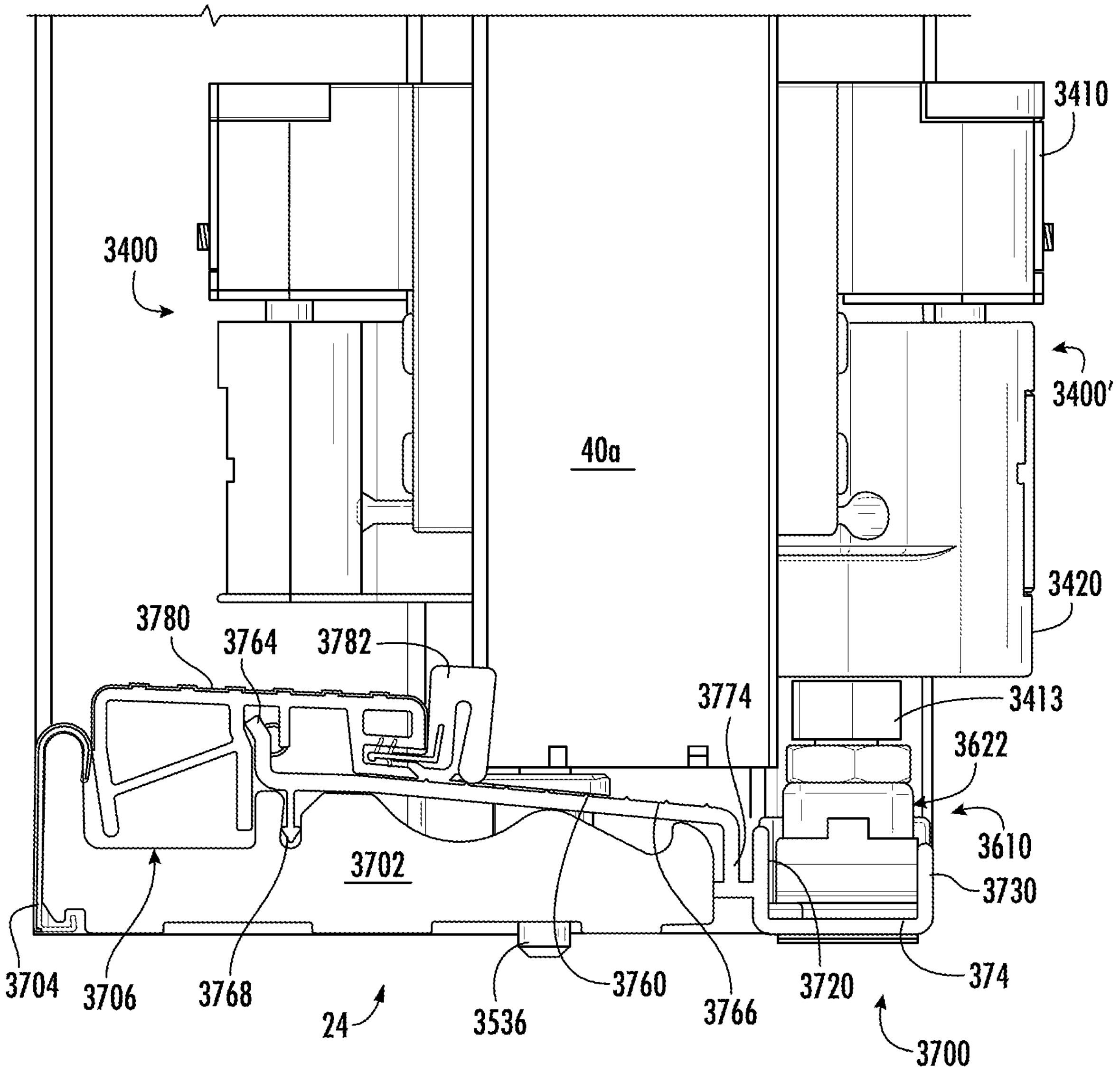
FIG. 82 is a cross-sectional view showing a lower track and guide assembly of the door panel system of FIG. 61 along line 82-82.
Figure 83:
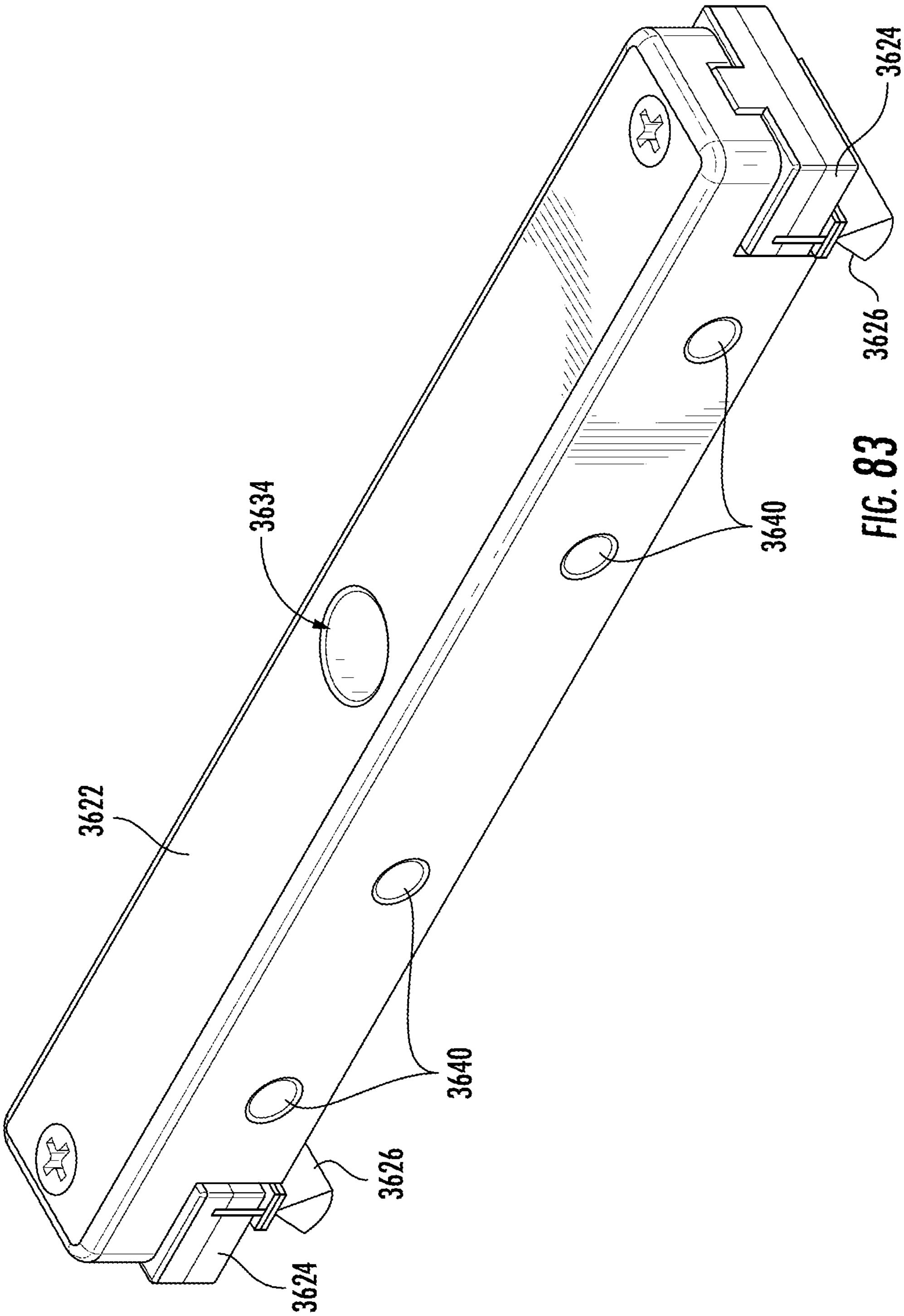
FIG. 83 is a perspective view of a guide assembly of FIGS. 81 and 82.

Now referring to FIGS. 81-83, the door panel system 3010 includes a guide assembly 3610. A guide assembly 3610 sits and moves within each of the upper track 3800 and the sill track 3700 as the door panel system 3010 transitions between the fully open and closed positions.

The guide assembly 3610 includes a truck 3622, rollers 3640, and sweeps 3624. The rollers 3640 allow the truck 3622 to roll along the upper track 3800 and the sill track 3700. The sweeps 3624 are disposed at each end of the truck 3622. The sweeps 3624 include a scrub 3626 that contacts a bottom wall 3840 of the upper track 3800 and a bottom wall 3740 of the sill track 3700 and may clear debris lodged in the upper track 3800 or sill track 3700. The scrub 3626 may be a brush with bristles or a squeegee with a blade. The sweeps 3624 may be optionally included in the guide assembly 3610 disposed within the upper track 3800. In some embodiments, the sweeps 3624 may function to urge water from the sill track 3700. The truck 3622 defines a pivot knuckle hole 3634 to receive the head 3313, 3413 and to secure the truck 3622 to a respective one of the upper pivot assembly 3300' or the lower pivot assembly 3400' together. The pivot knuckle hole 3634 receives the head 3313, 3413 to secure the truck 3622 to the pivot assemblies 3300', 3400'. The head 3313, 3413 may allow for vertical adjustment of the door panel system 3010 with respect to the frame 20 by spacing the guide assembly 3610 closer or further from the top or bottom edge of the door panels 30, 40*a*, 40*b*. In some embodiments, a guide pin may be used in lieu of a guide assembly 3610 in the upper track 3800. In such embodiments, the head 3313 may act as the guide pin and may have a bushing to slide or roll within the upper track 3800.

Figure 84:
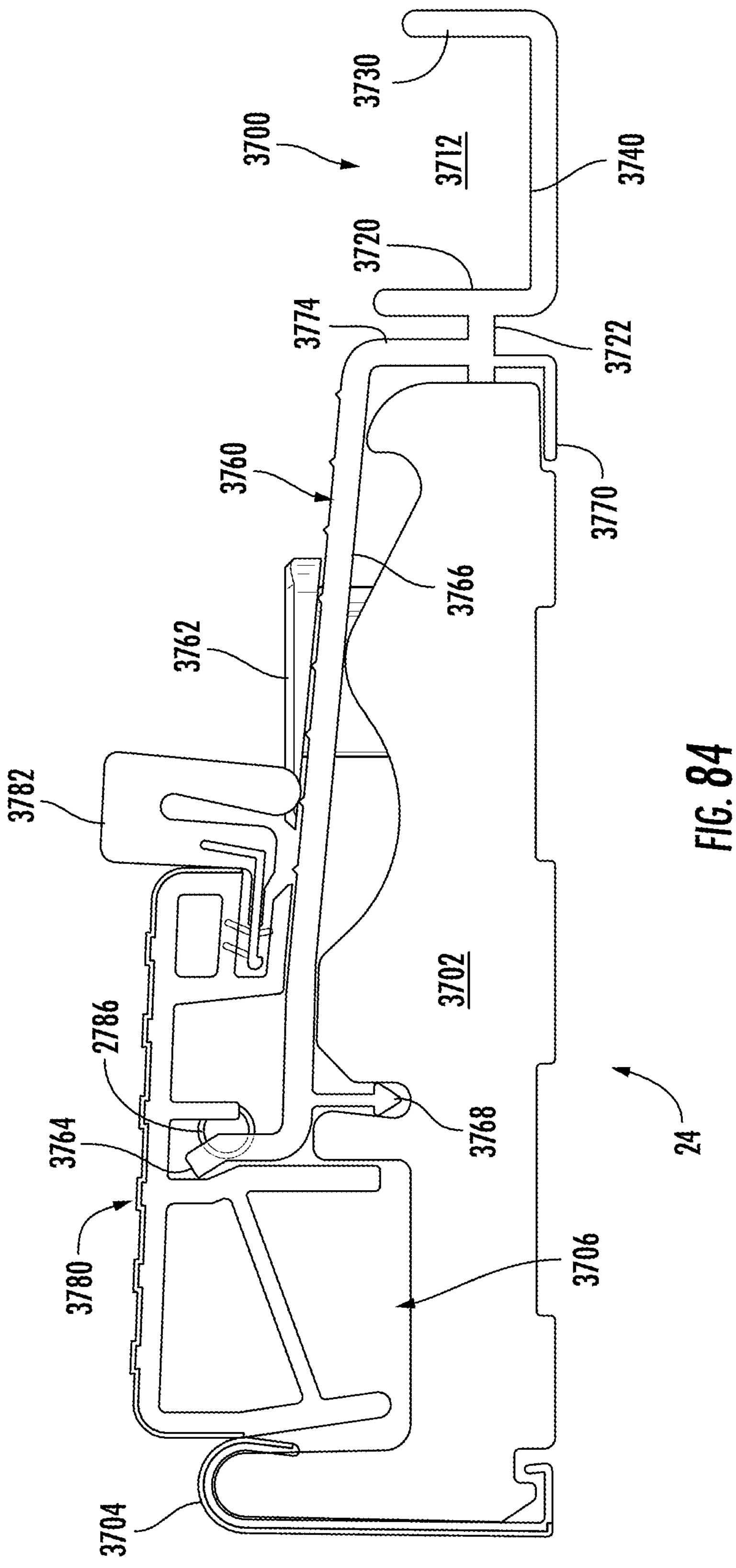
FIG. 84 is a profile view of a threshold assembly of the door panel system of FIG. 61.

Referring to FIG. 84, the sill 24 includes a substrate 3702, a nosing 3704, a sill deck 3760, a threshold cap 3780, and a sill track 3700. The bottom sill 24 may directly support portions of the door panel system 3010 as detailed below. The substrate 3702 is configured to be secured to a surface underlying the door frame. The substrate 3702 defines a drain channel 3706 between the nosing 3704 and a dam 3764 of the sill deck. The threshold cap 3780 is secured to the over the drain channel 3706 by engaging the dam 3764 of the sill deck and/or a portion of the nosing 3704. The threshold cap 3780 may receive weather stripping 3782 that is configured to engage the door panels 30, 40*a*, 40*b* to create a water resistant seal with the interior face of the door panels 30, 40*a*, 40*b* in a closed position thereof such that the sill 24 acts as a bumper sill. The weather stripping 3782 may be selected based on the thickness of the door panels 30, 40*a*, 40*b* to form the weatherproof seal. The threshold cap 3780 may include secondary weather stripping 3786 in contact with the sill deck 3760.

The sill deck 3760 may have a similar extrusion profile as a sill deck for use with a standard hinged door. The threshold cap 3780 may have a similar extrusion profile as a standard threshold cap for use with a standard hinged door. For example, the sill deck 3760 and the threshold cap 3780 may be a Z-Series Bumper Outswing Sill from Endura Products® with the addition the of the sill track 3700. The sill deck 3760 may include a shoot bolt receptacle 3762 defining a bolt cup in the sill 24 to receive the bottom shoot bolt 3536 when the panel locking mechanism 3530 is in the locked configuration.

The sill deck 3760 includes a dam 3764, a deck cover 3766, a front wall 3774, and an attachment arm 3770. The dam 3764 defines an interior end of the sill deck 3760 and is substantially vertical in orientation. The dam 3764 may include an angled portion that is engaged by the threshold cap 3780 to secure the threshold cap 3780 to the sill deck 3760. The deck cover 3766 extends from the dam 3764 toward an exterior side of the sill deck 3760. The deck cover 3766 is positioned over a portion of the substrate 3702. As shown, the deck cover 3766 has a substantially horizontal portion and a sloped portion that has a negative slope over a portion thereof from the dam 3764 to an end of the deck cover 3766. The sill deck 3760 may include a mounting projection 3768 that extends downward into a channel defined by the substrate 3702 to secure the sill deck 3760 to the substrate 3702. In some embodiments, the sill deck 3760 may include a single mounting projection 3768 that secures to the substrate 3702. The front wall 3774 extends downward in a substantially vertical direction from an exterior end of the deck cover 3766 beyond an exterior end of the substrate 3702. The front wall 3774 may be configured to extend to a bottom of the threshold 24. In some embodiments, the attachment arm 37700 may be omitted from the front wall 3774 as shown in FIG. 82. The front wall 3774 may include an attachment arm 3770 that extends in an interior direction from a bottom of the front wall 3774 to secure under an exterior end of the substrate 3702.

The sill track 3700 supports the door panel system 3010. As shown, the sill track 3700 is monolithically formed with the sill deck 3760 such that the sill track 3700 and the sill deck 3760 are formed as single unit, e.g., as a single extrusion. In some embodiments, the sill track 3700 may be formed separate from and joined to the sill deck 3760 through fasteners, welding, bonding, or other means. The sill track 3700 includes an attachment wall 3720, an exterior wall 3730, and a bottom wall 3740. The attachment wall 3720 is positioned on an exterior side of the substrate 3702 and the exterior wall 3730 is positioned on an exterior side of the attachment wall 3720. The attachment wall 3720 and the bottom wall 3740 define the support channel 3712 therebetween. The support channel 3712 is open upward and is closed on a bottom by the bottom wall 3740 that extends between the attachment wall 3720 and the exterior wall 3730. A leg 3722 extends in the interior direction from the attachment wall 3720 to the front wall 3774 of the sill deck 3760 to secure the sill track 3700 to the sill deck 3760. In embodiments, the attachment wall 3720 may be the front wall 3774 of the sill deck 3760 such that the sill track 3700 is provided without a leg 3722. In some embodiments, the sill track 3700, specifically the bottom wall 3740, may rest on the ground on an exterior side of the substrate 3702. For example, the bottom wall 3740 may be in direct contact with a surface at grade. A surface at grade may be the ground or a other surface that underlies the door frame at substantially the same level as an interior flooring such that the bottom wall 3740 is above grade. In some embodiments, the sill track 3700 supports the entire weight of the door panel system 3010 without resting on the ground. In certain embodiments, the attachment wall 3720 extends downward directly from the top surface of the sill deck 3760 such that the leg 3722 is not necessary. When the door panel system 3010 is in the closed posture, the exterior face of the door panels 30, 40*a*, 40*b* may be positioned closer to the interior side of the sill 24 than the exterior wall 3730 as shown in FIG. 82.

Continuing to refer to FIG. 84, the exterior wall 3730 of the support channel 3712 may angle slightly away from the center of the support channel 3712. The angle may between 0.5 degrees and 10 degrees away from vertical, e.g., 2 degrees away from vertical. This angle may compensate for deflection of the sill track 3700 caused by the weight of the door panel system 3010 and may prevent interference between the exterior wall 3730 and the door panels 30, 40*a*, 40*b*, or the support assembly 3610, while the door panel system 3010 transitions between the fully open posture and the closed posture. Alternatively, the exterior wall 3730 may be positioned vertically such that the exterior wall 3730 and the attachment wall 3720 are parallel, or such that the exterior wall 3730 and the bottom wall 3740 are perpendicular. The leg 3722 may maintain parallelism between the attachment wall 3720 and the exterior wall 3730. The weight of the door panel system 3010 causes sill track 3700, or portions thereof, to deflect. In such a case, the leg 3722 may deflect prior to the attachment wall 3720 or the exterior wall 3730 and may maintain parallelism between the two.

In the closed posture, the door panels 30, 40*a*, 40*b* may have their weight distributed across the length of the sill track 3700 unevenly. For example, the secondary panel 40*b* is secured to the fixed jamb 26 by hinges 27 that may support the entire weight of the secondary panel 40*b*. The secondary panel 40*a* is secured to the secondary panel 40*b* by the floating continuous hinge 3100 and is support by the sill track 3700 through the support continuous hinge 3100'. As such, the secondary panel 40*a* may be partially supported by the hinges 27 and partially supported by the sill track 3700. The operating panel 30 is secured to the secondary panel 40*a* by the support continuous hinge 3100' and only engages the operating jamb 28 with lock hardware. As such the entire weight of the operating panel 30 may be supported by the sill track 3700.

Figure 85:
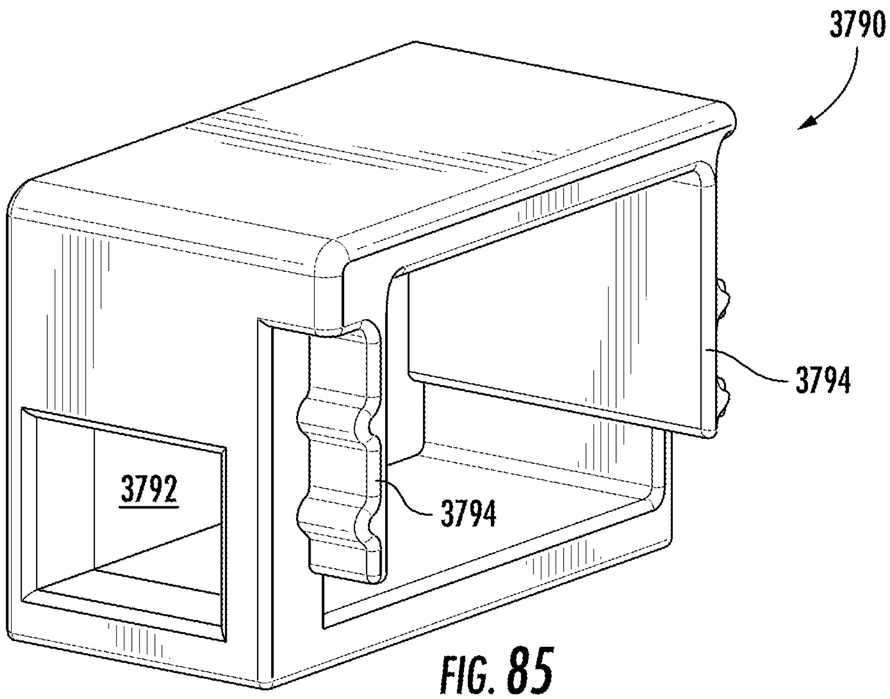
FIG. 85 is a perspective view of a drain plug of the threshold assembly of FIG. 84.
Figure 86:
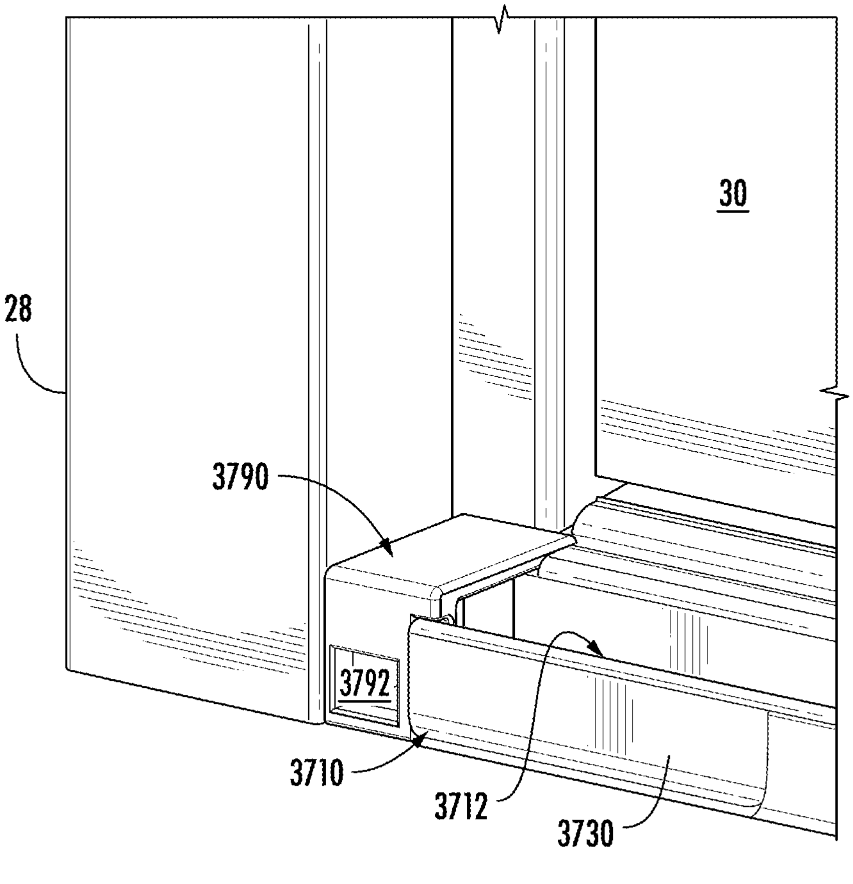
FIG. 86 is perspective view of the drain plug of FIG. 85 within the lower track of FIG. 82.

Referring to FIGS. 85 and 86, the sill 24 may include drain plugs 3790 disposed at the ends of sill track 3700. The drain plugs 3790 define a drain channel 3792 in fluid communication with the support channel 3712 to provide for drainage of fluid and debris from the support channel 3712. The drain plugs 3790 may have securement tabs 3794 to secure the drain plugs 3790 to the bottom sill 3700. The securement tabs 3794 are received between the attachment wall 3720 and the exterior wall 3730.

The above-described components may be made from steel, aluminum, or plastic. For example, the pivot anchor 2330 may be made of steel or aluminum. The pivot anchor 2330 may have a machined or cast. In some embodiments, components may be manufactured by a casting process and made of metal alloys such as a zamak material, e.g., zamak 2 (ZnAl4Cu3) also known as kirksite.

Referring back to FIGS. 56-60, the method for installing the door panel system 3010 of FIGS. 61-63 may follow similar steps as described in method 4000 of installing the door panel system 2010 of FIGS. 36 and 37.

The continuous hinge assemblies detailed herein are surface mounted hinge assemblies for folding door assemblies. Specifically, the continuous hinges 100, 1100, 2100, and 3100 are configured to secure or mount to unmachined hinged edges of door panels. The unmachined edges of door panels are edges that are substantially planar without requiring channels or recesses to be machined therein to receive portions of the hinges such that the unmachined hinged edges are substantially planar. The continuous hinges 100, 1100, 2100, and 3100 may be referred to as surface mounted hardware for folding door assemblies or hardware for folding door assemblies that do not require machining of the panels for mounting and use. By not requiring machining of the panels, the time, and thus, the cost of installing the continuous hinges 100, 1100, 2100, and 3100 may be reduced. In addition, the installation may be simplified by not requiring additional machining of door panels receiving the continuous hinges 100, 1100, 2100, and 3100 as compared to traditional hinges for folding door assemblies.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. An adjustable hinge comprising:

a pin defining a pivot axis;

a first body including a first connection plate;

a second body including a second connection plate, the second body pivotally coupled to the first body, the pin extending between the first body and the second body such that the first body and the second body pivot with respect to each another about the pivot axis between a closed position in which the first connection plate and the second connection plate are co-planer with one another and an open position in which the first connection plate and the second connection plate face opposite directions from one another; and an adjustment mechanism disposed within one of the first body or the second body, the adjustment mechanism configured to increase or decrease a gap defined between the first connection plate and the second connection plate in the closed position, the adjustment mechanism comprising:

a carriage having a rack; and an adjustment screw operably engaged with the rack such that rotation of the adjustment screw in a first direction increases the gap and rotation of the adjustment screw in a second direction opposite the first direction decreases the gap.

2. The adjustable hinge according to claim 1, wherein in the open position, the pivot axis is disposed between the first connection plate and the second connection plate.

3. The adjustable hinge according to claim 1, wherein the first connection plate and the second connection plate define a plate distance therebetween in the open position, the plate distance remaining constant in response to rotation of the adjustment screw.

4. The adjustable hinge according to claim 1, wherein the adjustment screw defines a rotational axis, the pivot axis and the rotational axis being perpendicular to one another.

5. The adjustable hinge according to claim 4, wherein the pivot axis and the rotational axis intersect.

* * * * *